(12) United States Patent
Thomas et al.

(10) Patent No.: US 12,398,710 B2
(45) Date of Patent: Aug. 26, 2025

(54) FLUID ROUTING PLUG

(71) Applicant: Kerr Machine Co., Sulphur, OK (US)

(72) Inventors: Micheal Cole Thomas, Azle, TX (US); Christopher Todd Barnett, Stratford, OK (US); Kelcy Jake Foster, Sulphur, OK (US); Nicholas Son, Davis, OK (US); John Keith, Ardmore, OK (US); Mark S. Nowell, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 19/188,205

(22) Filed: Apr. 24, 2025

(65) Prior Publication Data

US 2025/0250972 A1 Aug. 7, 2025

Related U.S. Application Data

(63) Continuation of application No. 18/434,354, filed on Feb. 6, 2024, now Pat. No. 12,292,047, which is a
(Continued)

(51) Int. Cl.
*F04B 7/02* (2006.01)
*F04B 1/0452* (2020.01)
(Continued)

(52) U.S. Cl.
CPC .......... *F04B 7/0208* (2013.01); *F04B 1/0452* (2013.01); *F04B 1/0538* (2013.01);
(Continued)

(58) Field of Classification Search
CPC ........ F04B 53/22; F04B 53/16; F04B 53/162; F04B 39/14; F04B 39/12; F04B 39/121; F04B 39/122; F04B 39/127; F04B 35/002; F04B 7/0084; F04B 7/0003; F04B 11/0091; F04B 53/1087; F04B 1/0452; F04B 53/007; F04B 53/109; F04B 15/02; F04B 1/0538; F04B 53/1022; F04B 53/1032; F04B 7/0266; F04B 7/0088; F04B 7/0208; F16L 55/11; F16L 39/00; F16K 15/066; F16K 11/105
See application file for complete search history.

(56) References Cited

U.S. PATENT DOCUMENTS

| 3,702,624 A * | 11/1972 | Fries | F16K 15/066 |
| | | | 137/516.23 |
| 2015/0071803 A1* | 3/2015 | Huang | F04B 39/1046 |
| | | | 417/560 |
| 2015/0211641 A1* | 7/2015 | Pacht | F04B 1/145 |
| | | | 251/359 |

* cited by examiner

*Primary Examiner* — Bryan M Lettman
(74) *Attorney, Agent, or Firm* — Tomlinson McKinstry, P.C.

(57) ABSTRACT

A fluid routing plug for use with a fluid end section. The fluid end section being one of a plurality of fluid end sections making up a fluid end side of a high pressure pump. The fluid routing plug is installed within a horizontal bore formed in a fluid end section and is configured to route fluid between an intake and discharge bore. The fluid routing plug comprises a plurality of first and second fluid passages. The first and second passages do not intersect and are offset from one another. The first fluid passages are configured to direct fluid delivered to the horizontal bore from intake bores towards a reciprocating plunger. The second fluid passages are configured to direct fluid pressurized by the plunger towards a discharge bore.

20 Claims, 131 Drawing Sheets

Related U.S. Application Data continuation of application No. 18/168,041, filed on Feb. 13, 2023, now Pat. No. 11,920,587, which is a continuation of application No. 17/668,529, filed on Feb. 10, 2022, now Pat. No. 11,578,711, which is a continuation-in-part of application No. 16/951,605, filed on Nov. 18, 2020, now Pat. No. 11,300,111, said application No. 17/668,529 is a continuation-in-part of application No. 17/550,552, filed on Dec. 14, 2021, now Pat. No. 11,644,018, which is a continuation-in-part of application No. 17/515,707, filed on Nov. 1, 2021, now Pat. No. 11,359,615, which is a continuation of application No. 16/951,741, filed on Nov. 18, 2020, now Pat. No. 11,162,479.

(60) Provisional application No. 62/936,789, filed on Nov. 18, 2019, provisional application No. 62/940,513, filed on Nov. 26, 2019, provisional application No. 62/953,763, filed on Dec. 26, 2019, provisional application No. 62/957,489, filed on Jan. 6, 2020, provisional application No. 62/959,570, filed on Jan. 10, 2020, provisional application No. 62/960,194, filed on Jan. 13, 2020, provisional application No. 62/960,366, filed on Jan. 13, 2020, provisional application No. 62/968,634, filed on Jan. 31, 2020, provisional application No. 62/990,817, filed on Mar. 17, 2020, provisional application No. 63/008,036, filed on Apr. 10, 2020, provisional application No. 63/018,021, filed on Apr. 30, 2020, provisional application No. 63/019,789, filed on May 4, 2020, provisional application No. 63/027,584, filed on May 20, 2020, provisional application No. 63/033,244, filed on Jun. 2, 2020, provisional application No. 63/040,086, filed on Jun. 17, 2020, provisional application No. 63/046,826, filed on Jul. 1, 2020, provisional application No. 63/053,797, filed on Jul. 20, 2020, provisional application No. 63/076,587, filed on Sep. 10, 2020, provisional application No. 63/089,882, filed on Oct. 9, 2020, provisional application No. 63/148,065, filed on Feb. 10, 2021, provisional application No. 63/155,835, filed on Mar. 3, 2021, provisional application No. 63/168,364, filed on Mar. 31, 2021, provisional application No. 63/283,487, filed on Nov. 28, 2021, provisional application No. 63/125,459, filed on Dec. 15, 2020, provisional application No. 63/015,340, filed on Feb. 17, 2021.

(51) Int. Cl.
*F04B 1/0538* (2020.01)
*F04B 7/00* (2006.01)
*F04B 15/02* (2006.01)
*F04B 53/10* (2006.01)

(52) U.S. Cl.
CPC ............ *F04B 7/0003* (2013.01); *F04B 7/003* (2013.01); *F04B 15/02* (2013.01); *F04B 53/1022* (2013.01); *F04B 53/1032* (2013.01); *F04B 7/0084* (2013.01); *F04B 7/0266* (2013.01)

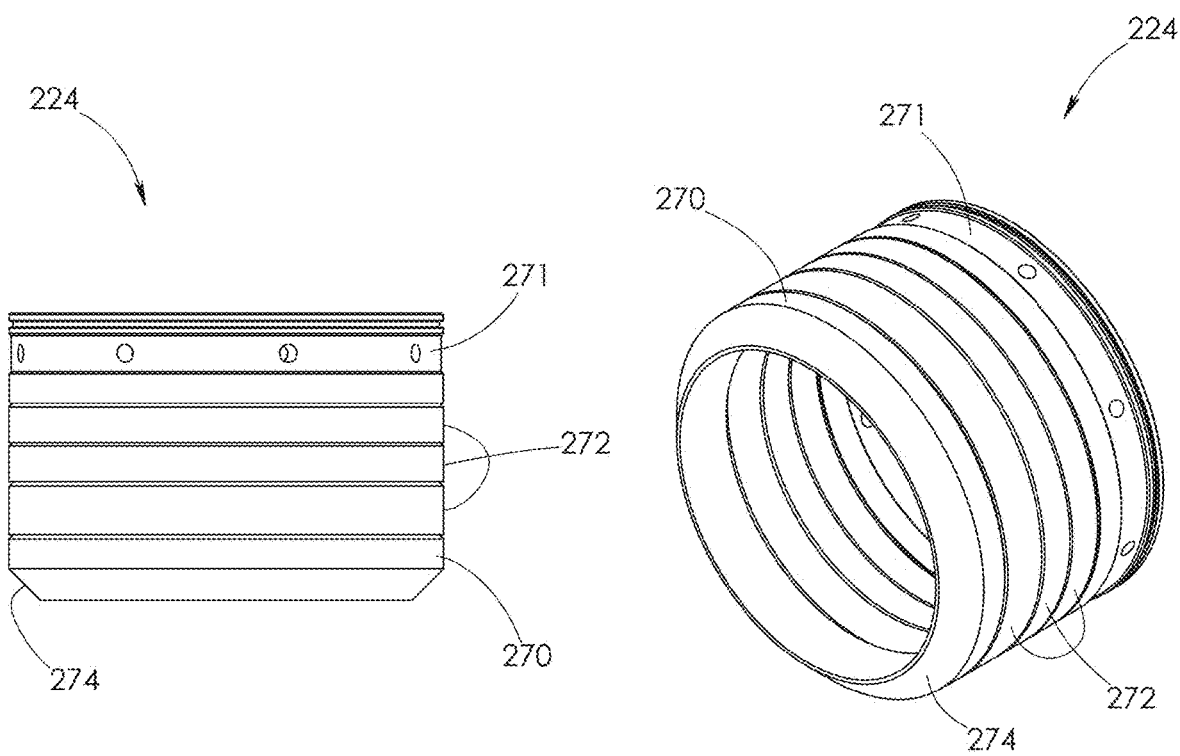
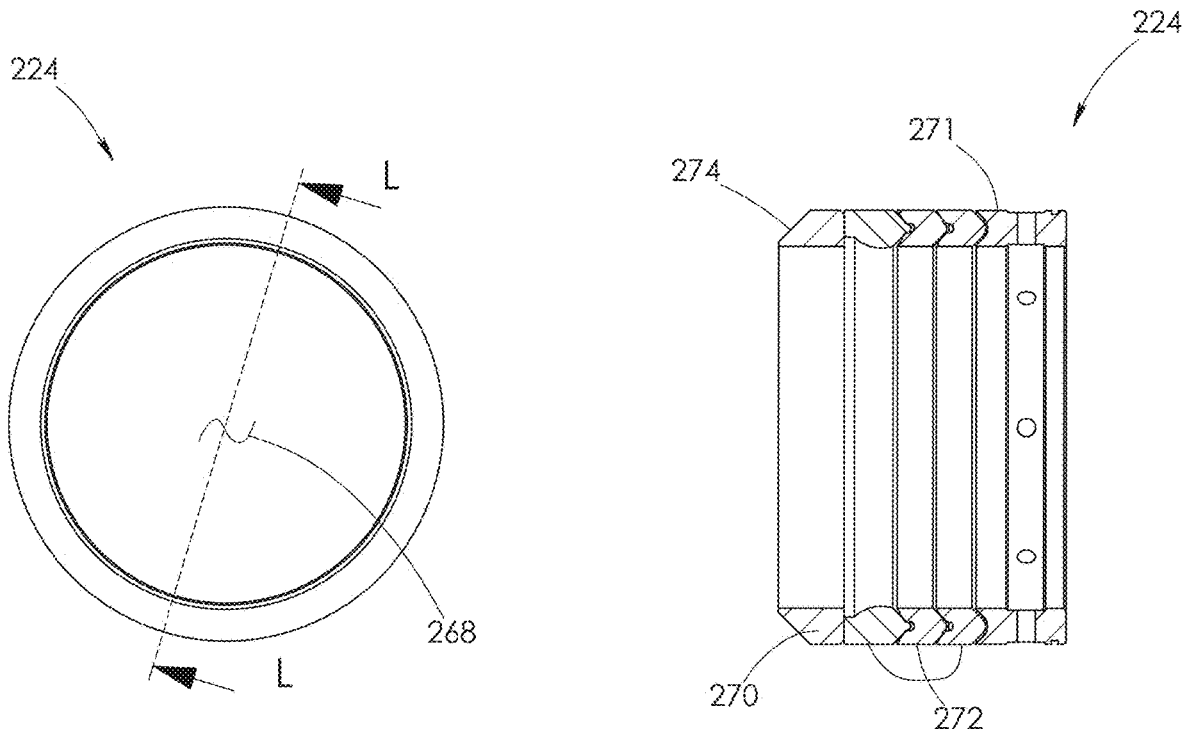

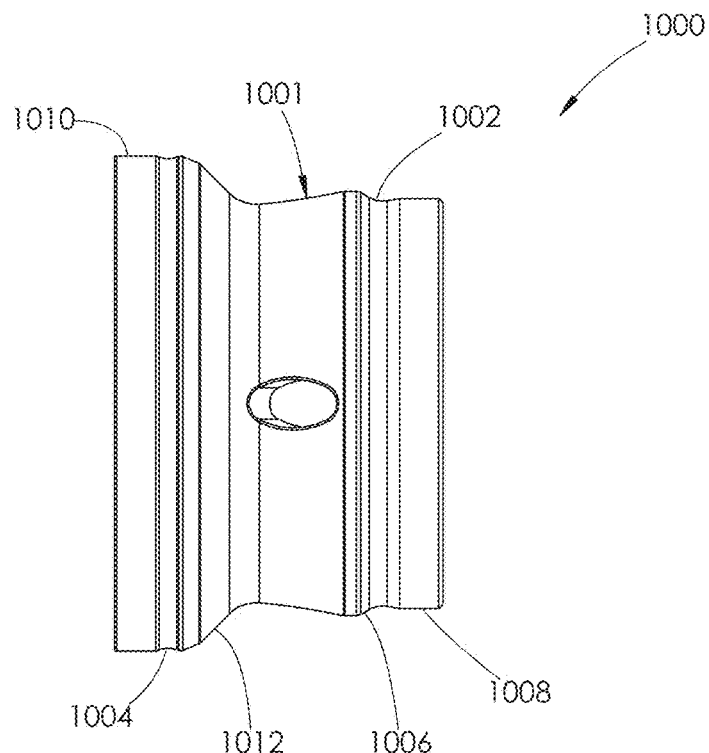
FIG. 129
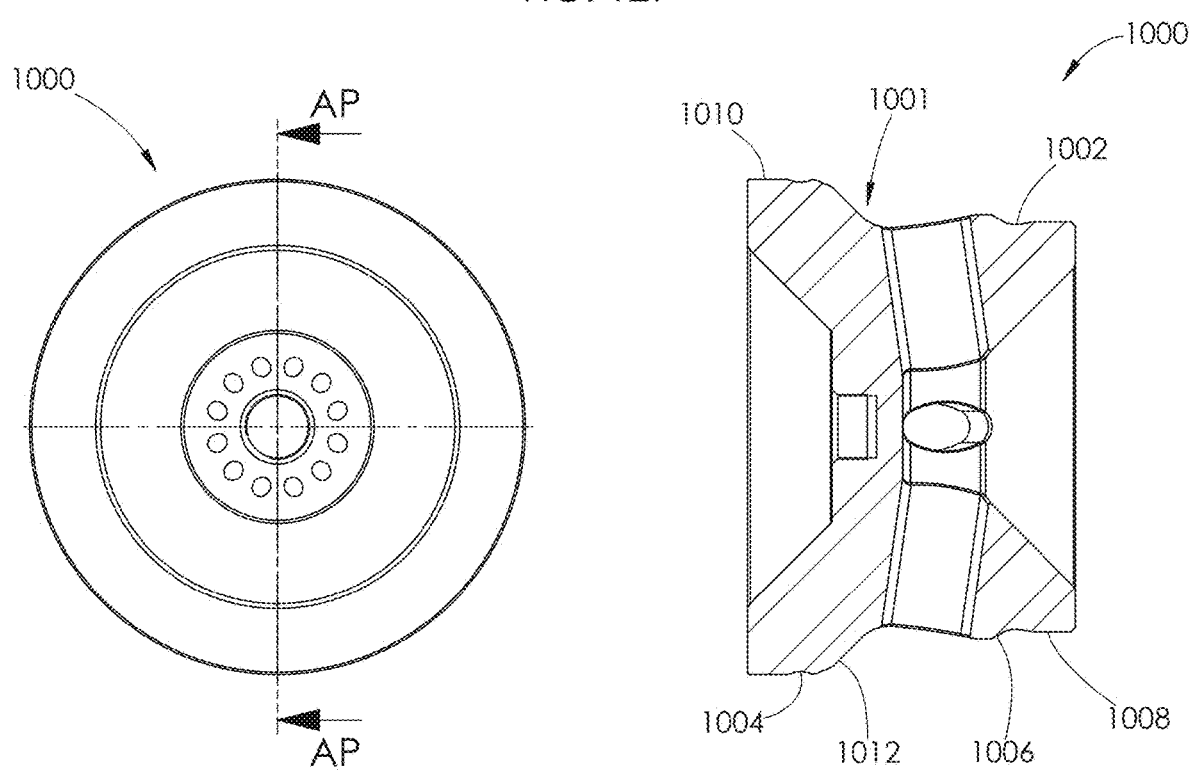
FIG. 130
FIG. 131

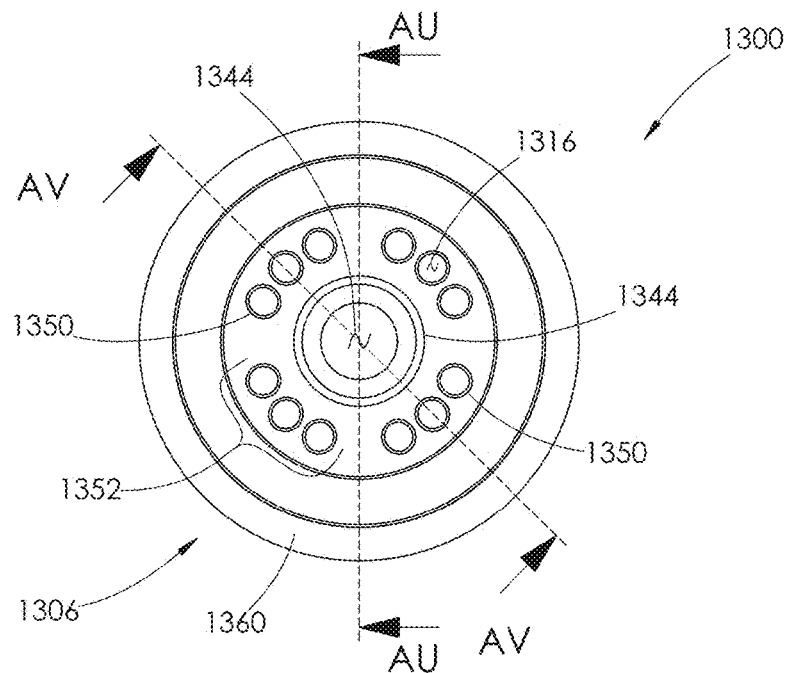
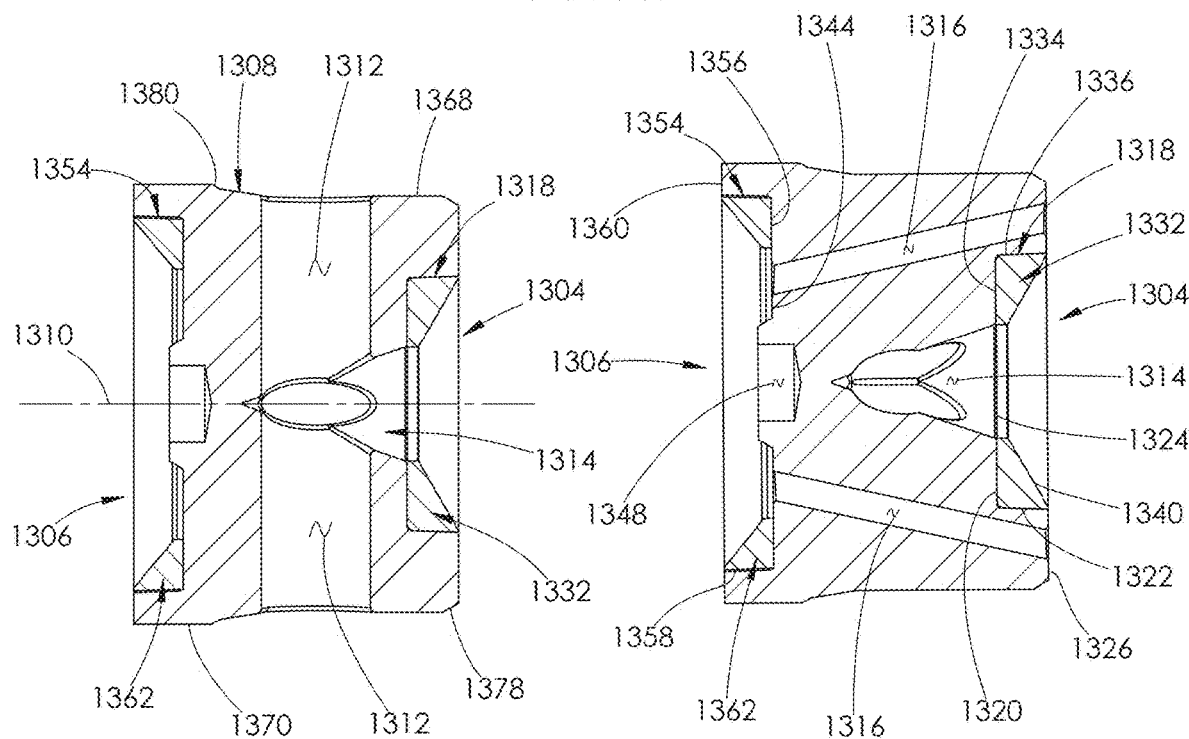
FIG. 145
FIG. 146　　　FIG. 147

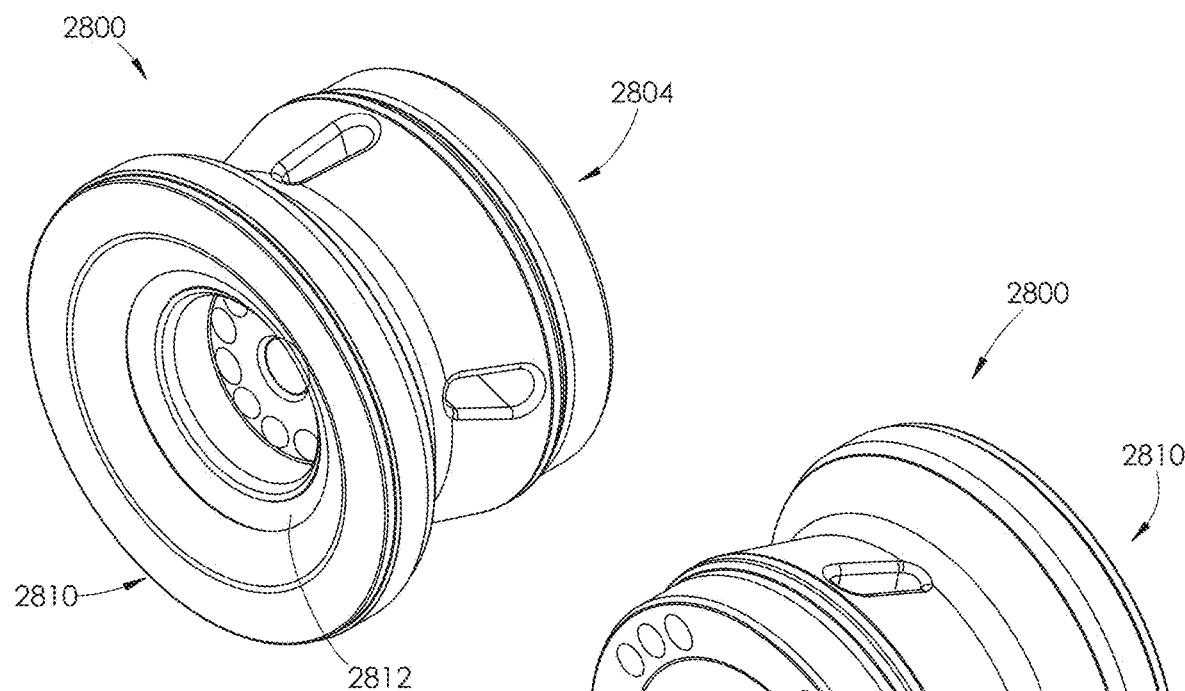
FIG. 232
FIG. 233
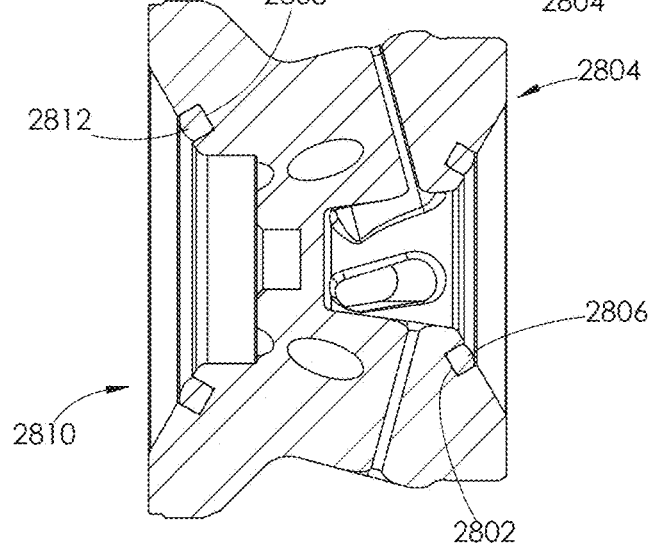
FIG. 234

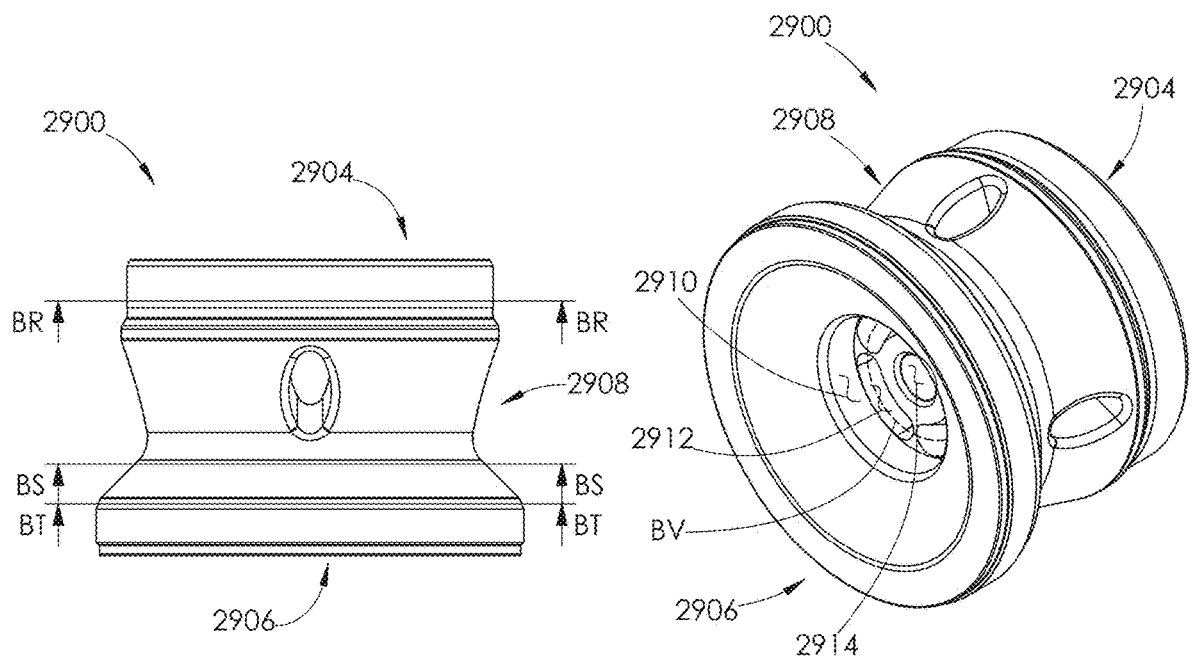
FIG. 237    FIG. 238
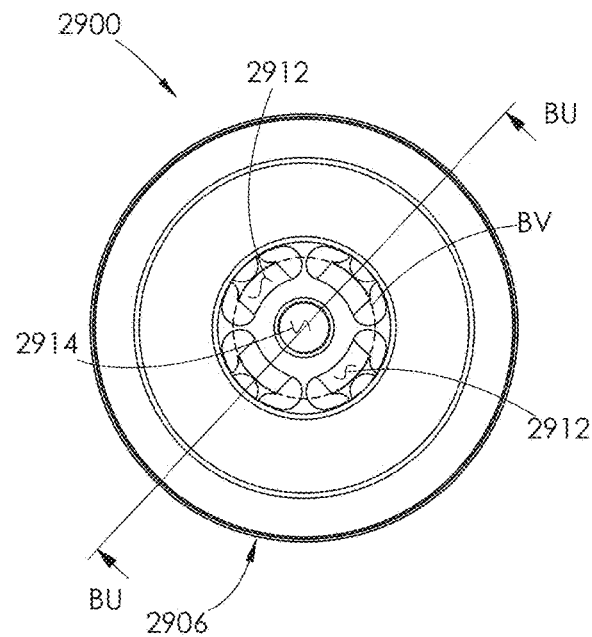    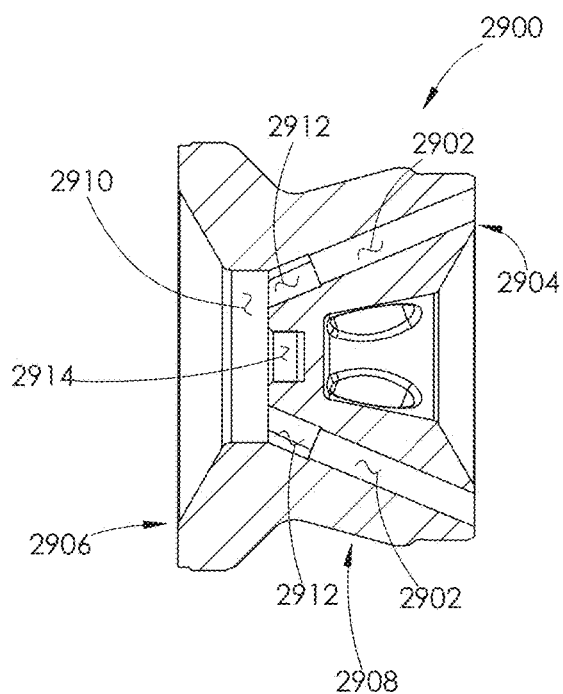
FIG. 239    FIG. 240

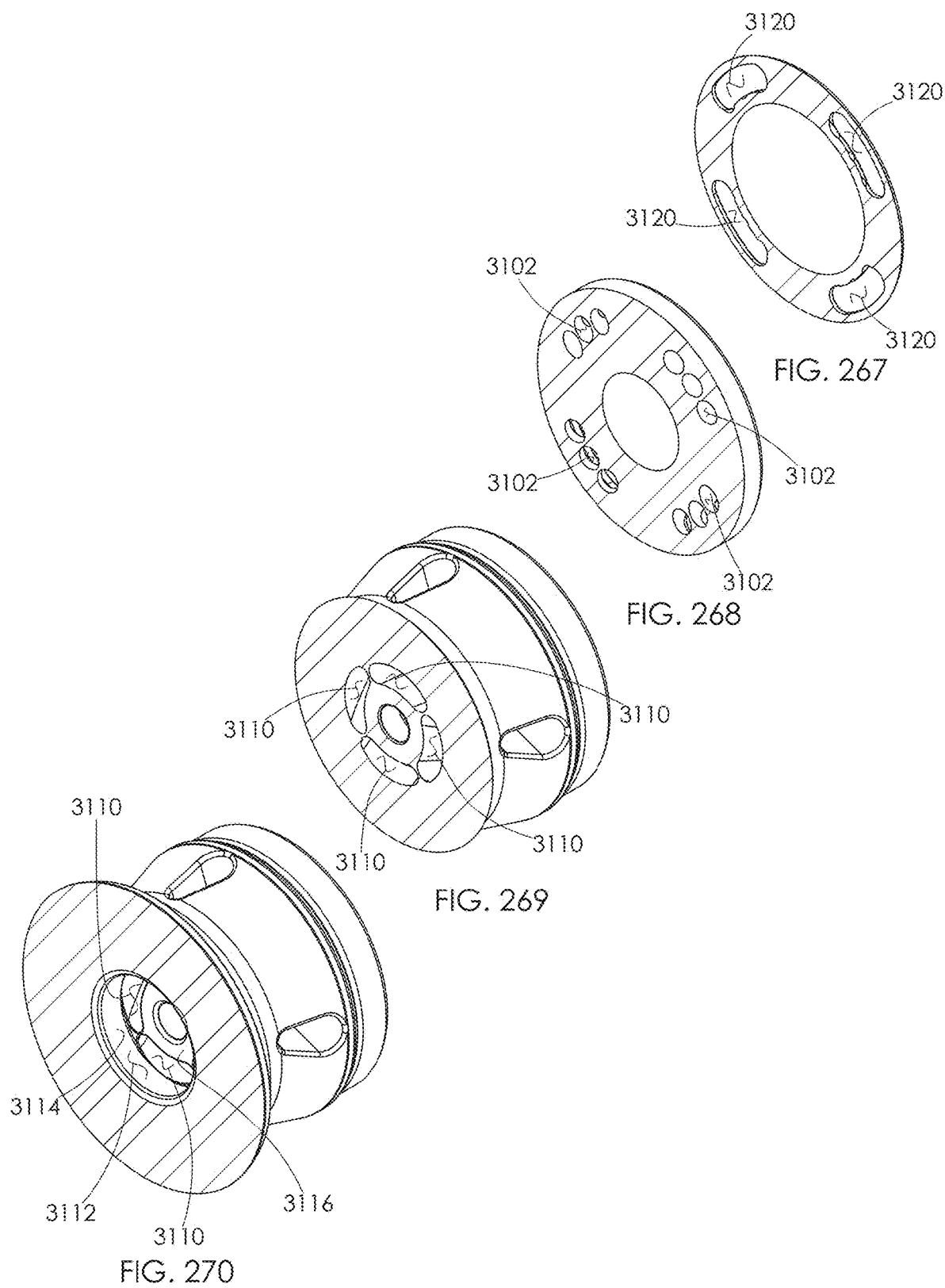

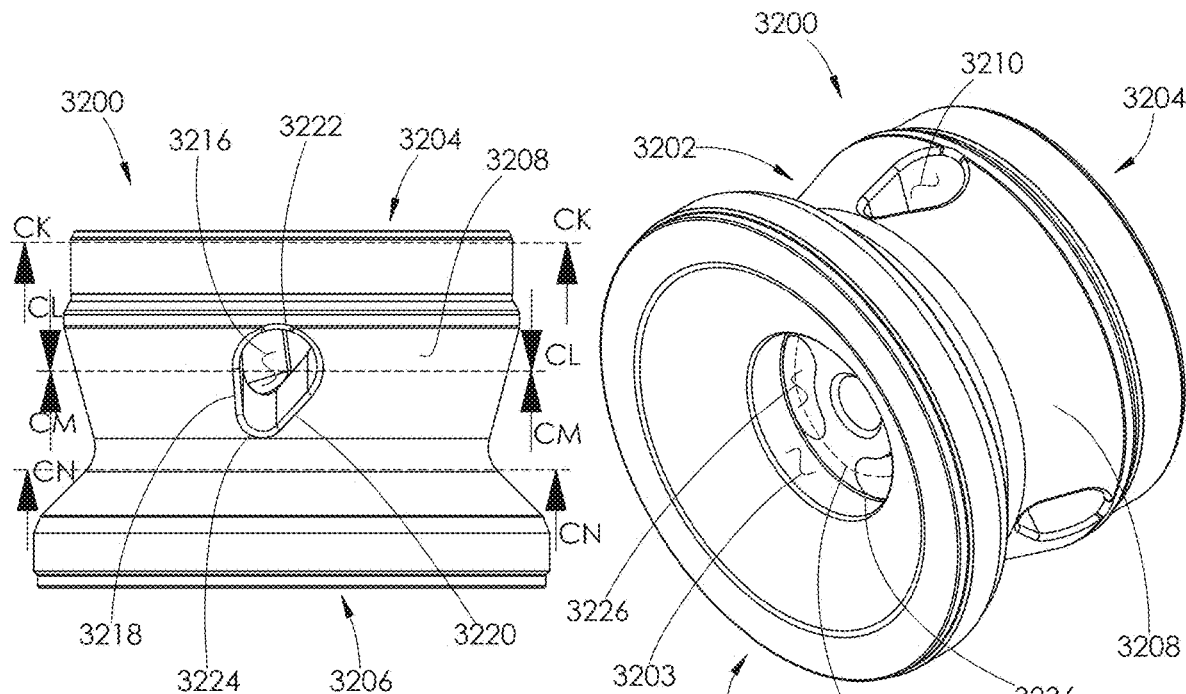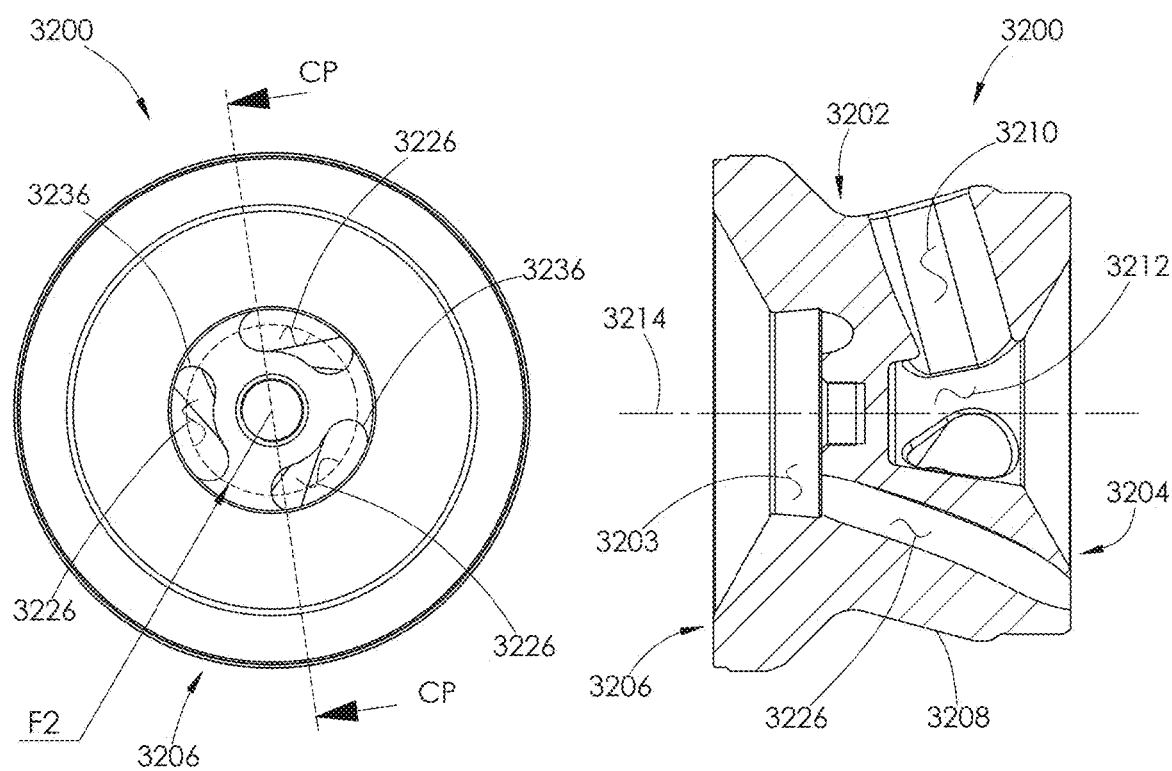

FLUID ROUTING PLUG

RELATED APPLICATIONS

This application is a Continuation-in-Part of U.S. Ser. No. 16/951,605, authored by Thomas et al. and filed on Nov. 18, 2020; and is a Continuation-in-Part of U.S. Ser. No. 17/550,552, authored by Thomas et al. and filed on Dec. 14, 2021.

This application also claims the benefit of the following provisional patent applications: Ser. No. 63/148,065, authored by Thomas et al. and filed on Feb. 10, 2021; Ser. No. 63/150,340, authored by Thomas et al. and filed on Feb. 17, 2021; Ser. No. 63/155,835, authored by Thomas et al. and filed on Mar. 3, 2021; Ser. No. 63/168,364, authored by Thomas et al. and filed on Mar. 31, 2021; and Ser. No. 63/283,487, authored by Thomas et al. and filed on Nov. 28, 2021.

The entire contents of all of the above listed non-provisional and provisional patent applications are incorporated herein by reference.

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressured fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating at a wellsite 24 in FIG. 2. Each of the fluid ends 22 is attached to a power end 26 in a one-to-one relationship. The power end 26 serves as an engine or motor for the fluid end 22. Together, the fluid end 22 and power end 26 function as a hydraulic pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi. The power end used with the fluid end typically has a power output of at least 2,250 horsepower during hydraulic fracturing operations. A single fluid end typically produces a fluid volume of about 400 gallons, or 10 barrels, per minute during a fracking operation. A single fluid end may operate in flow ranges from 170 to 630 gallons per minute, or approximately 4 to 15 barrels per minute. When a plurality of fluid ends are used together, the fluid ends collectively deliver about 4,200 gallons per minute or 100 barrels per minute to the wellbore.

In contrast, mud pumps known in the art typically operate at a pressure of less than 8,000 psi. Mud pumps are used to deliver drilling mud to a rotating drill bit within the wellbore during drilling operations. Thus, the drilling mud does not need to have as high of fluid pressure as fracking fluid. A fluid end does not pump drilling mud. A power end used with mud pumps typically has a power output of less than 2,250 horsepower. Mud pumps generally produce a fluid volume of about 150-600 gallons per minute, depending on the size of pump used.

In further contrast, a fluid jetting pump known in the art typically operates at pressures of 30,000-90,000 psi. Jet pumps are used to deliver a highly concentrated stream of fluid to a desired area. Jet pumps typically deliver fluid through a wand. Fluid ends do not deliver fluid through a wand. Unlike fluid ends, jet pumps are not used in concert with a plurality of other jet pumps. Rather, only a single jet pump is used to pressurize fluid. A power end used with a jet pump typically has a power output of about 1,000 horsepower. Jet pumps generally produce a fluid volume of about 10 gallons per minute.

High operational pressures may cause a fluid end to expand or crack. Such a structural failure may lead to fluid leakage, which leaves the fluid end unable to produce and maintain adequate fluid pressures. Moreover, if proppants are included in the pressurized fluid, those proppants may cause erosion at weak points within the fluid end, resulting in additional failures.

It is not uncommon for conventional fluid ends to experience failure after only several hundred operating hours. Yet, a single fracking operation may require as many as fifty (50) hours of fluid end operation. Thus, a traditional fluid end may require replacement after use on as few as two fracking jobs.

During operation of a hydraulic pump, the power end is not exposed to the same corrosive and abrasive fluids that move through the fluid end. Thus, power ends typically have much longer lifespans than fluid ends. A typical power end may service five or more different fluid ends during its lifespan.

With reference to FIG. 3, a traditional power end 34 is shown. The power end 34 comprises a housing 36 having a mounting plate 38 formed on its front end 40. A plurality of stay rods 42 are attached to and project from the mounting plate 38. A plurality of pony rods 44 are disposed at least partially within the power end 34 and project from openings formed in the mounting plate 38. Each of the pony rods 44 is attached to a crank shaft installed within the housing 36. Rotation of the crank shaft powers reciprocal motion of the pony rods 44 relative to the mounting plate 38.

A fluid end 46 shown in FIG. 3 is attached to the power end 34. The fluid end 46 comprises a single housing 48 having a flange 50 machined therein. The flange 50 provides a connection point for the plurality of stay rods 42. The stay rods 42 rigidly interconnect the power end 34 and the fluid end 46. When connected, the fluid end 46 is suspended in offset relationship to the power end 34.

A plurality of plungers 52 are disposed within the fluid end 46 and project from openings formed in the flange 50. The plungers 52 and pony rods 44 are arranged in a one-to-one relationship, with each plunger 52 aligned with and connected to a corresponding one of the pony rods 44. Reciprocation of each pony rod 44 causes its connected plunger 52 to reciprocate within the fluid end 46. In operation, reciprocation of the plungers 52 pressurizes fluid within the fluid end 46. The reciprocation cycle of each plunger 52 is differently phased from that of each adjacent plunger 52.

With reference to FIG. 5, the interior of the fluid end 46 includes a plurality of longitudinally spaced bore pairs. Each bore pair includes a vertical bore 56 and an intersecting horizontal bore 58. The zone of intersection between the paired bores defines an internal chamber 60. Each plunger 52 extends through a horizontal bore 58 and into its associated internal chamber 60. The plungers 52 and horizontal bores 58 are arranged in a one-to-one relationship.

Each horizontal bore 58 is sized to receive a plurality of packing seals 64. The seals 64 are configured to surround the installed plunger 52 and prevent high-pressure fluid from passing around the plunger 52 during operation. The packing seals 64 are maintained within the bore 58 by a retainer 65. The retainer 65 has external threads 63 that mate with internal threads 67 formed in the walls surrounding the bore 58. In some traditional fluid ends, the packing seals 64 are installed within a removable stuffing box sleeve that is installed within the horizontal bore.

Each vertical bore 56 interconnects opposing top and bottom surfaces 66 and 68 of the fluid end 46. Each horizontal bore 58 interconnects opposing front and rear surfaces 70 and 72 of the fluid end 46. A discharge plug 74 seals each opening of each vertical bore 56 on the top surface 66 of the fluid end 46. Likewise, a suction plug 76 seals each opening of each horizontal bore 58 on the front surface 70 of the fluid end 46.

Each of the plugs 74 and 76 features a generally cylindrical body. An annular seal 77 is installed within a recess formed in an outer surface of that body, and blocks passage of high pressure fluid. The discharge and suction plugs 74 and 76 are retained within their corresponding bores 56 and 58 by a retainer 78, shown in FIGS. 3, 5, and 6. The retainer 78 has a cylindrical body having external threads 79 formed in its outer surface. The external threads 79 mate with internal threads 81 formed in the walls surrounding the bore 56 or 58 between the installed plug 74 or 76 and the surface 66 or 70 of the fluid end 46.

As shown in FIG. 3, a single manifold 80 is attached to the fluid end 46. The manifold 80 is also connected to an intake piping system, of the type shown in FIG. 2. Fluid to be pressurized is drawn from the intake piping system into the manifold 80, which directs the fluid into each of the vertical bores 56, by way of openings (not shown) in the bottom surface 68.

When a plunger 52 is retracted, fluid is drawn into each internal chamber 60 from the manifold 80. When a plunger 52 is extended, fluid within each internal chamber 60 is pressurized and forced towards a discharge conduit 82. Pressurized fluid exits the fluid end 46 through one or more discharge openings 84, shown in FIGS. 3-5. The discharge openings 84 are in fluid communication with the discharge conduit 82. The discharge openings 84 are attached to a discharge piping system, of the type shown in FIG. 2.

A pair of valves 86 and 88 are installed within each vertical bore 56, on opposite sides of the internal chamber 60. The valve 86 prevents backflow in the direction of the manifold 80, while the valve 88 prevents backflow in the direction of the internal chamber 60. The valves 86 and 88 each comprise a valve body 87 that seals against a valve seat 89.

Traditional fluid ends are normally machined from high strength alloy steel. Such material can corrode quickly, leading to fatigue cracks. Fatigue cracks occur because corrosion of the metal decreases the metal's fatigue strength—the amount of loading cycles that can be applied to a metal before it fails. Such cracking can allow leakage that prevents a fluid end from achieving and maintaining adequate pressures. Once such leakage occurs, fluid end repair or replacement becomes necessary.

Fatigue cracks in fluid ends are commonly found in areas that experience high stress. For example, with reference to the fluid end 46 shown in FIG. 5, fatigue cracks are common at a corner 90 formed in the interior of the fluid end 46 by the intersection of the walls surrounding the horizontal bore 58 with the walls surrounding the vertical bore 56. A plurality of the corners 90 surround each internal chamber 60. Because fluid is pressurized within each internal chamber 60, the corners 90 typically experience the highest amount of stress during operation, leading to fatigue cracks. Fatigue cracks are also common at the neck that connects the flange 50 and the housing 48. Specifically, fatigue cracks tend to form at an area 92 where the neck joins the housing 48, as shown for example in FIGS. 4 and 5.

For the above reasons, there is a need in the industry for a fluid end configured to avoid or significantly delay the structures or conditions that cause wear or failures within a fluid end.

BRIEF DESCRIPTION OF THE DRAWINGS

FIG. 22 is a top plan view of a stuffing box shown attached to the housing in

FIG. 20.

FIG. 38 is a top plan view of a plunger packing shown installed within the stuffing box and retainer in FIG. 20.

FIG. 39 is a perspective view of a first surface of the plunger packing shown in FIG. 38.

FIG. 40 is an elevational view of the first surface of the plunger packing shown in FIG. 38.

FIG. 41 is a cross-sectional view of the plunger packing shown in FIG. 40, taken along line L-L.

FIG. 110 is a top plan view of another embodiment of a suction and discharge valve.

FIG. 111 is a perspective view of a second surface of the suction and discharge valve shown in FIG. 110.

FIG. 112 is an elevational view of a second surface of the suction and discharge valve shown in FIG. 110.

FIG. 113 is a perspective view of a first surface of the suction and discharge valve shown in FIG. 110.

FIG. 114 is a cross-sectional view of the suction and discharge valve shown in FIG. 112, taken along line AI-AI.

FIG. 115 is the cross-sectional view of the fluid end section shown in FIG. 65, but another embodiment of a fluid routing plug is shown installed within the housing.

FIG. 116 is an enlarged view of area AJ shown in FIG. 115.

FIG. 117 is an enlarged view of area AK shown in FIG. 115.

FIG. 118 is the cross-sectional view of the fluid end section shown in FIG. 65, but another embodiment of a fluid routing plug is shown installed within the housing.

FIG. 119 is an enlarged view of area AL shown in FIG. 118.

FIG. 120 is an enlarged view of area AM shown in FIG. 118.

FIG. 121 is a top plan view of another embodiment of a fluid routing plug.

Figure 121:
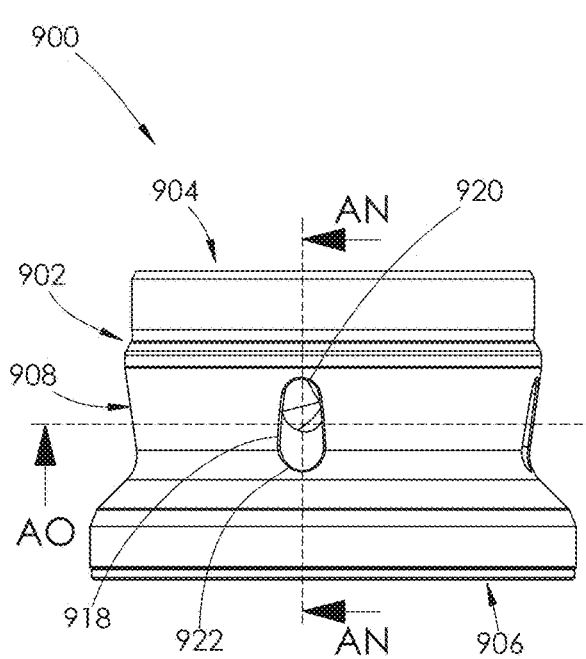
Figure 122:
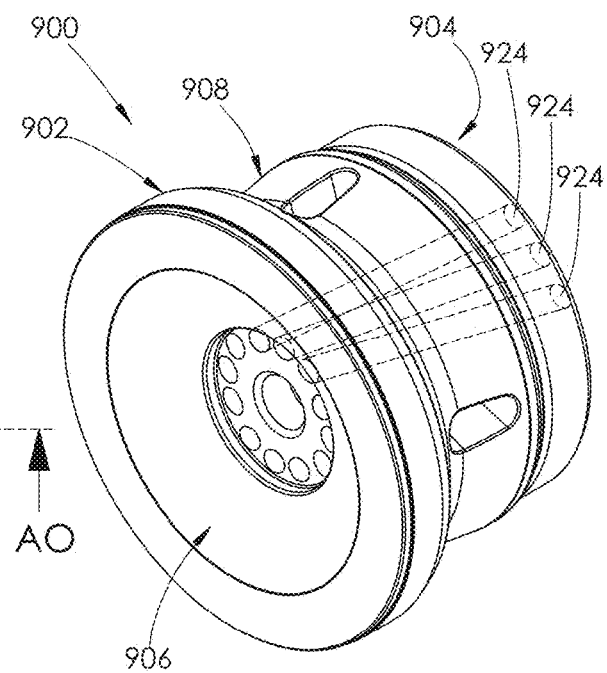

FIG. 122 is a perspective view of a second surface of the fluid routing plug shown in FIG. 121, with a plurality of second fluid passages formed within the plug shown by phantom lines.

Figure 123:
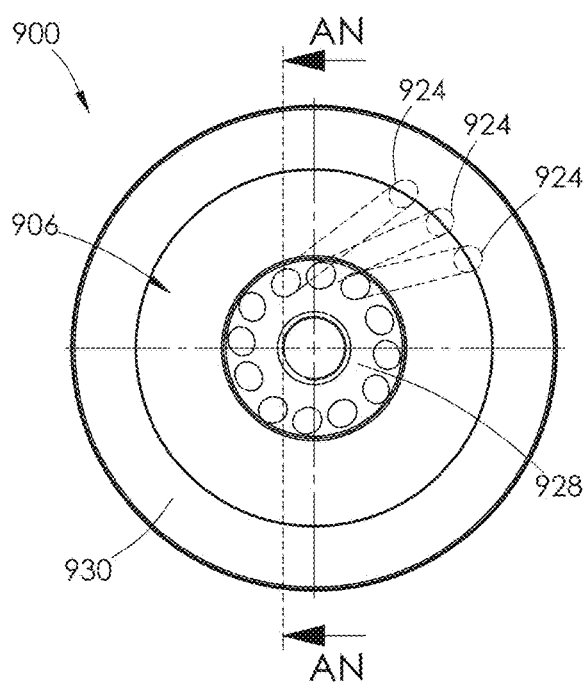

FIG. 123 is an elevational view of the second surface of the fluid routing plug shown in FIG. 121, with a plurality of second fluid passages formed within the plug shown by phantom lines.

Figure 124:
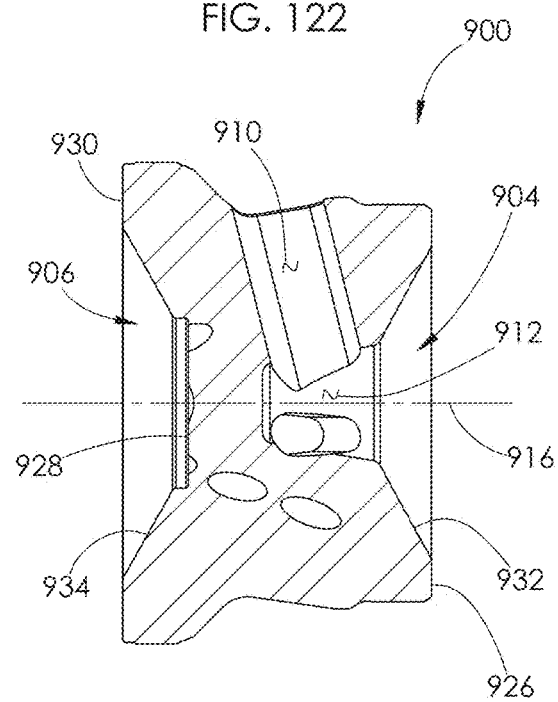

FIG. 124 is a cross-sectional view of the fluid routing plug shown in FIG. 123, taken along line AN-AN.

Figure 125:
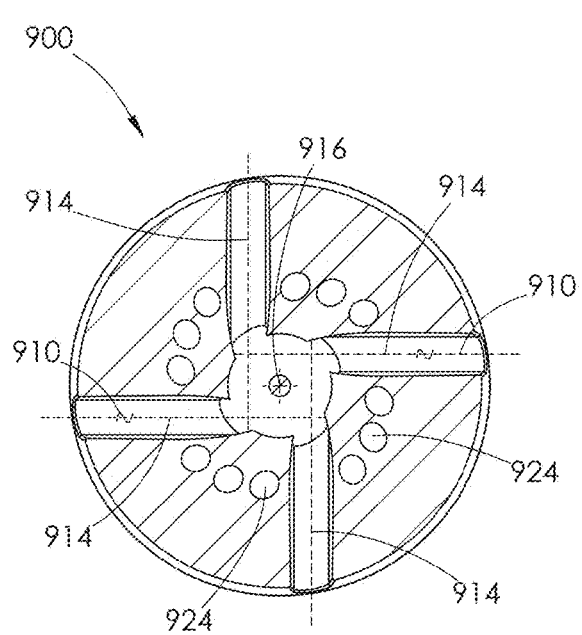

FIG. 125 is a cross-sectional view of the fluid routing plug shown in FIG. 121, taken along line AO-AO.

Figure 126:
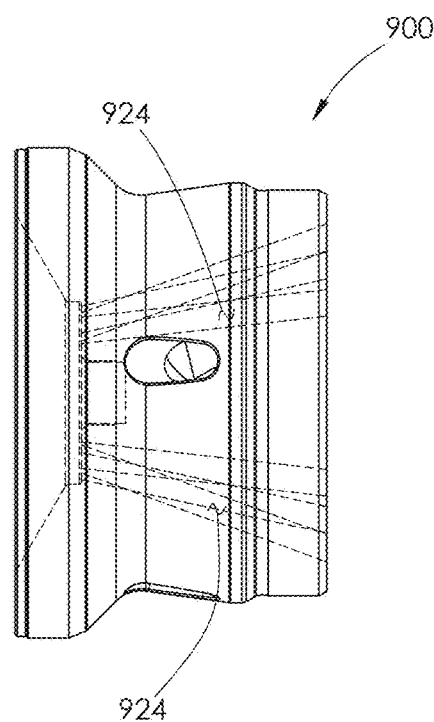

FIG. 126 is the top plan view of the fluid routing plug shown in FIG. 121, with the plurality of second fluid passages formed within the plug shown by phantom lines.

Figure 127:
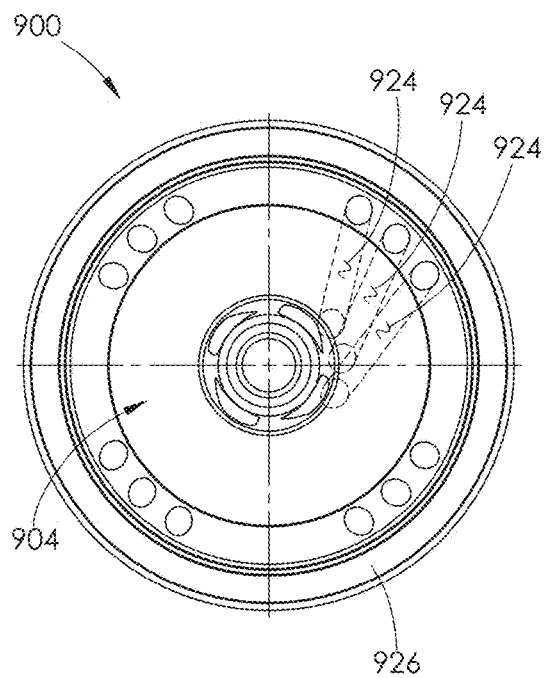

FIG. 127 is an elevational view of a first surface of the fluid routing plug shown in FIG. 121, with a plurality of second fluid passages formed within the plug shown by phantom lines.

Figure 128:
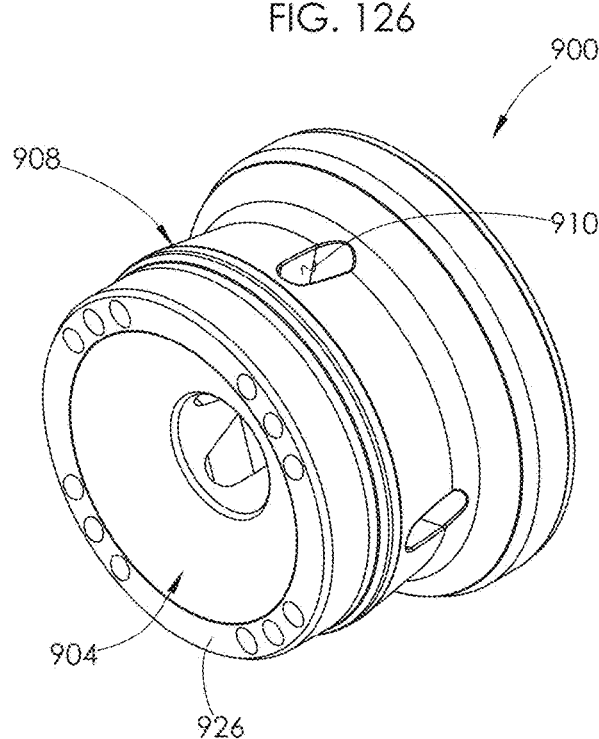

FIG. 128 is a perspective view of the first surface of the fluid routing plug shown in FIG. 121.

Figure 128A:
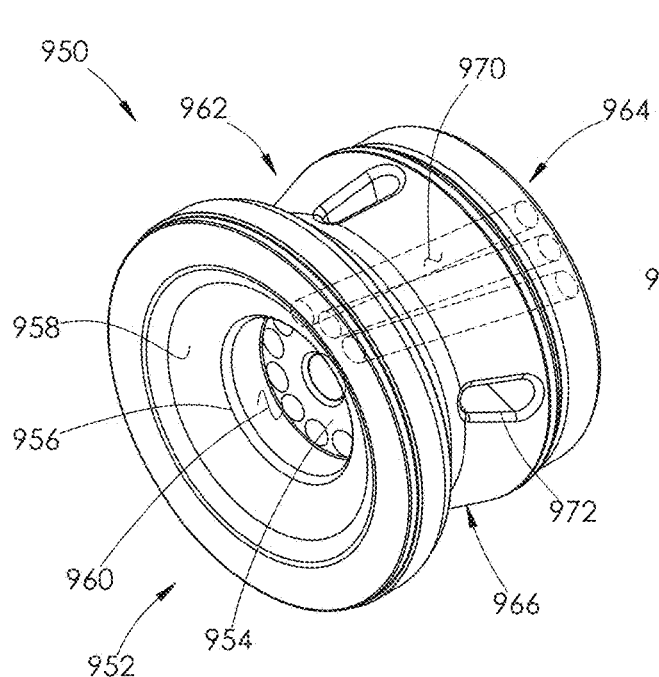

FIG. 128A is a perspective view of a second surface of another embodiment of a fluid routing plug.

Figure 128B:
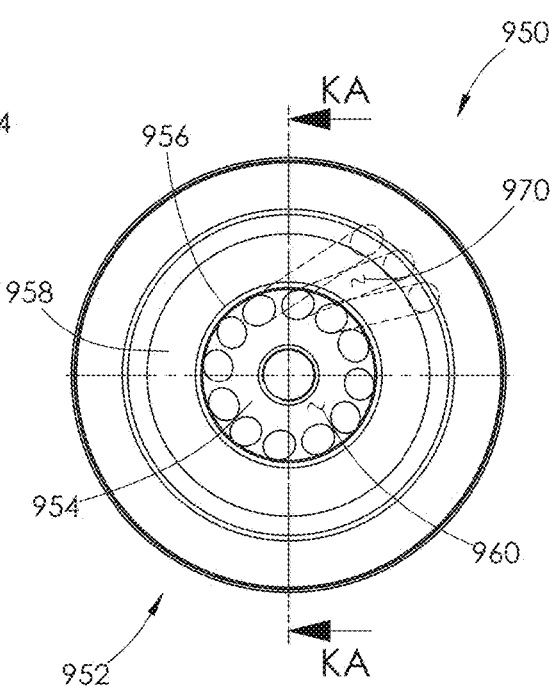

FIG. 128B is an elevational view of the second surface of the fluid routing plug shown in FIG. 128A.

Figure 128C:
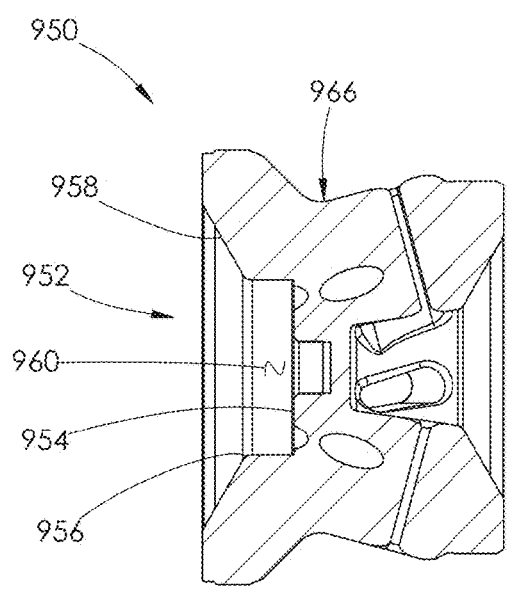

FIG. 128C is a cross-sectional view of the fluid routing plug shown in FIG. 128A, taken along line KA-KA.

Figure 128D:
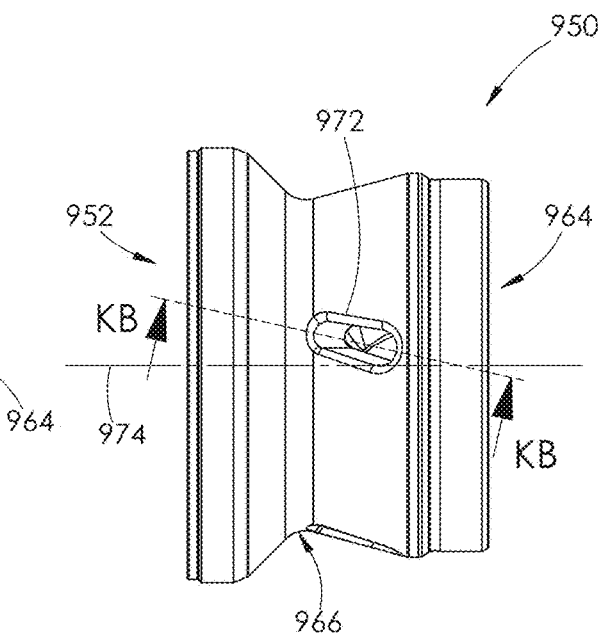

FIG. 128D is a top plan view of the fluid routing plug shown in FIG. 128A.

Figure 128E:
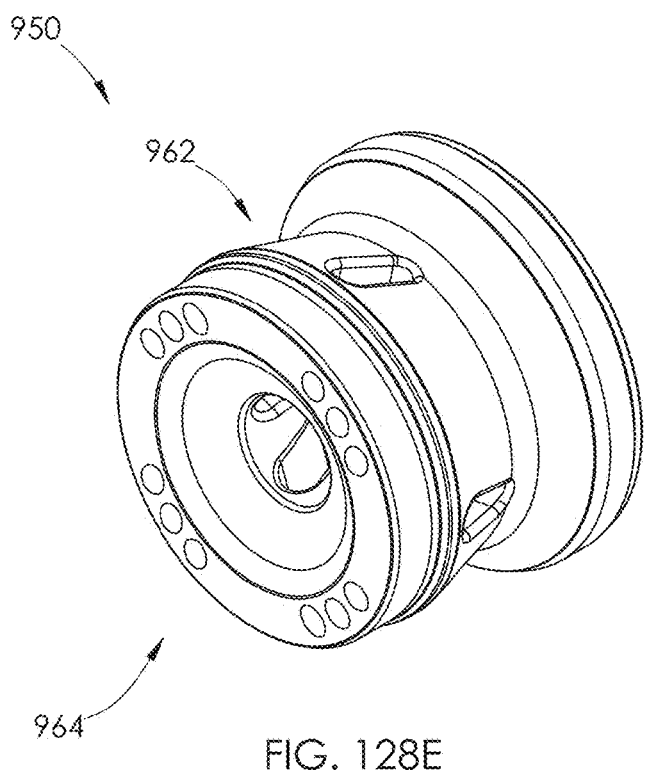

FIG. 128E is a perspective view of a first surface of the fluid routing plug shown in FIG. 128A.

Figure 128F:
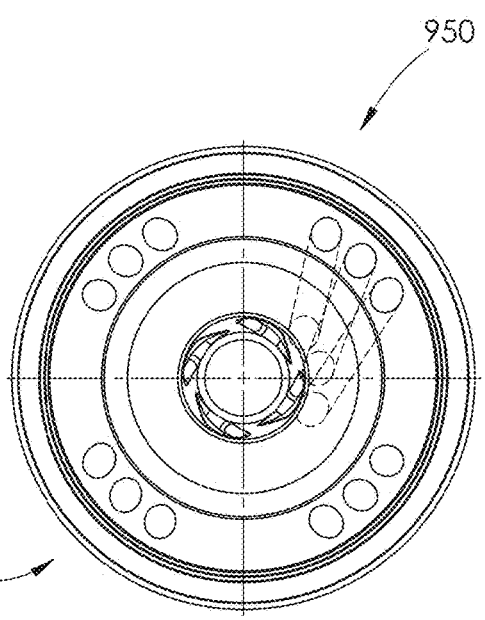

FIG. 128F is an elevational view of the first surface of the fluid routing plug shown in FIG. 128A.

Figure 128G:
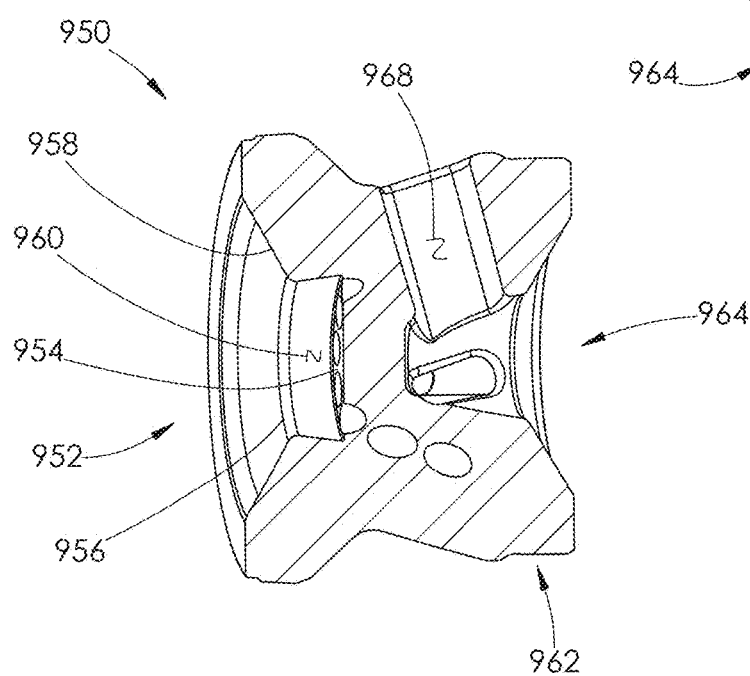

FIG. 128G is a cross-sectional view of the fluid routing plug shown in FIG. 128D, taken along line KB-KB.

FIG. 129 is a top plan view of another embodiment of a fluid routing plug.

FIG. 130 is an elevational view of a second surface of the fluid routing plug shown in FIG. 129.

FIG. 131 is a cross-sectional view of the fluid routing plug shown in FIG. 130, taken along line AP-AP.

Figure 132:
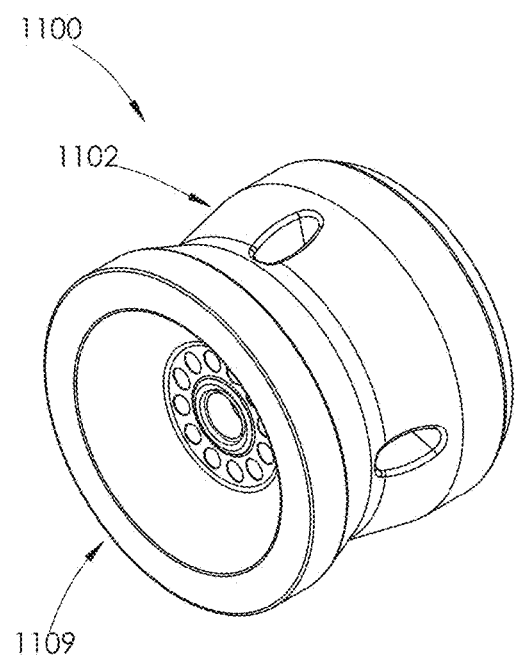

FIG. 132 is a perspective view of a second surface of another embodiment of a fluid routing plug.

Figure 133:
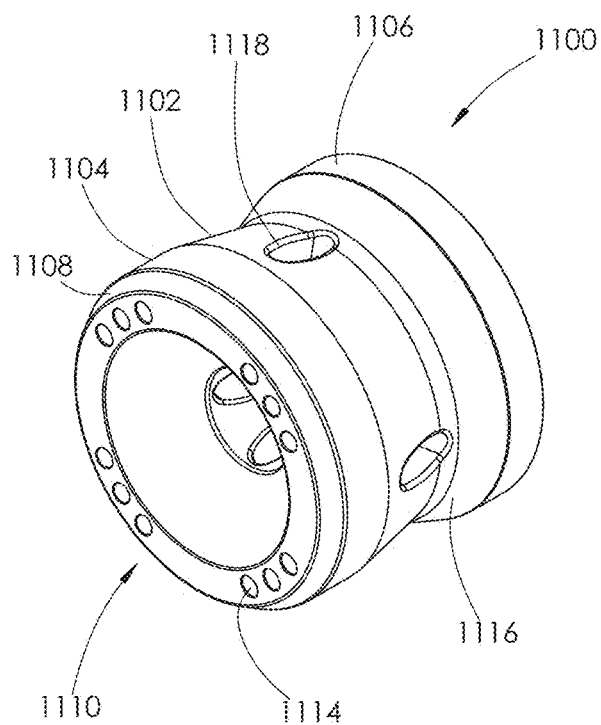

FIG. 133 is a perspective view of a first surface of the fluid routing plug shown in FIG. 132.

Figure 134:
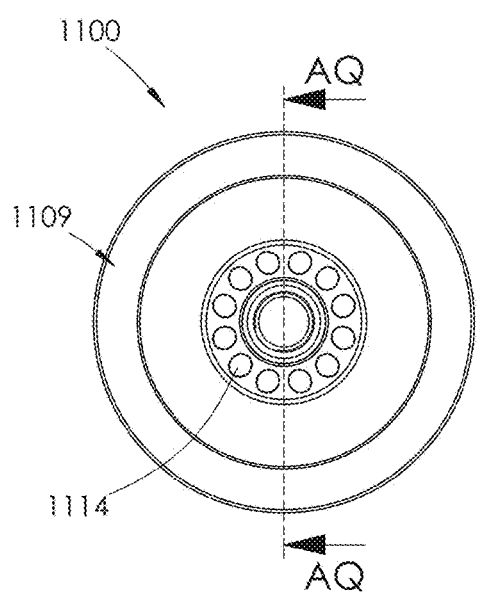

FIG. 134 is an elevational view of the second surface of the fluid routing plug shown in FIG. 132.

Figure 135:
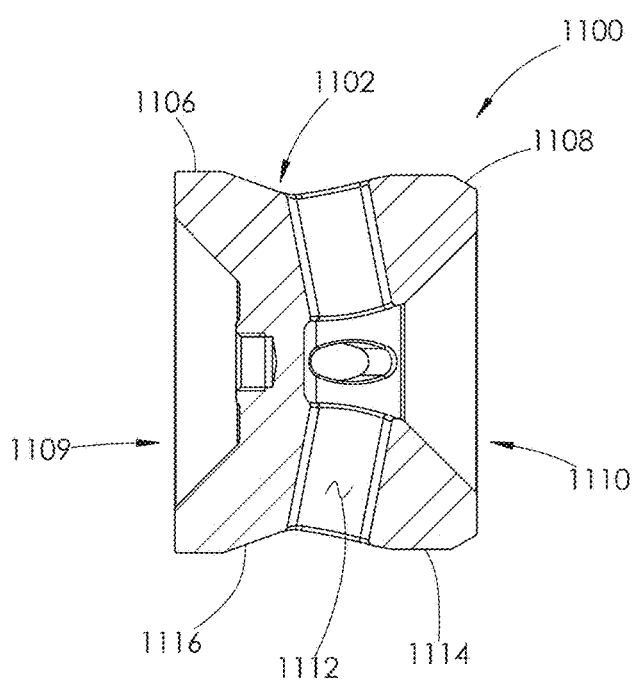

FIG. 135 is a cross-sectional view of the fluid routing plug shown in FIG. 134, taken along line AQ-AQ.

Figure 136:
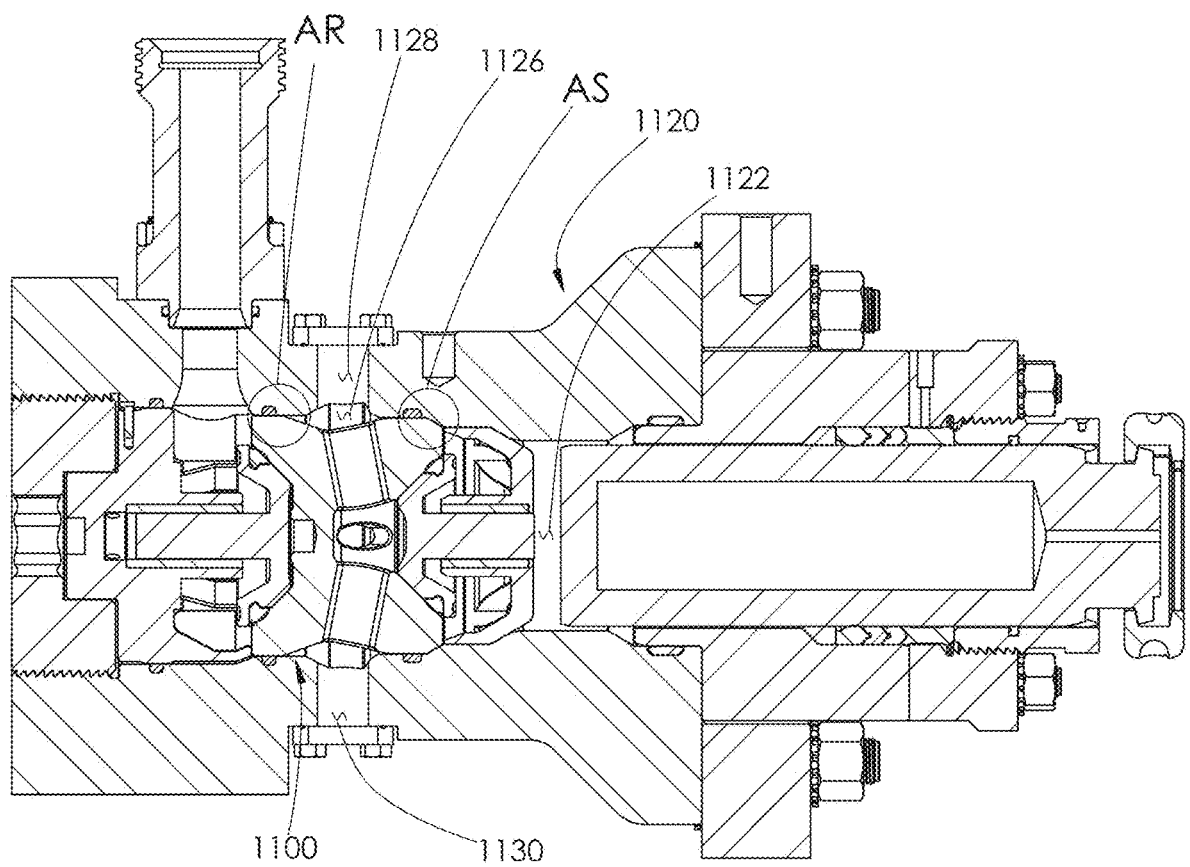

FIG. 136 is a cross-sectional view of a fluid end section comprising another embodiment of a housing. The fluid routing plug shown in FIG. 132 is installed within the housing.

Figure 137:
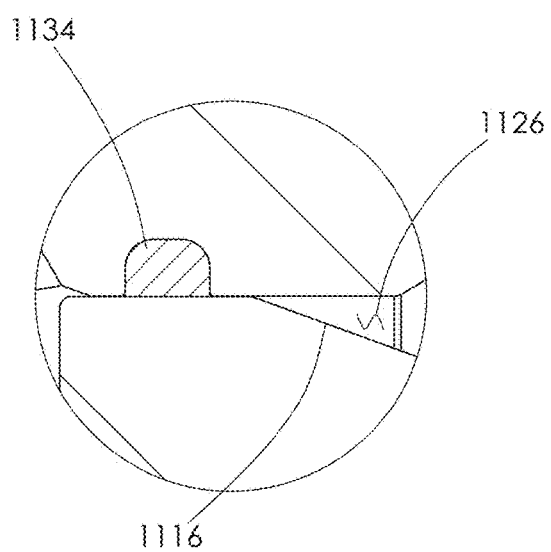

FIG. 137 is an enlarged view of area AR shown in FIG. 136.

Figure 138:
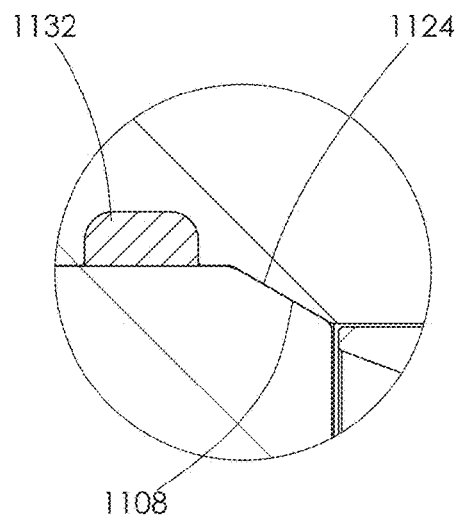

FIG. 138 is an enlarged view of area AS shown in FIG. 136.

Figure 139:
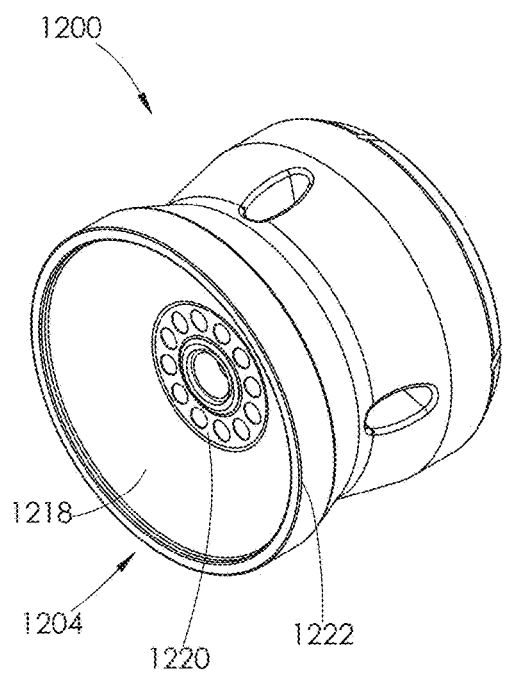

FIG. 139 is a perspective view of a second surface of another embodiment of a fluid routing plug.

Figure 140:
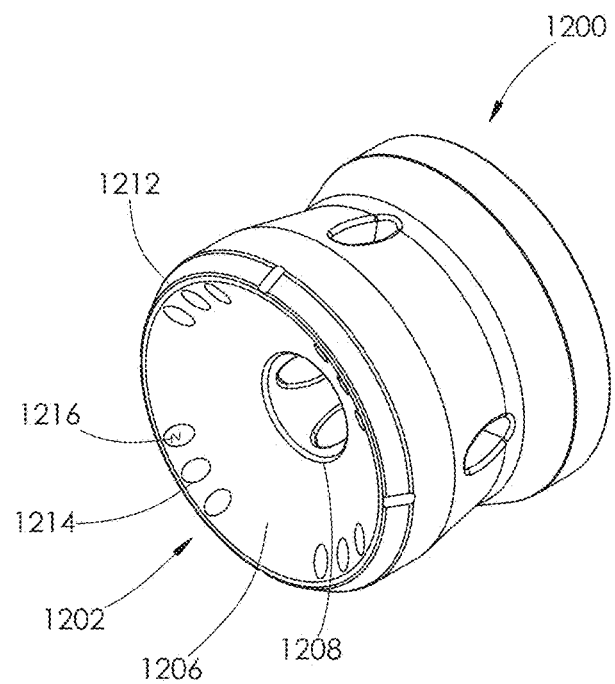

FIG. 140 is a perspective view of a first surface of the fluid routing plug shown in FIG. 139.

Figure 141:
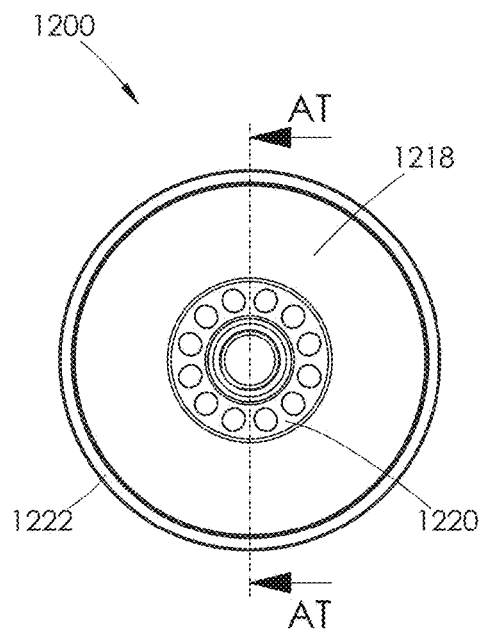

FIG. 141 is an elevational view of the second surface of the fluid routing plug shown in FIG. 139

Figure 142:
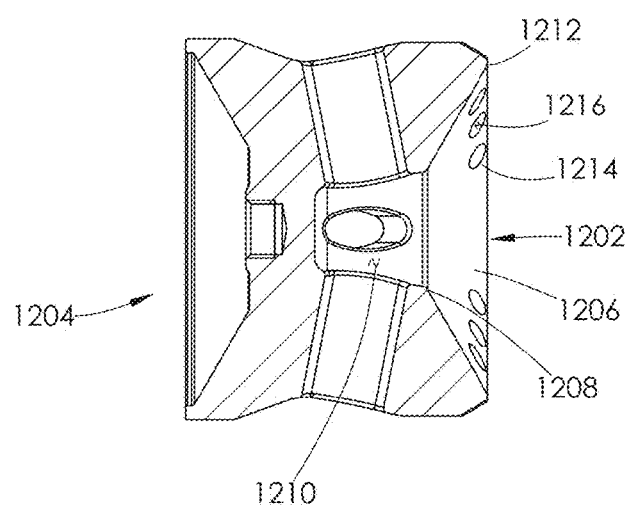

FIG. 142 is a cross-sectional view of the fluid routing plug shown in FIG. 141, taken along line AT-AT.

Figure 143:
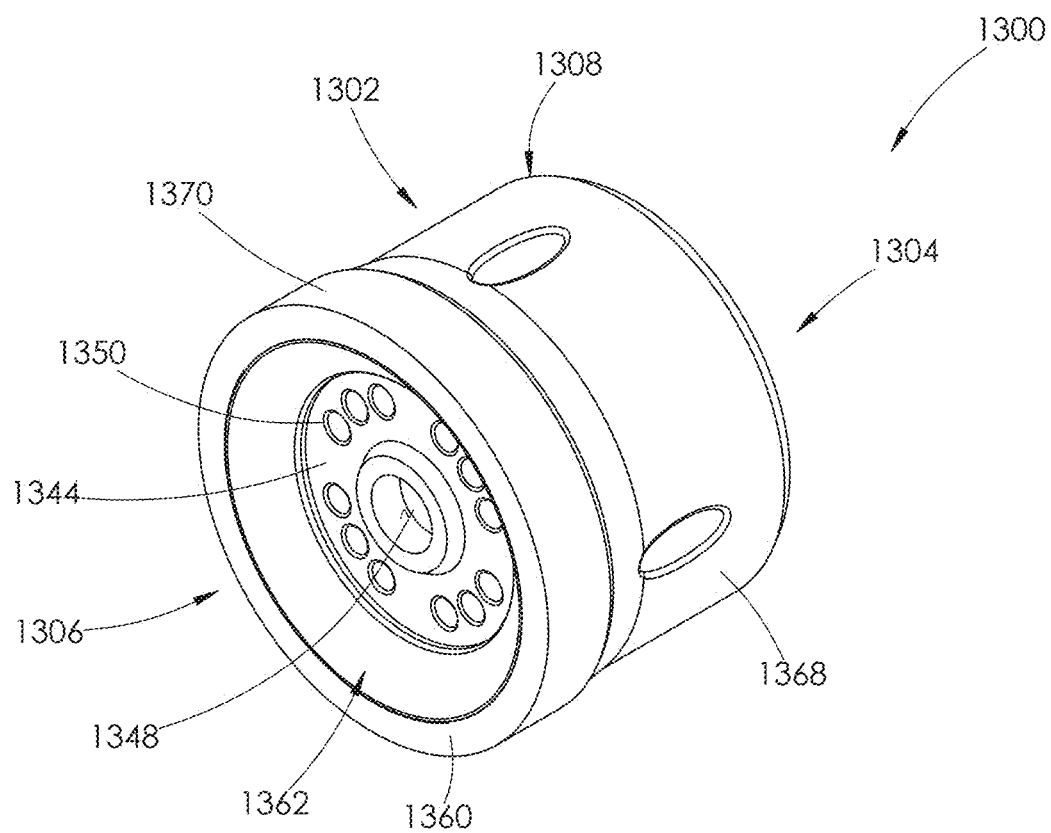

FIG. 143 is a perspective view of a second surface of another embodiment of a fluid routing plug.

Figure 144:
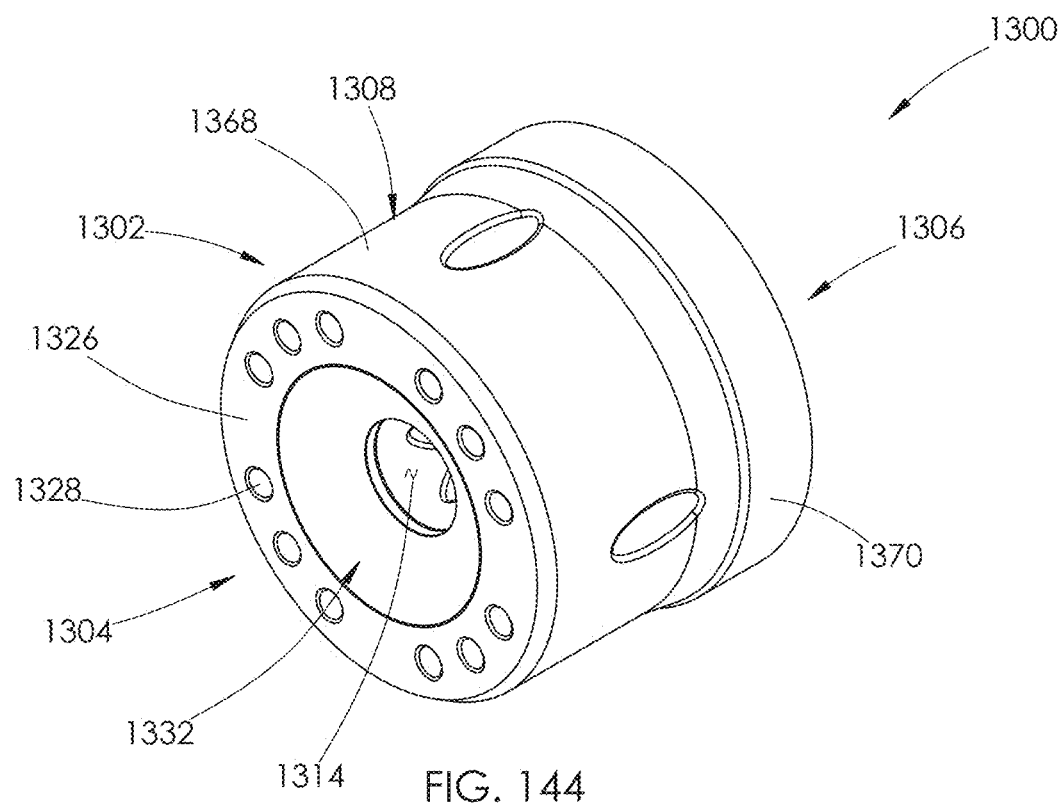

FIG. 144 is a perspective view of a first surface of the fluid routing plug shown in FIG. 143.

FIG. 145 is an elevational view of the second surface of the fluid routing plug shown in FIG. 143.

FIG. 146 is a cross-sectional view of the fluid routing plug shown in FIG. 145, taken along line AU-AU.

FIG. 147 is a cross-sectional view of the fluid routing plug shown in FIG. 145, taken along line AV-AV.

Figure 148:
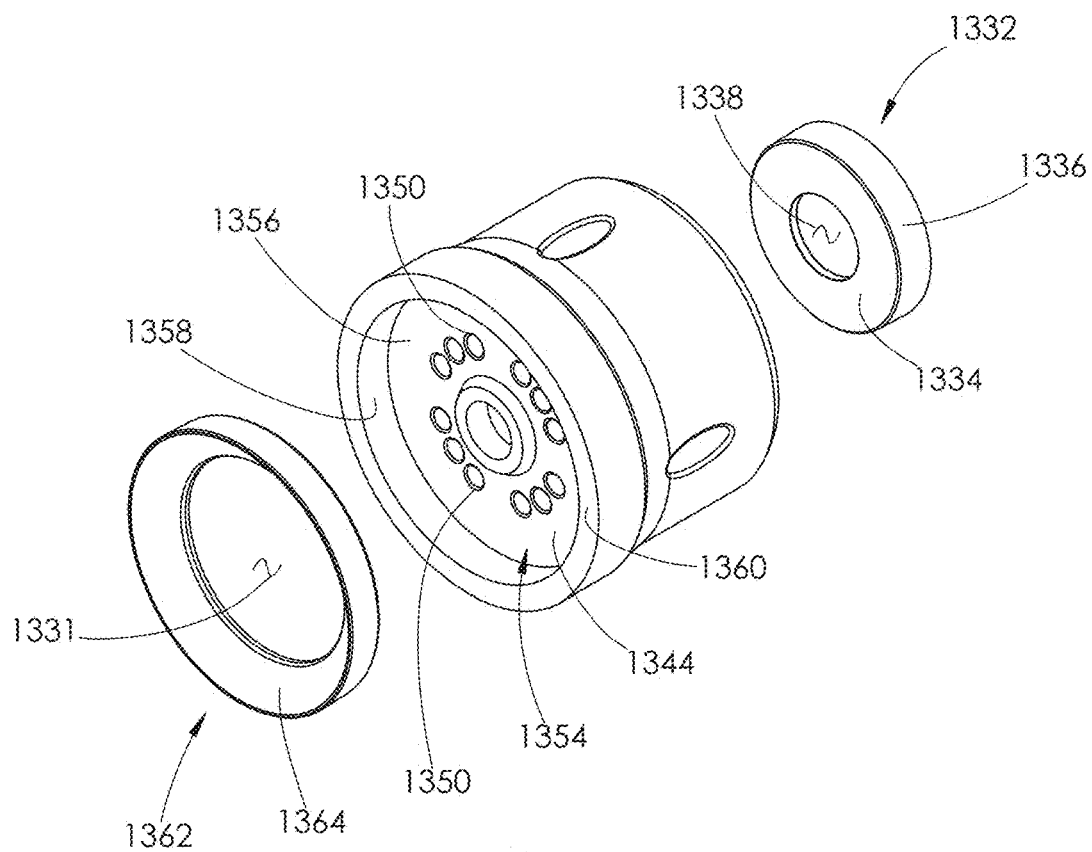

FIG. 148 is an exploded perspective view of the second surface of the fluid routing plug shown in FIG. 143.

Figure 149:
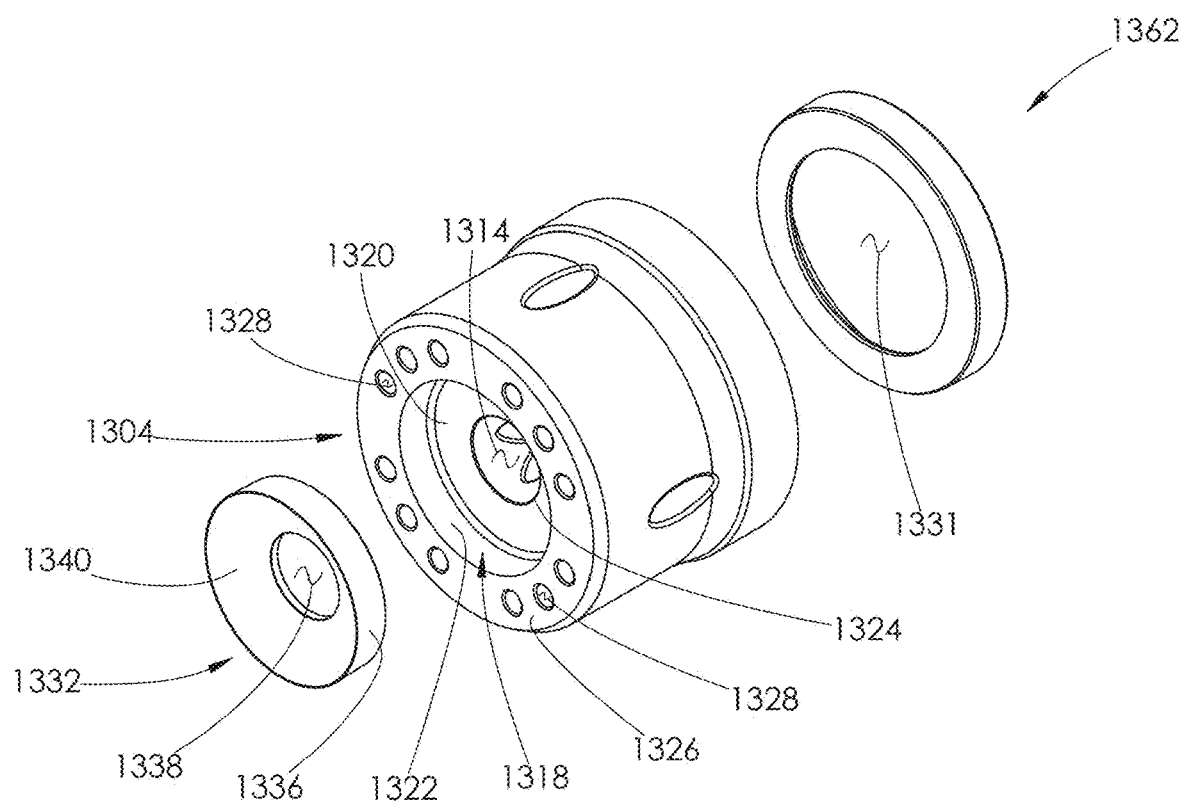

FIG. 149 is an exploded perspective view of the first surface of the fluid routing plug shown in FIG. 143.

Figure 150:
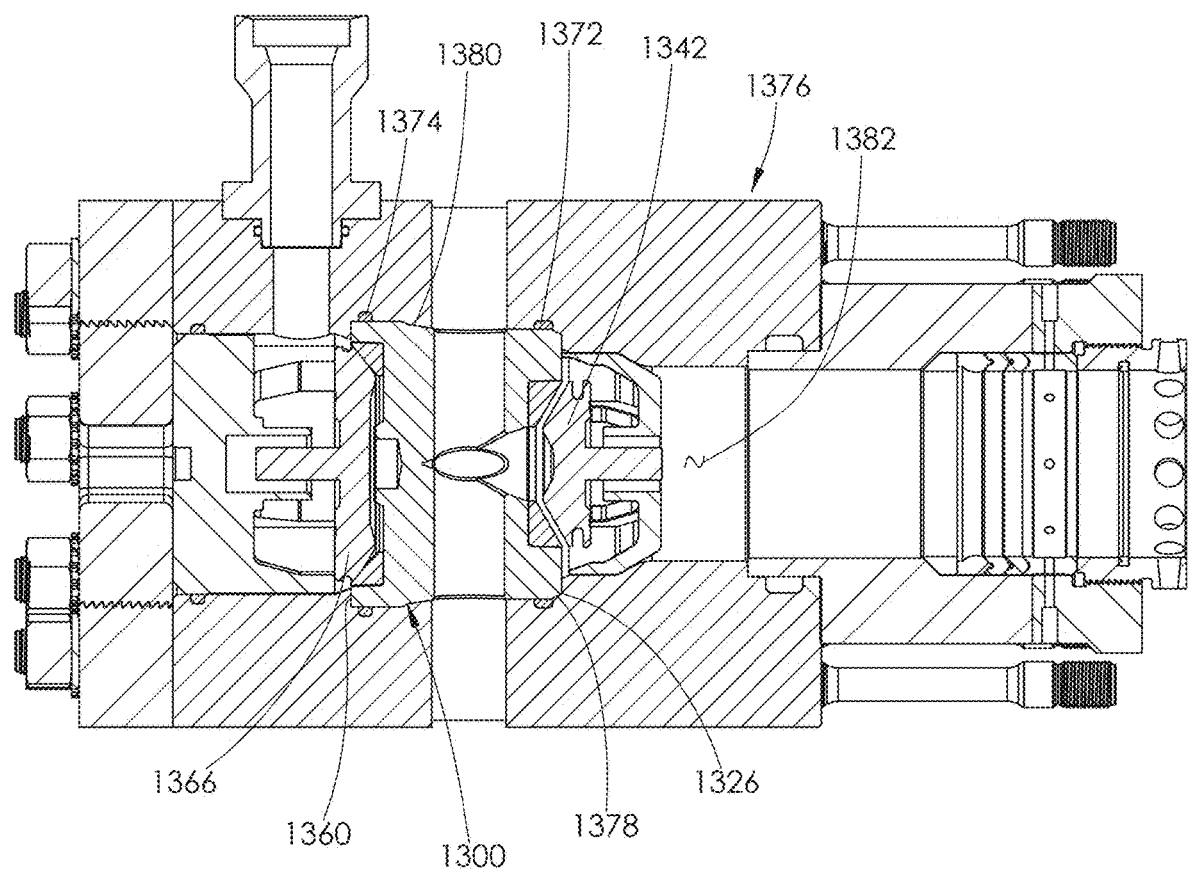

FIG. 150 is a cross-sectional view of a fluid end section comprising another embodiment of a housing. The fluid routing plug shown in FIG. 143 is installed within the housing.

Figure 151:
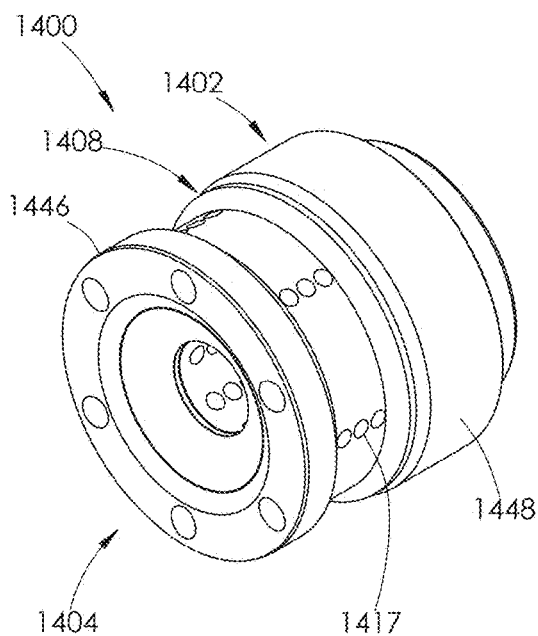

FIG. 151 is a perspective view of a first surface of another embodiment of a fluid routing plug.

Figure 152:
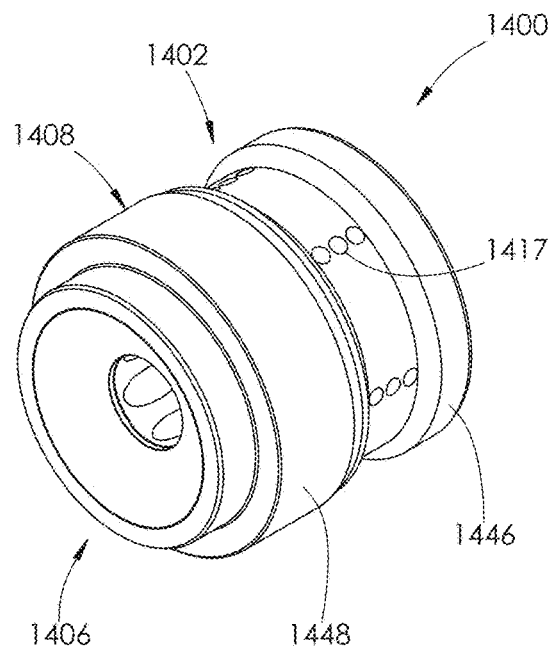

FIG. 152 is a perspective view of a second surface of the fluid routing plug shown in FIG. 151.

Figure 153:
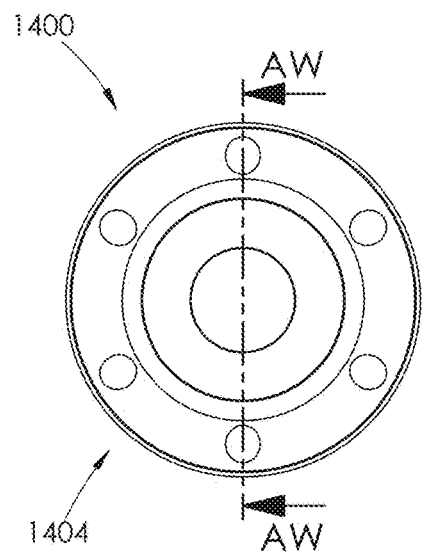

FIG. 153 is an elevational view of the first surface of the fluid routing plug shown in FIG. 151.

Figure 154:
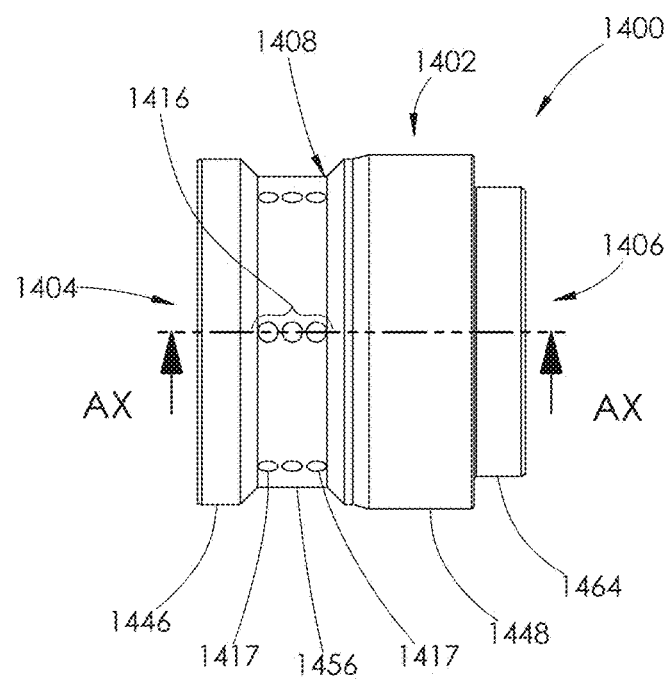

FIG. 154 is a top plan view of the fluid routing plug shown in FIG. 151.

Figure 155:
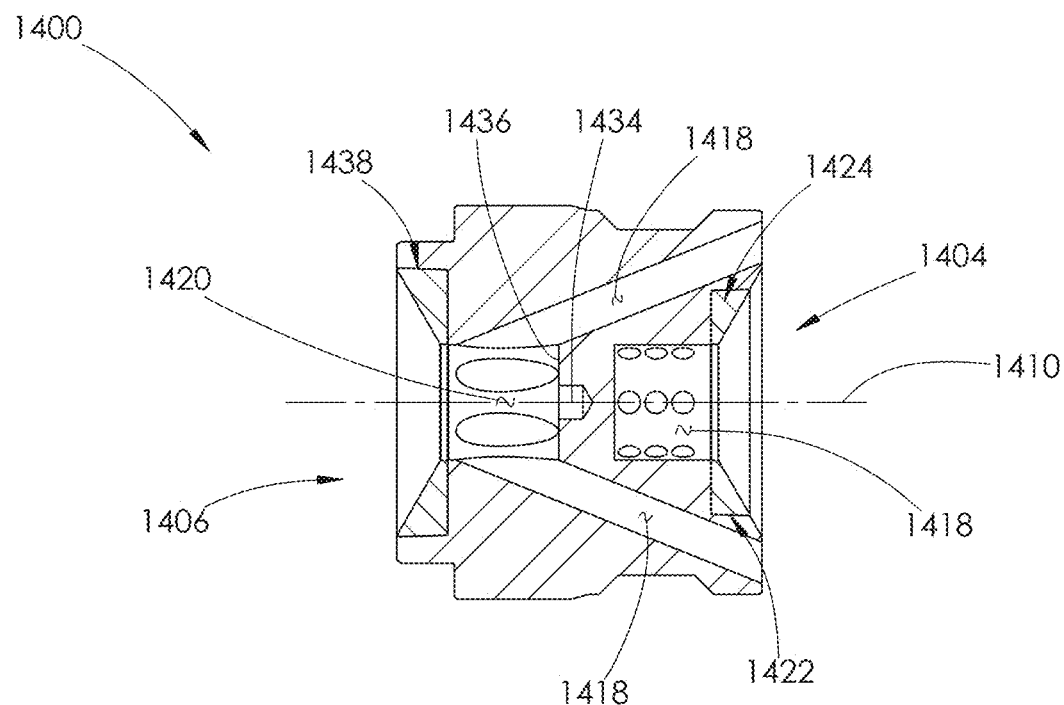

FIG. 155 is a cross-sectional view of the fluid routing plug shown in FIG. 153, taken along line AW-AW.

Figure 156:
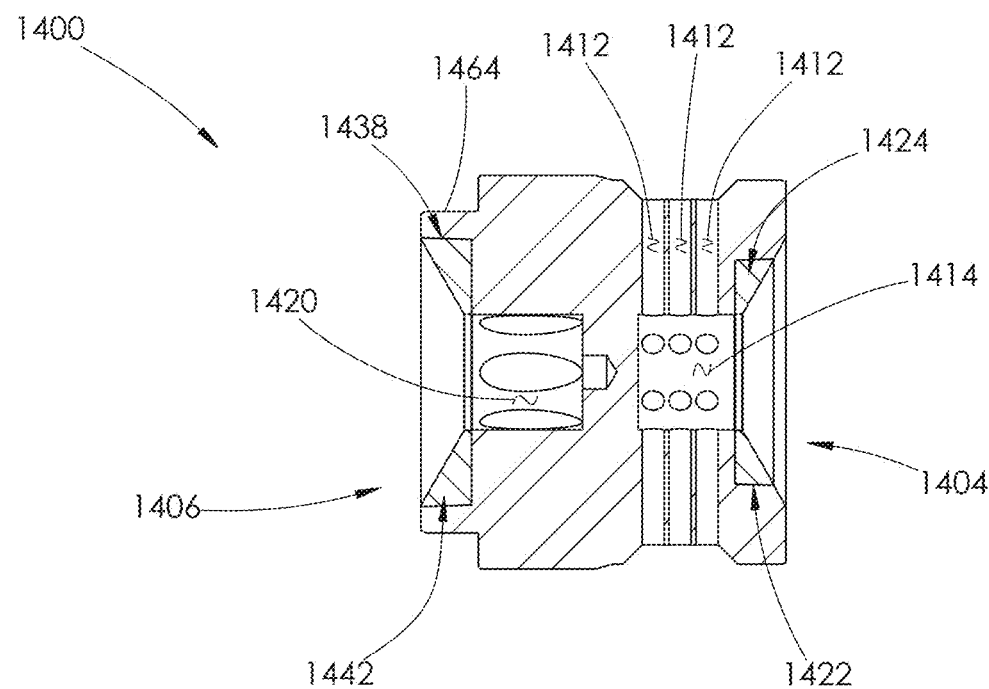

FIG. 156 is a cross-sectional view of the fluid routing plug shown in FIG. 154, taken along line AX-AX.

Figure 157:
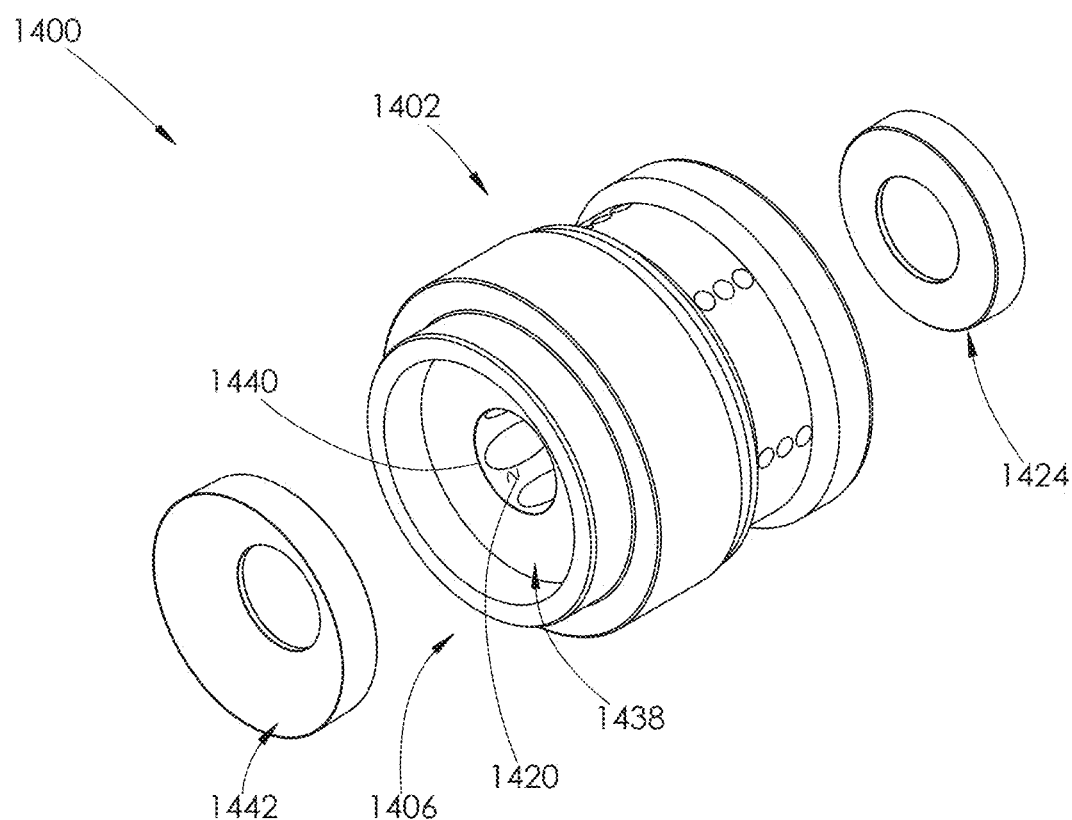

FIG. 157 is an exploded perspective view of the second surface of the fluid routing plug shown in FIG. 151.

Figure 158:
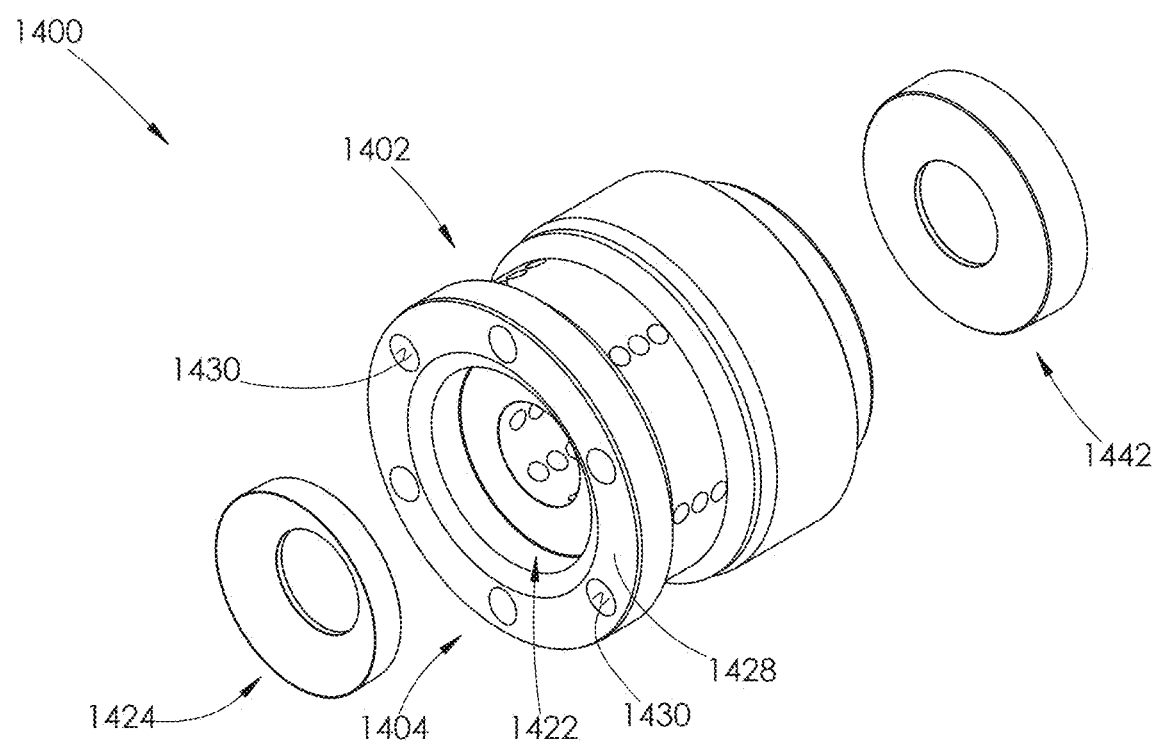

FIG. 158 is an exploded perspective view of the first surface of the fluid routing plug shown in FIG. 151.

Figure 159:
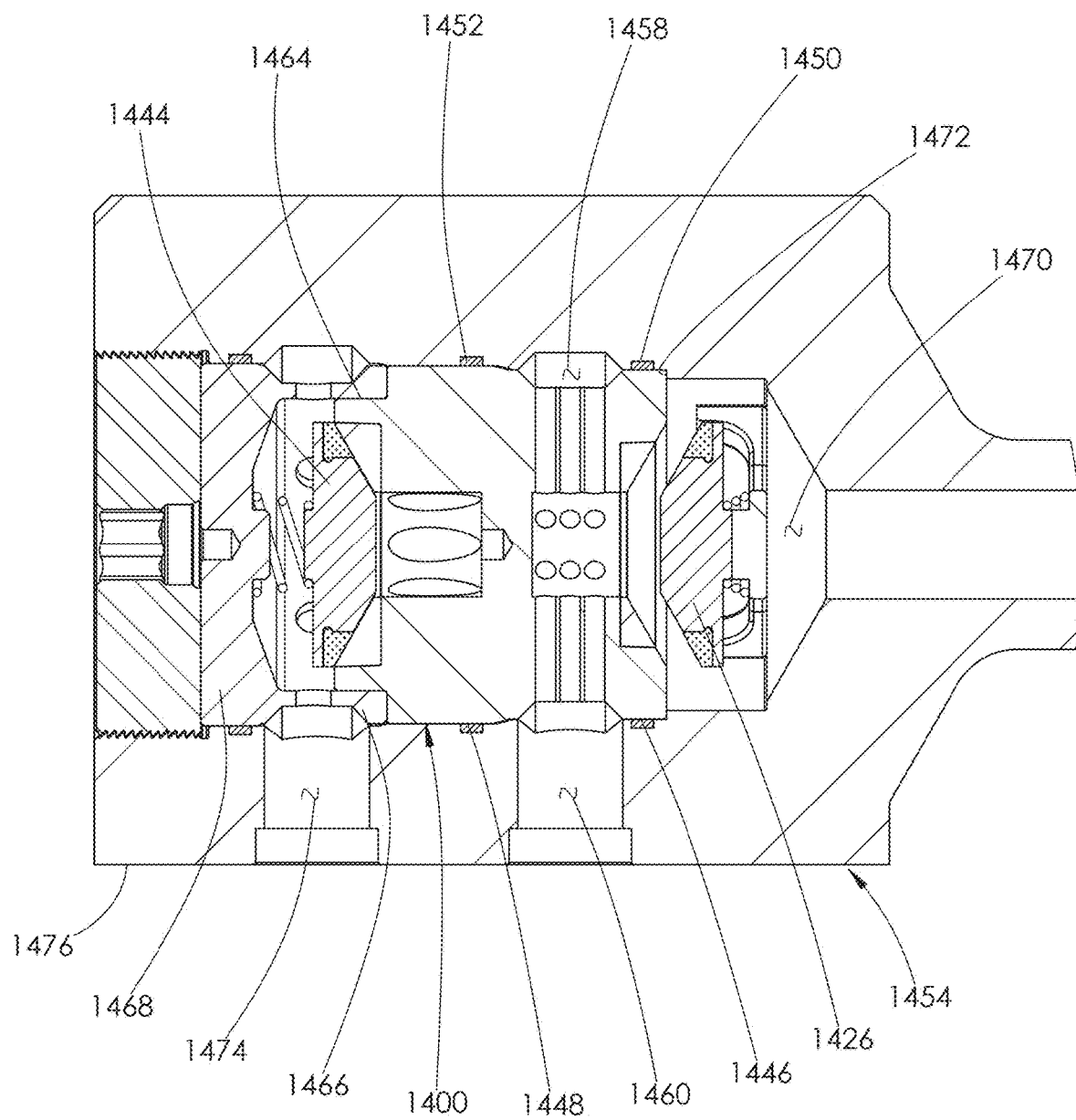

FIG. 159 is a cross-sectional view of another embodiment of a housing. The fluid routing plug shown in FIG. 151 is installed within the housing.

Figure 160:
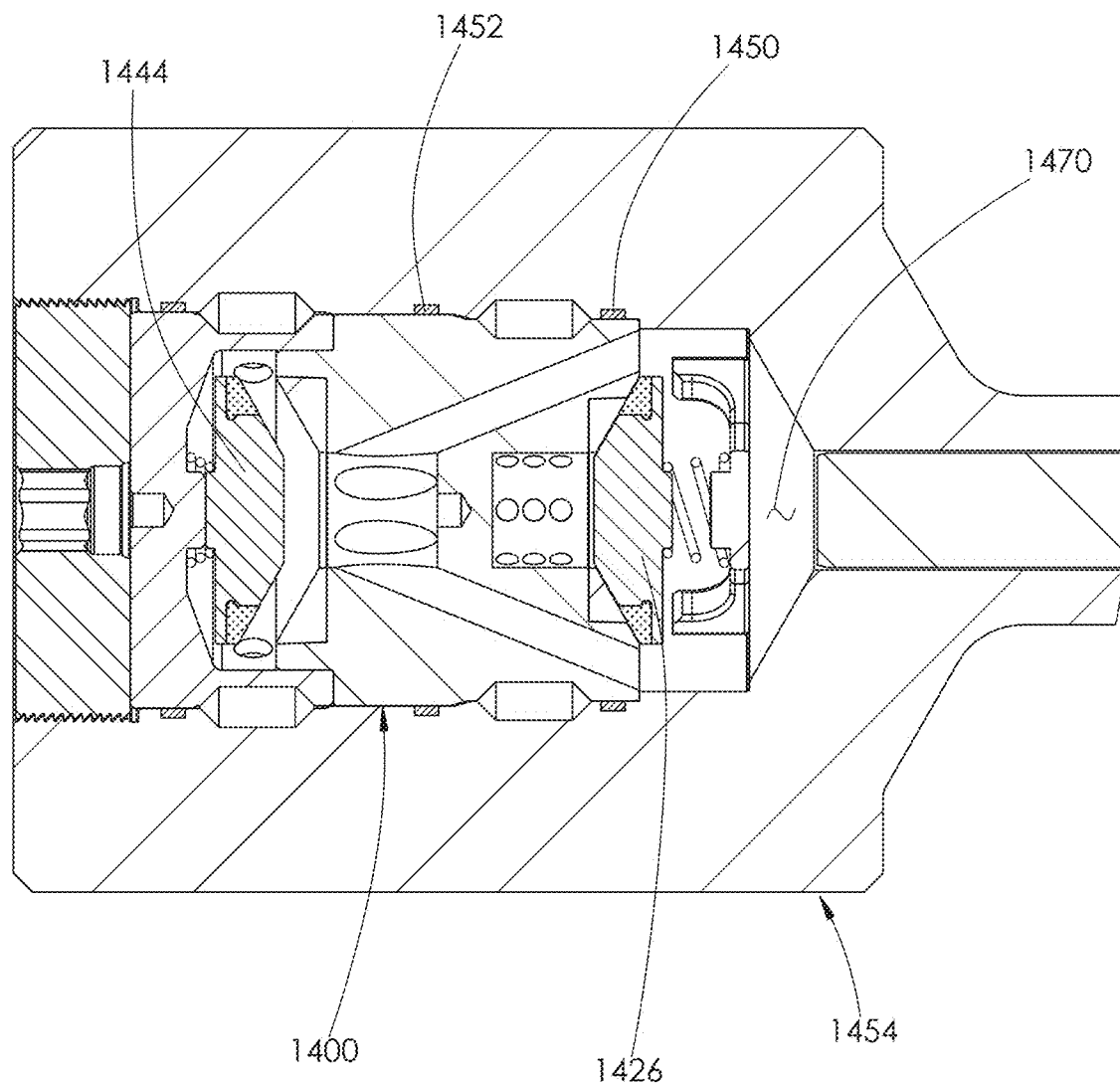

FIG. 160 is a cross-sectional view of the housing shown in FIG. 159, taken along a different axis.

Figure 161:
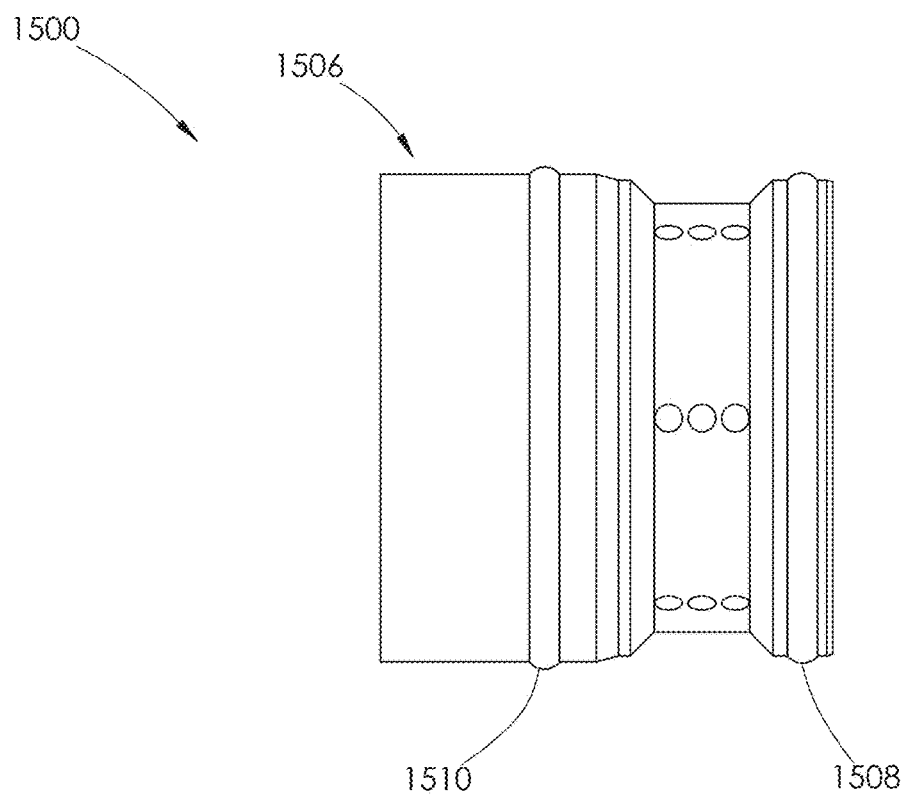

FIG. 161 is a top plan view of another embodiment of a fluid routing plug.

Figure 162:
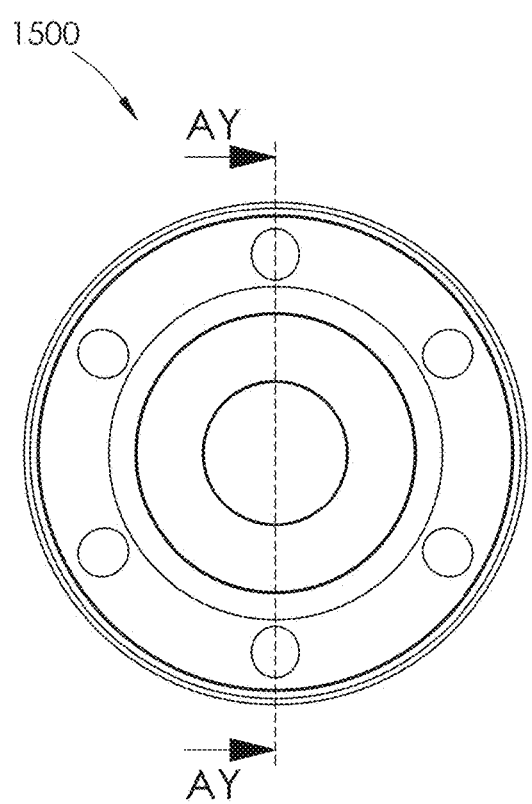

FIG. 162 is an elevational view of a first surface of the fluid routing plug shown in FIG. 161.

Figure 163:
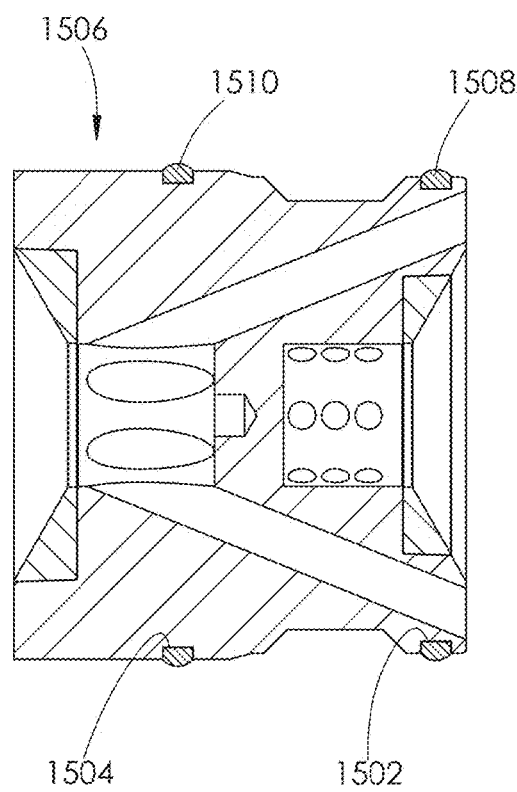

FIG. 163 is a cross-sectional view of the fluid routing plug shown in FIG. 162, taken along line AY-AY.

Figure 164:
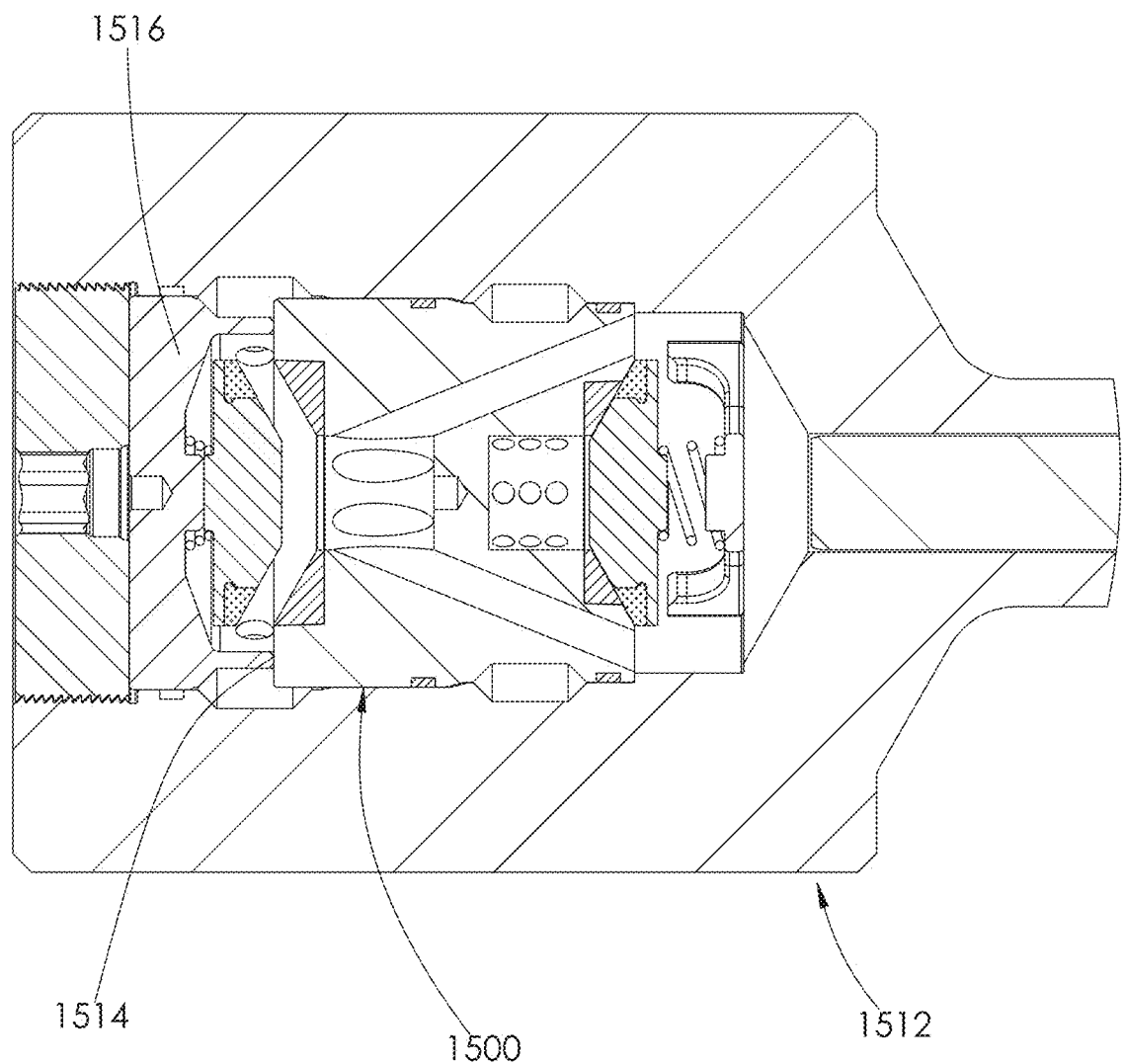

FIG. 164 is a cross-sectional view of another embodiment of a housing. The fluid routing plug shown in FIG. 161 is installed within the housing.

Figure 165:
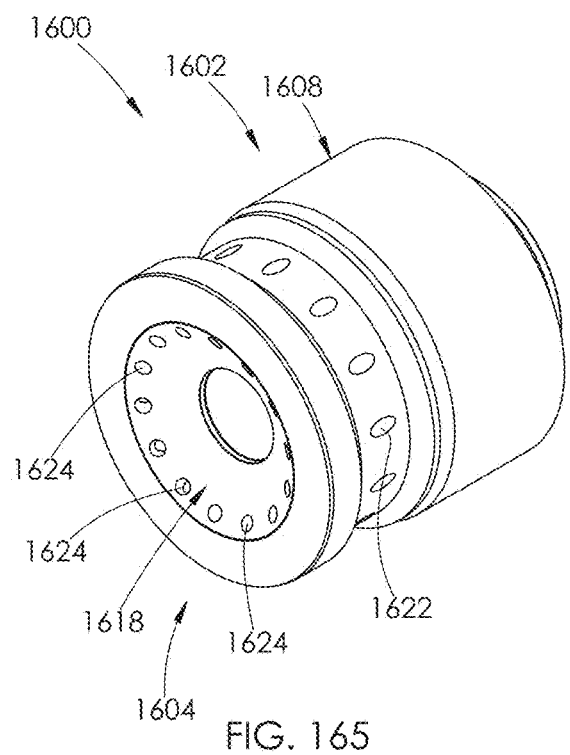

FIG. 165 is a perspective view of a first surface of another embodiment of a fluid routing plug.

Figure 166:
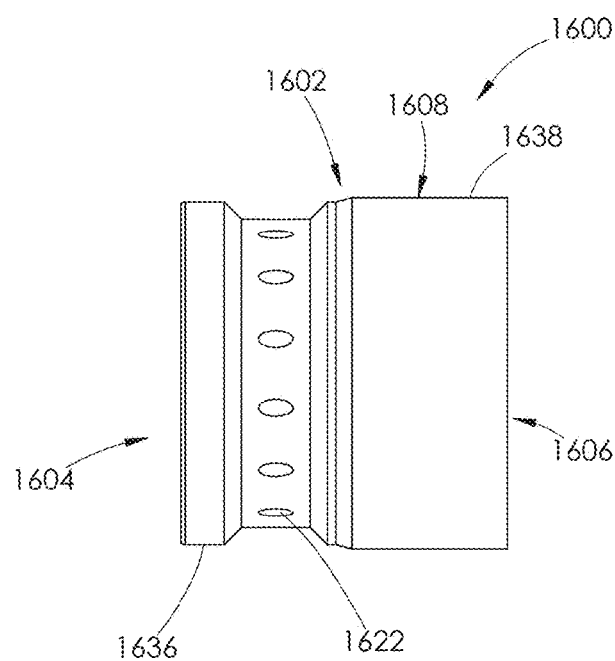

FIG. 166 is a top plan view of the fluid routing plug shown in FIG. 165.

Figure 167:
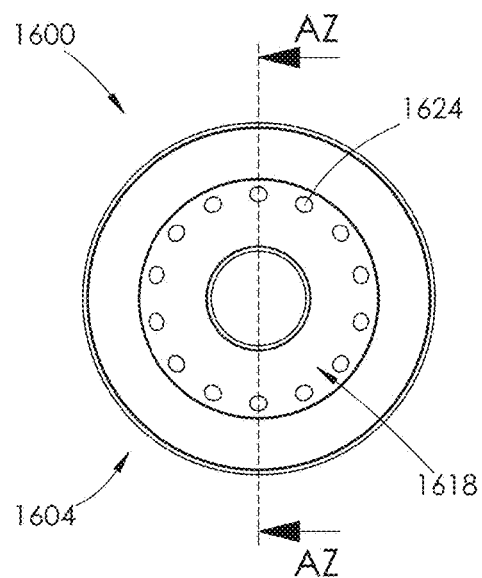

FIG. 167 is an elevational view of the first surface of the fluid routing plug shown in FIG. 165.

Figure 168:
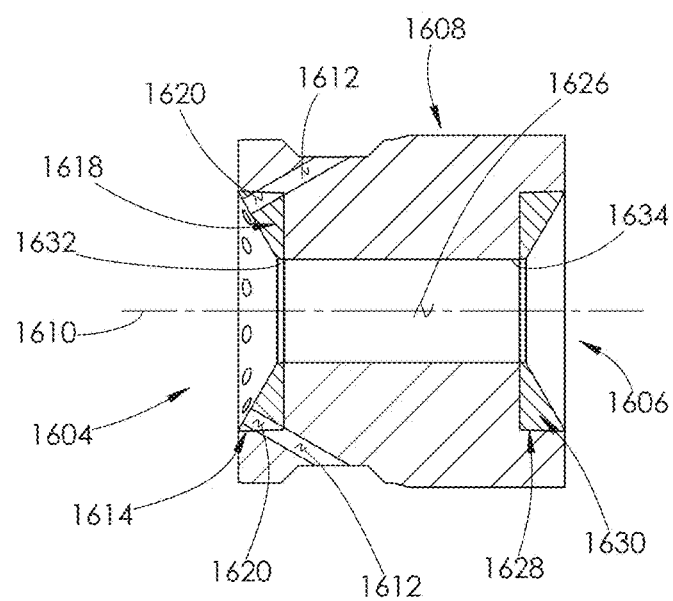

FIG. 168 is a cross-sectional view of the fluid routing plug shown in FIG. 167, taken along line AZ-AZ.

Figure 169:
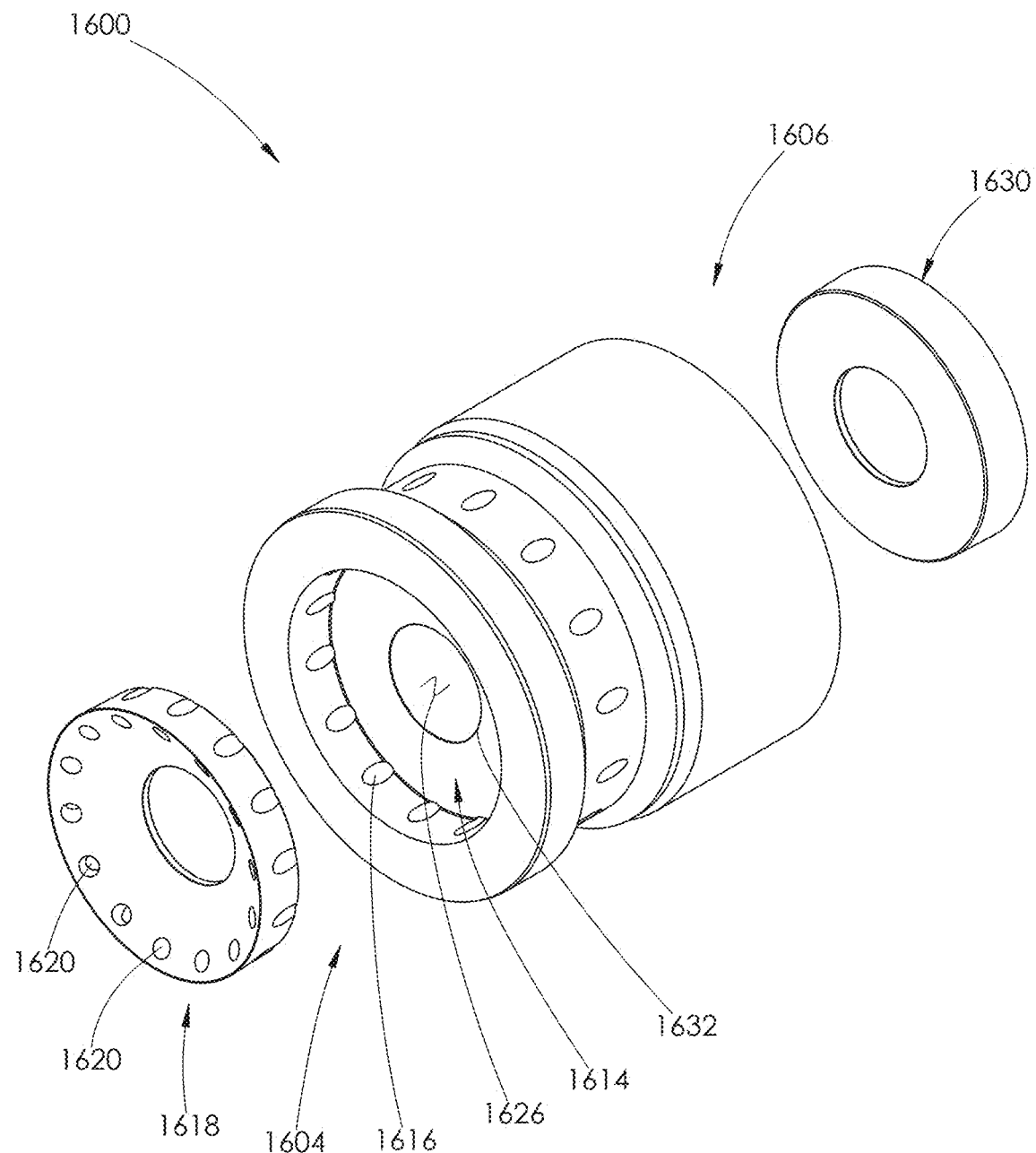

FIG. 169 is an exploded perspective view of the first surface of the fluid routing plug shown in FIG. 165.

Figure 170:
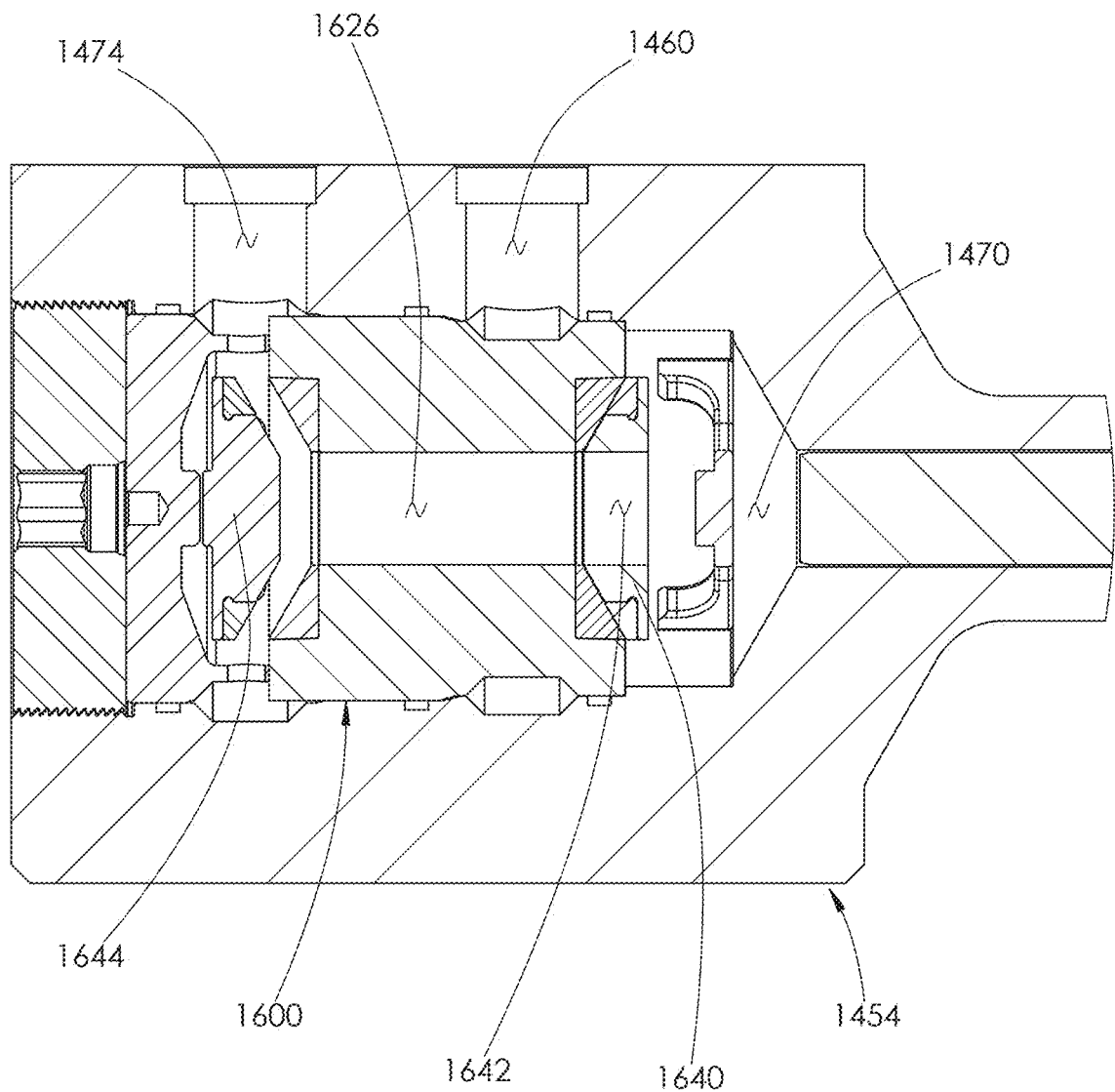

FIG. 170 is a cross-sectional view of another embodiment of a housing. The fluid routing plug shown in FIG. 165 is installed within the housing.

Figure 171:
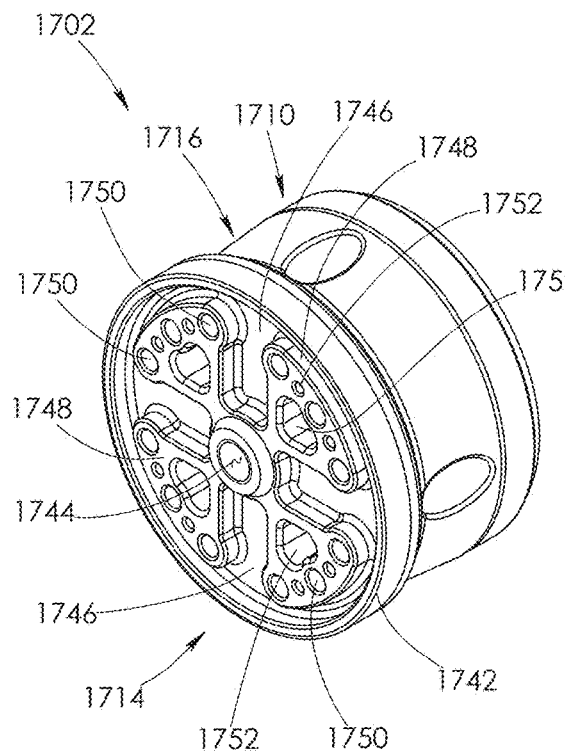

FIG. 171 is a perspective view of a second surface of a first section of another embodiment of a fluid routing plug.

Figure 172:
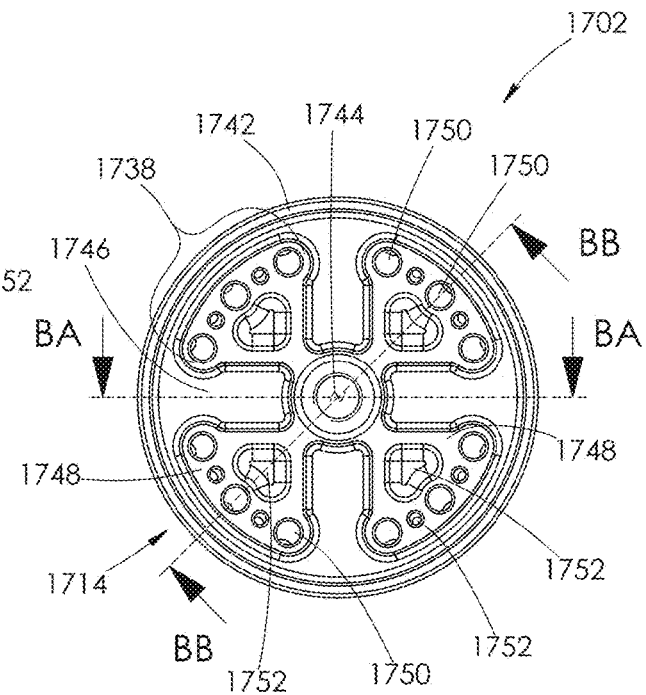

FIG. 172 is an elevational view of the second surface of the first section shown in FIG. 171.

Figure 173:
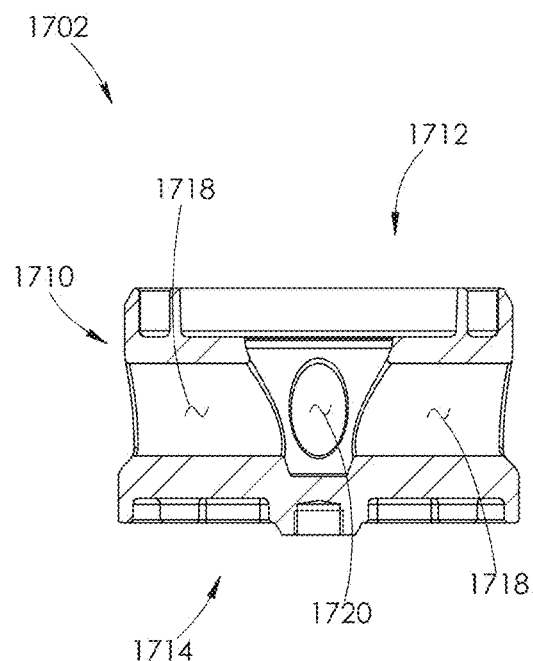

FIG. 173 is a cross-sectional view of the first section shown in FIG. 172, taken along line BA-BA.

Figure 174:
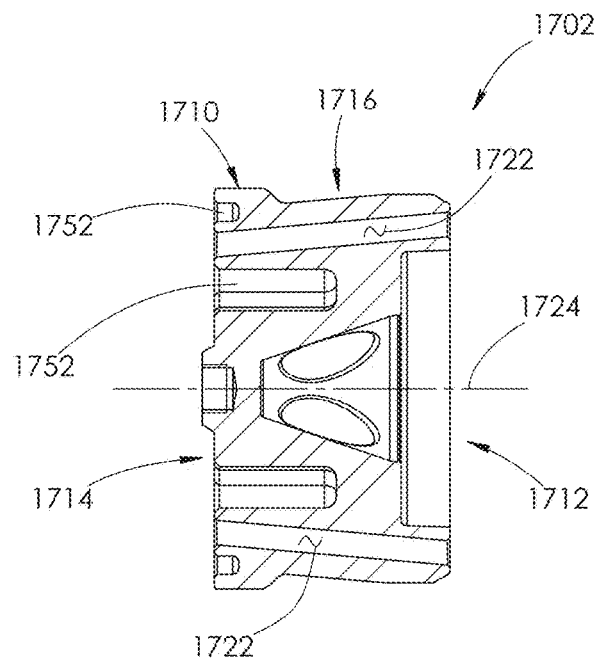

FIG. 174 is a cross-sectional view of the first section shown in FIG. 172, taken along line BB-BB.

Figure 175:
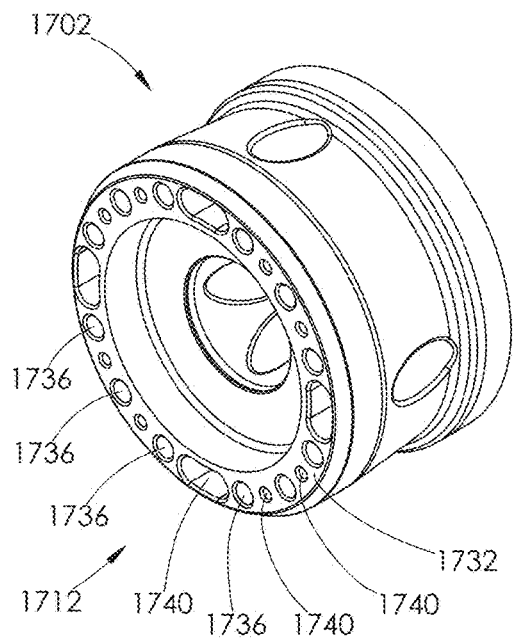

FIG. 175 is a perspective view of a first surface of the first section shown in FIG. 171.

Figure 176:
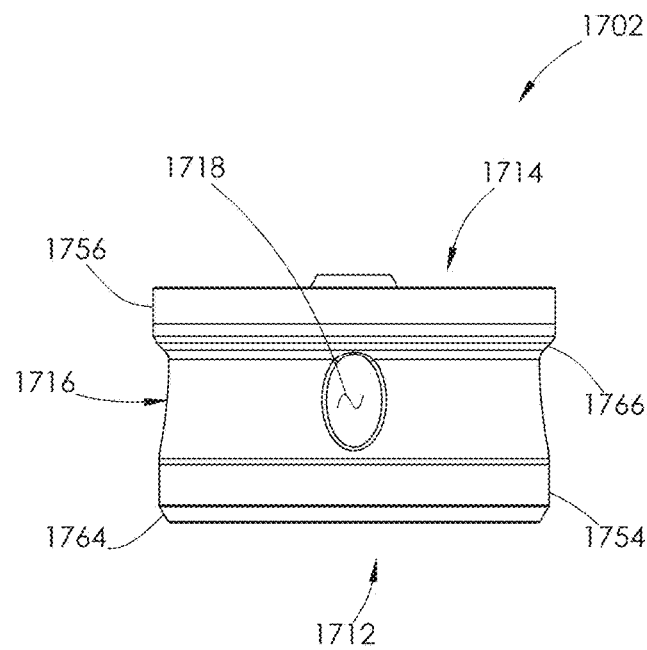

FIG. 176 is a top plan view of the first section shown in FIG. 171.

Figure 177:
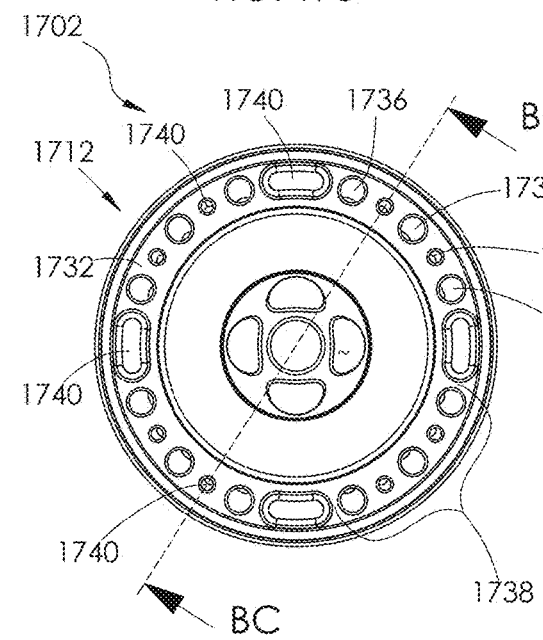

FIG. 177 is an elevational view of the first surface of the first section shown in FIG. 171.

Figure 178:
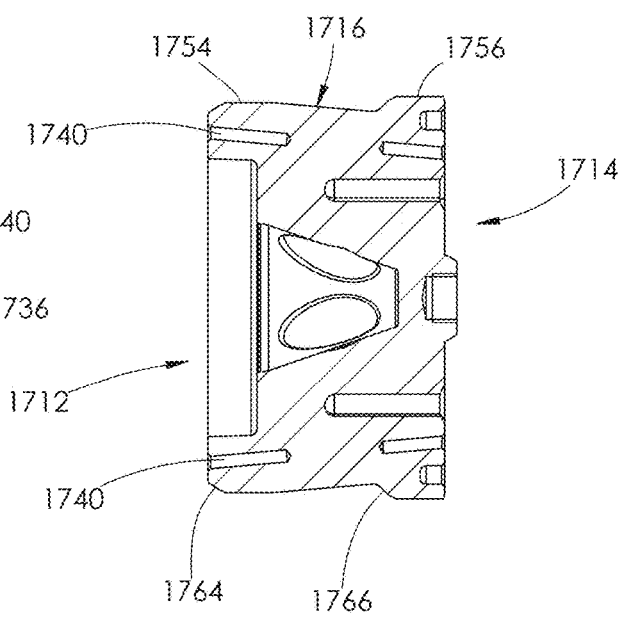

FIG. 178 is cross-sectional view of the first section shown in FIG. 177, taken along line BC-BC.

Figure 179:
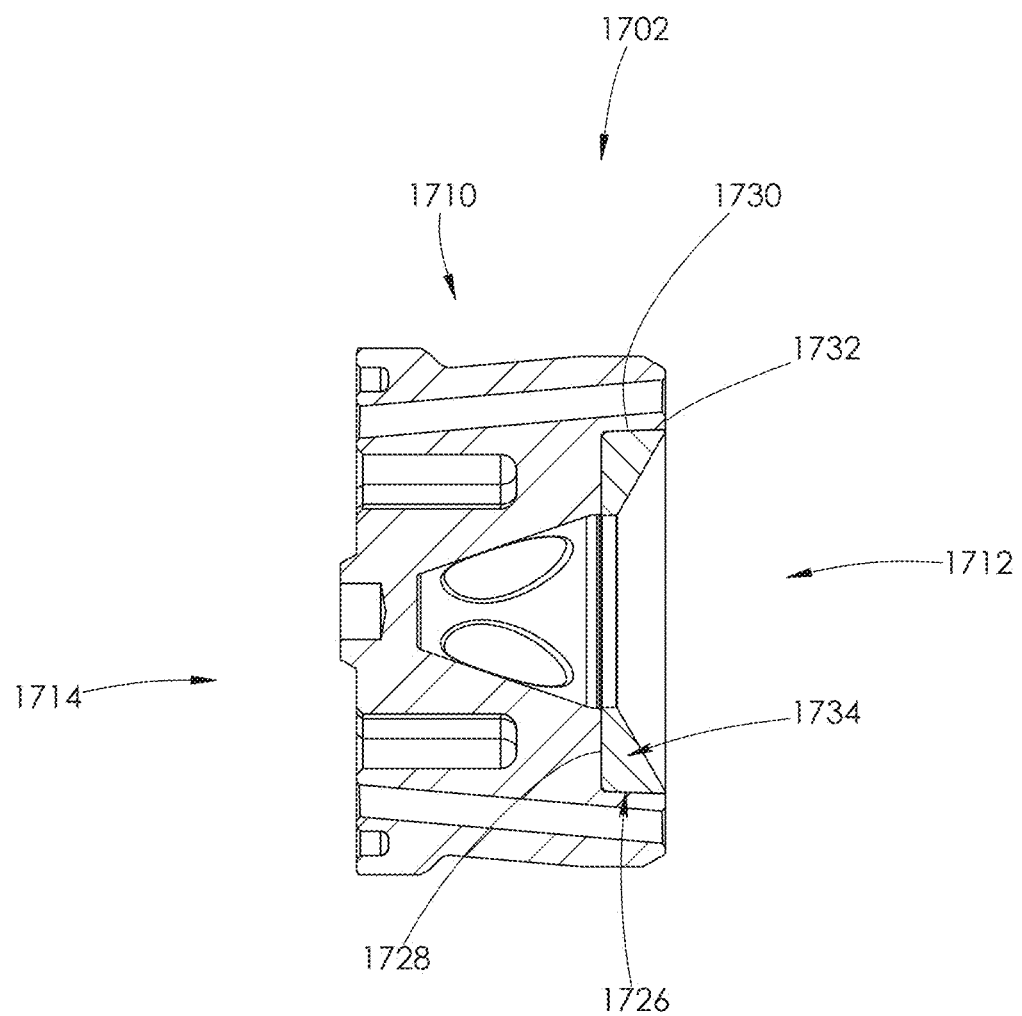

FIG. 179 is the cross-sectional view of the first section shown in FIG. 178, but with an annular insert installed within the first surface.

Figure 180:
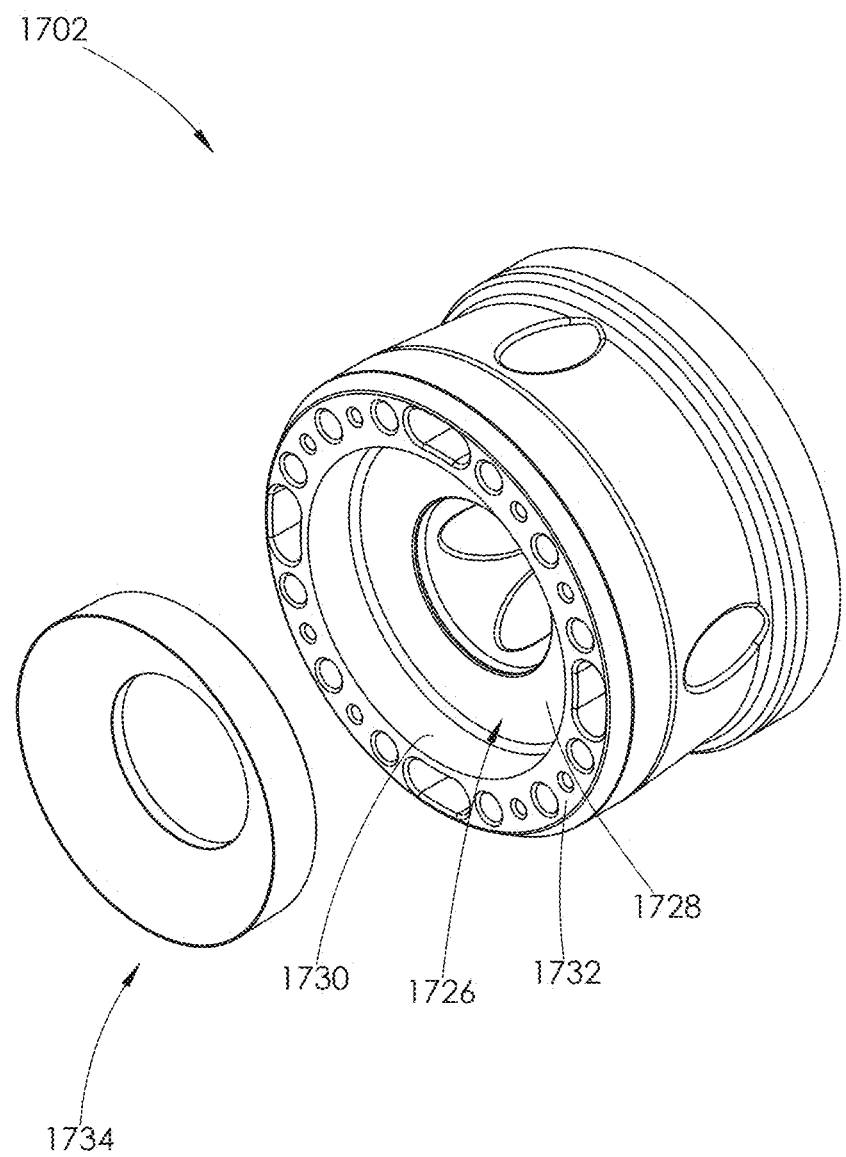

FIG. 180 is an exploded perspective view of the first surface of the first section shown in FIG. 171.

Figure 181:
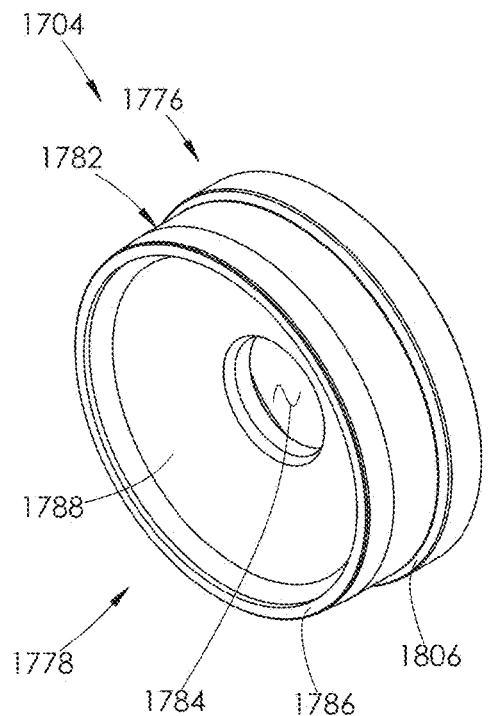

FIG. 181 is a perspective view of a first surface of a second section for use with the first section shown in FIG. 171.

Figure 182:
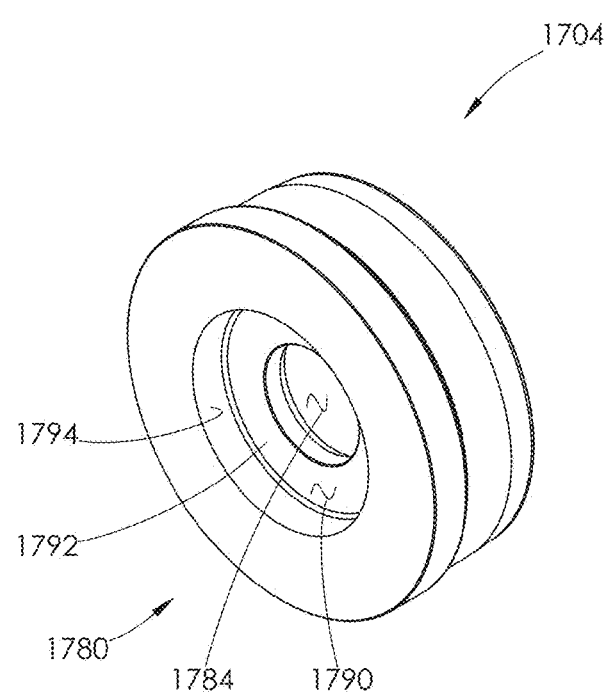

FIG. 182 is a perspective view of the second surface of the second section shown in FIG. 181.

Figure 183:
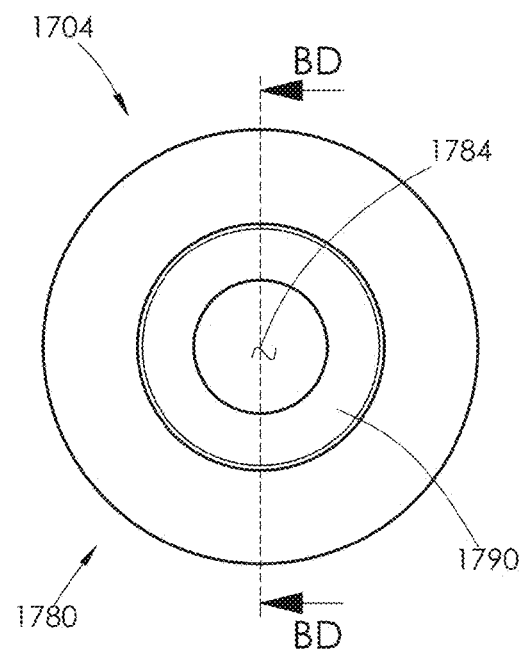

FIG. 183 is an elevational view of the second surface of the second section shown in FIG. 181.

Figure 184:
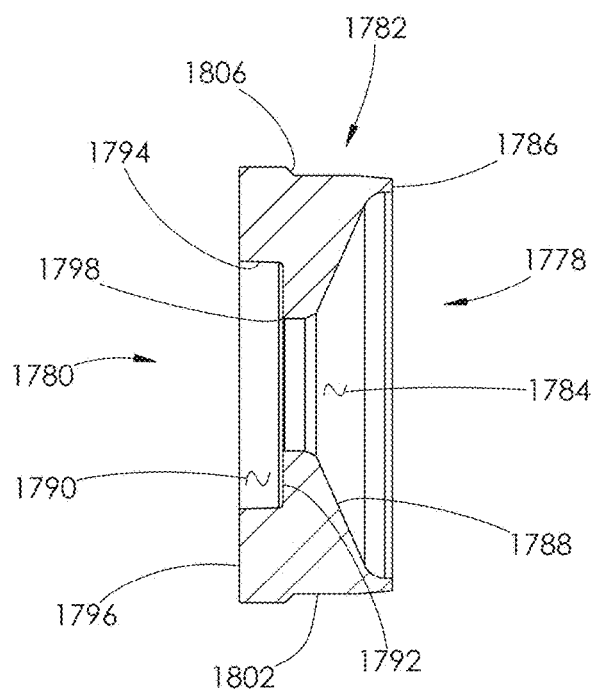

FIG. 184 is a cross-sectional view of the second section shown in FIG. 183, taken along line BD-BD.

Figure 185:
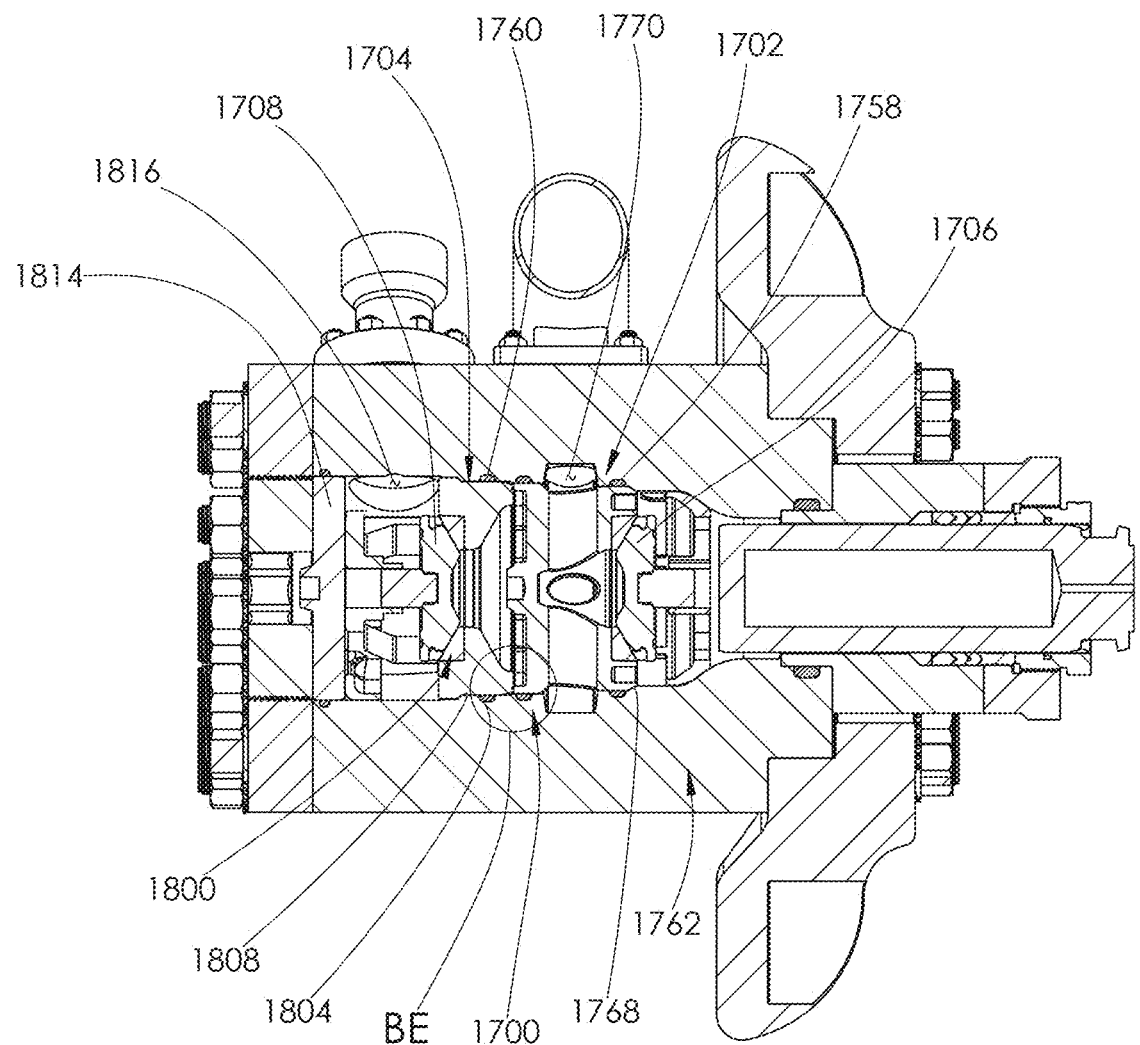

FIG. 185 is a cross-sectional view of another embodiment of a housing. The fluid routing plug made of the first section shown in FIG. 171 and the second section shown in FIG. 181 is installed within the housing.

Figure 186:
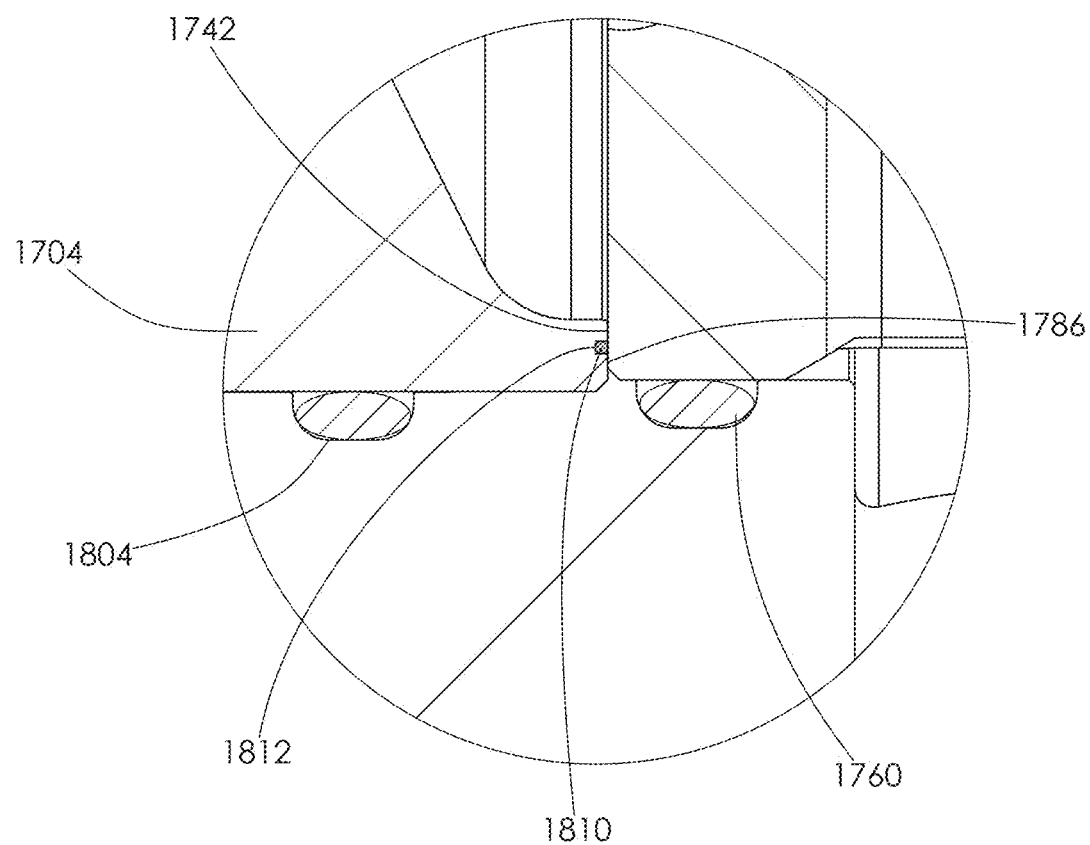

FIG. 186 is an enlarged view of area BE shown in FIG. 185.

Figure 187:
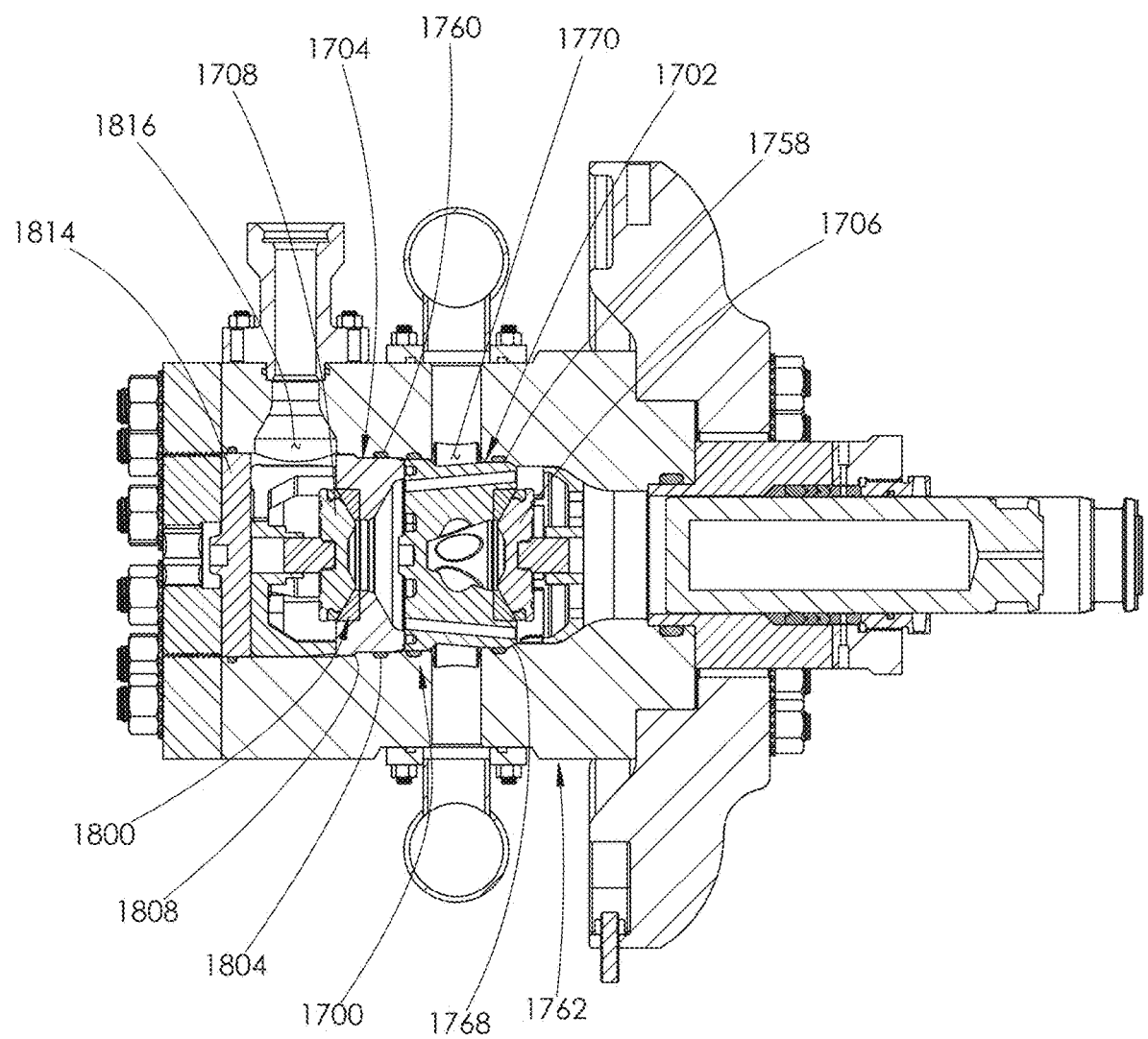

FIG. 187 is a cross-sectional view of the housing shown in FIG. 185, but taken along a different axis.

Figure 188:
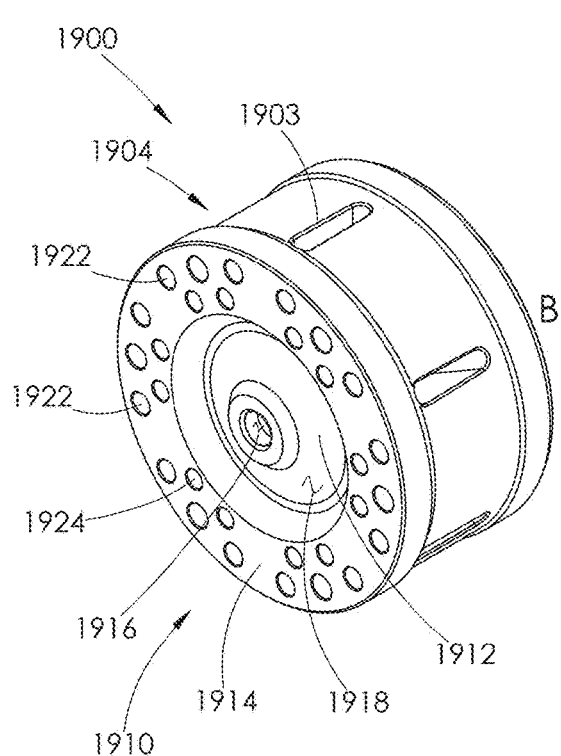

FIG. 188 is a perspective view of a second surface of another embodiment of a first section.

Figure 189:
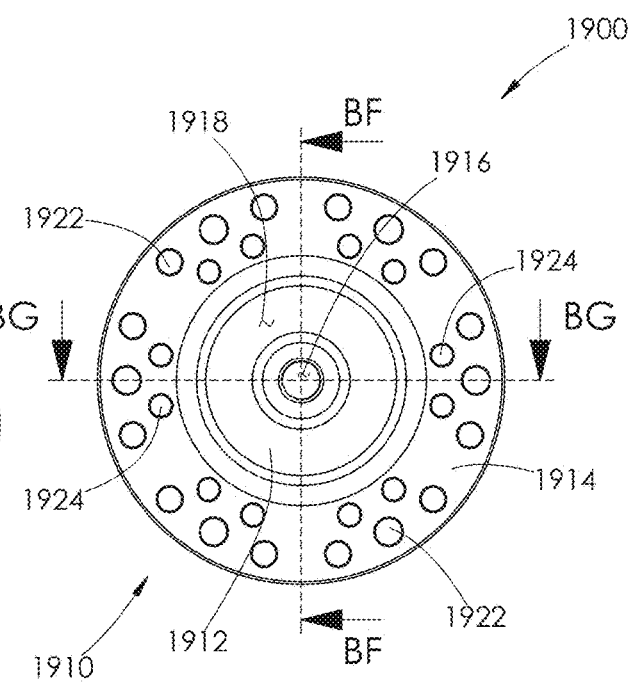

FIG. 189 is an elevational view of the second surface of the first section shown in FIG. 188.

Figure 190:
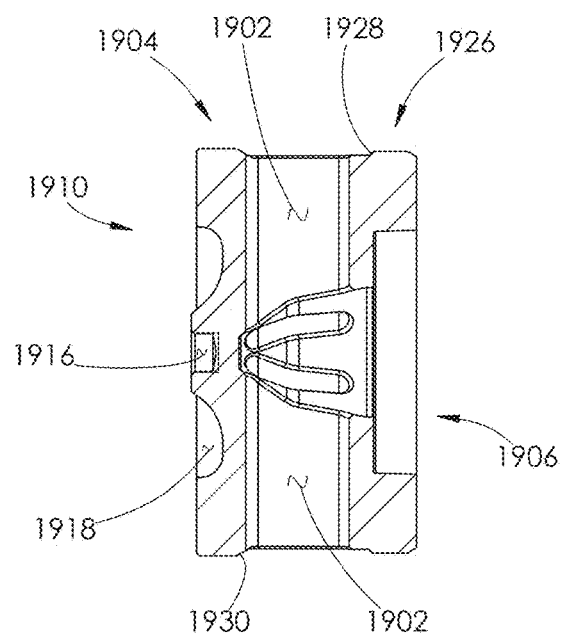

FIG. 190 is a cross-sectional view of the first section shown in FIG. 189, taken along line BF-BF.

Figure 191:
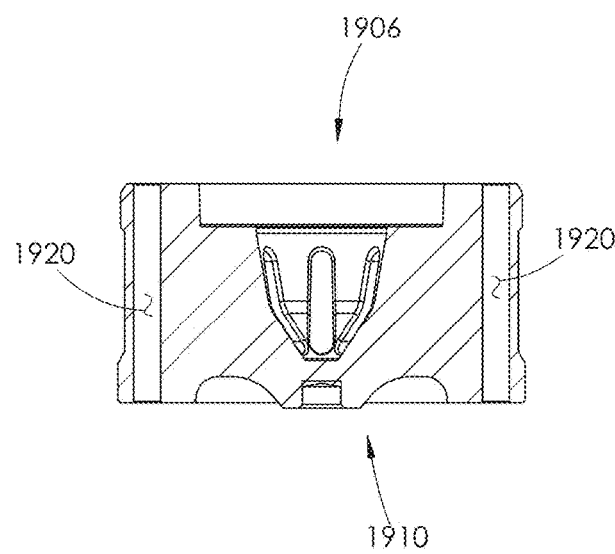

FIG. 191 is a cross-sectional view of the first section shown in FIG. 189, taken along line BG-BG.

Figure 192:
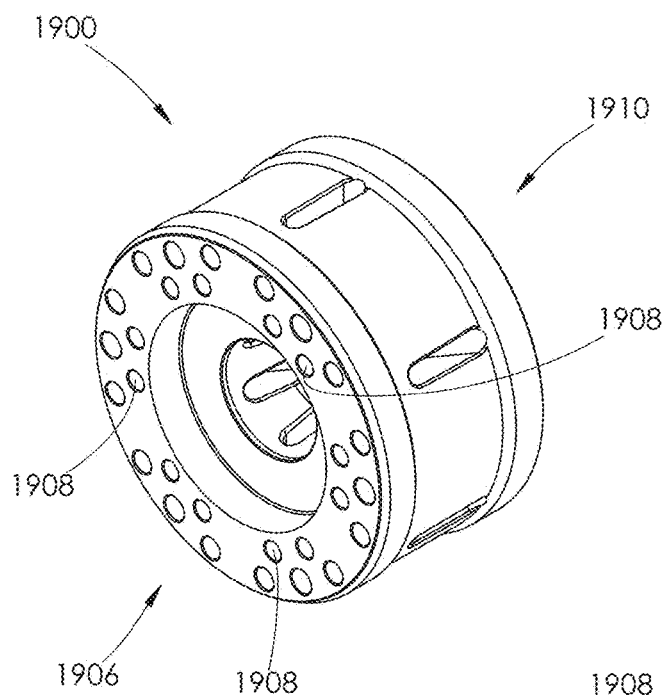

FIG. 192 is a perspective view of a first surface of the first section shown in FIG. 188.

Figure 193:
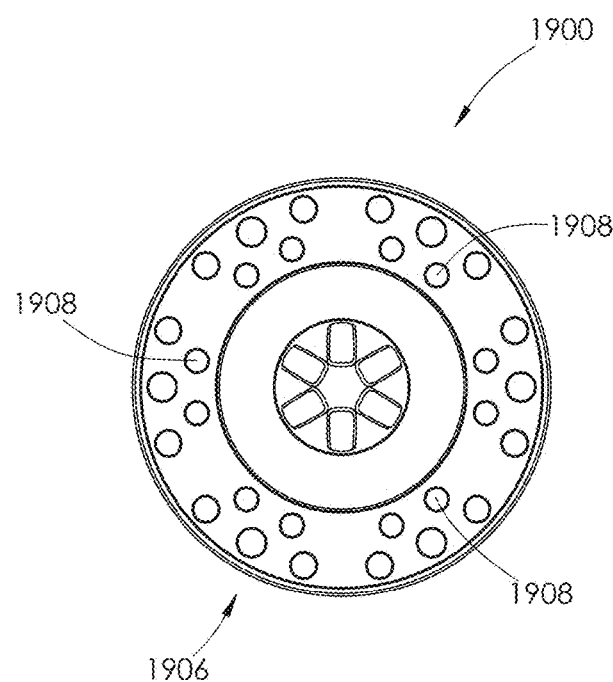

FIG. 193 is an elevational view of the first surface of the first section shown in FIG. 188.

Figure 194:
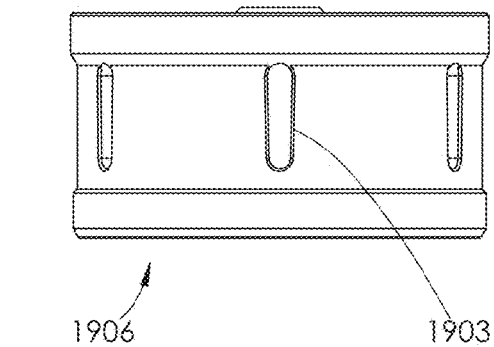

FIG. 194 is a top plan view of the first section shown in FIG. 188.

Figure 195:
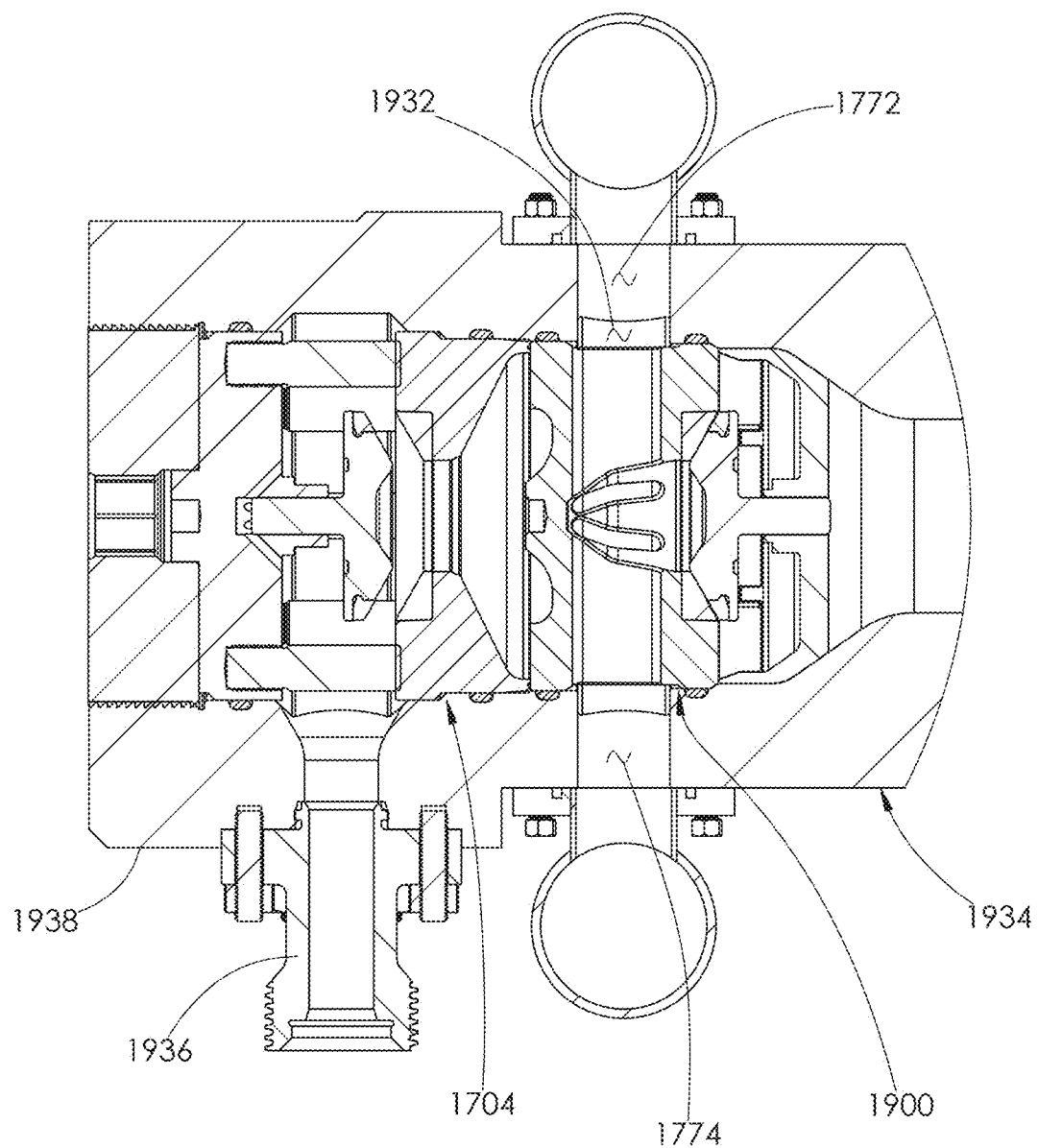

FIG. 195 is a cross-sectional view of another embodiment of a housing.

Another embodiment of a fluid routing plug made of the first section shown in FIG. 188 and the second section shown in FIG. 181 is installed within the housing.

Figure 196:
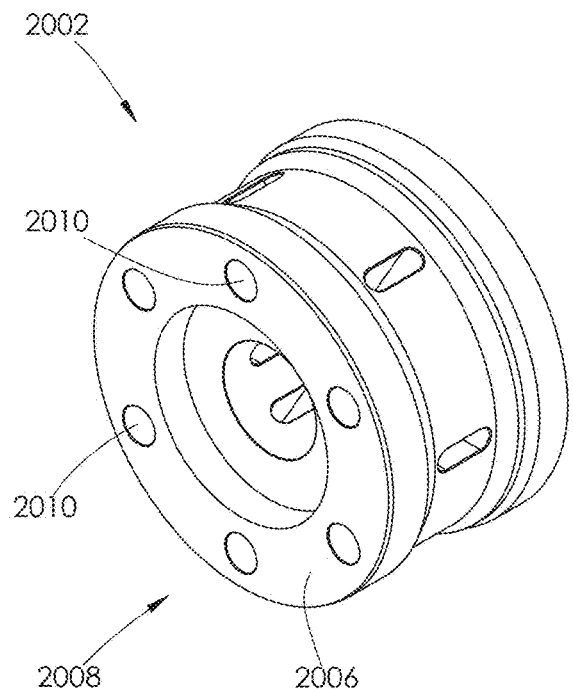

FIG. 196 is a perspective view of a first surface of another embodiment of a first section.

Figure 197:
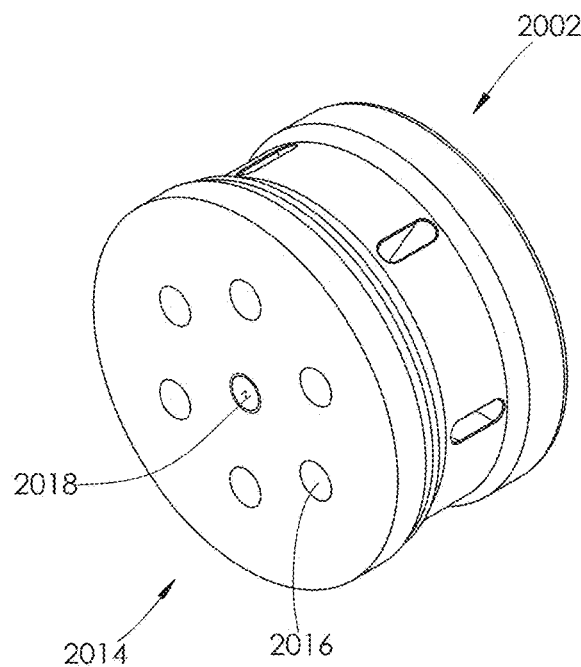

FIG. 197 is a perspective view of a second surface of the first section shown in FIG. 196.

Figure 198:
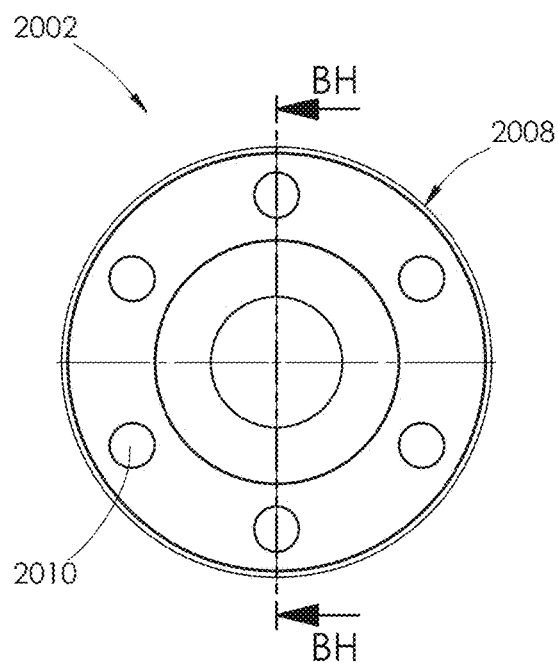

FIG. 198 is an elevational view of the first surface of the first section shown in FIG. 196.

Figure 199:
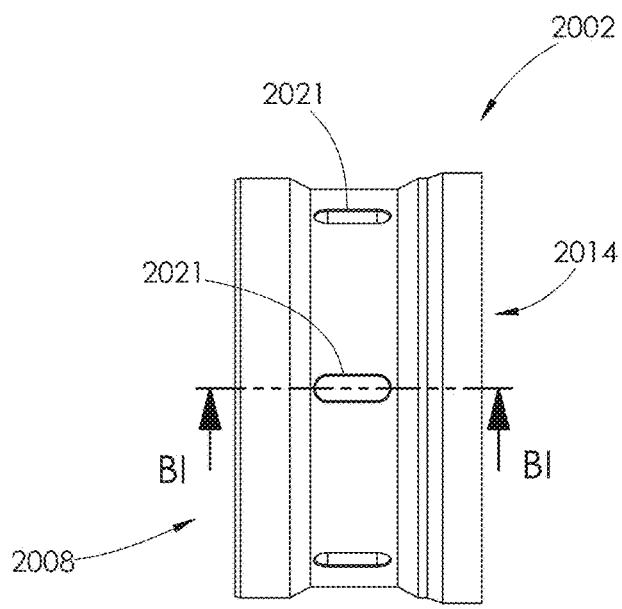

FIG. 199 is a top plan view of the first section shown in FIG. 196.

Figure 200:
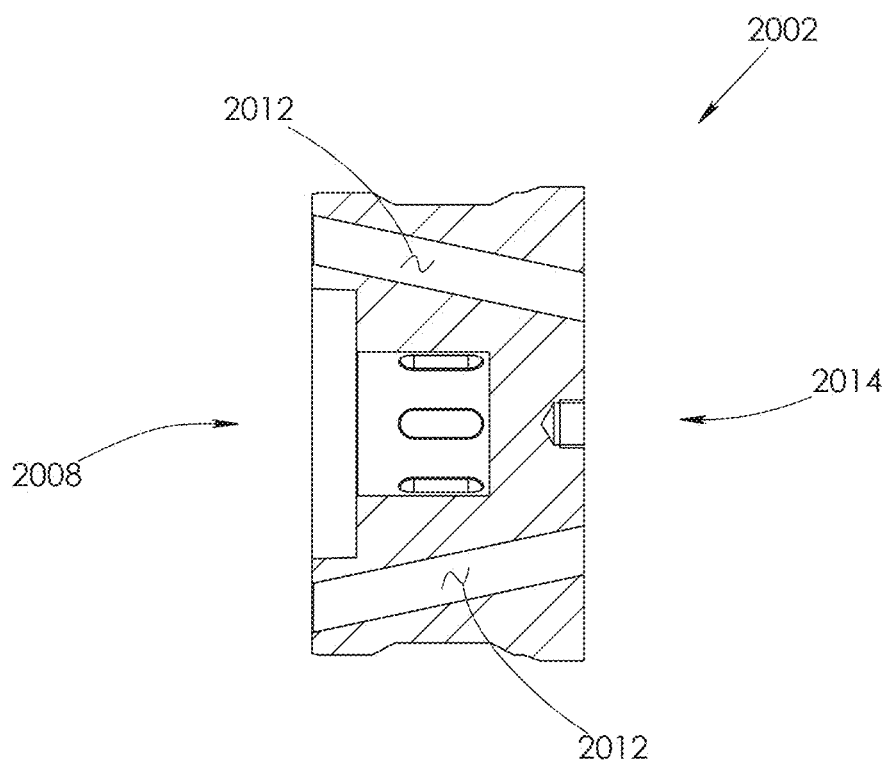

FIG. 200 is a cross-sectional view of the first section shown in FIG. 198, taken along line BH-BH.

Figure 201:
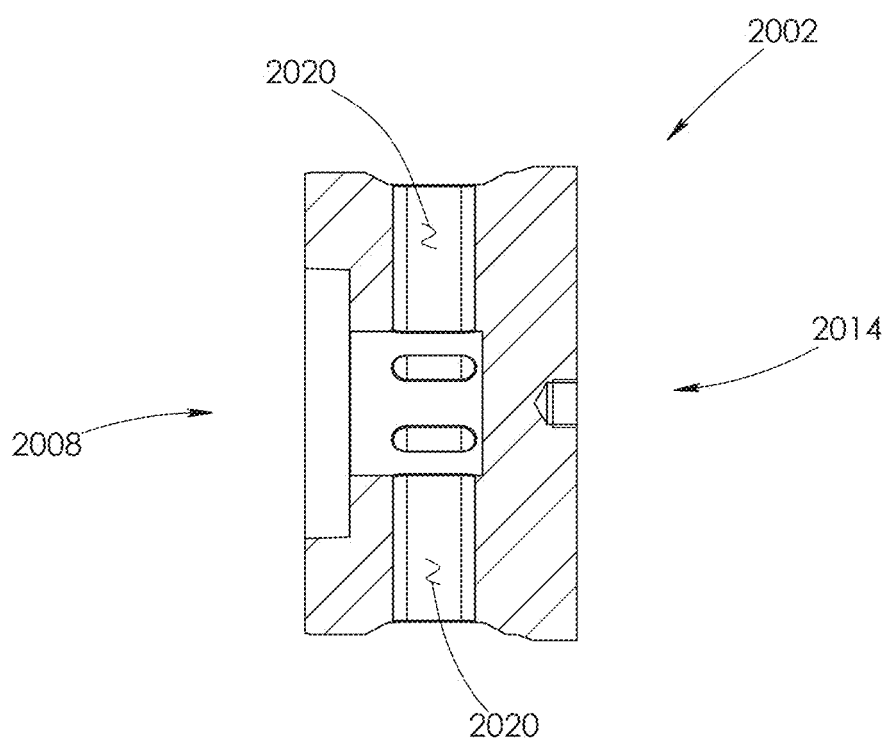

FIG. 201 is a cross-sectional view of the first section shown in FIG. 199, taken along line BI-BI.

Figure 202:
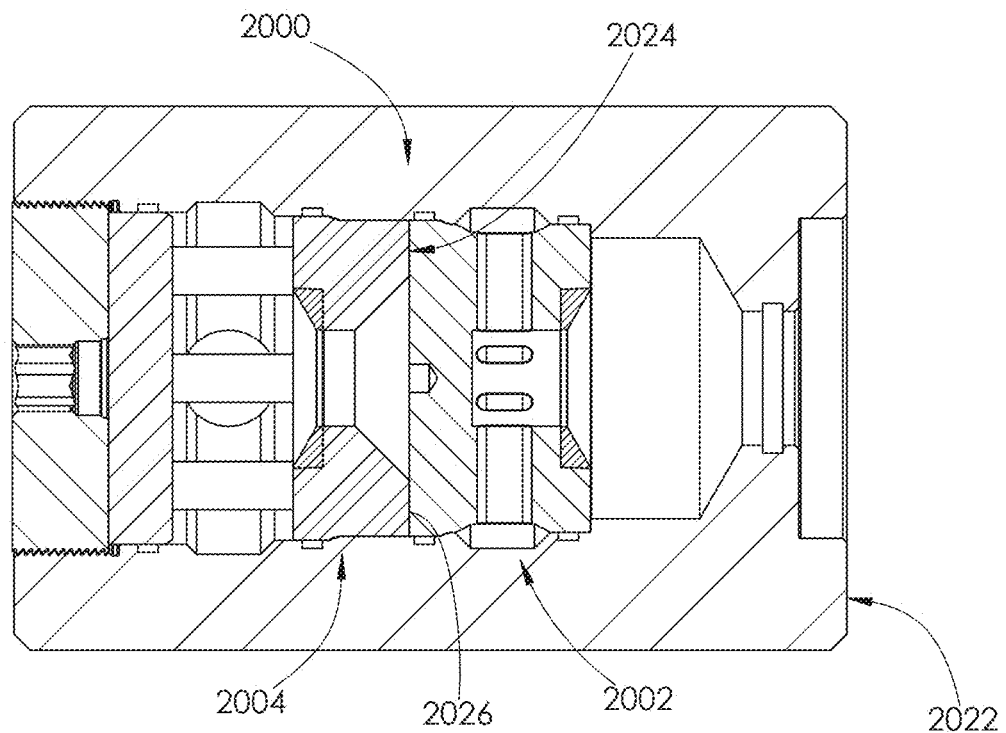

FIG. 202 is a cross-sectional view of another embodiment of a housing.

Another embodiment of a fluid routing plug made of the first section shown in FIG. 196 and another embodiment of a second section is installed within the housing.

Figure 203:
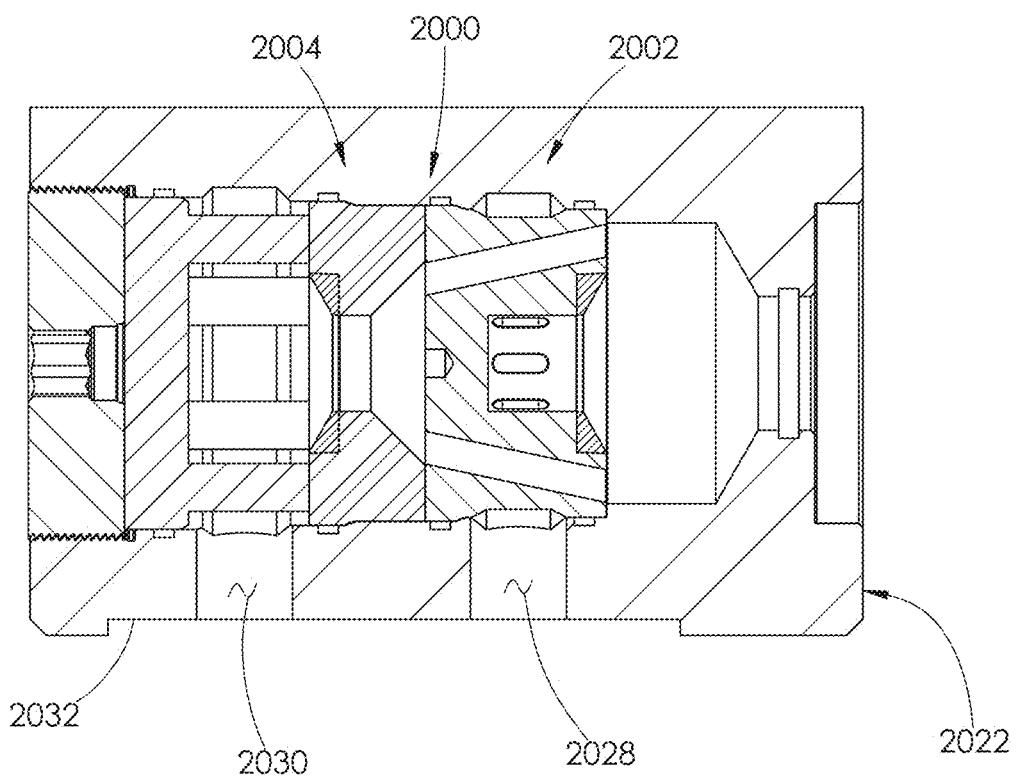

FIG. 203 is a cross-sectional view of the housing shown in FIG. 202, but taken along a different axis.

Figure 204:
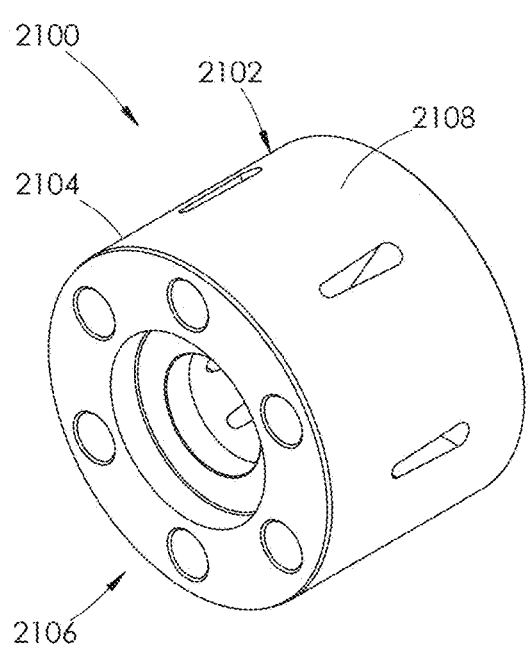

FIG. 204 is a perspective view of a first surface of another embodiment of a first section.

Figure 205:
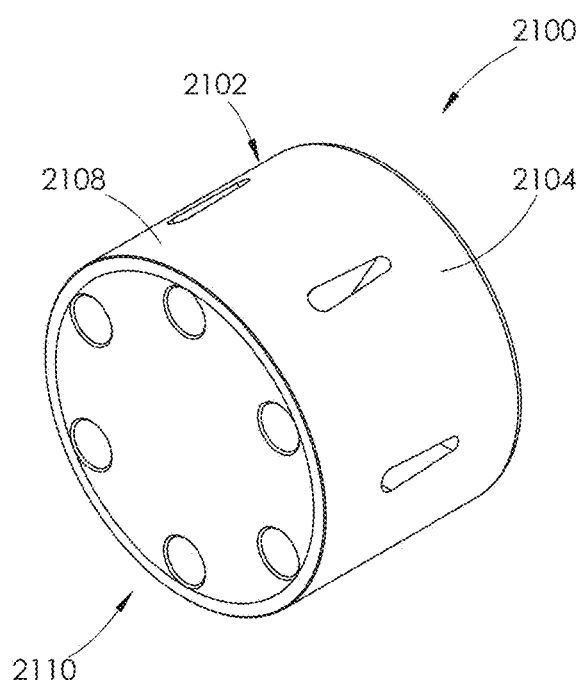

FIG. 205 is a perspective view of a second surface of the first section shown in FIG. 204.

Figure 206:
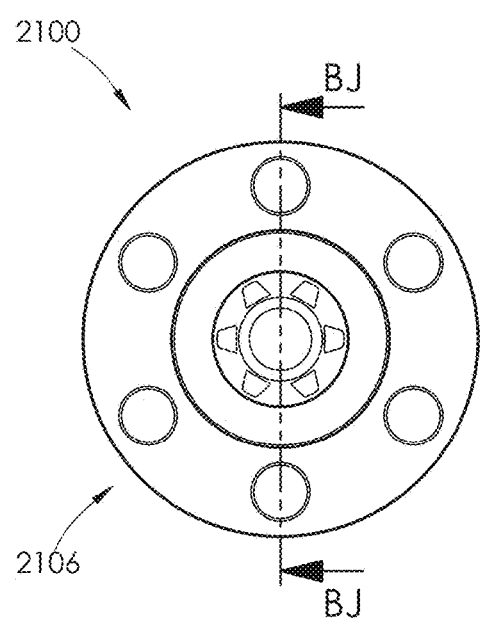

FIG. 206 is an elevational view of the first surface of the first section shown in FIG. 204.

Figure 207:
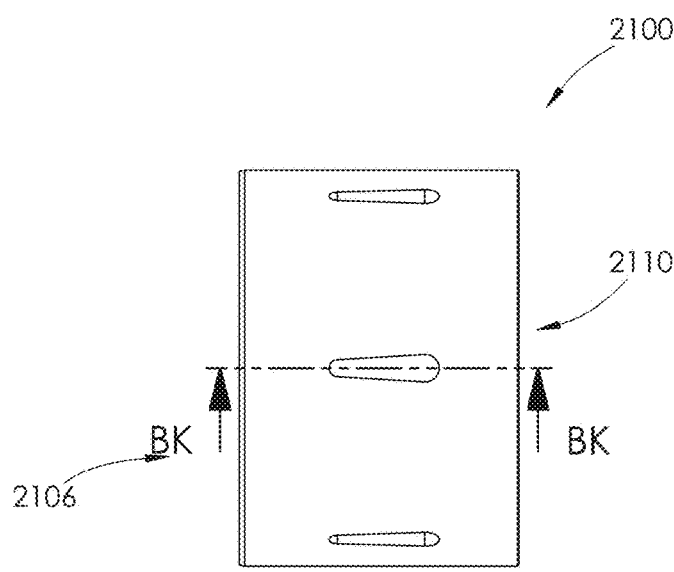

FIG. 207 is a top plan view of the first section shown in FIG. 204.

Figure 208:
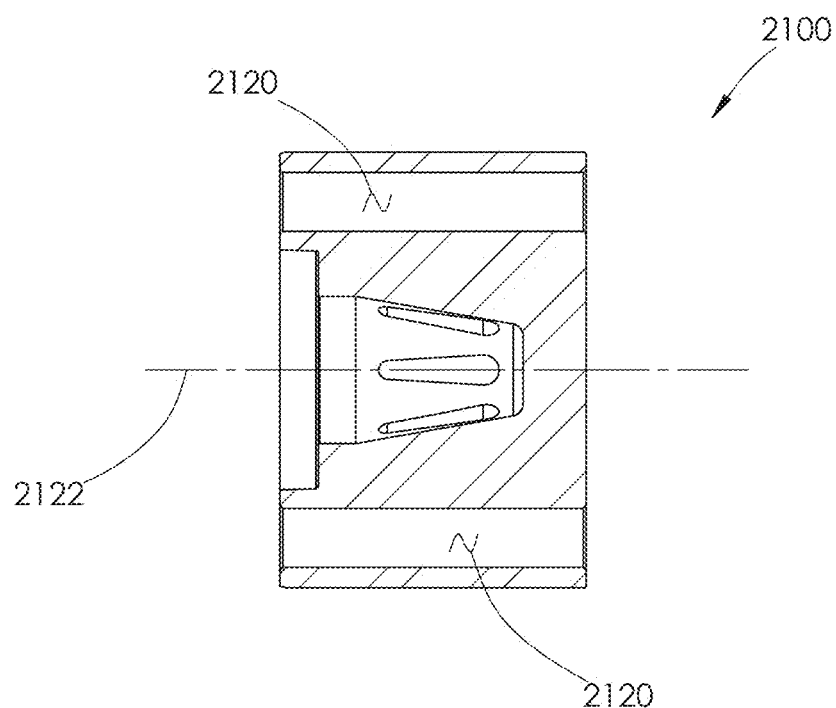

FIG. 208 is a cross-sectional view of the first section shown in FIG. 206, taken along line BJ-BJ.

Figure 209:
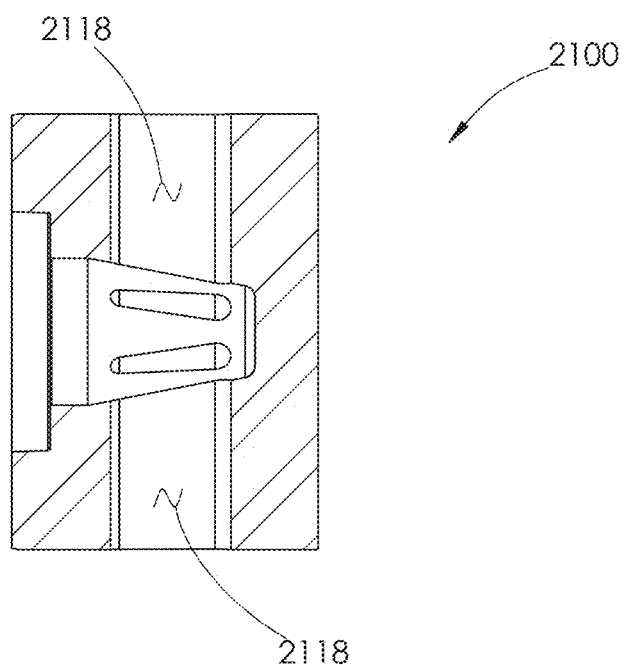

FIG. 209 is a cross-sectional view of the first section shown in FIG. 207, taken along line BK-BK.

Figure 210:
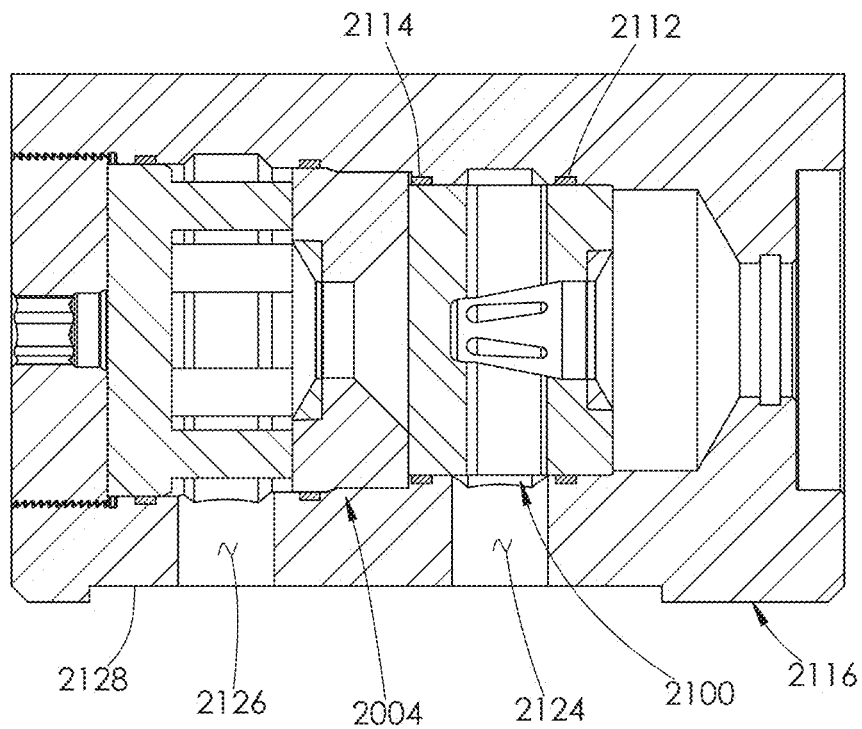

FIG. 210 is a cross-sectional view of another embodiment of a housing.

Another embodiment of a fluid routing plug made of the first section shown in FIG. 204 and the second section shown in FIG. 202 is installed within the housing.

Figure 211:
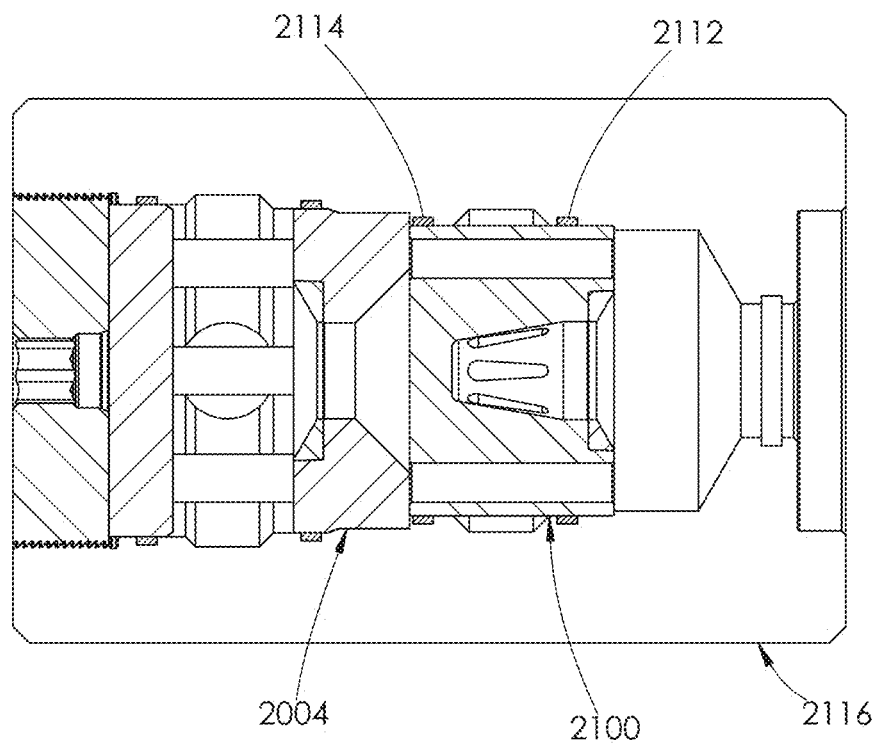

FIG. 211 is a cross-sectional view of the housing shown in FIG. 210, but taken along a different axis.

Figure 212:
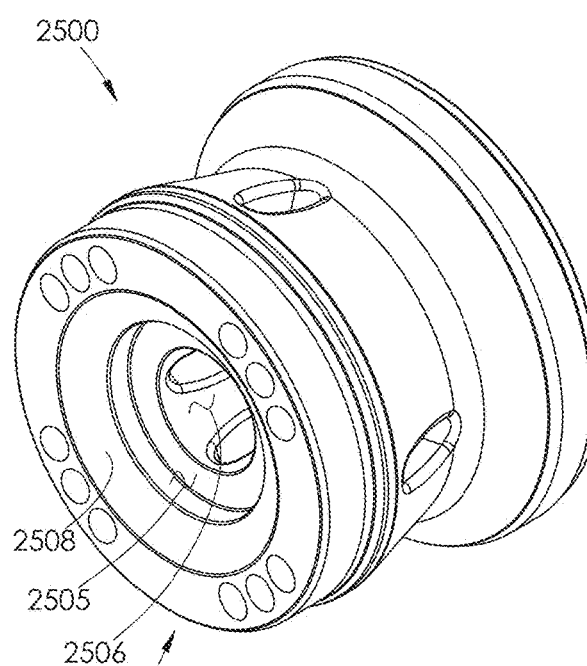

FIG. 212 is a perspective view of the first surface of another embodiment of a fluid routing plug.

Figure 213:
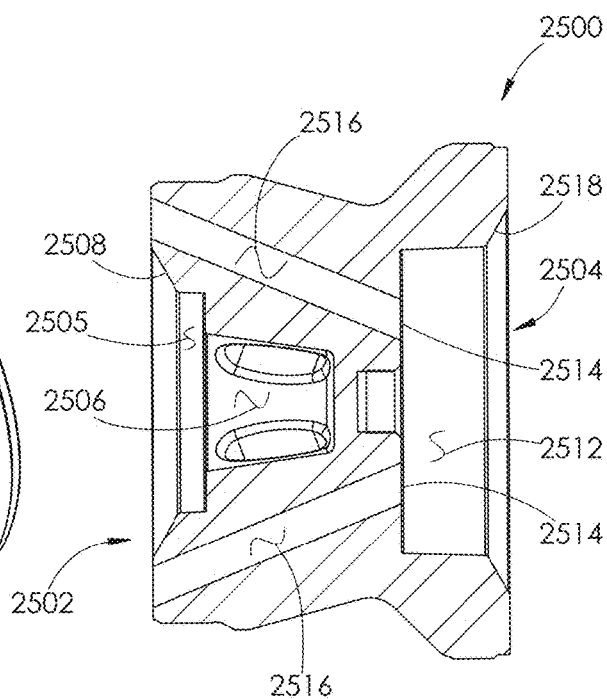
Figure 214:
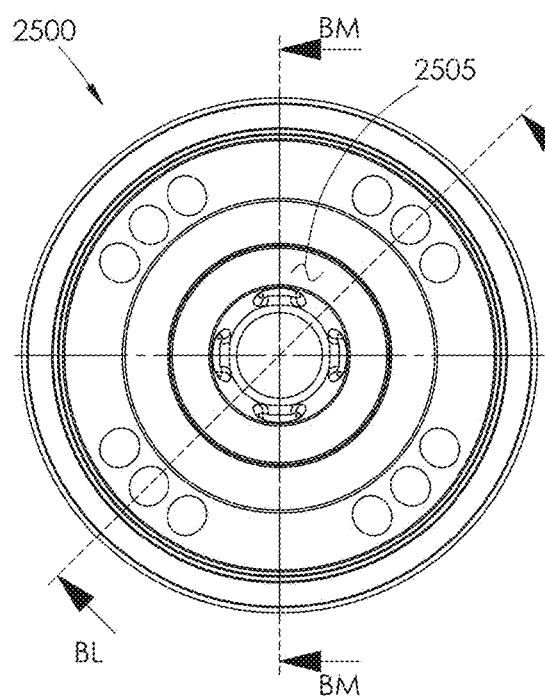

FIG. 213 is a cross-sectional view of the fluid routing plug shown in FIG. 214, taken along line BL-BL.

FIG. 214 is an elevational view of the first surface of the fluid routing plug shown in FIG. 212.

Figure 215:
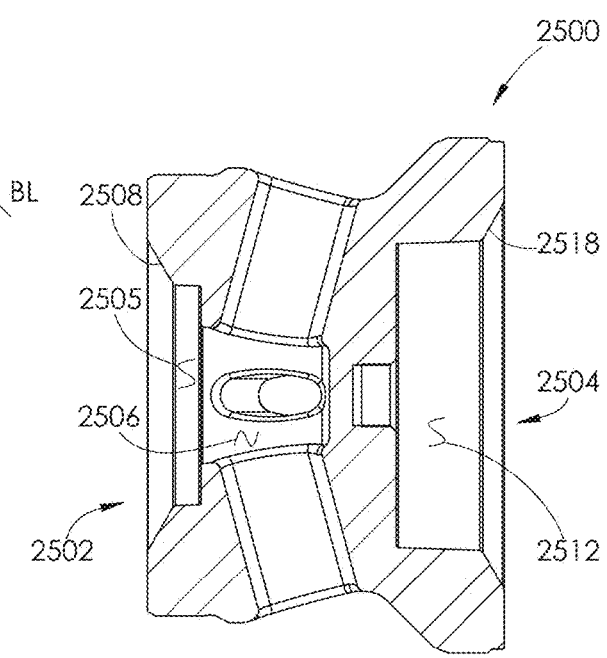

FIG. 215 is a cross-sectional view of the fluid routing plug shown in FIG. 214, taken along line BM-BM.

Figure 216:
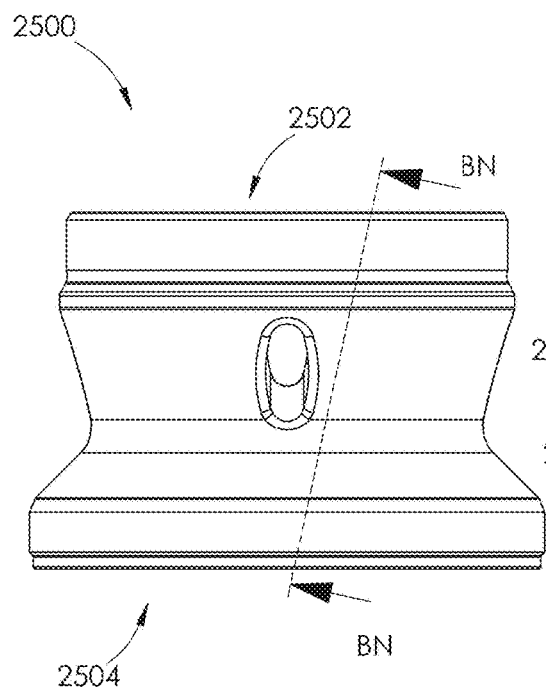

FIG. 216 is a top plan view of the fluid routing plug shown in FIG. 212.

Figure 217:
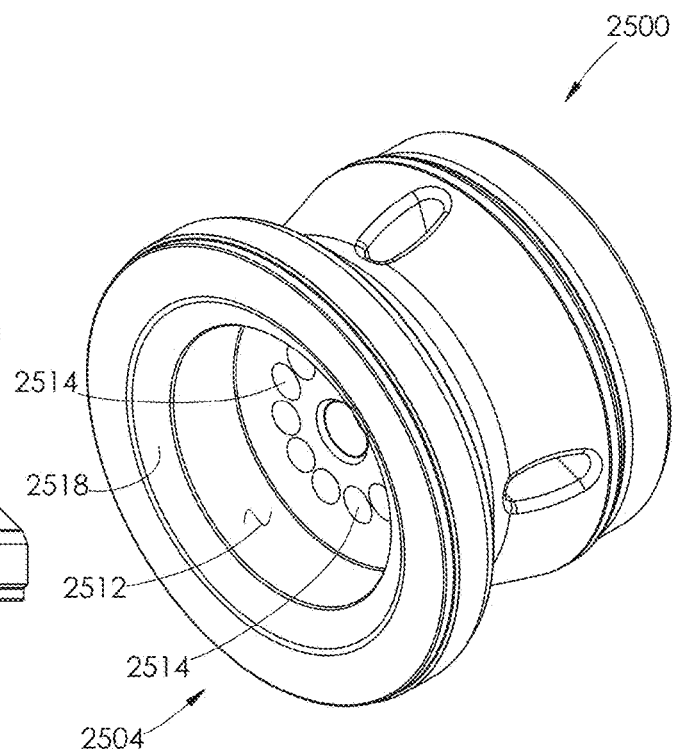

FIG. 217 is a perspective view of the second surface of the fluid routing plug shown in FIG. 212.

Figure 218:
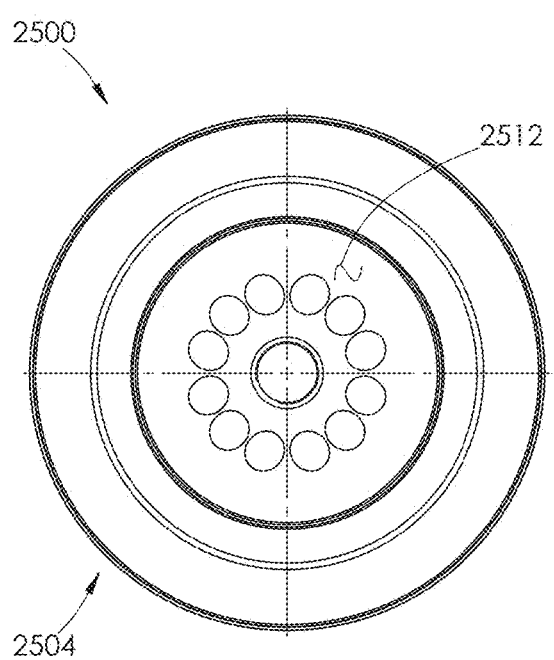

FIG. 218 is an elevational view of the second surface of the fluid routing plug shown in FIG. 212.

Figure 219:
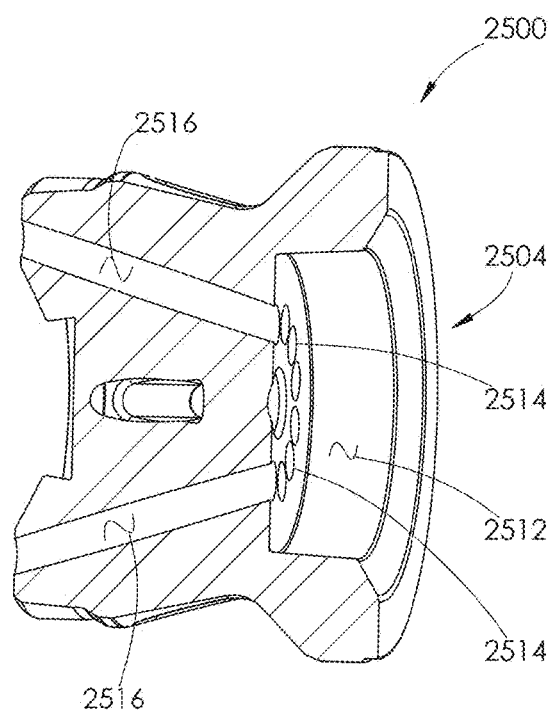

FIG. 219 is a cross-sectional view of the fluid routing plug shown in FIG. 216, taken along line BN-BN.

Figure 220:
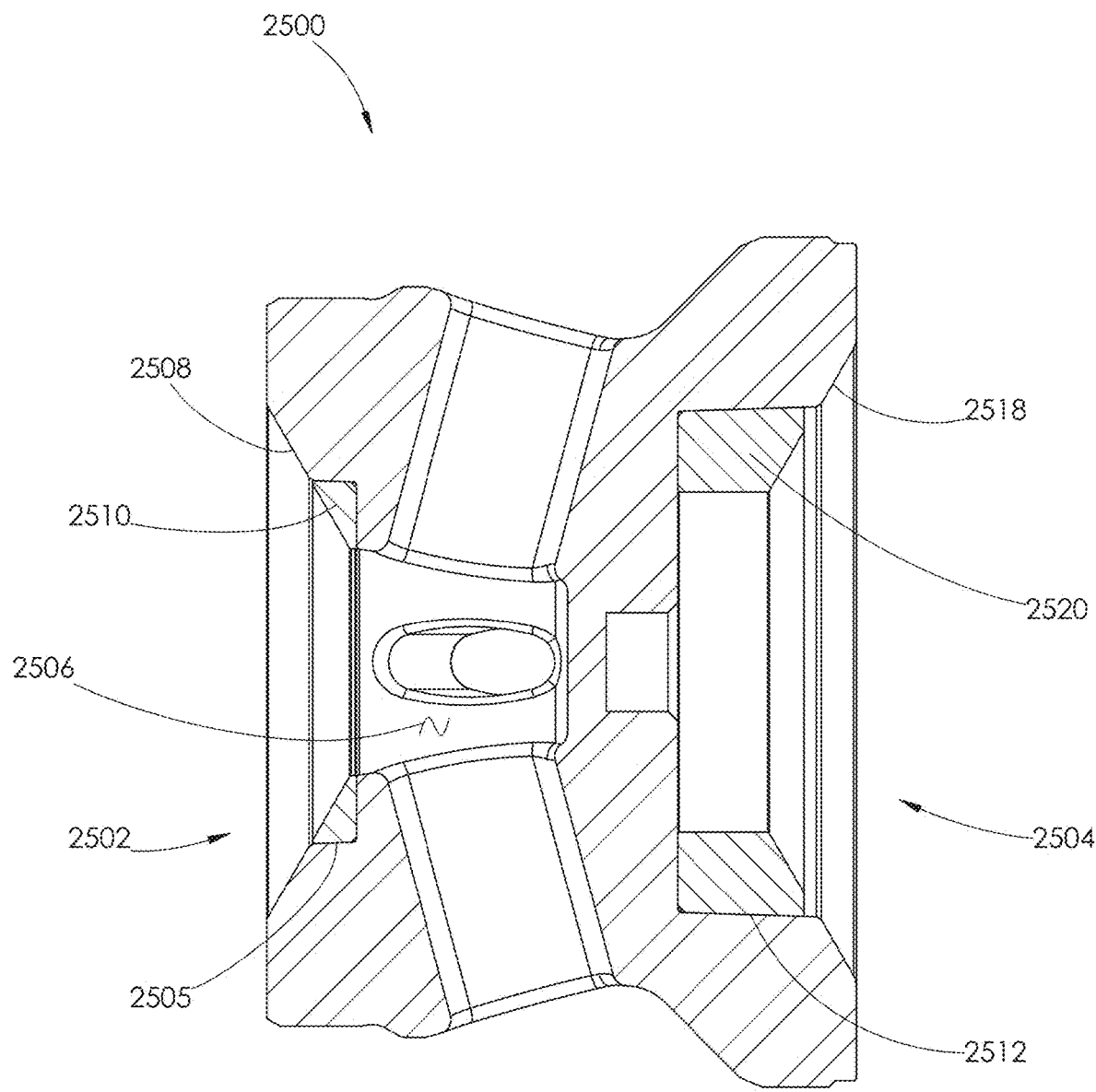

FIG. 220 is the cross-sectional view of the fluid routing plug shown in FIG. 213 having a pair of inserts installed therein.

Figure 221:
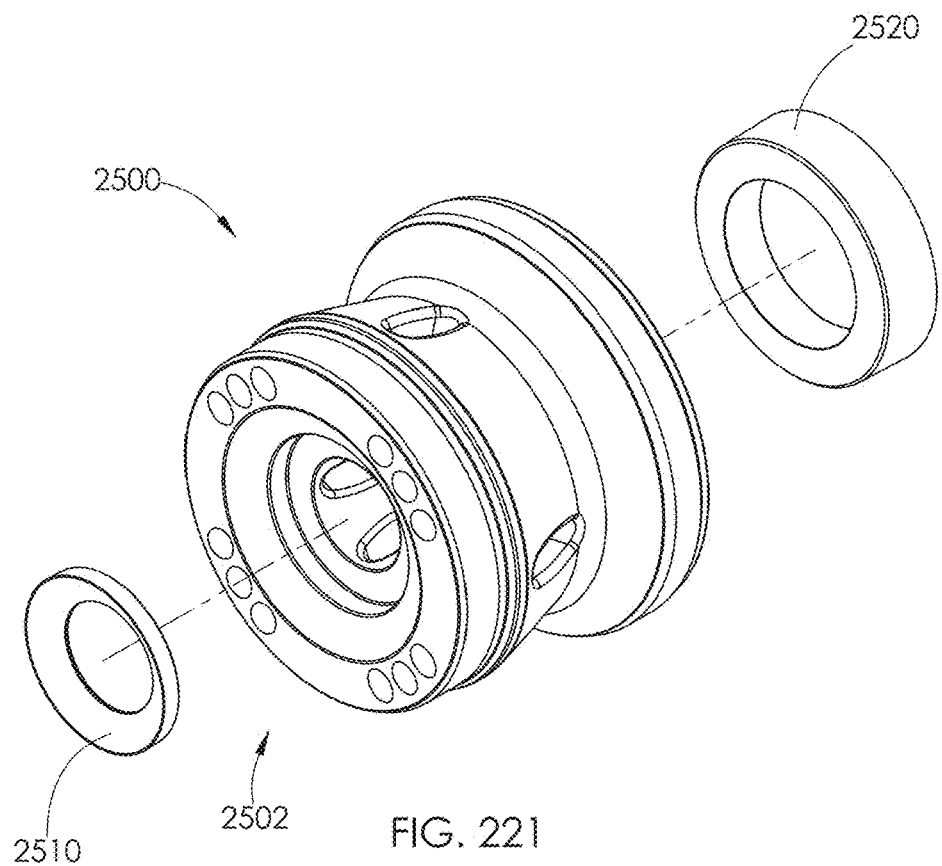

FIG. 221 is a perspective and exploded view of the first surface of the fluid routing plug shown in FIG. 220.

Figure 222:
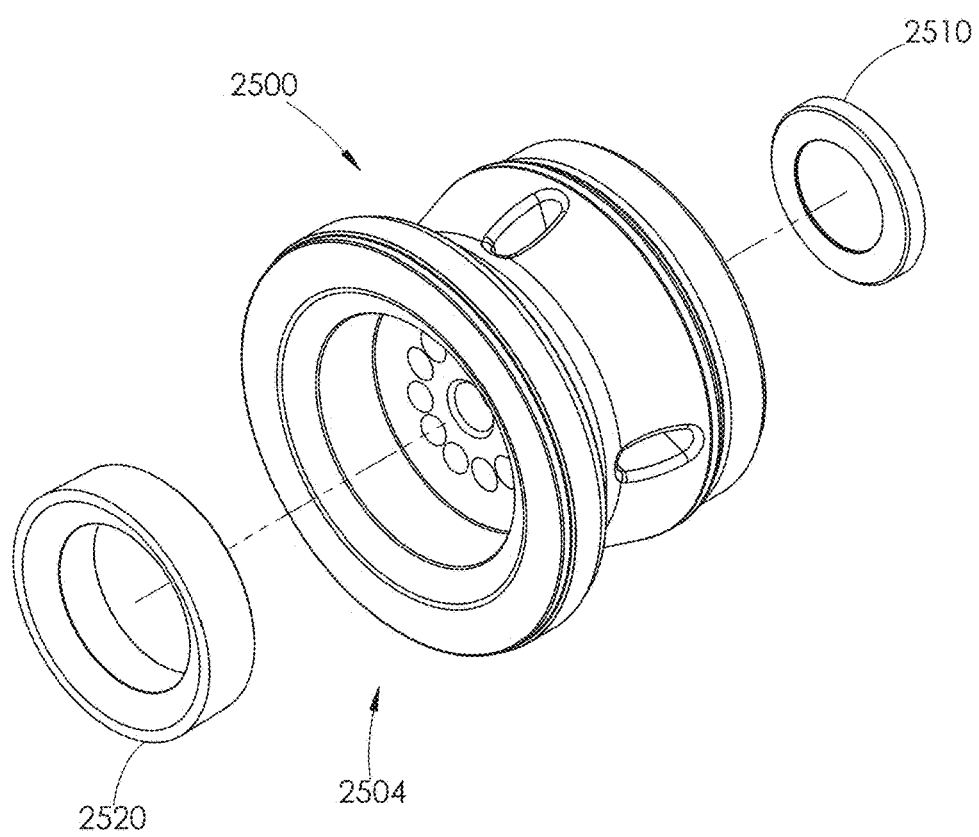

FIG. 222 is a perspective and exploded view of the second surface of the fluid routing plug shown in FIG. 220.

Figures 223, 224:
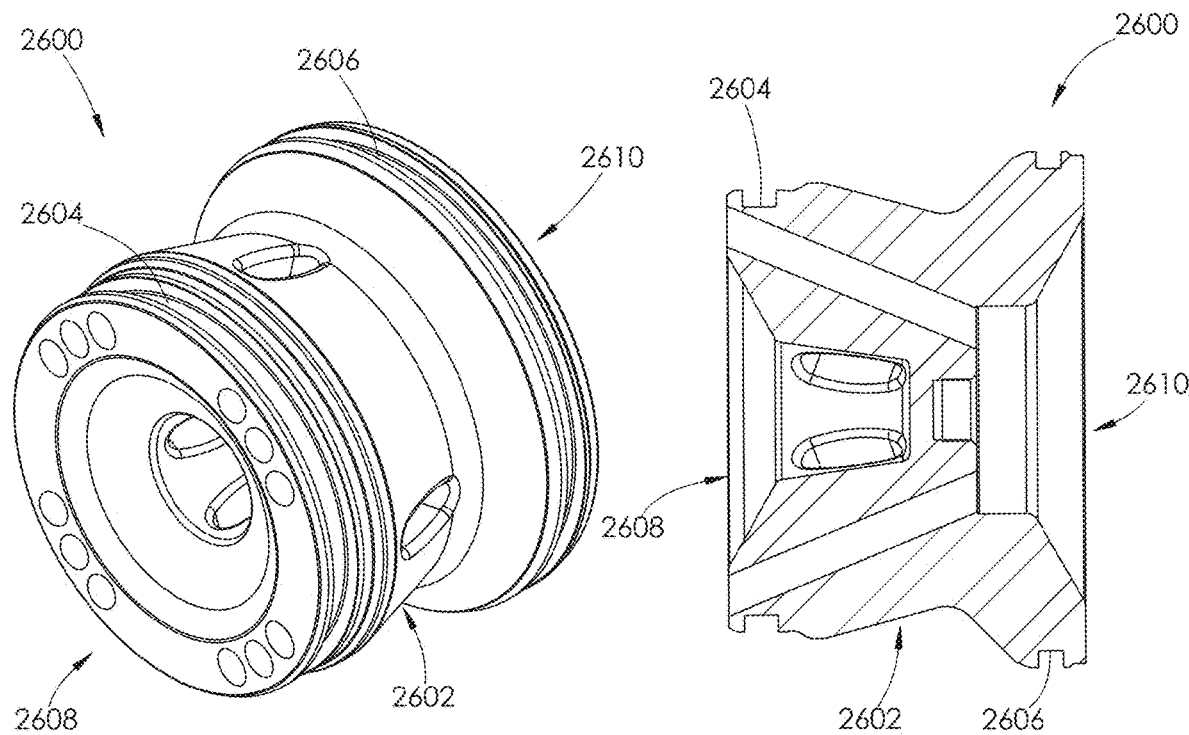

FIG. 223 is a perspective view of a first surface of another embodiment of a fluid routing plug.

Figure 225:
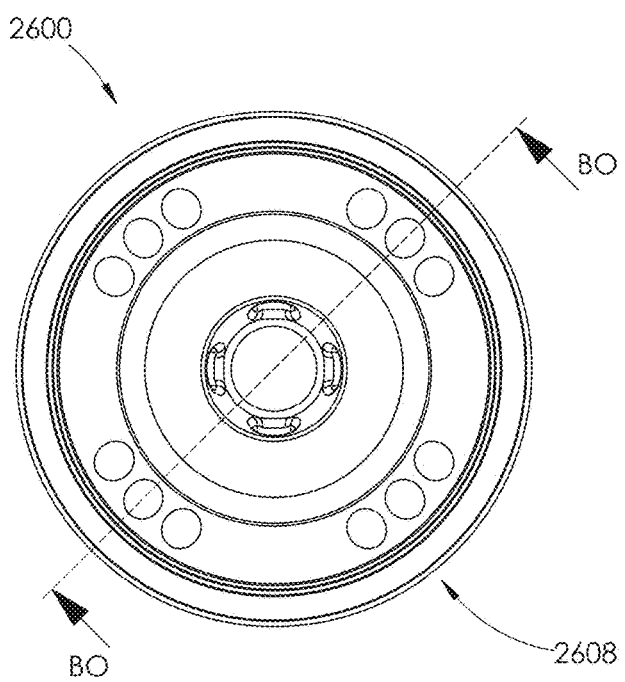

FIG. 224 is a cross-sectional view of the fluid routing plug shown in FIG. 225, taken along line BO-BO.

FIG. 225 is an elevational view of the first surface of the fluid routing plug shown in FIG. 223.

Figure 226:
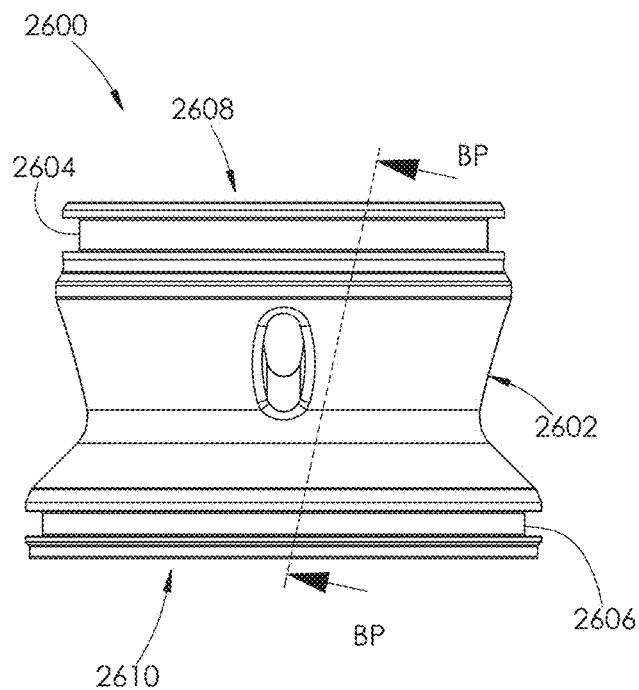

FIG. 226 is a top plan view of the fluid routing plug shown in FIG. 223.

Figure 227:
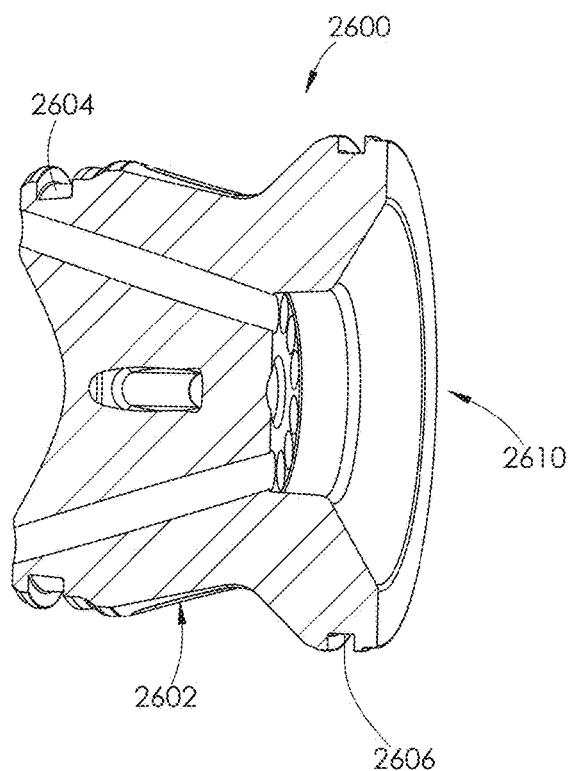

FIG. 227 is a cross-sectional view of the fluid routing plug shown in FIG. 226, taken along line BP-BP.

Figure 228:
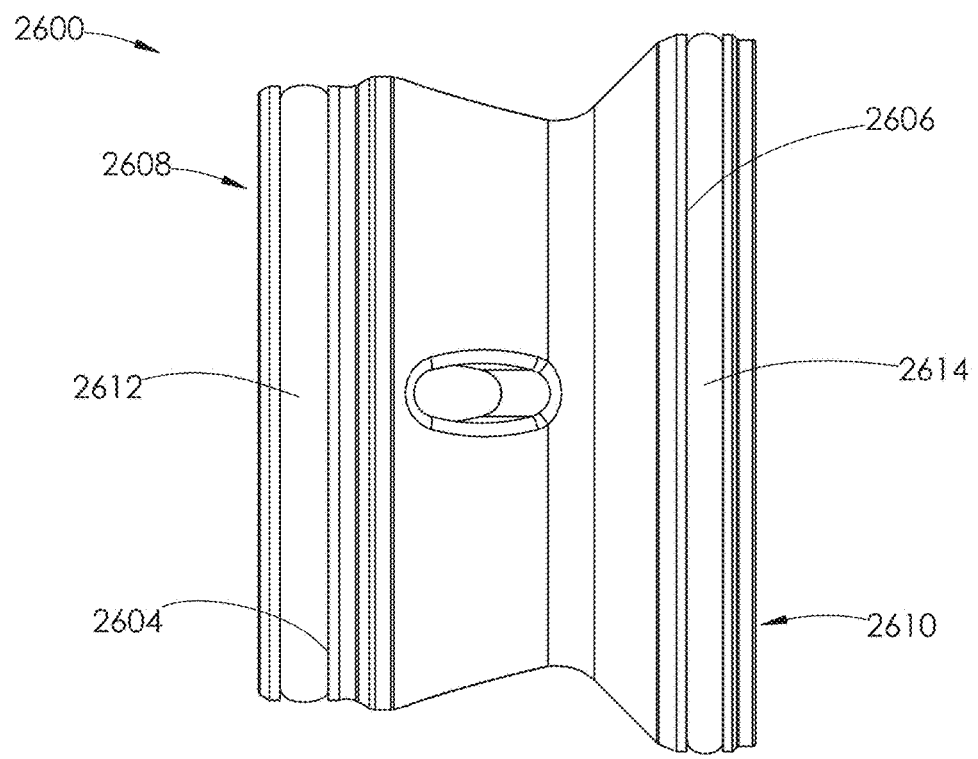

FIG. 228 is the top plan view of the fluid routing plug shown in FIG. 226 having a pair of seals installed therein.

Figure 229:
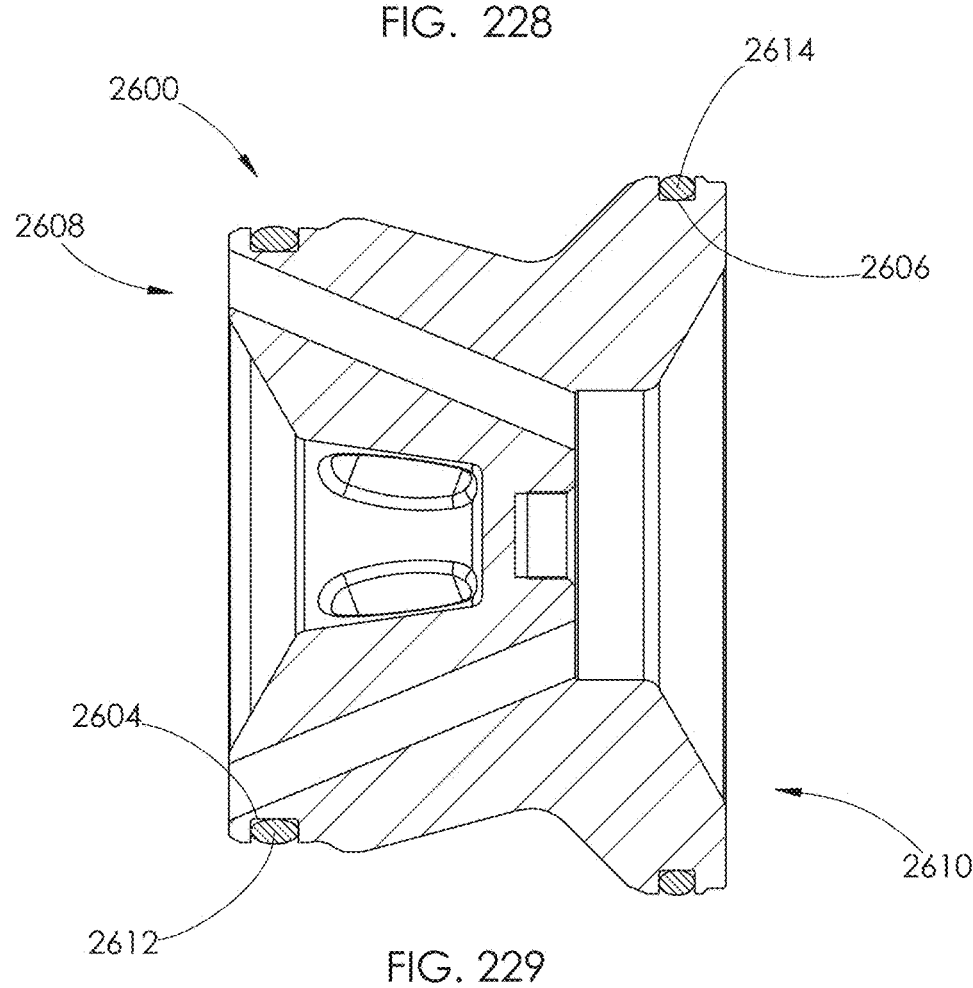

FIG. 229 is the cross-sectional view of the fluid routing plug shown in FIG. 225, taken along line BO-BO and having a pair of seals installed therein.

Figure 230:
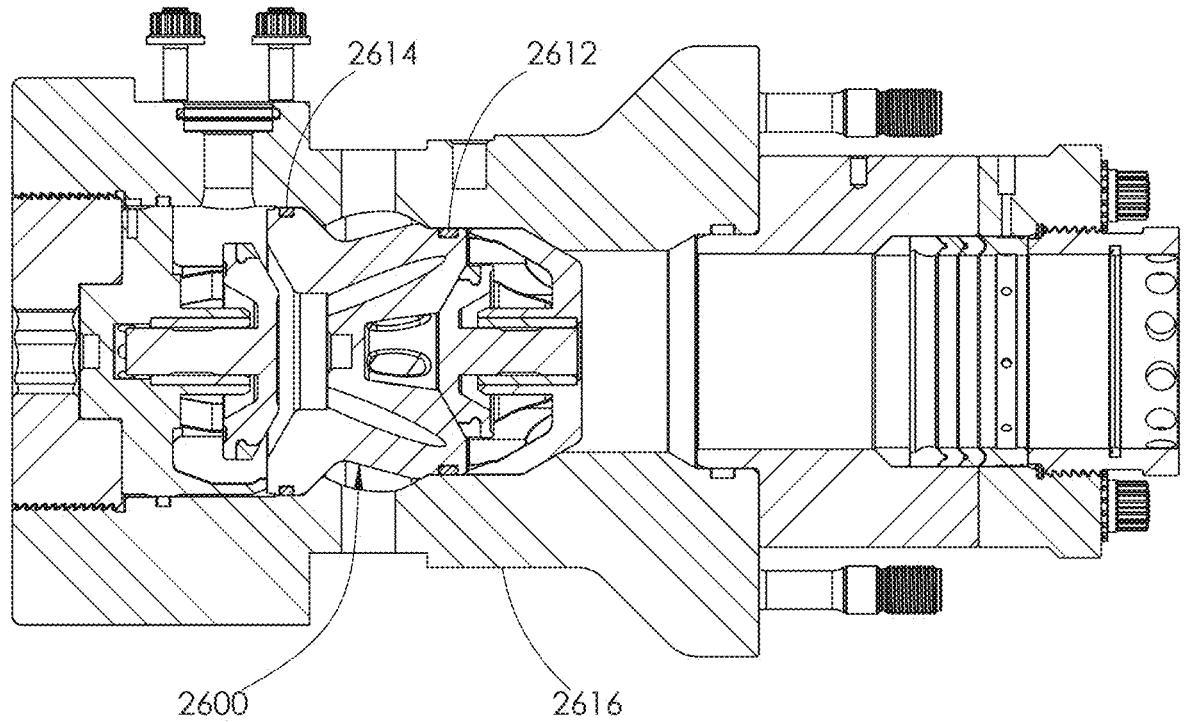

FIG. 230 is a cross-sectional view of an alternative embodiment of a fluid end section having the fluid routing plug shown in FIG. 229 installed therein.

Figure 231:
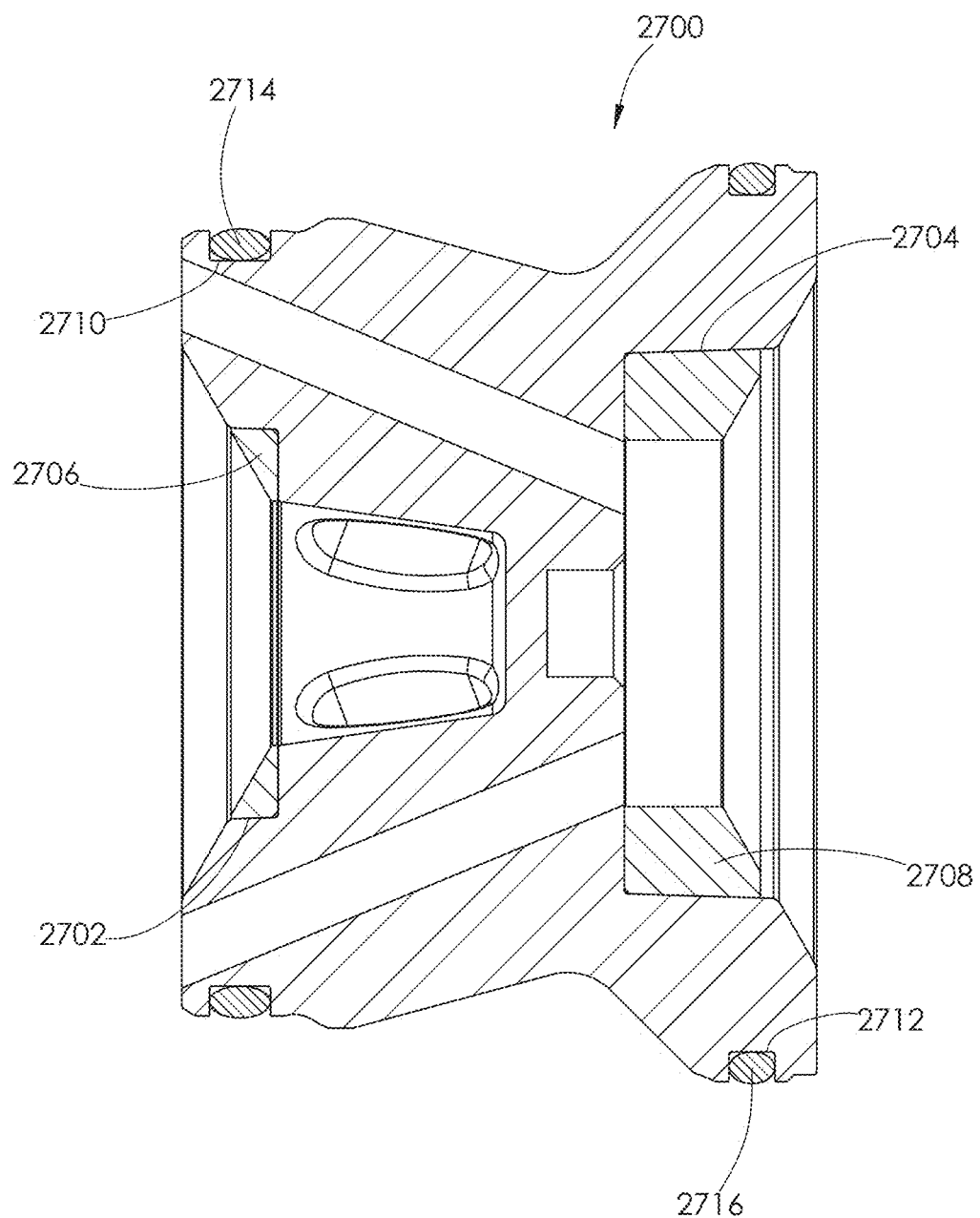

FIG. 231 is a cross-sectional view of another embodiment of a fluid routing plug.

FIG. 232 is a perspective view of the second surface of another embodiment of a fluid routing plug.

FIG. 233 is a perspective view of the first surface of the fluid routing plug shown in FIG. 232.

FIG. 234 is a cross-sectional view of the fluid routing plug shown in FIG. 232.

Figure 235:
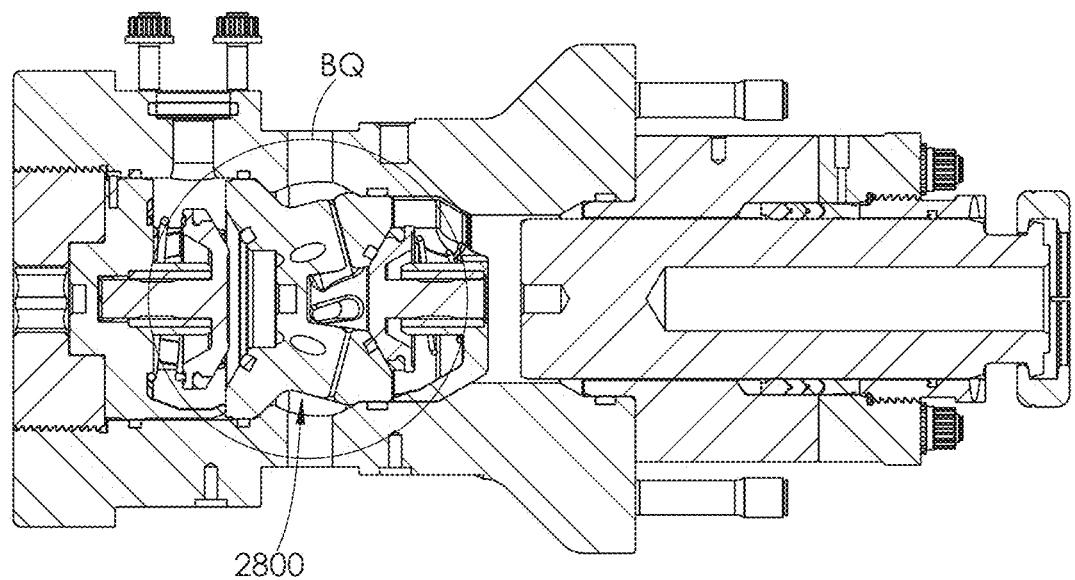

FIG. 235 is a cross-sectional view of an alternative embodiment of a fluid end section having the fluid routing plug shown in FIG. 232 installed therein.

Figure 236:
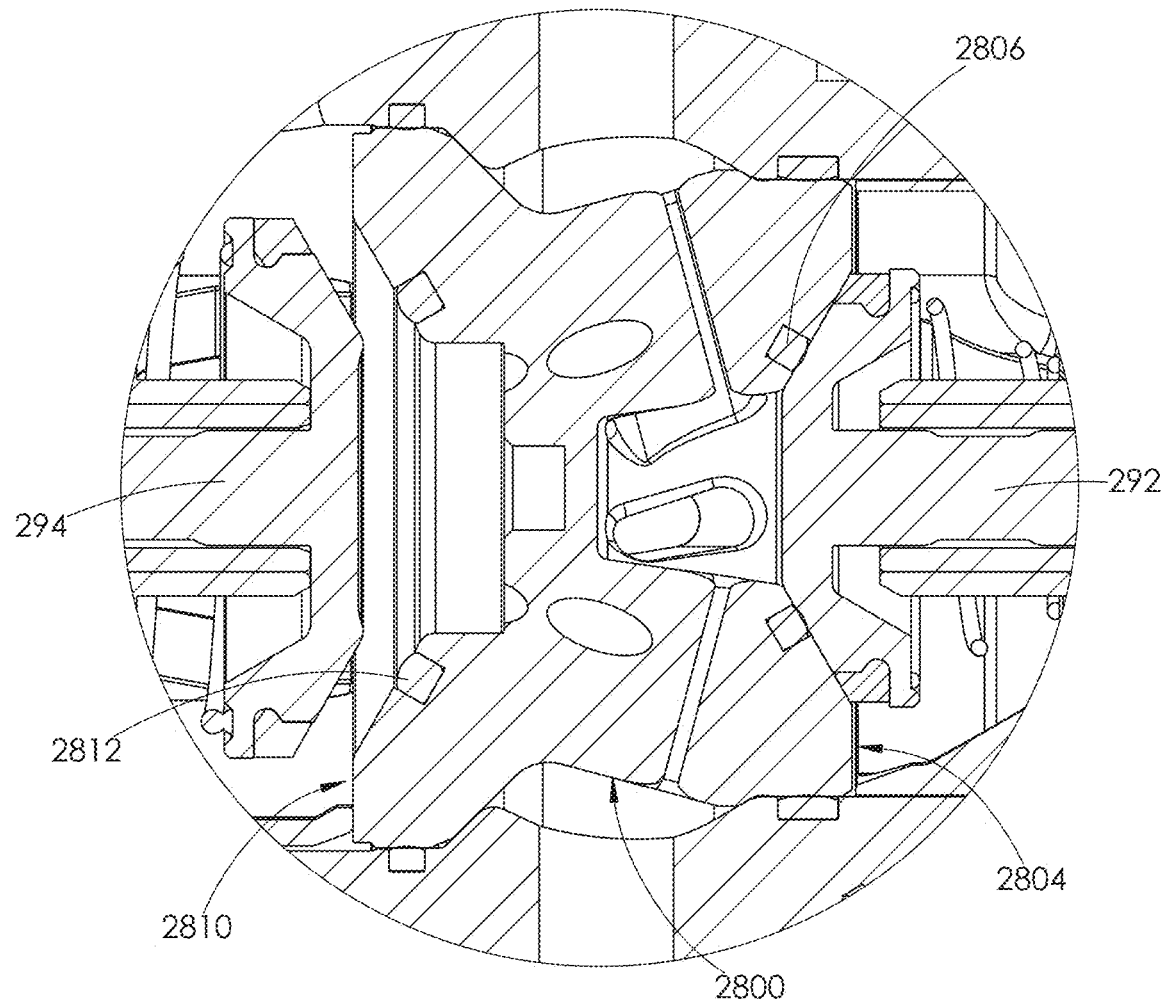

FIG. 236 is an enlarged view of area BQ shown in FIG. 235.

FIG. 237 is a top plan view of another embodiment of a fluid routing plug.

FIG. 238 is a perspective view of the second surface of the fluid routing plug shown in FIG. 237.

FIG. 239 is a side elevational view of the second surface of the fluid routing plug shown in FIG. 237.

FIG. 240 is a cross-sectional view of the fluid routing plug shown in FIG. 239, taken along line BU-BU.

Figure 241:
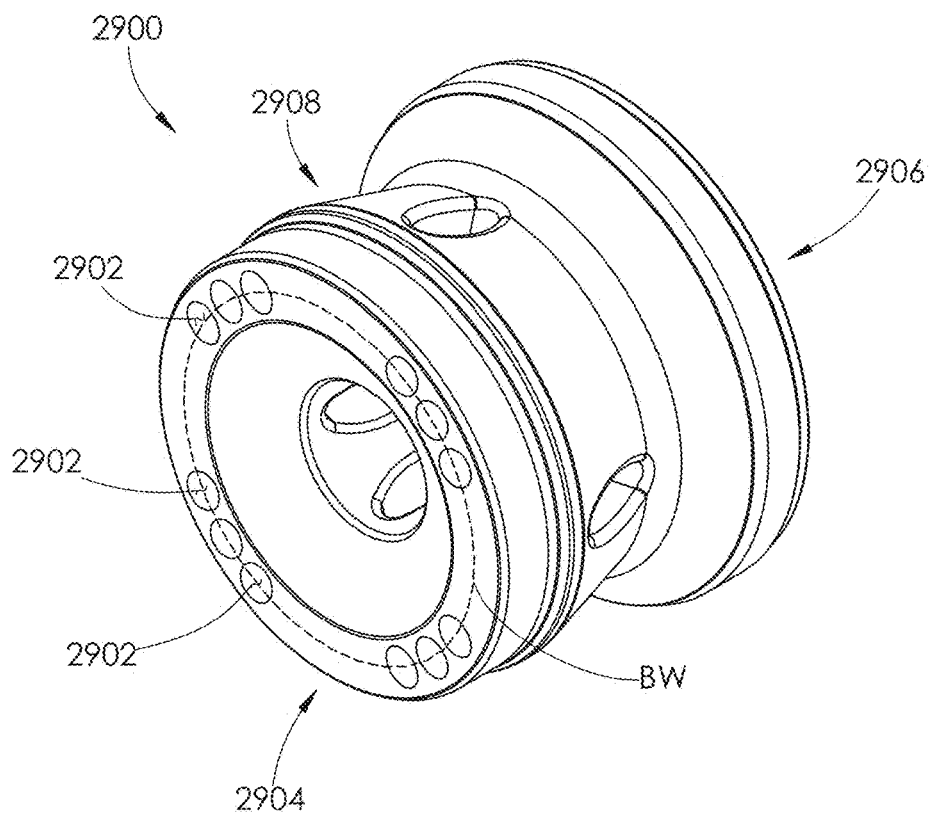

FIG. 241 is a perspective view of the first surface of the fluid routing plug shown in FIG. 237.

Figure 242:
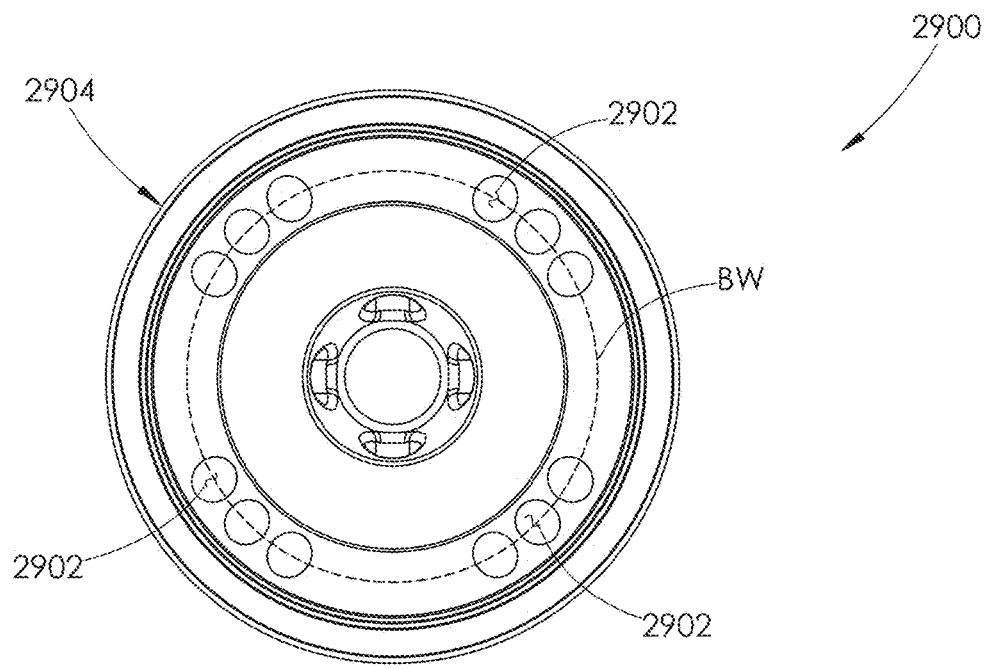

FIG. 242 is a side elevational view of the first surface of the fluid routing plug shown in FIG. 237.

Figure 243:
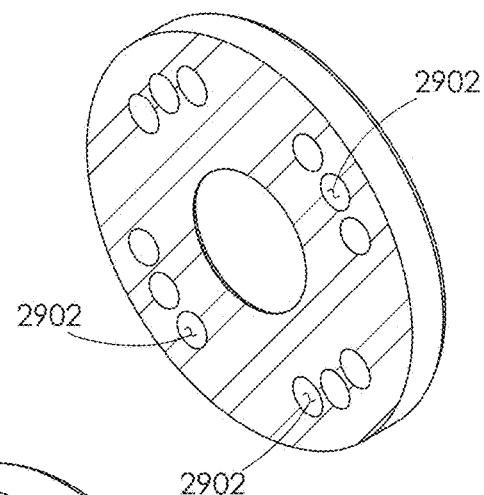

FIG. 243 is a cross-sectional view of the fluid routing plug shown in FIG. 237, taken along line BR-BR.

Figure 244:
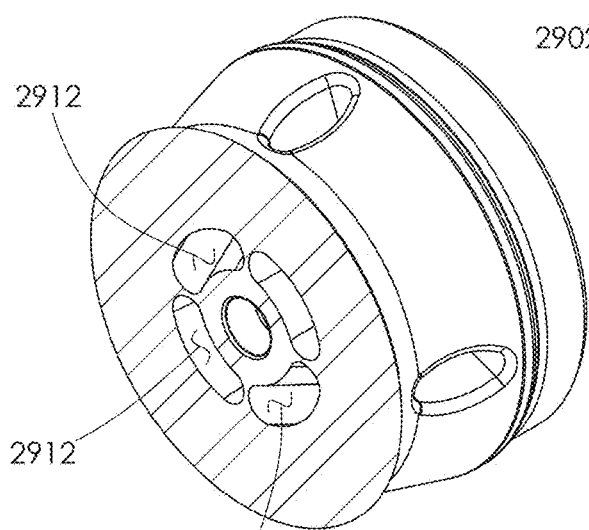

FIG. 244 is a cross-sectional view of the fluid routing plug shown in FIG. 237, taken along line BS-BS.

Figure 245:
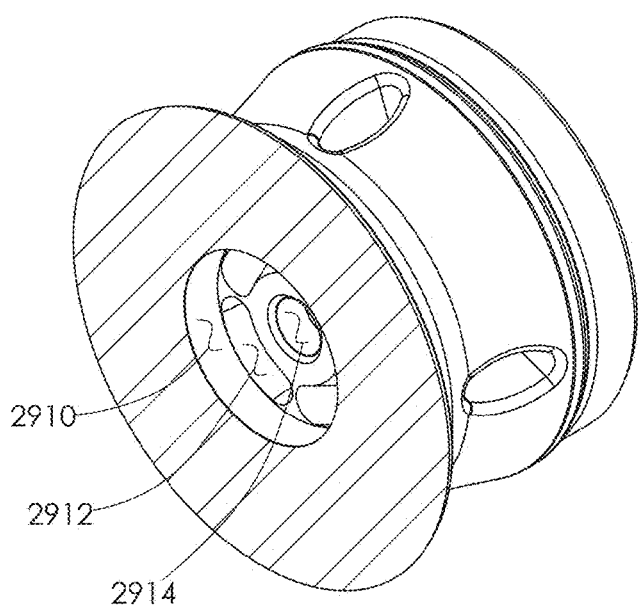

FIG. 245 is a cross-sectional view of the fluid routing plug shown in FIG. 237, taken along line BT-BT.

Figure 246:
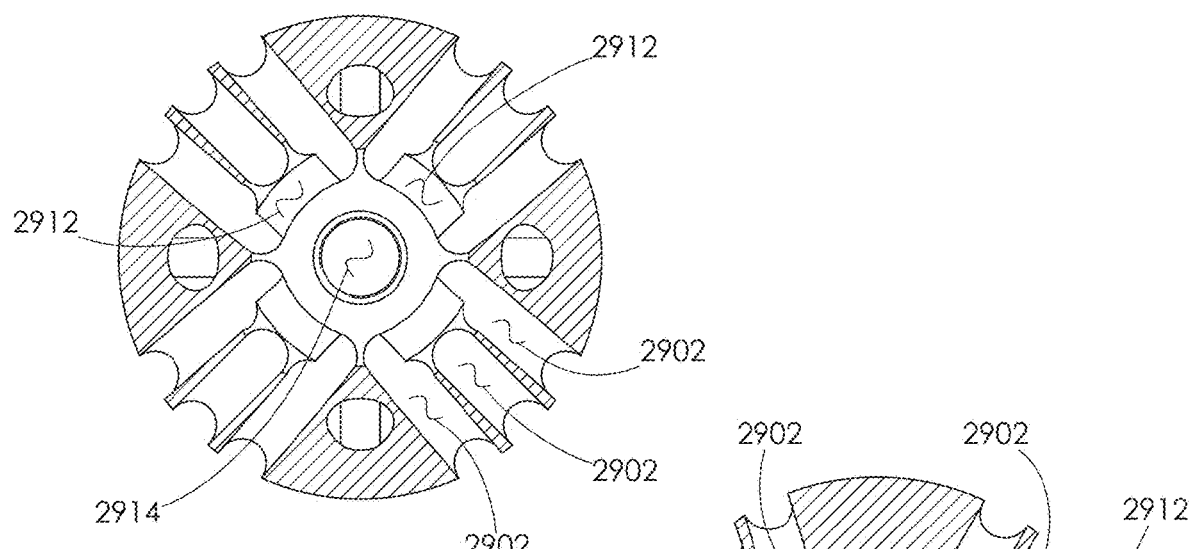

FIG. 246 is a side elevational and conical-section view of the second surface of the fluid routing plug shown in FIG. 237, the conical-section is taken from circle BV shown in FIG. 238 to circle BW shown in FIG. 241.

Figure 247:
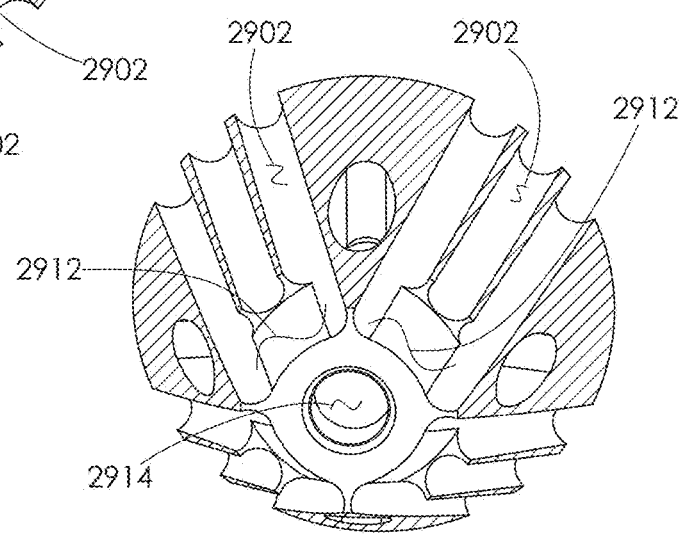

FIG. 247 is top perspective view of the second surface of the fluid routing plug shown in FIG. 246.

Figure 248:
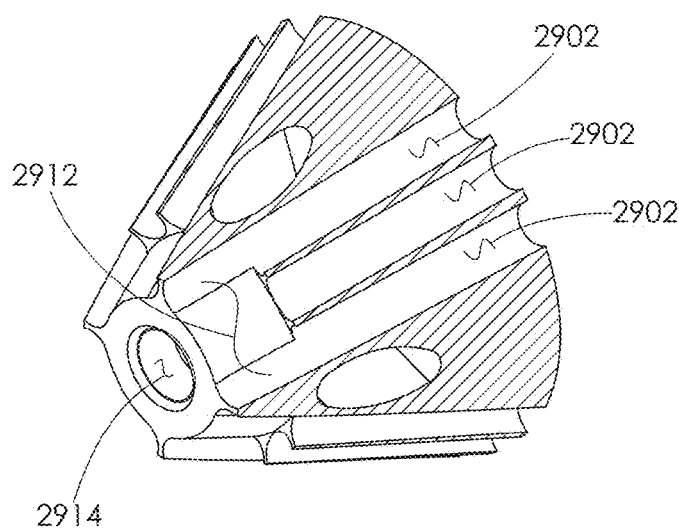

FIG. 248 is a perspective view of the second surface of the fluid routing plug shown in FIG. 246.

Figures 249, 250:
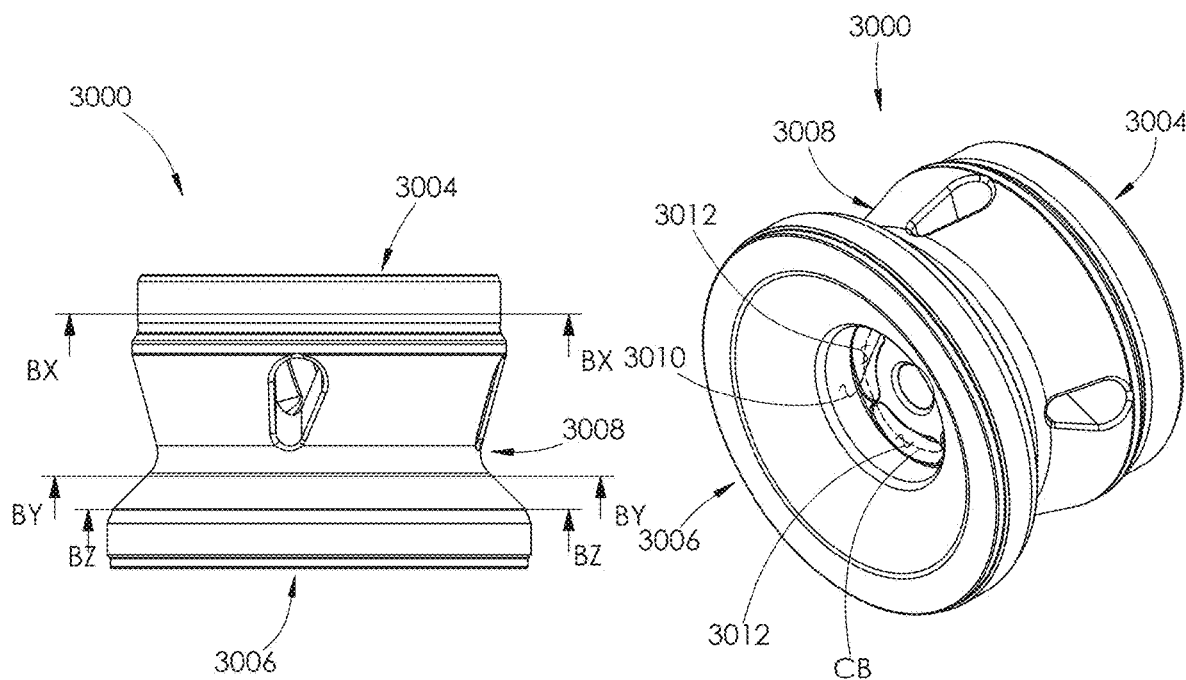

FIG. 249 is a top plan view of another embodiment of a fluid routing plug.

FIG. 250 is a perspective view of the second surface of the fluid routing plug shown in FIG. 249.

Figure 251:
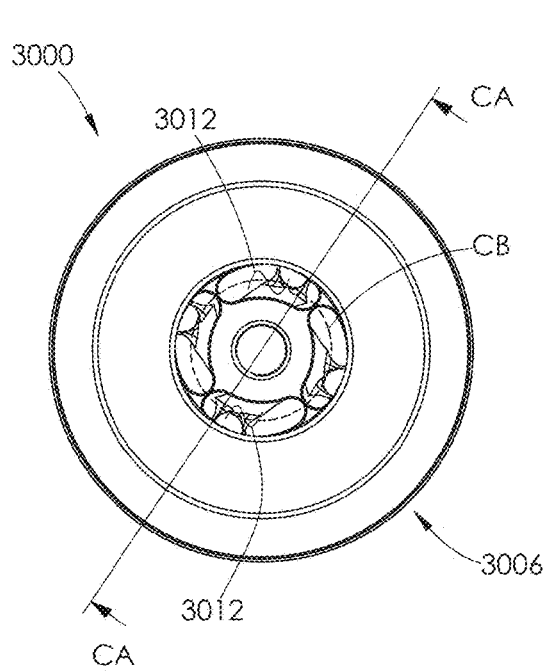

FIG. 251 is a side elevational view of the second surface of the fluid routing plug shown in FIG. 249.

Figure 252:
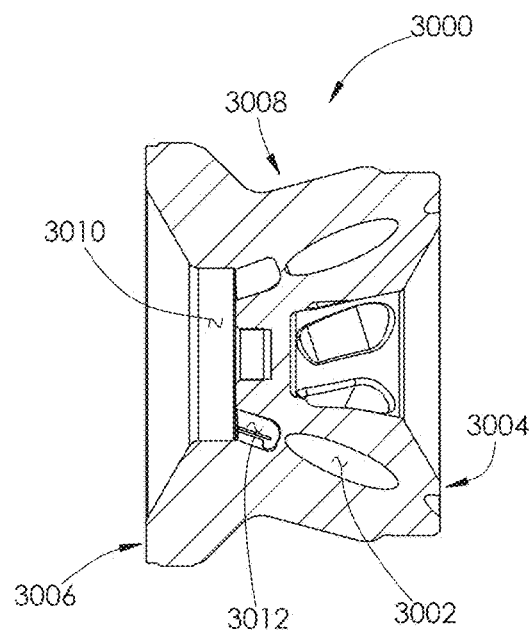

FIG. 252 is a cross-sectional view of the fluid routing plug shown in FIG. 251, taken along line CA-CA.

Figure 253:
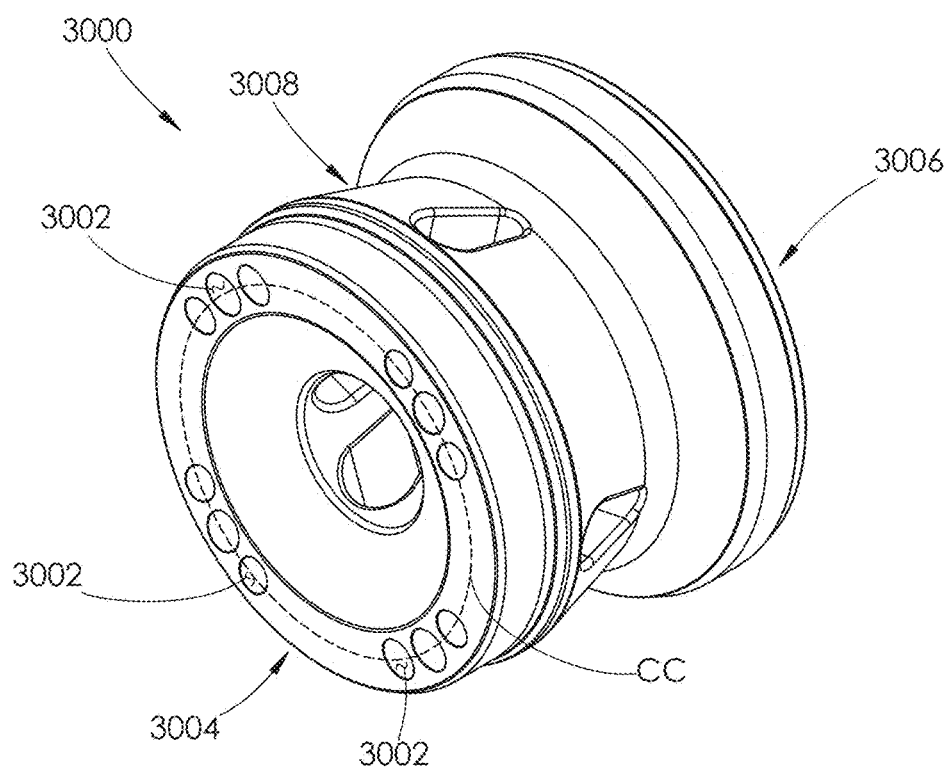

FIG. 253 is a perspective view of the first surface of the fluid routing plug shown in FIG. 249.

Figure 254:
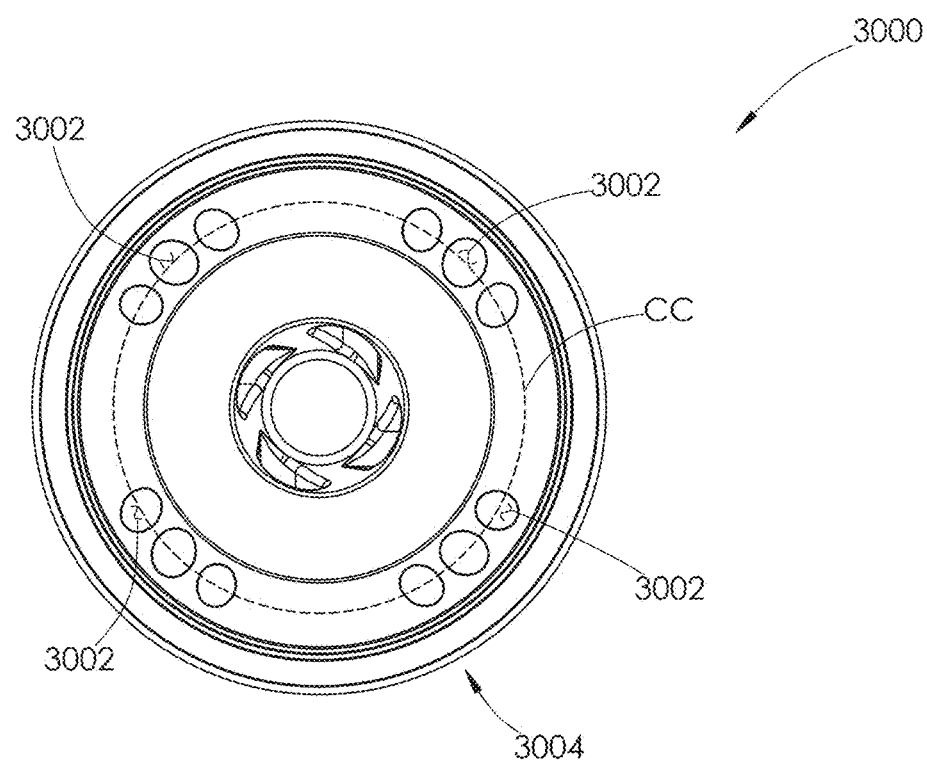

FIG. 254 is a side elevational view of the first surface of the fluid routing plug shown in FIG. 249.

Figure 255:
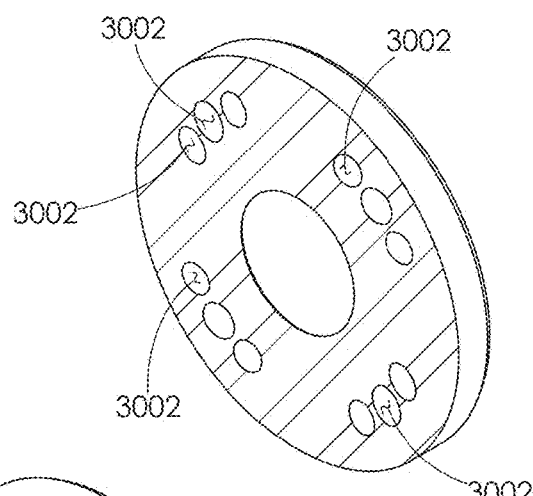

FIG. 255 is a cross-sectional view of the fluid routing plug shown in FIG. 249, taken along line BX-BX.

Figure 256:
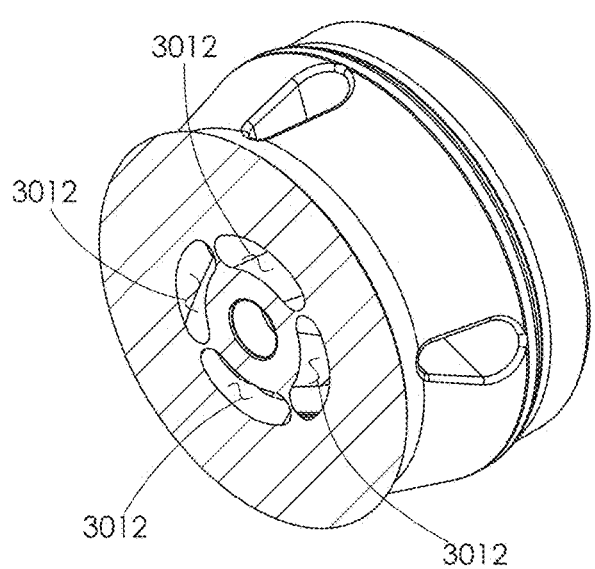

FIG. 256 is a cross-sectional view of the fluid routing plug shown in FIG. 249, taken along line BY-BY.

Figure 257:
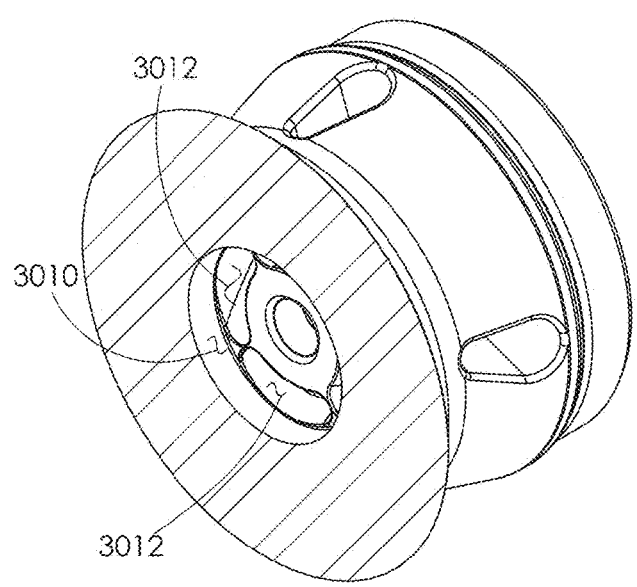

FIG. 257 is a cross-sectional view of the fluid routing plug shown in FIG. 249, taken along line BZ-BZ.

Figure 258:
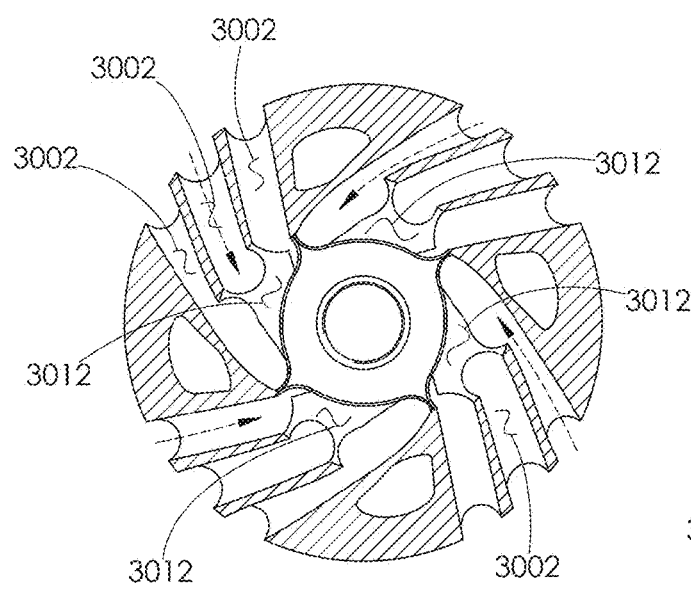

FIG. 258 is a side elevational and conical-section view of the second surface of the fluid routing plug shown in FIG. 249, the conical-section is taken from circle CB shown in FIG. 250 to circle CC shown in FIG. 253.

Figure 259:
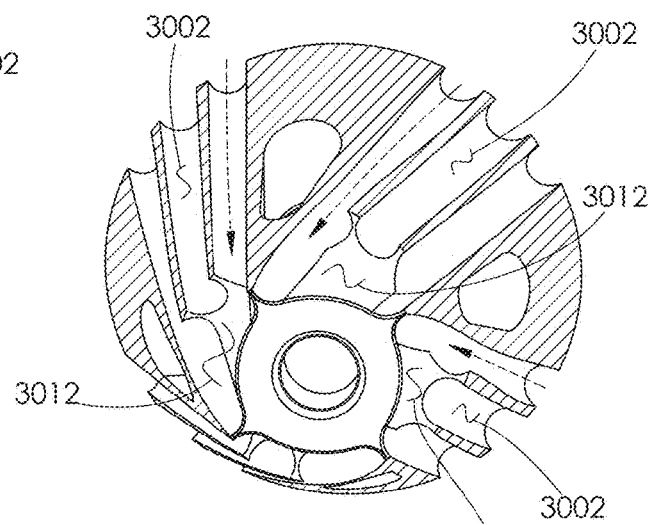

FIG. 259 is top perspective view of the second surface of the fluid routing plug shown in FIG. 258.

Figure 260:
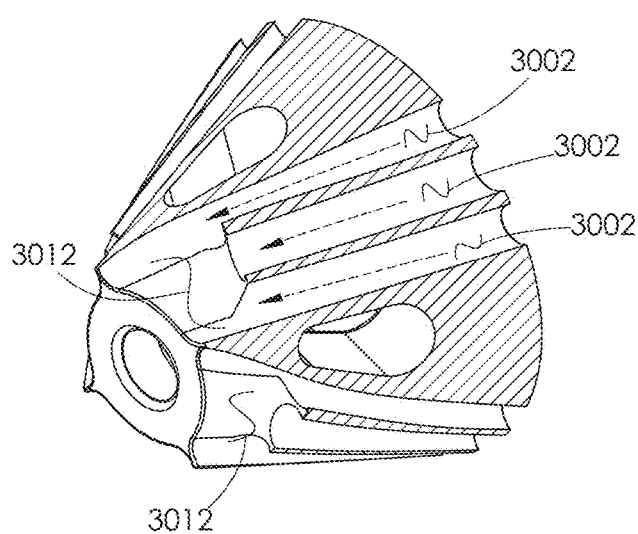

FIG. 260 is a perspective view of the second surface of the fluid routing plug shown in FIG. 258.

Figures 261, 262:
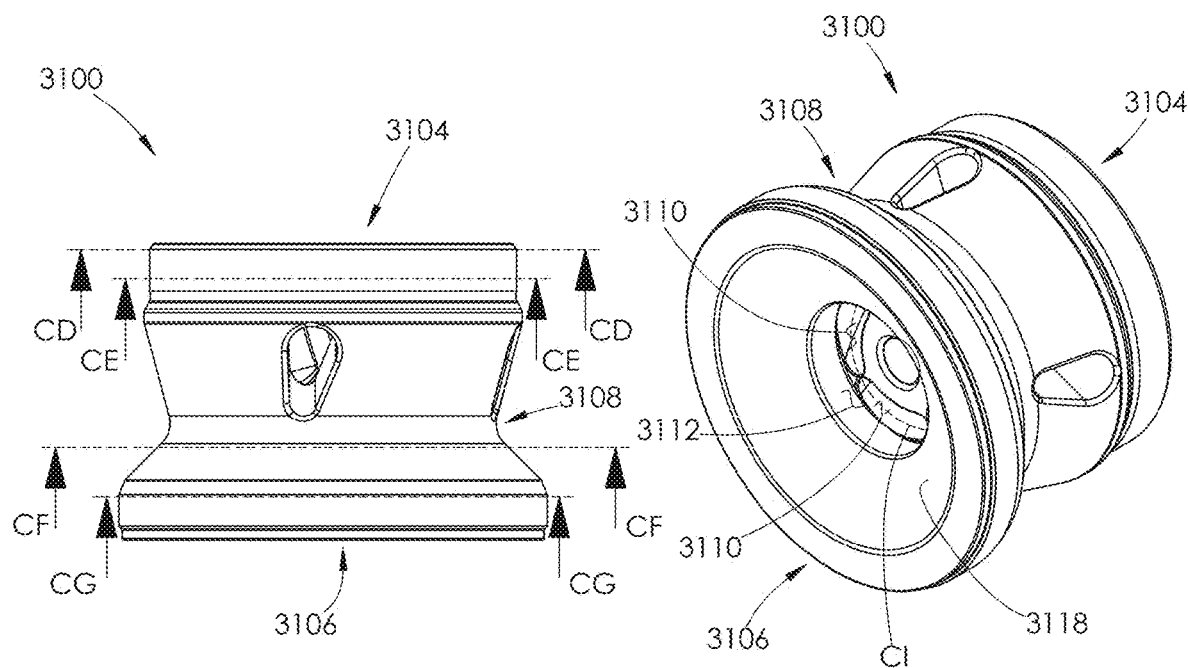

FIG. 261 is a top plan view of another embodiment of a fluid routing plug.

FIG. 262 is a perspective view of the second surface of the fluid routing plug shown in FIG. 261.

Figures 263, 264:
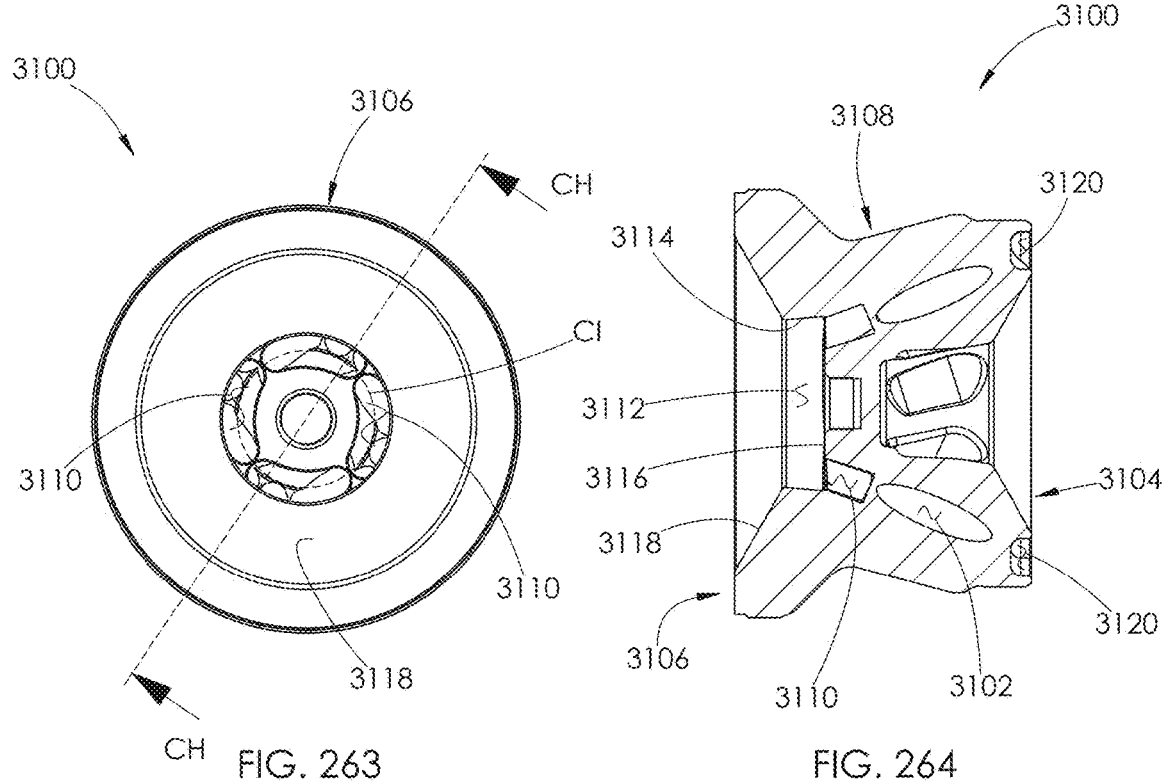

FIG. 263 is a side elevational view of the second surface of the fluid routing plug shown in FIG. 261.

FIG. 264 is a cross-sectional view of the fluid routing plug shown in FIG. 263, taken along line CH-CH.

Figure 265:
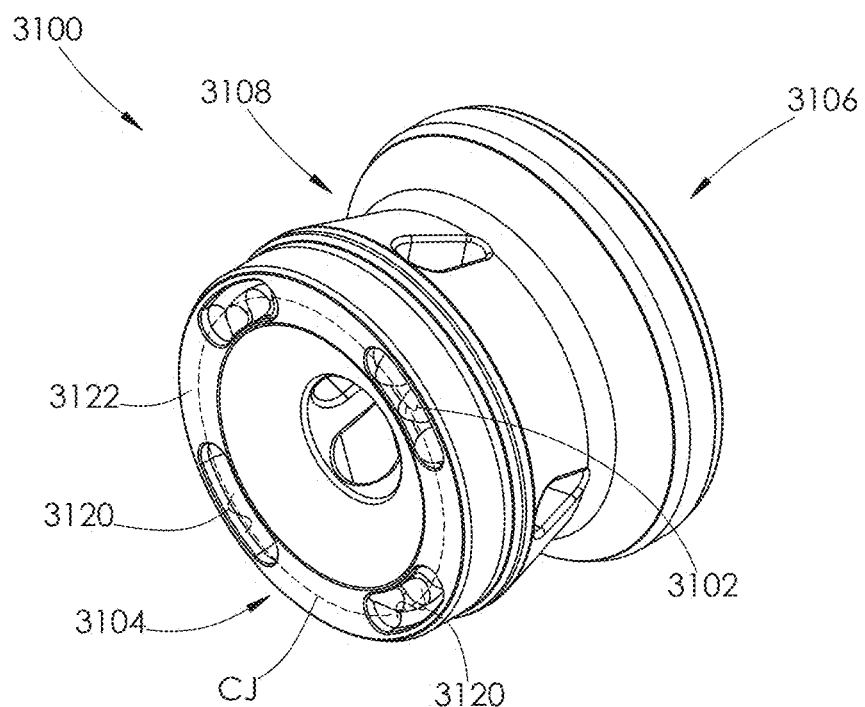

FIG. 265 is a perspective view of the first surface of the fluid routing plug shown in FIG. 261.

Figure 266:
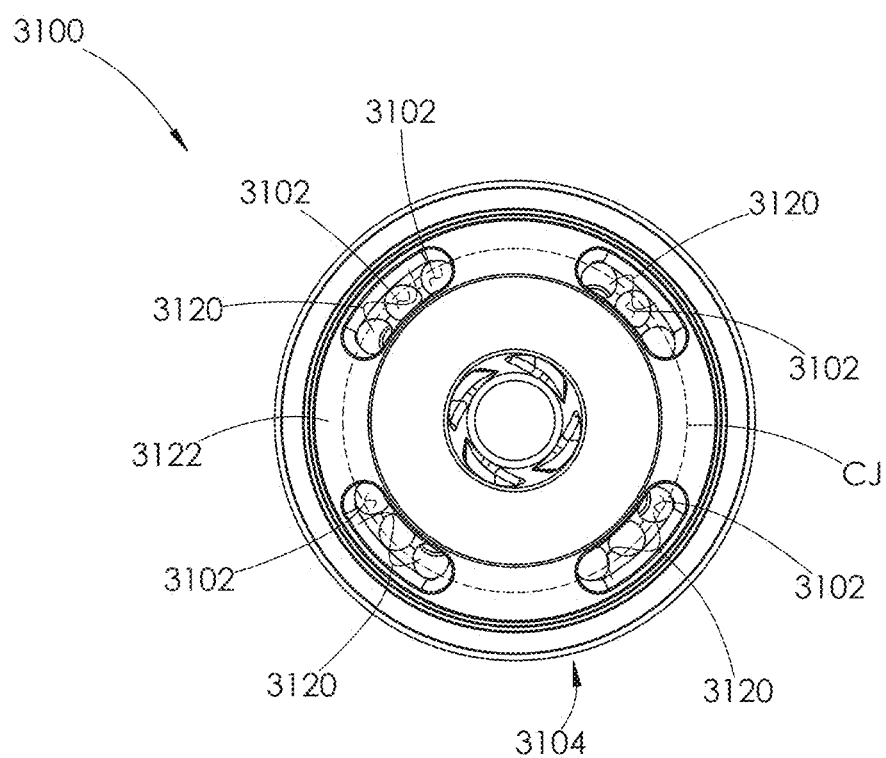

FIG. 266 is a side elevational view of the first surface of the fluid routing plug shown in FIG. 261.

FIG. 267 is a cross-sectional view of the fluid routing plug shown in FIG. 261, taken along line CD-CD.

FIG. 268 is a cross-sectional view of the fluid routing plug shown in FIG. 261, taken along line CE-CE.

FIG. 269 is a cross-sectional view of the fluid routing plug shown in FIG. 261, taken along line CF-CF.

FIG. 270 is a cross-sectional view of the fluid routing plug shown in FIG. 261, taken along line CG-CG.

Figure 271:
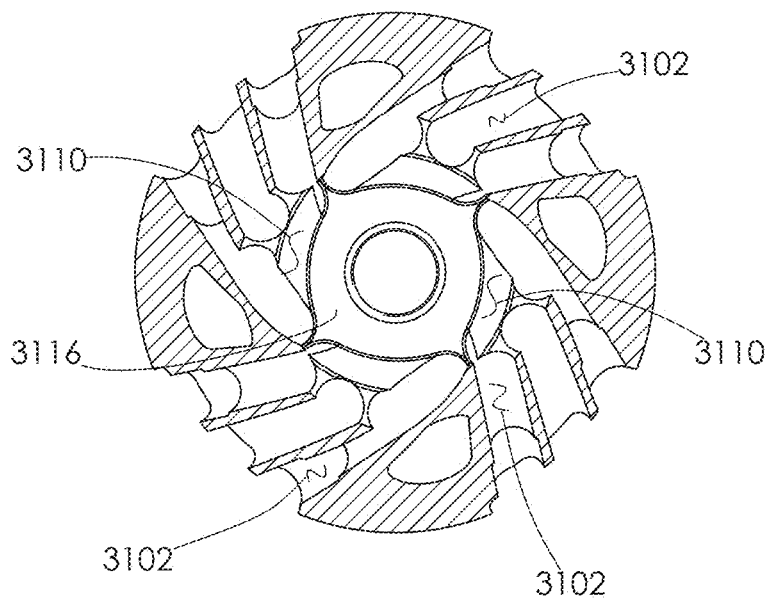

FIG. 271 is a side elevational and conical-section view of the second surface of the fluid routing plug shown in FIG. 261, the conical-section is taken from circle CI shown in FIG. 262 to circle CJ shown in FIG. 265.

Figure 272:
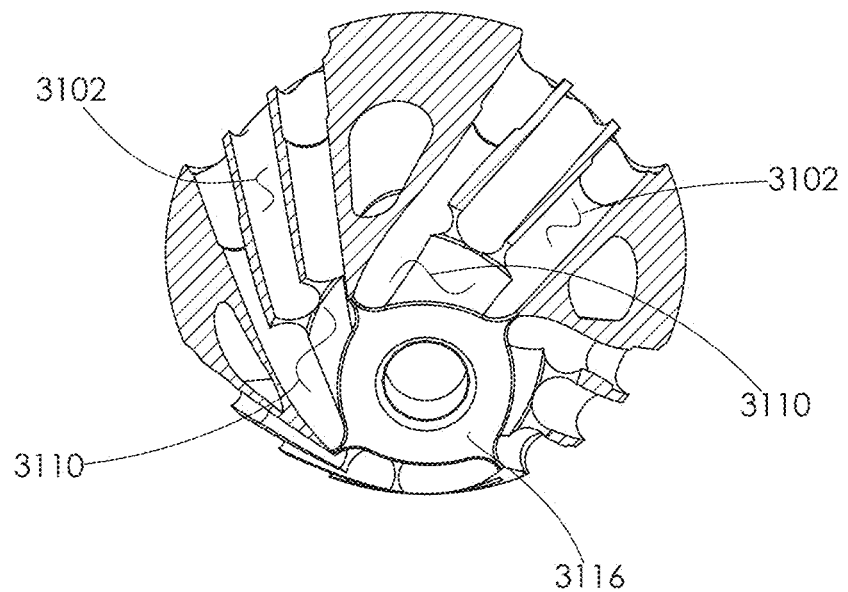

FIG. 272 is a top perspective view of the second surface of the fluid routing plug shown in FIG. 271.

Figure 273:
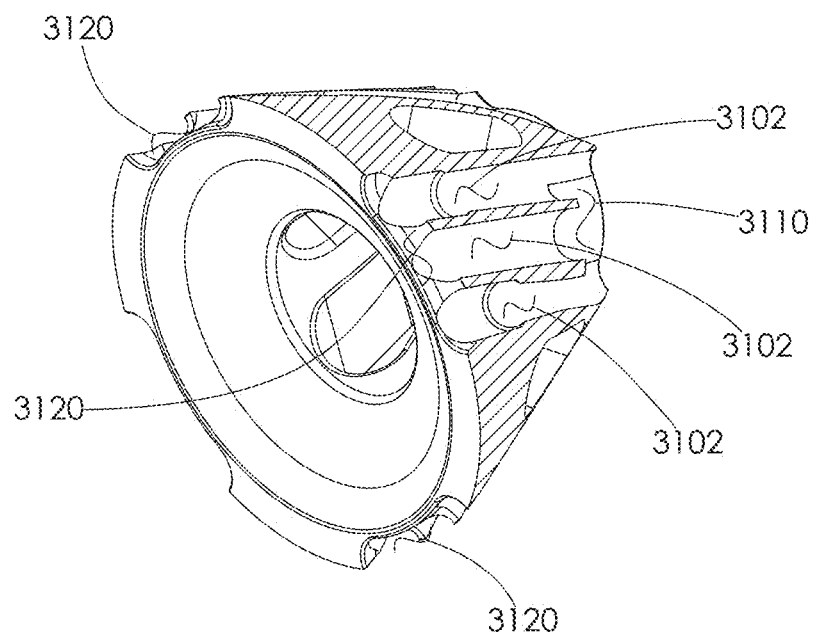

FIG. 273 is a perspective view of the first surface of the fluid routing plug shown in FIG. 271.

Figure 274:
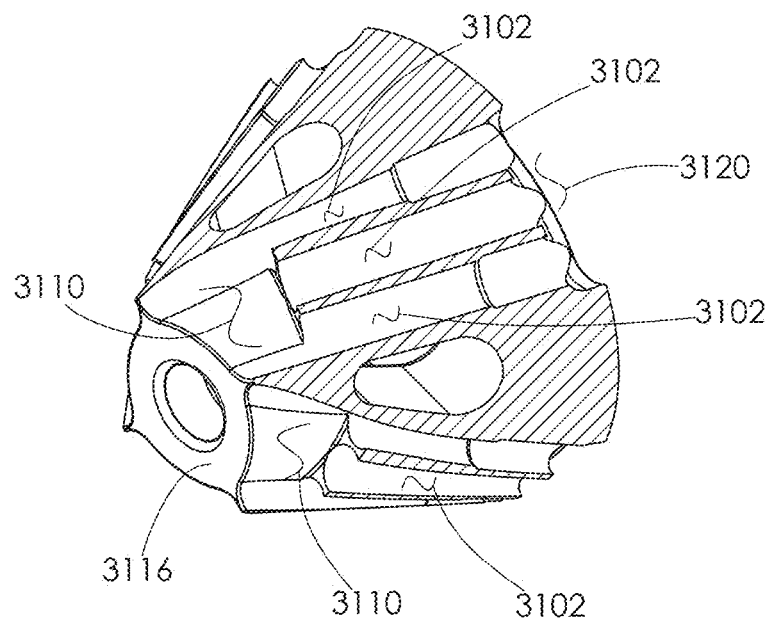

FIG. 274 is a perspective view of the second surface of the fluid routing plug shown in FIG. 271.

FIG. 275 is a top plan view of another embodiment of a fluid routing plug.

FIG. 276 is a perspective view of the second surface of the fluid routing plug shown in FIG. 275.

FIG. 277 is a side elevational view of the second surface of the fluid routing plug shown in FIG. 275.

FIG. 278 is a cross-sectional view of the fluid routing plug shown in FIG. 277, taken along line CP-CP.

Figure 279:
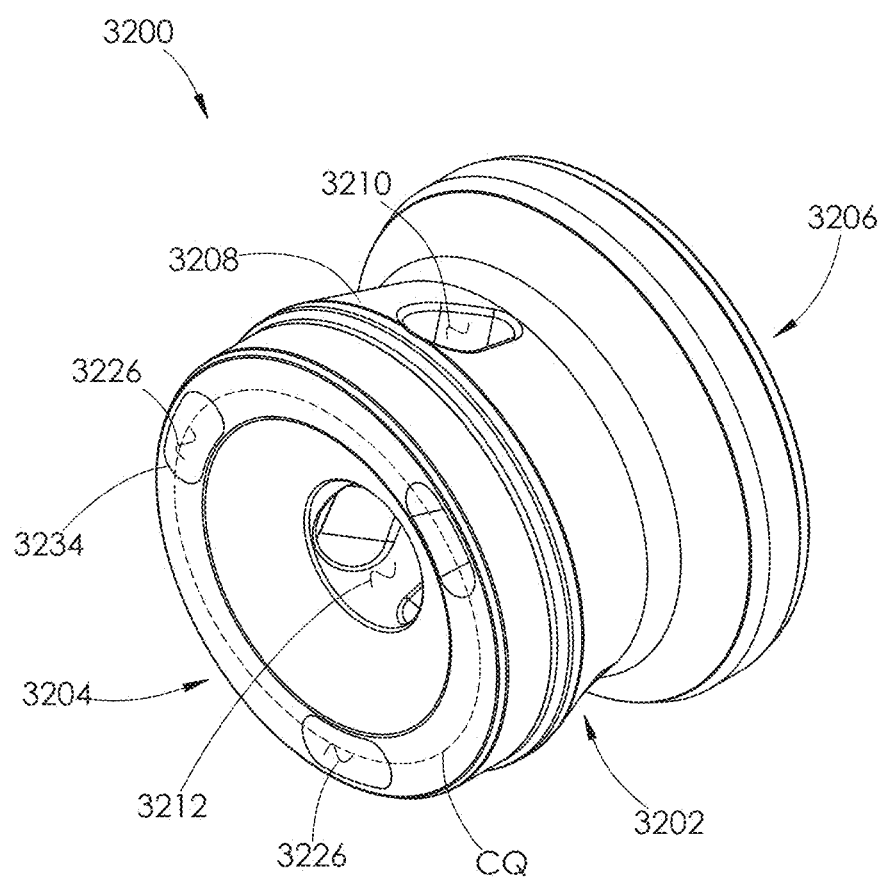

FIG. 279 is a perspective view of the first surface of the fluid routing plug shown in FIG. 275.

Figure 280:
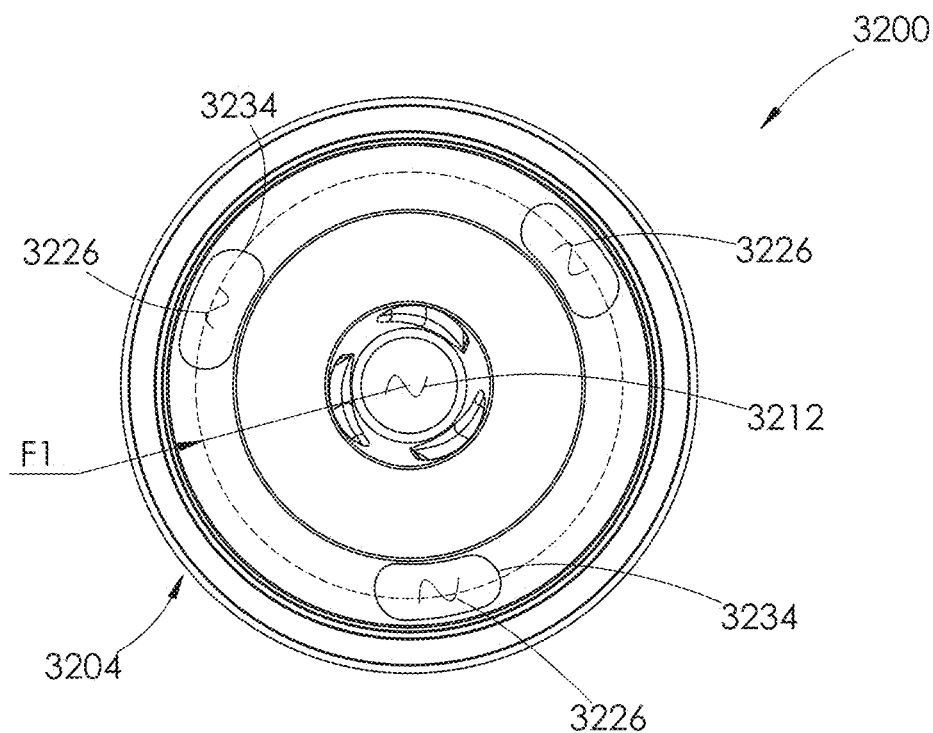

FIG. 280 is a side elevational view of the first surface of the fluid routing plug shown in FIG. 275.

Figure 281:
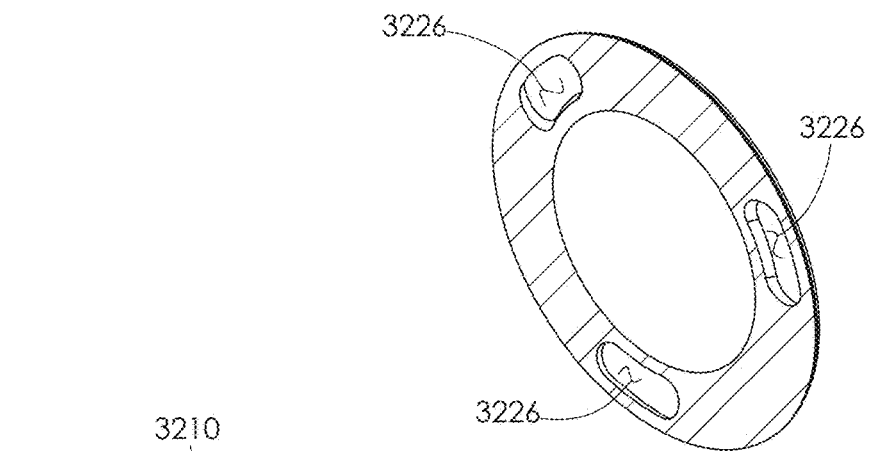

FIG. 281 is a cross-sectional view of the fluid routing plug shown in FIG. 275, taken along line CK-CK.

Figure 282:
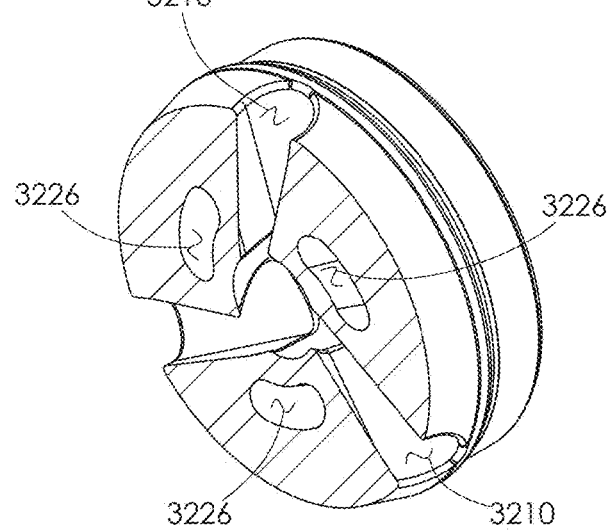

FIG. 282 is a cross-sectional view of the fluid routing plug shown in FIG. 275, taken along line CM-CM.

Figure 283:
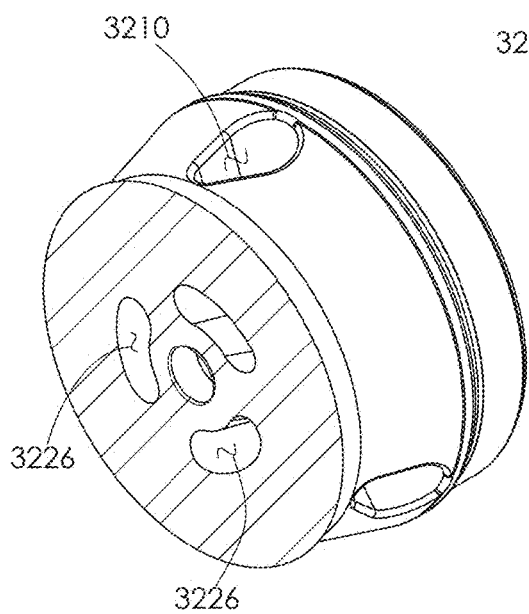

FIG. 283 is a cross-sectional view of the fluid routing plug shown in FIG. 275, taken along line CN-CN.

Figure 284:
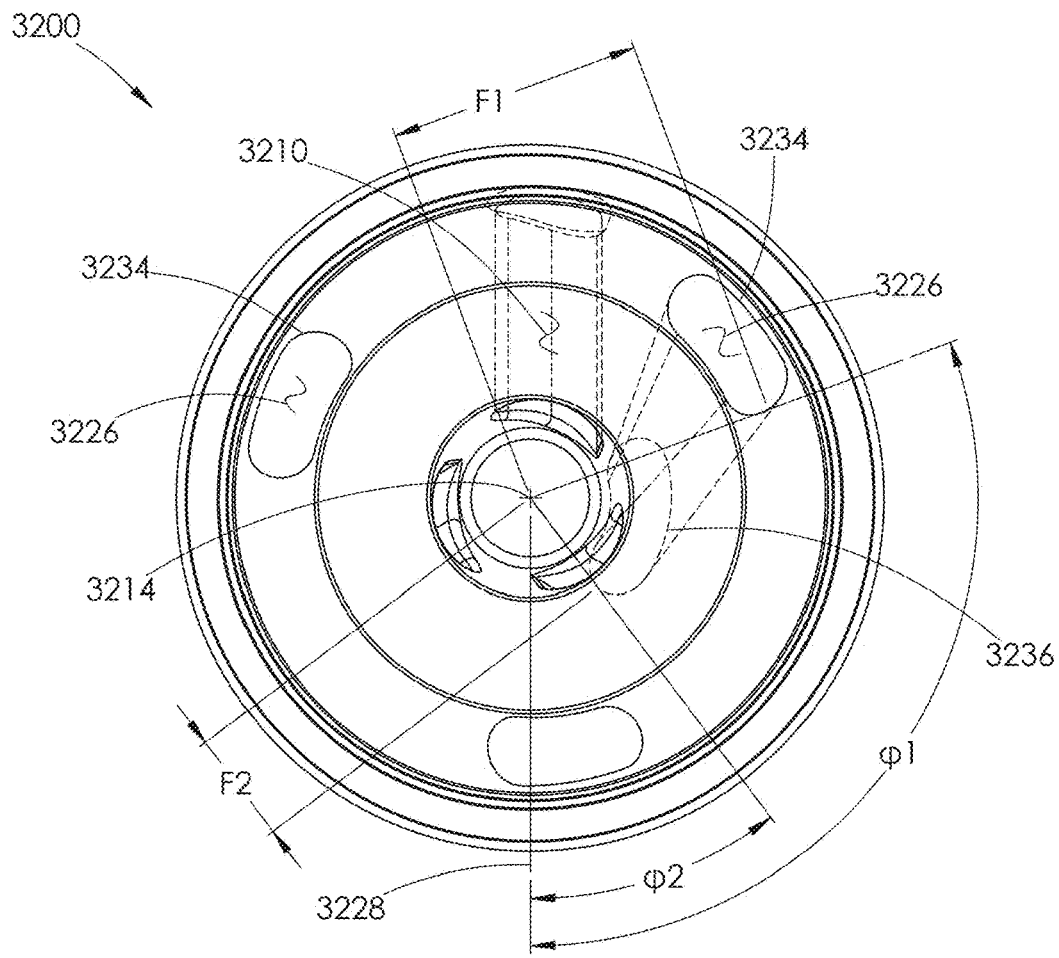

FIG. 284 is the side elevational view of the first surface of the fluid routing plug shown in FIG. 280, but one of the suction fluid passages and one of the discharge fluid slots are shown in phantom.

Figure 285:
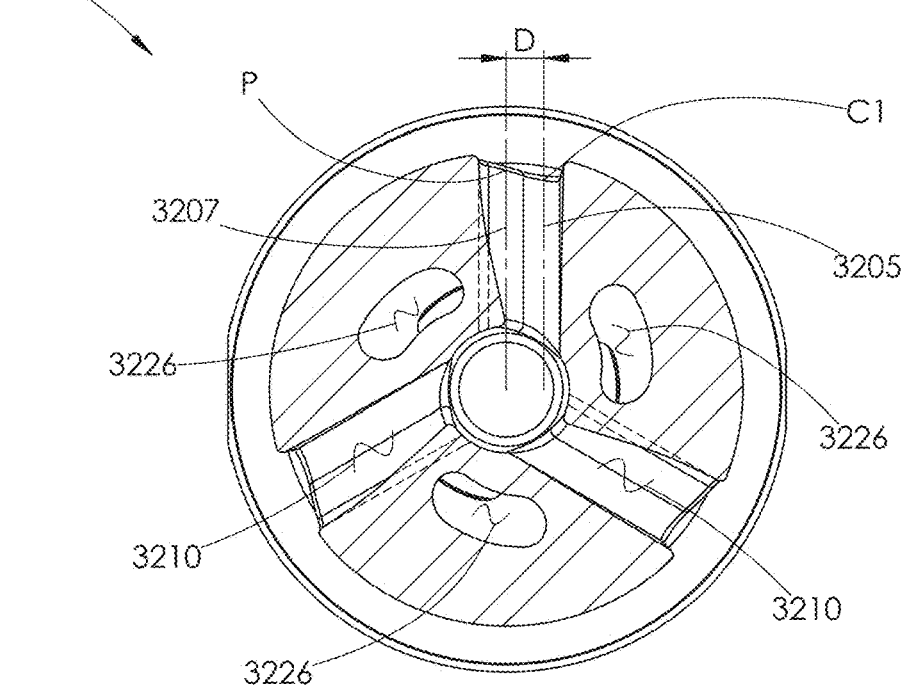

FIG. 285 is a cross-sectional view of the fluid routing plug shown in FIG. 275, taken along line CL-CL. A portion of each of the suction fluid passages is shown in phantom.

Figure 286:
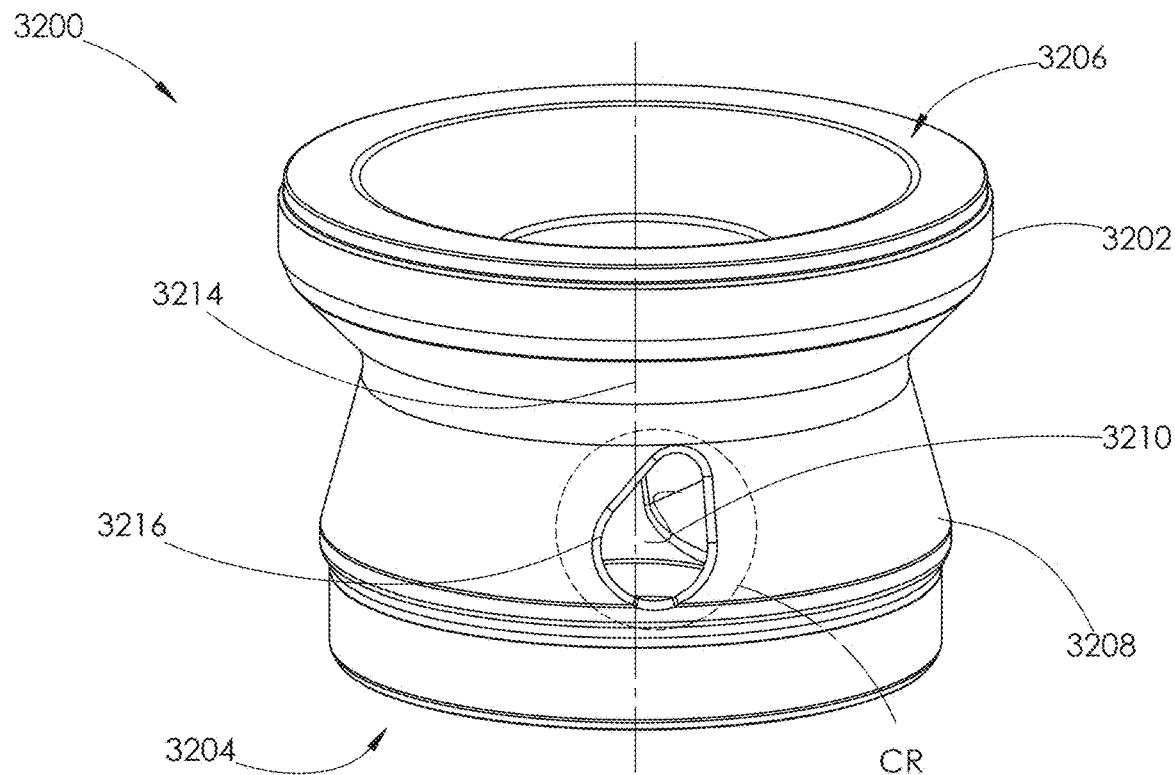

FIG. 286 is a top perspective view of the fluid routing plug shown in FIG. 275.

Figure 287:
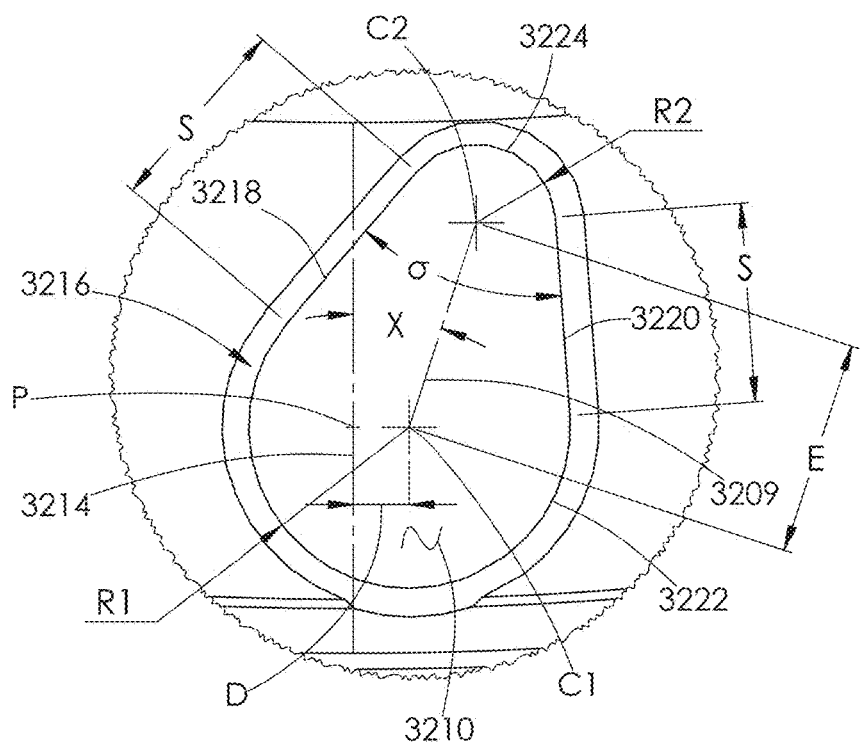

FIG. 287 is an enlarged view of area CR shown in FIG. 286.

Figure 288:
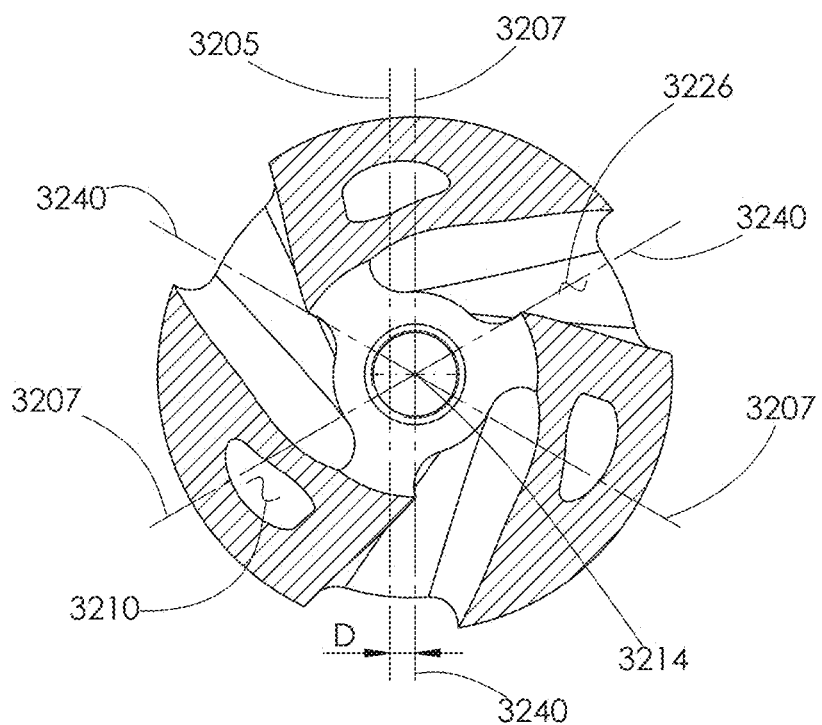

FIG. 288 is a side elevational and conical-section view of the second surface of the fluid routing plug shown in FIG. 275, the conical-section is taken from circle CO shown in FIG. 276 to circle CQ shown in FIG. 279.

Figure 289:
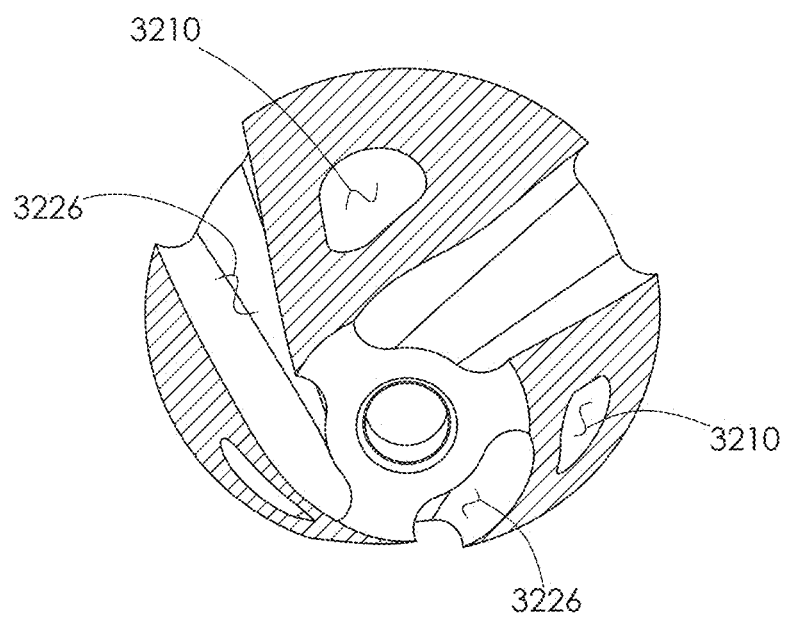

FIG. 289 is top perspective view of the second surface of the fluid routing plug shown in FIG. 288.

Figure 290:
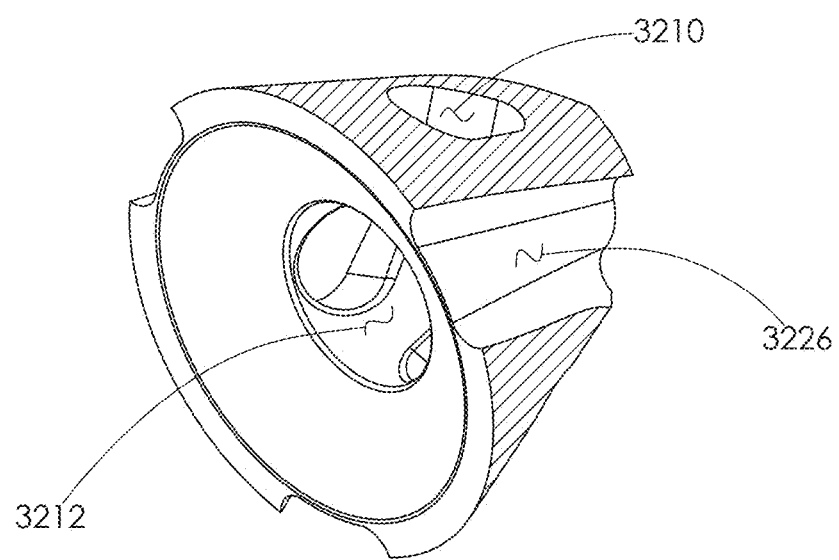

FIG. 290 is a perspective view of the first surface of the fluid routing plug shown in FIG. 288.

Figure 291:
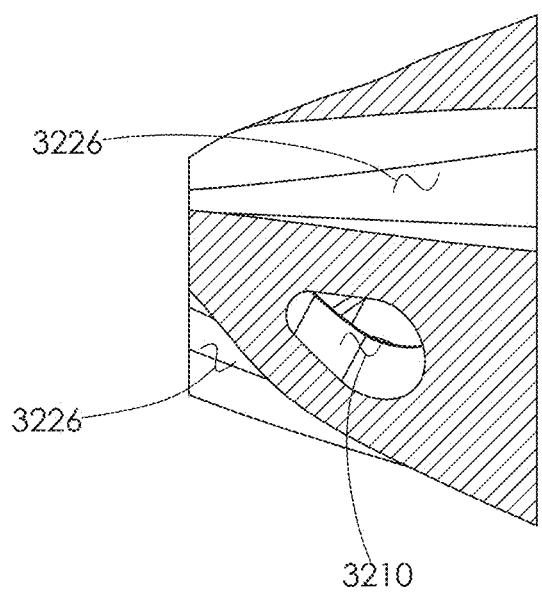

FIG. 291 is a side elevational view of the fluid routing plug shown in FIG. 288.

Figure 292:
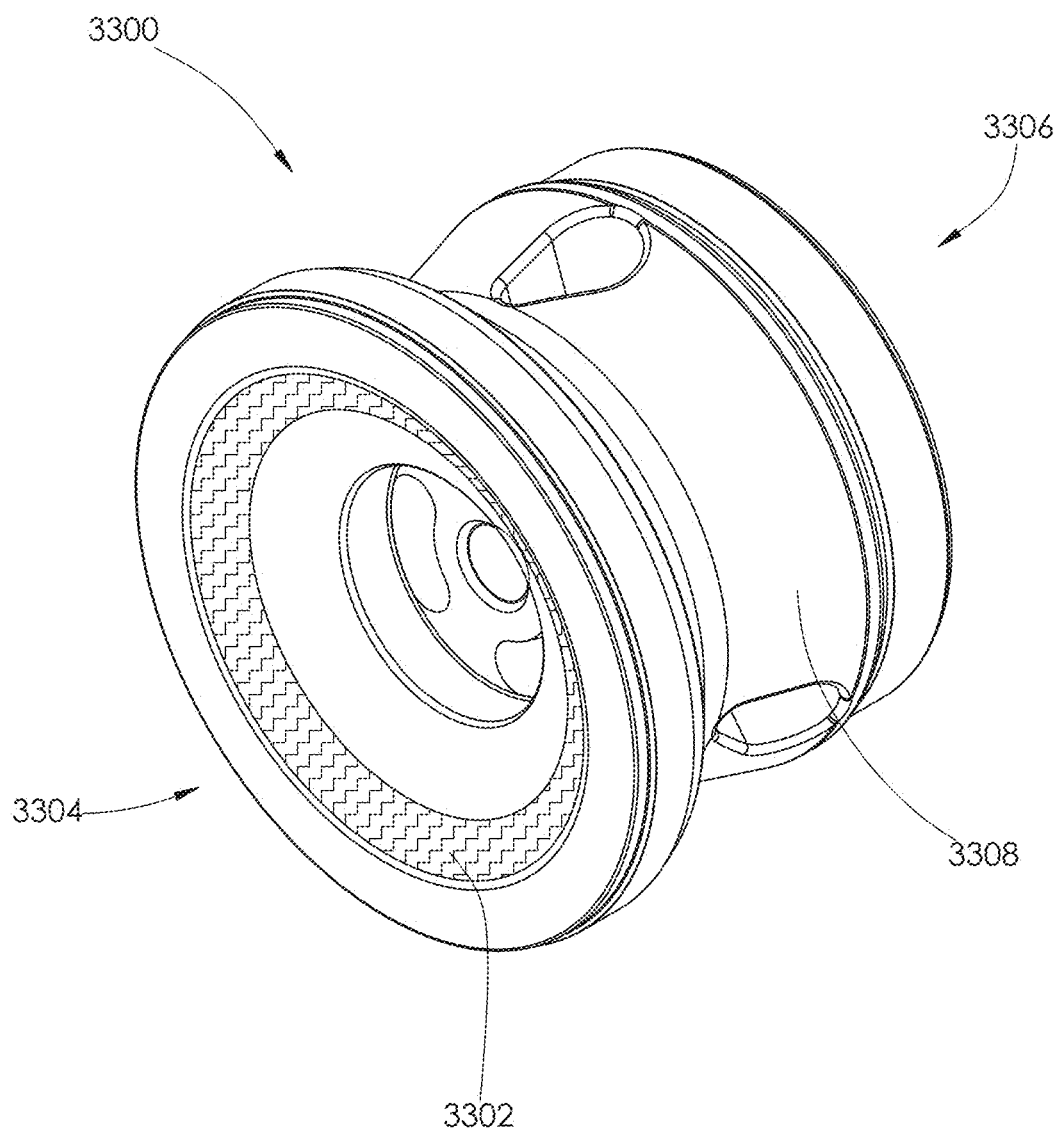

FIG. 292 is a perspective view of the second surface of another embodiment of a fluid routing plug.

DETAILED DESCRIPTION

Figure 6:
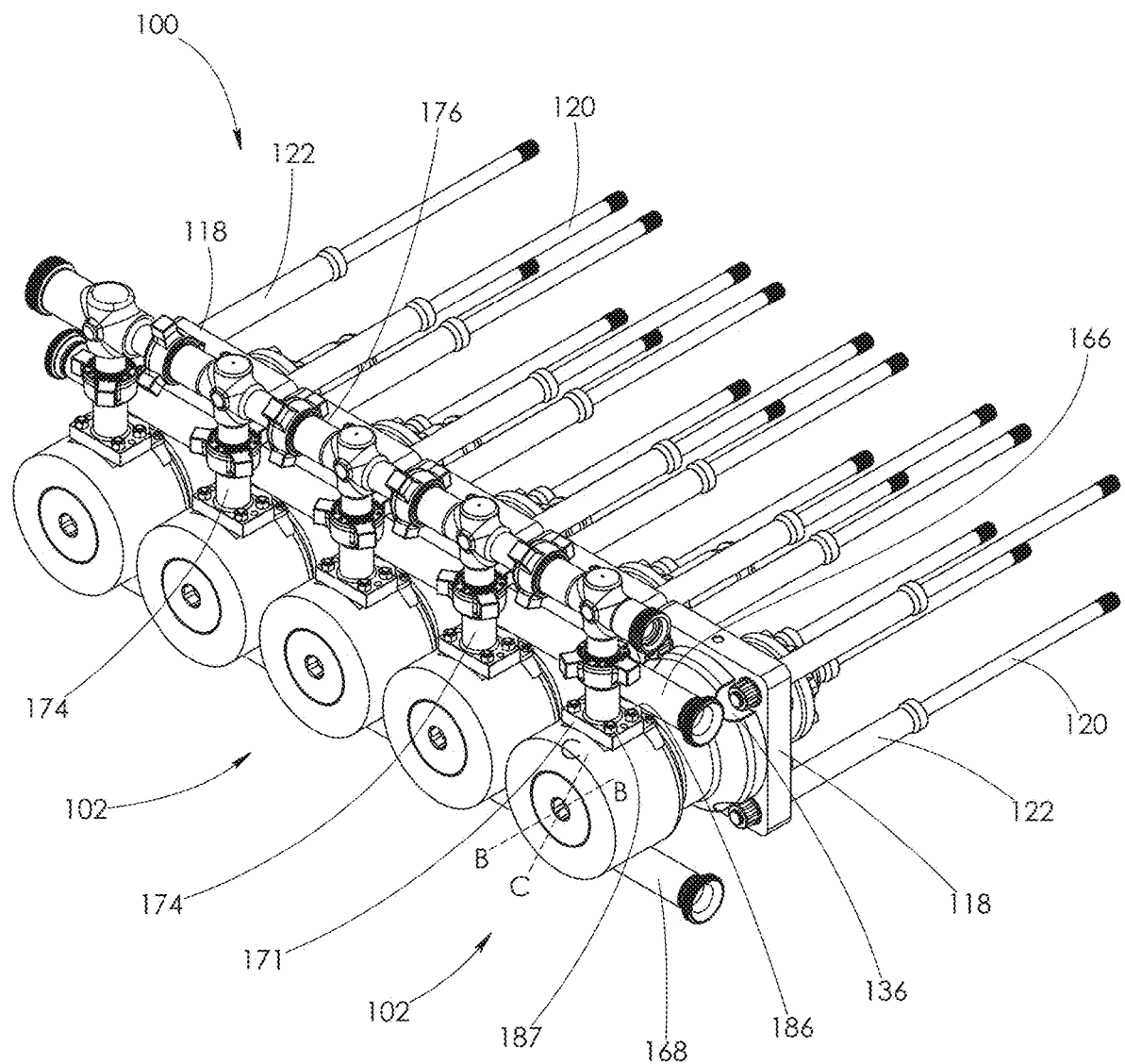
FIG. 6 is a front perspective view of a fluid end. A plurality of stay rods are attached to the fluid end.
Figure 7:
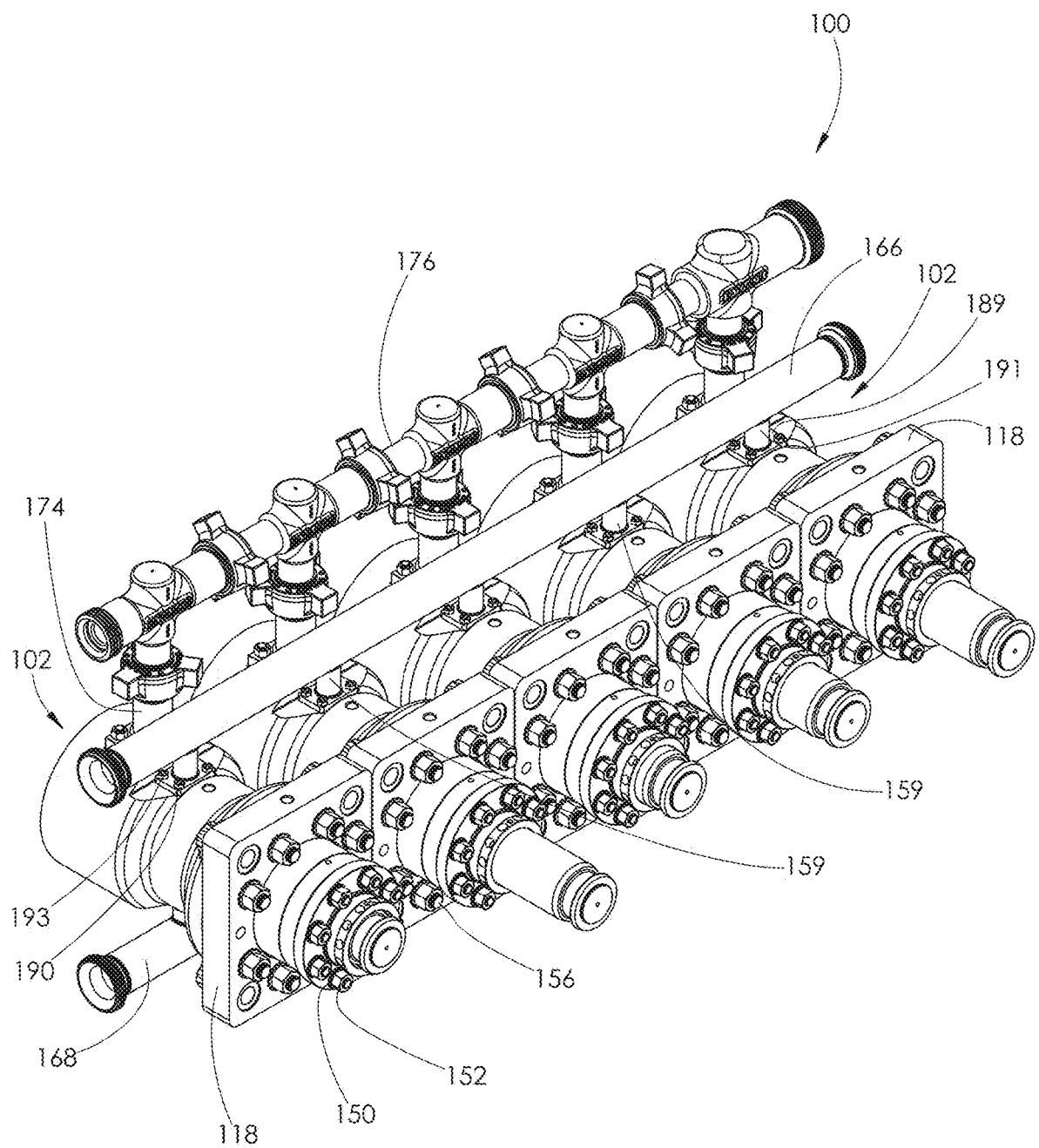
FIG. 7 is a rear perspective view of the fluid end shown in FIG. 6, but the plurality of stay rods have been removed.

Turning now to the non-prior art figures, FIGS. 6 and 7 show a fluid end 100. The fluid end 100 may be attached to the traditional power end 34, shown in FIG. 3. Alternatively, the fluid end 100 may be attached to various embodiments of power ends, such as the modular power end described in U.S. Provisional Patent Application Ser. No. 63/053,797, authored by Thomas et al. and filed on Jul. 20, 2020.

Figure 1:
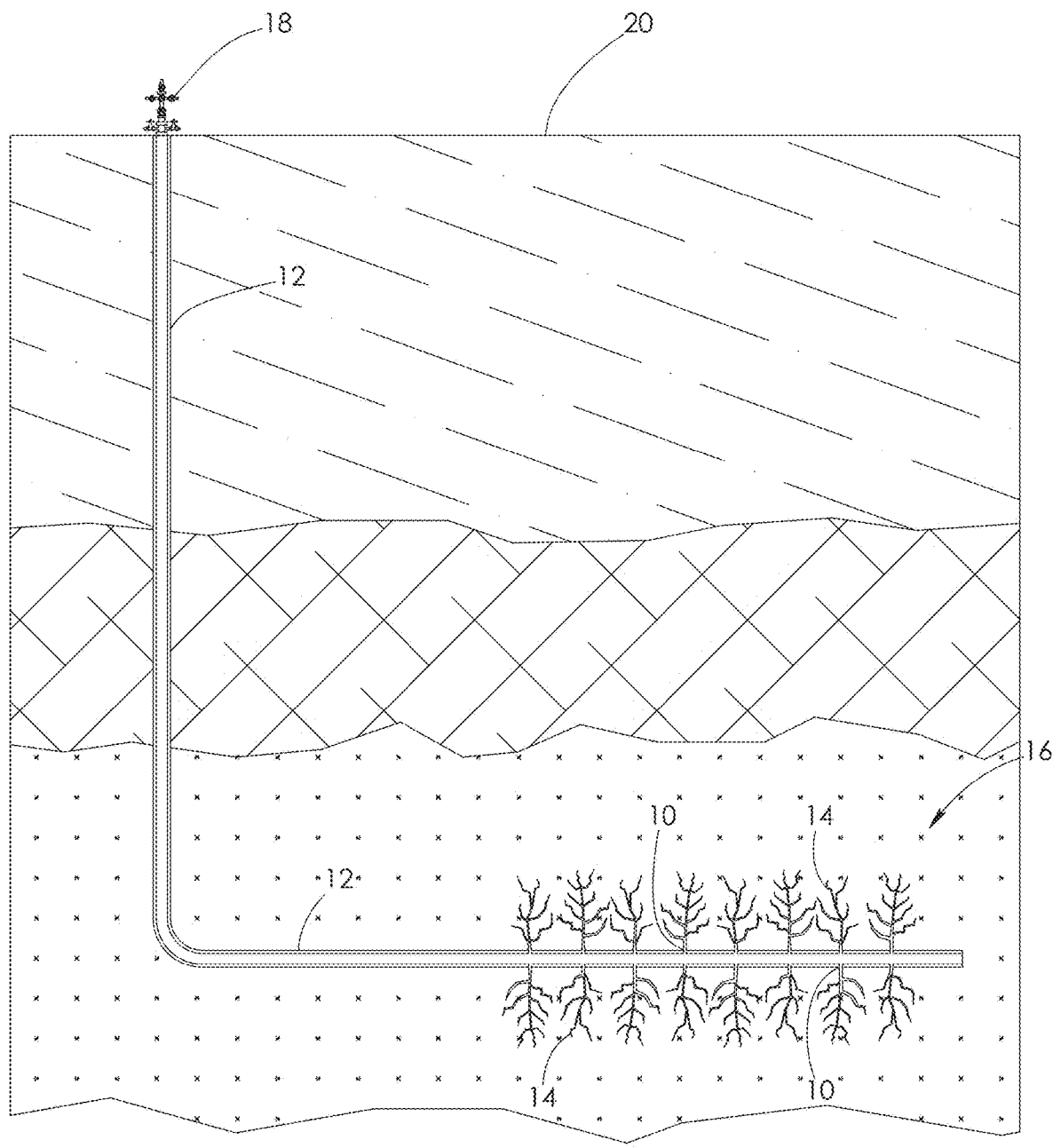
FIG. 1 is an illustration of the underground environment of a hydraulic fracturing operation.
Figure 2:
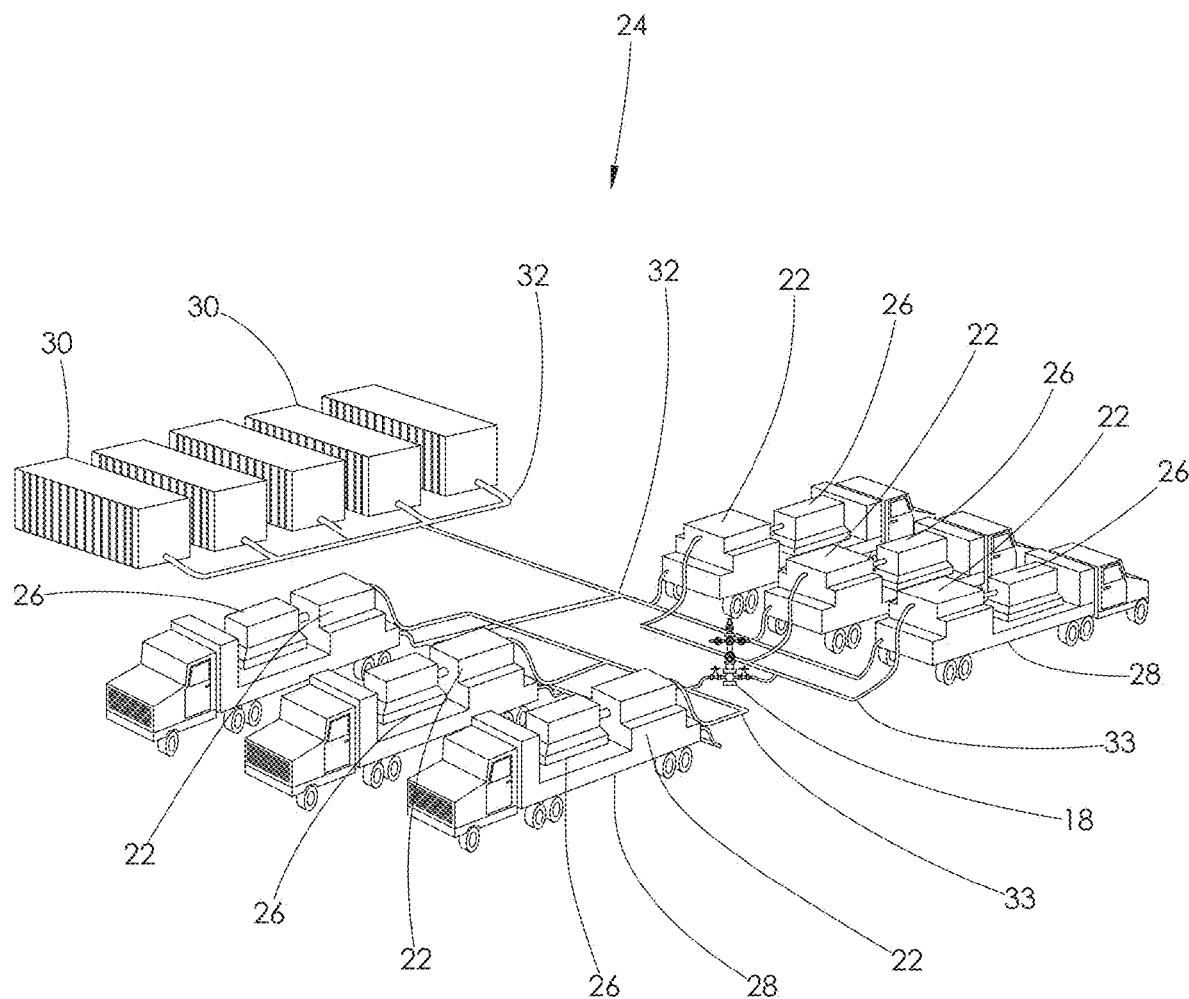
FIG. 2 illustrates above-ground equipment used in a hydraulic fracturing operation.
Figure 3:
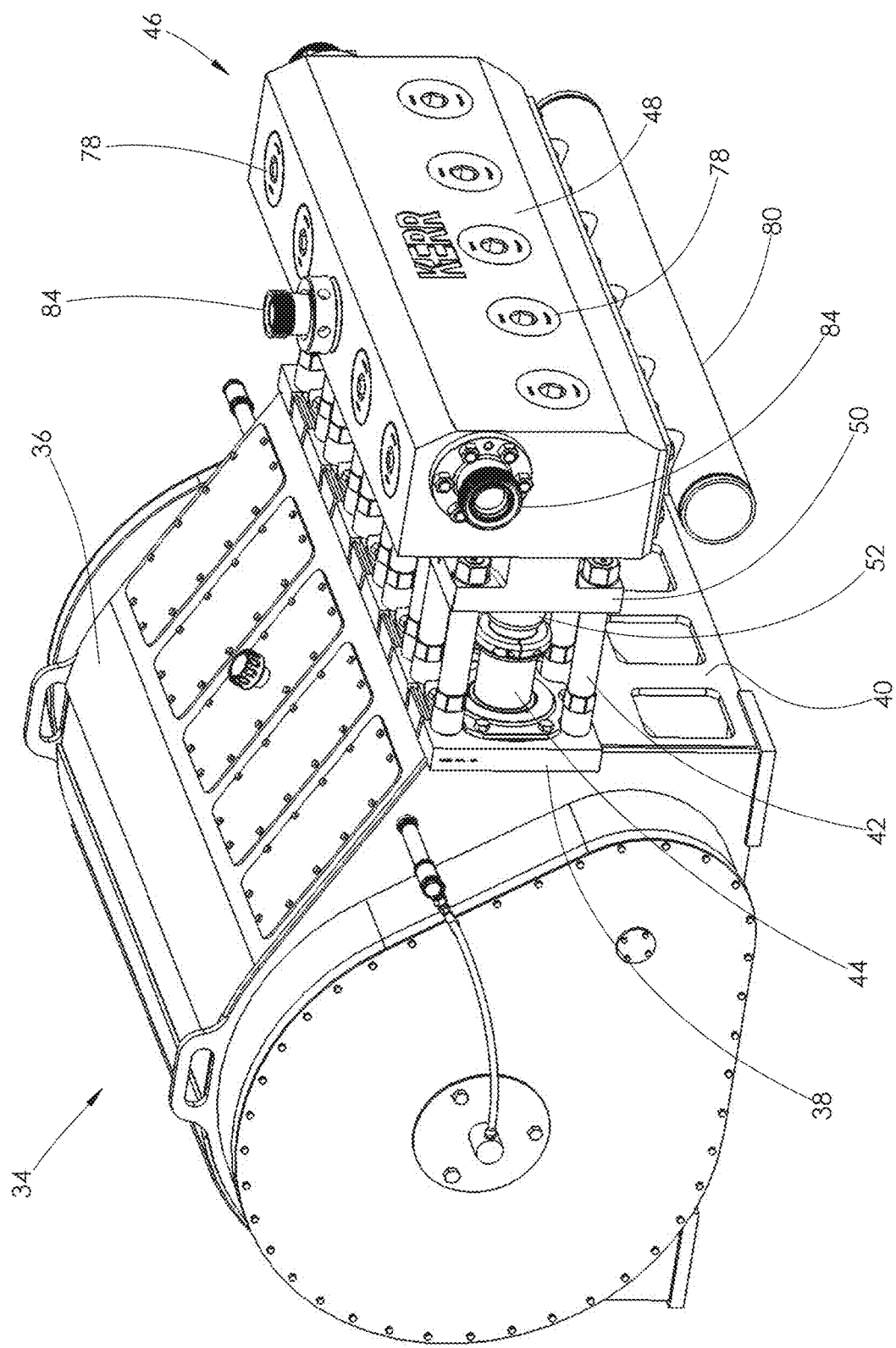
FIG. 3 is a left side perspective view of a traditional fluid end attached to a traditional power end.
Figure 4:
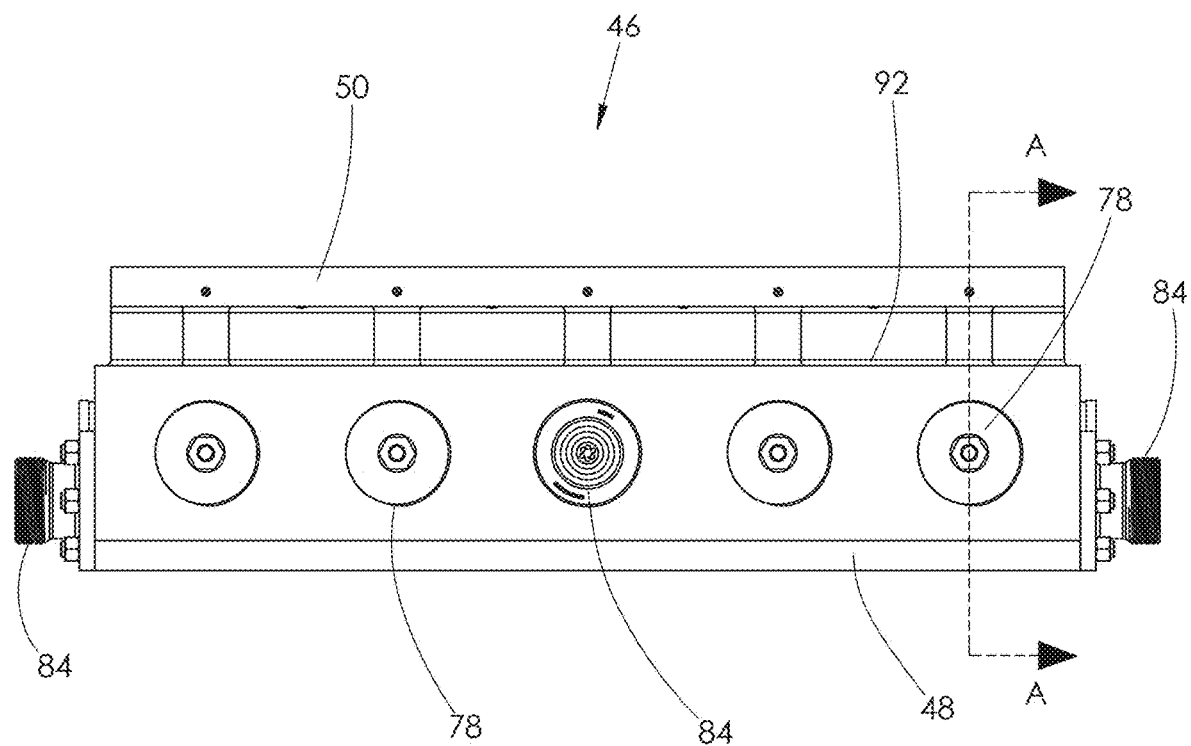
FIG. 4 is a top plan view of the fluid end shown in FIG. 3.

Unlike the traditional fluid end 46, shown in FIG. 3, the fluid end 100 comprises a plurality of fluid end sections 102 rather than a single housing 48. The fluid end sections 102 are positioned in a side-by-side relationship. Preferably, the fluid end 100 comprises five fluid end sections 102. However, more or less fluid end sections 102 may be used. Forming the fluid end 100 out of multiple fluid end sections 102 allows a single fluid end section 102 to be replaced, if needed. In contrast, the entire housing 48 in traditional fluid ends 46 may need to be replaced if only a portion of the housing 48 fails.

Figure 5:
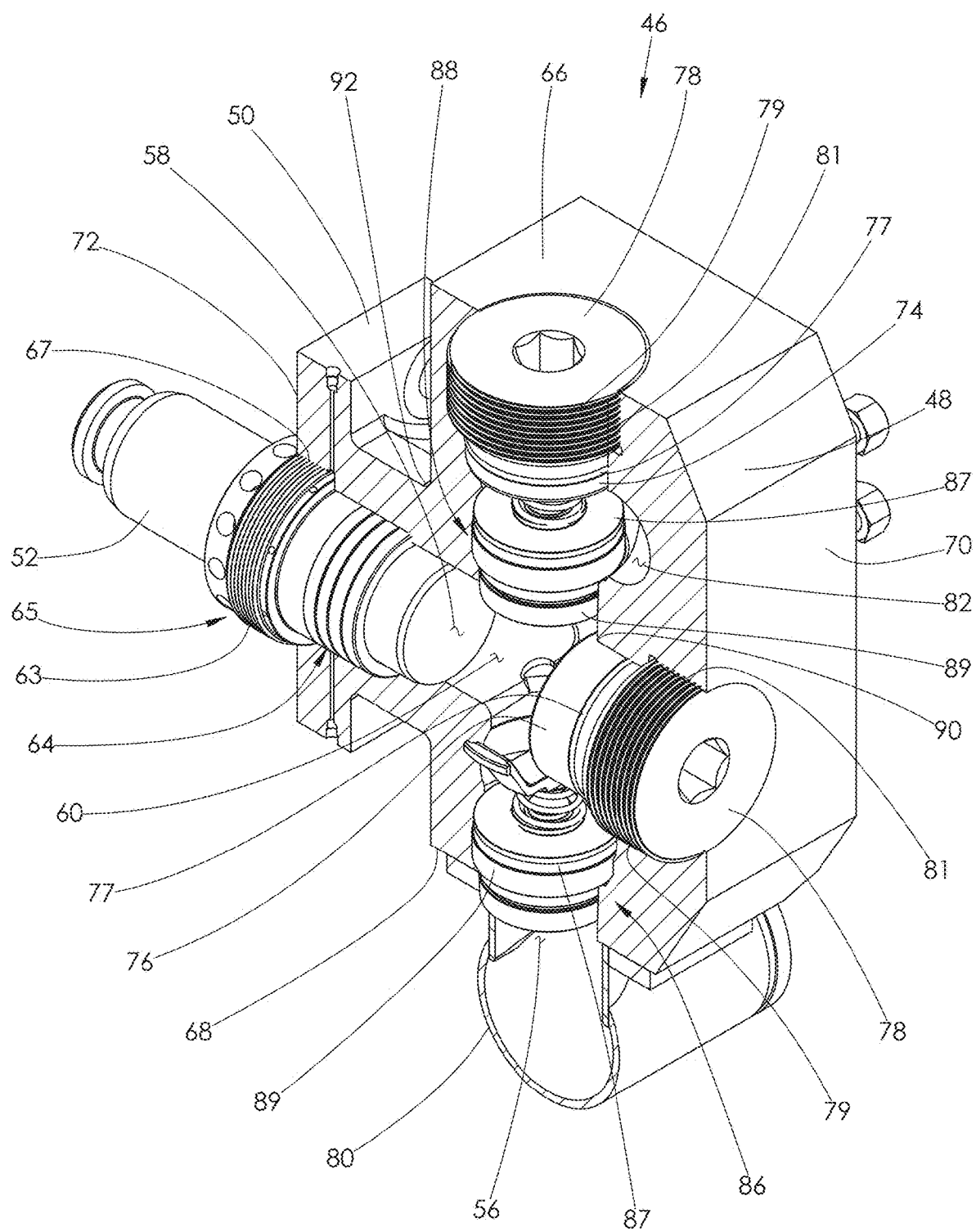
FIG. 5 is a sectional view of the fluid end shown in FIG. 4, taken along line A-A.
Figure 8:
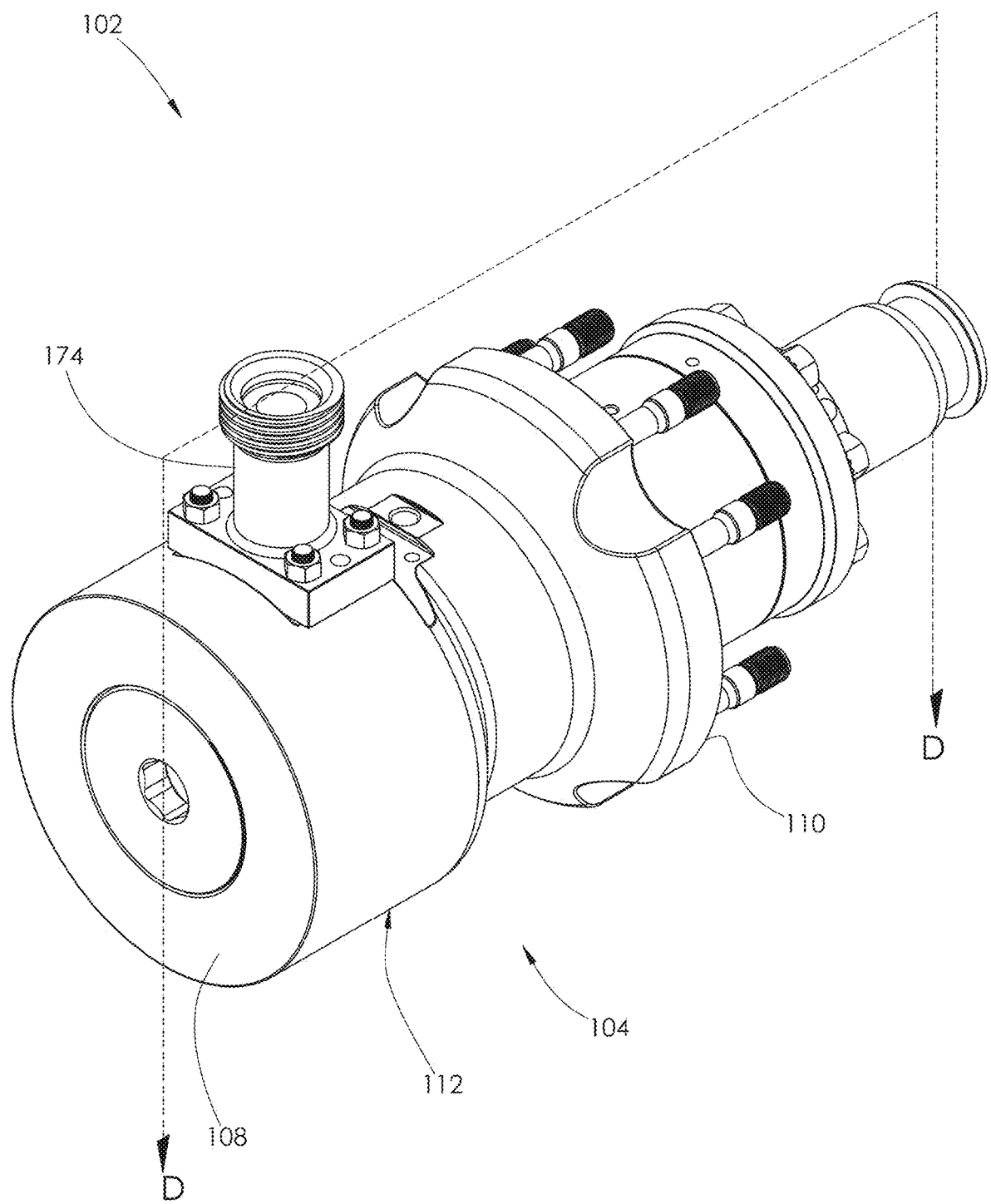
FIG. 8 is a front perspective view of one of the fluid end sections making up the fluid end shown in FIG. 6.
Figure 9:
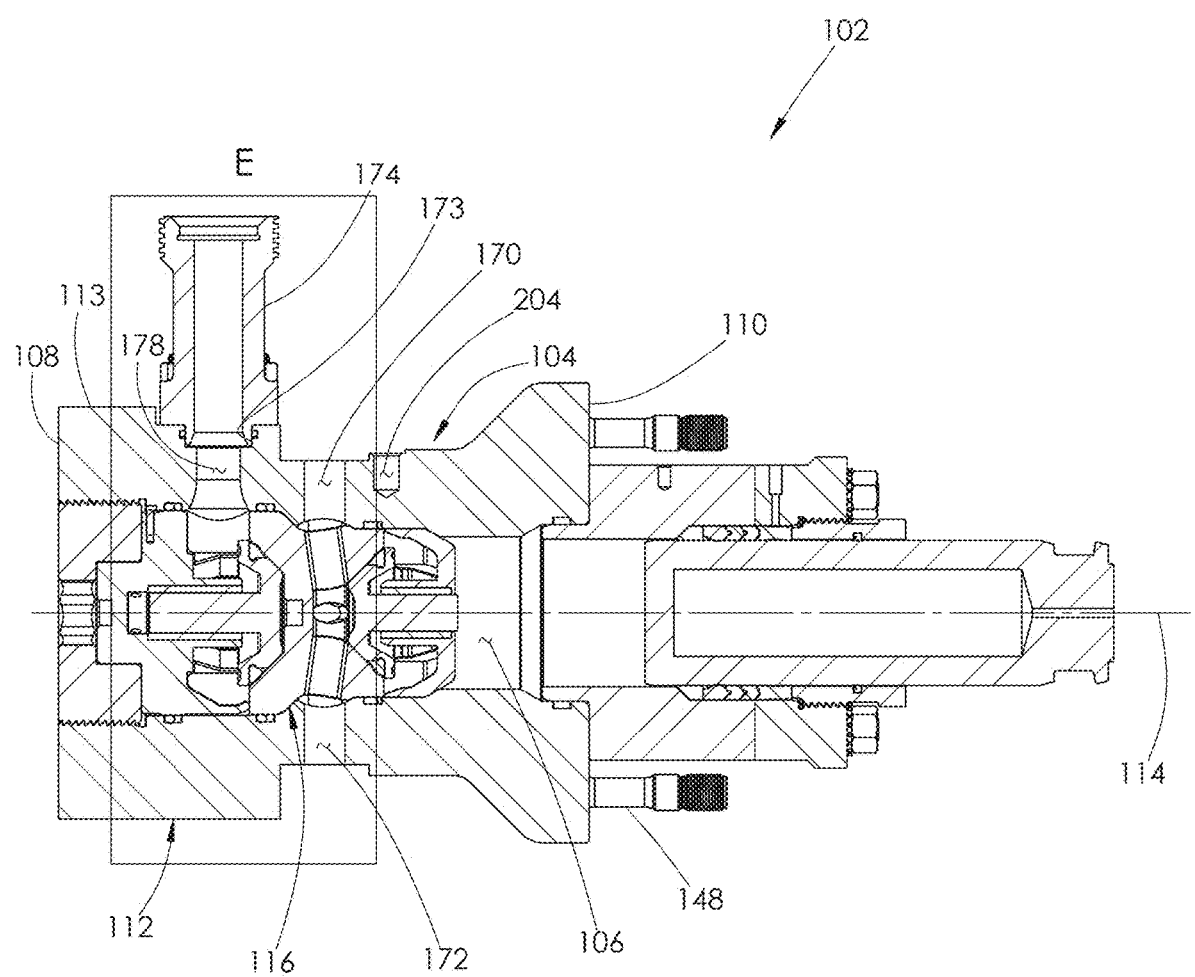
FIG. 9 is a cross-sectional view of the fluid end section shown in FIG. 8, taken along line D-D.

Turning to FIGS. 8 and 9, each fluid end section 102 comprises a horizontally positioned housing 104 having a generally cylindrical cross-sectional shape, as shown in FIG. 8. In alternative embodiments, each fluid end section may have a generally rectangular cross-sectional shape. Unlike the traditional fluid end 46 shown in FIGS. 3 and 5, each housing 104 does not include a vertical bore intersecting a horizontal bore to form an internal chamber. Rather, each housing 104 only has a single horizontally positioned bore 106, as shown in FIG. 9. Removing the internal chamber found in traditional fluid ends from the housing 104 removes common stress points from the housing 104.

Eliminating the intersecting bore also reduces the cost of manufacturing the fluid end 100 as compared to traditional fluid ends. The time required to manufacture the fluid end 100 is greatly reduced without the need for machining an intersecting bore, and the fluid end 100 may be manufactured on a lathe instead of a machining center. The fluid end 100 may also be manufactured out of lower strength and less costly materials since it does not include the high stress areas found in traditional fluid ends. Each housing 104 may be manufactured out of high strength alloy steel, such as carbon steel. In alternative embodiments, each housing 104 may be manufactured out of stainless steel.

Continuing with FIGS. 8 and 9, each housing 104 comprises a first outer surface 108 joined to an opposed second outer surface 110 by an intermediate outer surface 112. The horizontal bore 106 extends through the housing 104 along a central longitudinal axis 114 and interconnects the opposed first and second outer surfaces 108 and 110, as shown in FIG. 9. Each housing 104 is of single piece construction.

Since each housing 104 only has a single horizontal bore 106, fluid must be routed throughout the housing 104 differently from how fluid is routed throughout a traditional fluid end housing 48. As will be described in more detail herein, a fluid routing plug 116, shown in FIGS. 52-64, is installed within each housing 104 and is configured to route fluid throughout the housing 104.

With reference to FIGS. 6, 7, and 10-16, each housing 104 is supported on a single connect plate 118 in a one-to-one relationship. A plurality of sets of stay rods 120, shown in FIG. 6, are used to attach each connect plate 118 to a power end. The connect plates 118 may each be attached to the corresponding stay rods 120 prior to attaching a housing 104 to a corresponding connect plate 118. Because the housings 104 are each attached to a connect plate 118, the fluid end 100 does not include a flange like the flange 50 formed in the fluid end 46 shown in FIG. 3. In an alternative embodiment, multiple housings may be attached to a single, larger connect plate. In such embodiment, the stay rods are likewise attached to the single, larger connect plate.

The stay rods 120 shown in FIG. 6 are configured for use with a modular power end, like that shown in U.S. Provisional Patent Application Ser. No. 63/053,797, authored by Thomas et al. and filed on Jul. 20, 2020. A spacer 122 is installed on each stay rod 120 and is configured to engage with a front surface of the power end. In alternative embodiments, the stay rods may be configured like the stay rods 42 shown in FIG. 3.

With reference to FIGS. 10-13, each connect plate 118 has a generally rectangular shape and has opposed first and second surfaces 124 and 126. A plurality of first passages 128 are formed around the outer periphery of each connect plate 118. Each first passage 128 interconnects the first and second surfaces 124 and 126 of the connect plate 118 and is configured for receiving a stay rod 120. Each stay rod 120 extends through a corresponding passage 128 in a one-to-one relationship.

The connect plate 118 shown in FIGS. 10-13 has four first passages 128. Likewise, four stay rods 120 are shown attached to each connect plate 118 in FIG. 6. In alternative embodiments, the connect plate may have more than four or less than four first passages, as long as the amount of first passages corresponds with the number of stay rods being used with each connect plate.

Figure 16:
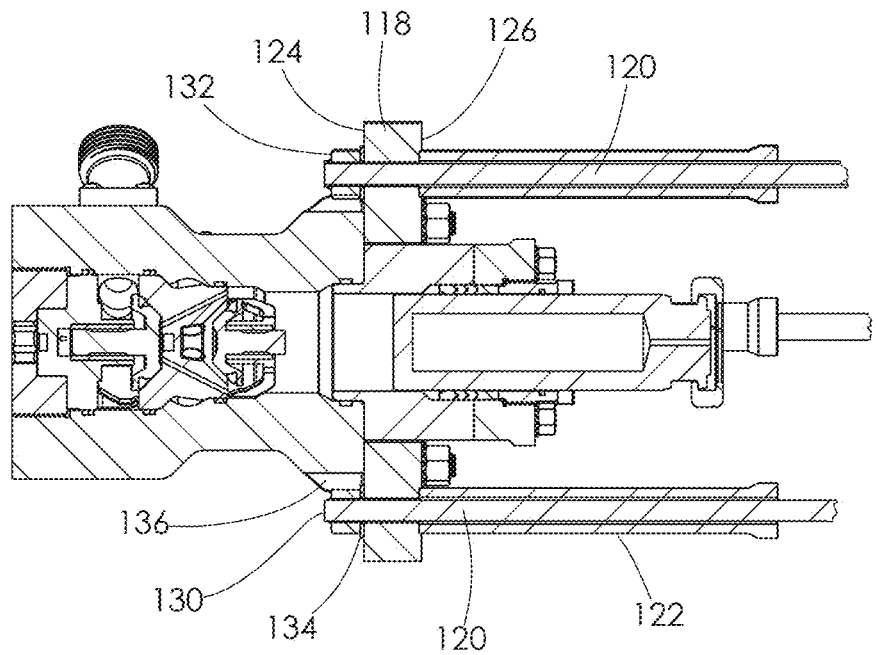
FIG. 16 is a cross-sectional view of the fluid end and stay rods shown in FIG. 6, taken along a plane that includes the line B-B.

Once each stay rod 120 is installed in a connect plate 118, a first end 130 of each stay rod 120 projects from the first surface 124 of the connect plate 118, as shown in FIG. 16. A nut 132 and a washer 134 are installed on the projecting first end 130 of each stay rod 120 in a one-to-one relationship. The nut 132 is turned until it tightly engages a corresponding washer 134 and the first surface 124 of the connect plate 118, thereby securing the connect plate 118 to the stay rods 120.

Figure 14:
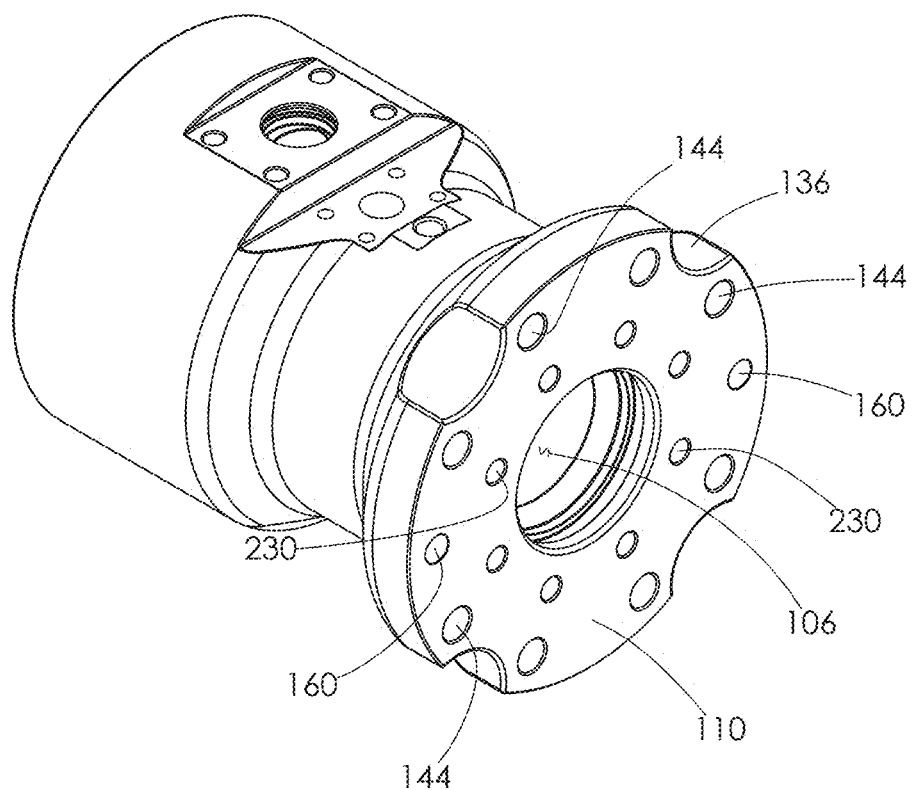
FIG. 14 is a perspective view of a second surface of a housing making up the fluid end section shown in FIG. 8.
Figure 15:
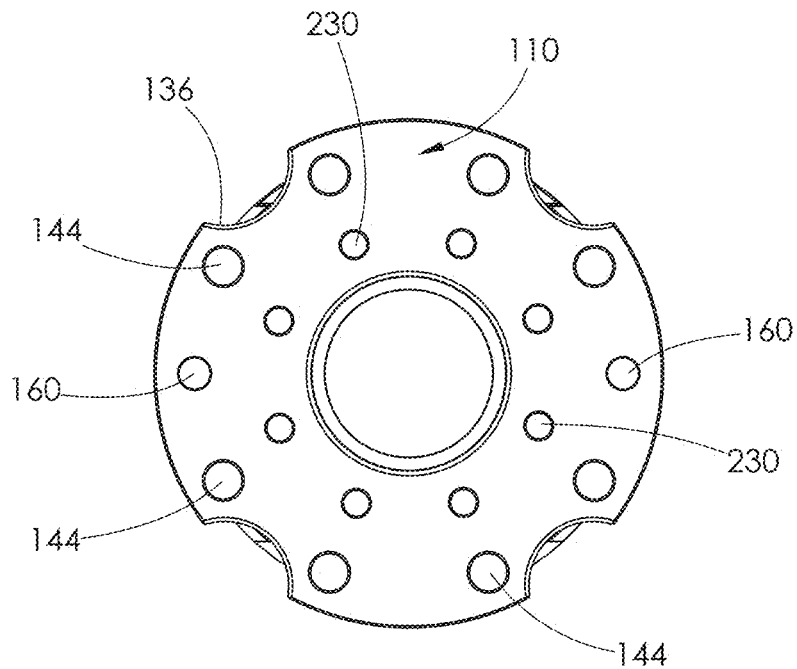
FIG. 15 is an elevational view of the second surface of the housing shown in FIG. 14.

With reference to FIGS. 6, and 14-16, a plurality of notches 136 are formed around the periphery of the housing 104 at its second surface 110, as shown in FIGS. 14 and 15. When the housing 104 is attached to the connect plate 118, each notch 136 partially surrounds one of the first passages 128 in a one-to-one relationship. The notches 136 provide space to access the washer 134 and nut 132 during operation.

Continuing with FIGS. 10-13, a central bore 138 is formed in each connect plate 118 and interconnects the first and second surfaces 124 and 126. The central bore 138 is configured for receiving a stuffing box 140, as described in more detail later herein. A plurality of second passages 142 are formed in the connect plate 118 and surround the central bore 138. Each second passage 142 interconnects the first and second surfaces 124 and 126 of the connect plate 118. The second passages 142 are configured to align in a one-to-one relationship with a plurality of first threaded openings 144 formed in the second surface 110 of each housing 104, as shown in FIGS. 14 and 15.

Figure 17:
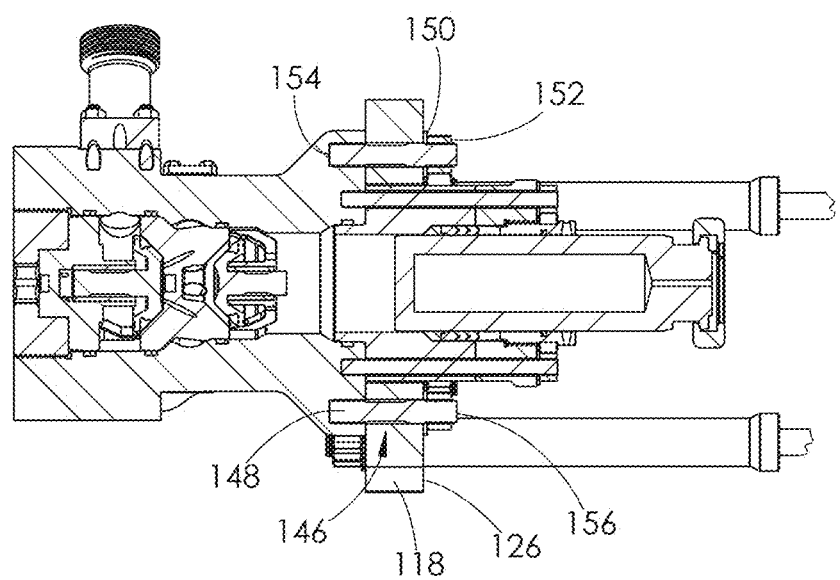
FIG. 17 is a cross-sectional view of the fluid end and stay rods shown in FIG. 6, taken along a plane that includes the line C-C.

Each housing 104 is attached to the first surface 124 of a corresponding connect plate 118 using a fastening system 146. The fastening system 146 comprises a plurality of studs 148, a plurality of washers 150, and a plurality of nuts 152, as shown in FIGS. 7 and 17. A first end 154 of each stud 148 is configured to mate with a corresponding one of the first openings 144 formed in the housing 104. The second passages 142 formed in the connect plate 118 subsequently receive the plural studs 148 projecting from the housing 104.

When the housing 104 and the connect plate 118 are brought together, a second end 156 of each stud 148 projects from the second surface 126 of the connect plate 118. A washer 150 and a nut 152 are subsequently installed on the second end 156 of each stud 148, in a one-to-one relationship. The nut 152 is turned until it tightly engages the washer 150 and the second surface 126 of the connect plate 118, thereby securing the housing 104 and the connect plate 118 together.

In FIGS. 10-15, the housing 104 and connect plate 118 each have eight corresponding first openings 144 and second passages 142. In alternative embodiments, more than eight or less than eight corresponding openings and second passages may be formed in the housing and connect plate. In such embodiments, the fastening system may comprise the same number of studs, washers, and nuts as there are openings and passages. In further alternative embodiments, the fastening system may comprise different types of fasteners, such as socket-headed screws.

Figure 10:
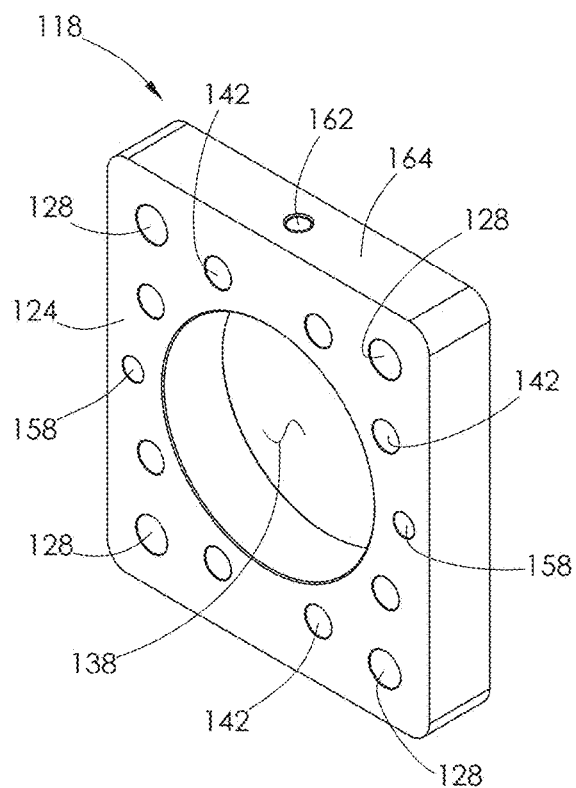
FIG. 10 is a perspective view of a first surface of a connect plate used with the fluid end shown in FIG. 6.
Figure 11:
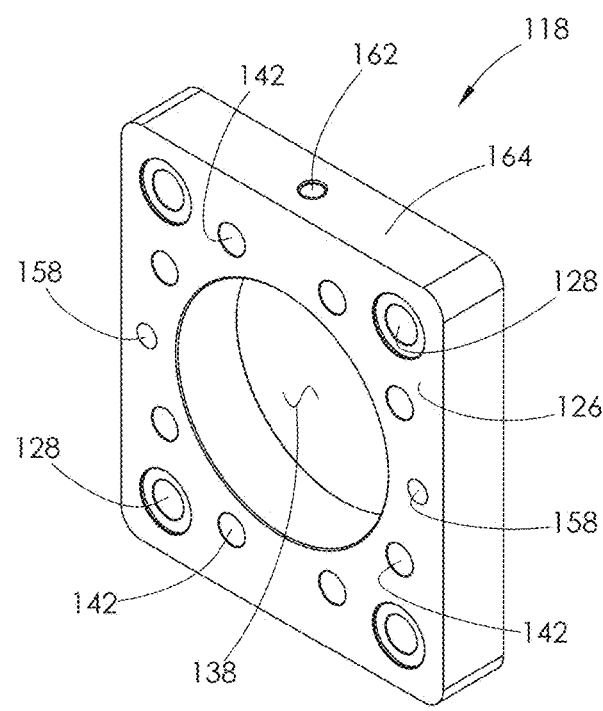
FIG. 11 is a perspective view of a second surface of the connect plate shown in FIG. 10.
Figure 12:
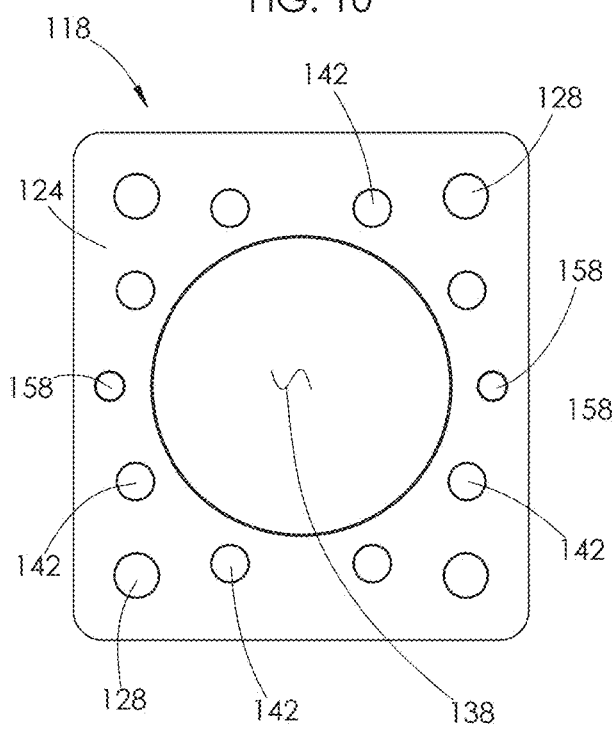
FIG. 12 is an elevational view of the first surface of the connect plate shown in FIG. 10.
Figure 13:
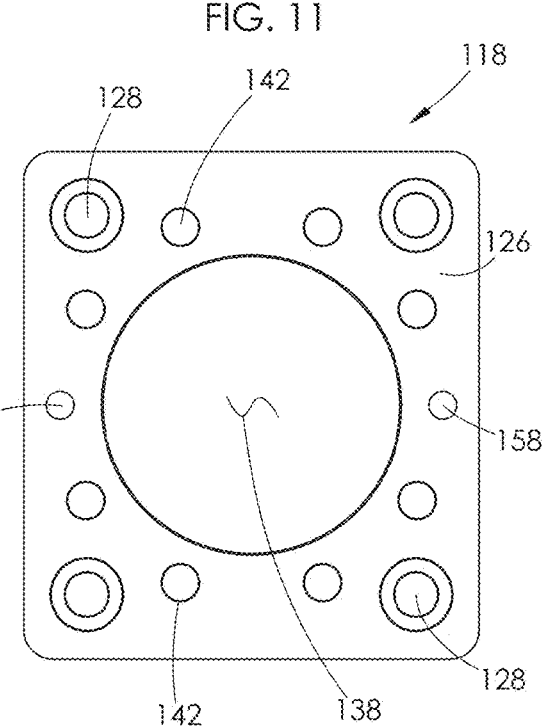
FIG. 13 is an elevational view of the second surface of the connect plate shown in FIG. 10.

Continuing with FIGS. 10-15, a pair of third passages 158 are formed in the connect plate 118 on opposite sides of the central bore 138. The third passages 158 are alignable with a pair of pin holes 160 formed in the second surface 110 of the housing 104. Each third passage 158 and each corresponding pin hole 160 is configured to receive a dowel pin in a one-to-one relationship. The dowel pins are used to help align the housing 104 on the connect plate 118 during assembly. A threaded hole 162 may also be formed in a top surface 164 of each connect plate 118, as shown in FIGS. 10 and 11. The threaded hole 162 is configured for receiving a lifting eye (not shown) used to lift and support the connect plate 118 during assembly.

In alternative embodiments, the connect plate may have various shapes and sizes other than those shown in FIGS. 10-13. For example, the connect plate may be shaped like the various embodiments disclosed in U.S. Provisional Patent Ser. No. 63/053,797, authored by Thomas et al. and filed on Jul. 20, 2020.

Turning back to FIGS. 6 and 7, in contrast to the traditional fluid end 46, shown in FIG. 3, the fluid end 100 is configured to receive fluid from two manifolds, rather than just one. The fluid end 100 comprises an upper intake manifold 166 and a lower intake manifold 168. Each manifold 166 and 168 is in fluid communication with each fluid end section 102. Using two different manifolds 166 and 168 allows different types of fluid to be delivered to each fluid end section 102. For example, fluid having a higher level of proppant may be delivered via the upper intake manifold 166, while fluid having a zero to minimal level of proppant may be delivered via the lower intake manifold 168.

Continuing with FIGS. 6 and 7, the upper and lower intake manifolds 166 and 168 are joined to the fluid end sections 102 via a plurality of conduits 159. Each conduit 159 is positioned directly below the corresponding manifold 166 and 168 and extends along a straight line between the fluid end section 102 and the corresponding manifold 166 and 168. Thus, each conduit 159 and corresponding manifolds 166 and 168 have a "T" shape.

Figure 7A:
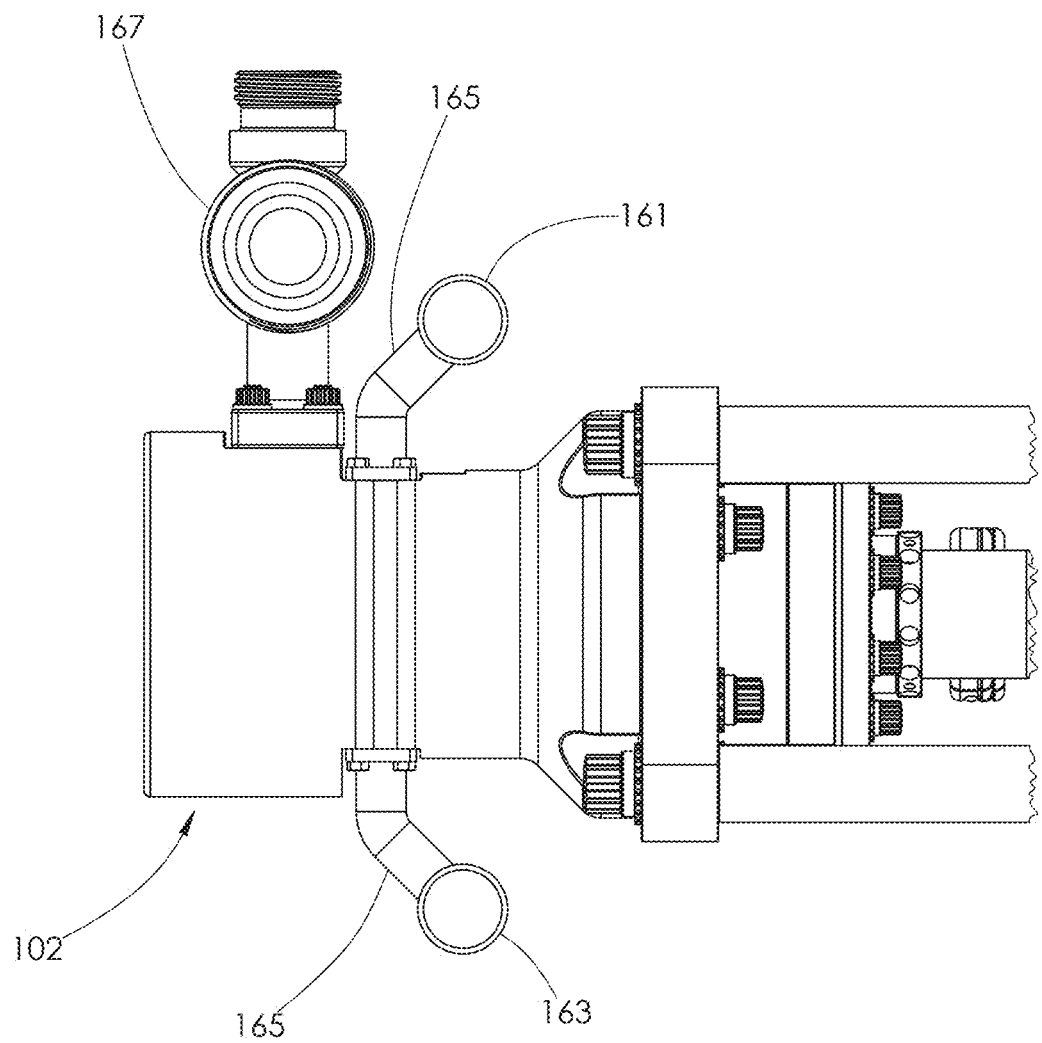
FIG. 7A is a side elevational view of the fluid end shown in FIG. 6, but with another embodiment of intake and discharge manifolds.
Figure 7B:
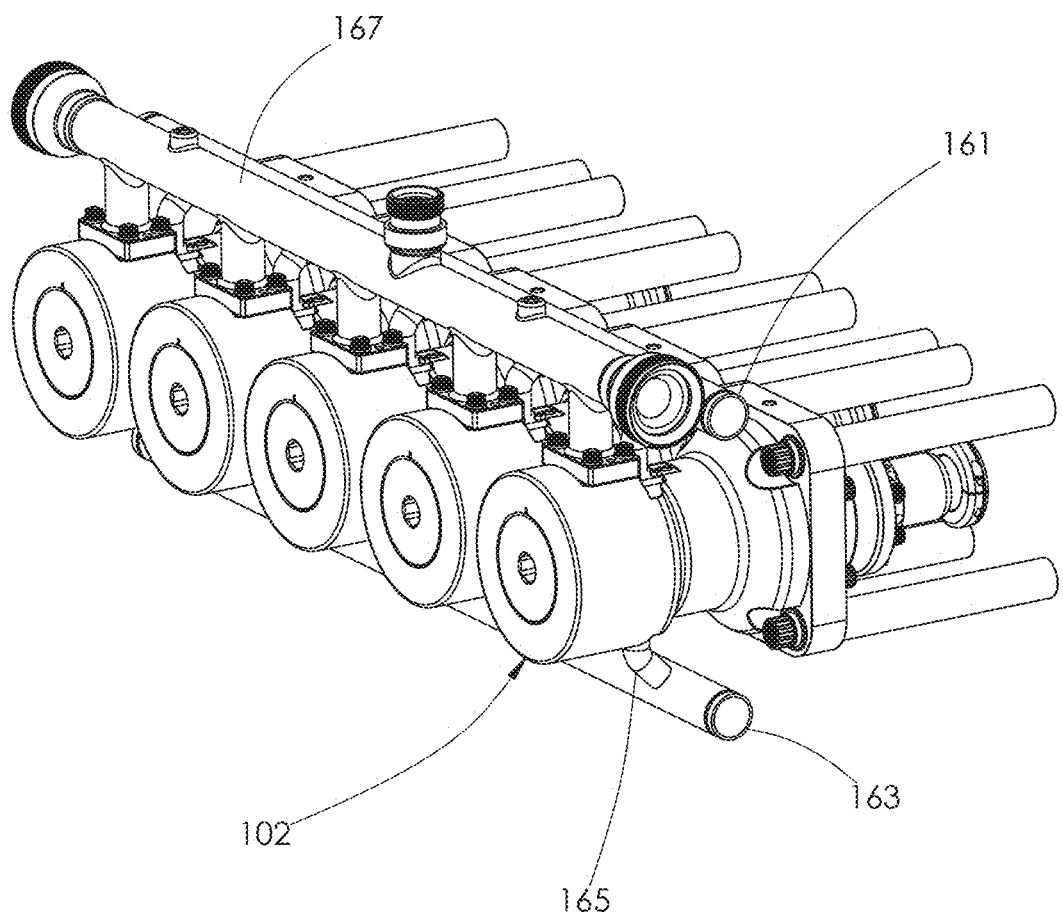
FIG. 7B is a front perspective view of the fluid end shown in FIG. 7A.

Turning to FIGS. 7A and 7B, an alternative embodiment of an upper and lower intake manifold 161 and 163 is shown. The upper and lower intake manifolds 161 and 163 are joined to the fluid end sections 102 via a plurality of conduits 165. The conduits 165 have an elbow shape. The elbow shape of the conduits 165 causes the corresponding manifolds 161 and 163 to be spaced farther away from a discharge manifold 167, than the manifolds 166 and 168. Providing more space between the intake manifolds 161 and 163 and the discharge manifold 167 provides more space for maintenance to different areas of the fluid end 100, when needed.

Turning back to FIG. 9, an upper and lower intake bore 170 and 172 are formed within the housing 104. Each bore 170 and 172 interconnects the intermediate outer surface 112 and the horizontal bore 106. The upper and lower intake bores 170 and 172 shown in FIG. 9 are collinear. In alternative embodiments, the upper and lower intake bores may not be collinear.

With reference to FIGS. 6-9, the upper intake bore 170 is in fluid communication with the upper intake manifold 166, and the lower intake bore 172 is in fluid communication with the lower intake manifold 168. In operation, fluid may be delivered into the housing 104 through both the upper and lower intake bores 170 and 172. In alternative embodiments, only one intake bore may be formed in the housing and only one intake manifold may be attached to the housing.

Continuing with FIGS. 6-9, the fluid end 100 further comprises a plurality of discharge conduits 174. Each discharge conduit 174 is attached to one of the fluid end sections 102 in a one-to-one relationship. A discharge manifold 176 interconnects each of the discharge conduits 174, as shown in FIGS. 6 and 7. In alternative embodiments, the discharge conduits and discharge manifold may be formed as a single unit, like the discharge manifold 167, shown in FIGS. 7A and 7B.

Continuing with FIG. 9, a discharge bore 178 is formed in the housing 104 and interconnects the intermediate surface 112 and the horizontal bore 106. The discharge bore 178 is positioned between the first surface 108 of the housing 104 and the intake bores 170 and 172. The discharge bore 178 is in fluid communication with the discharge conduit 174. In operation, fluid to be pressurized enters the housing 104 through the upper and lower intake bores 170 and 172. Pressurized fluid exits the housing 104 through the discharge bore 178.

Figure 18:
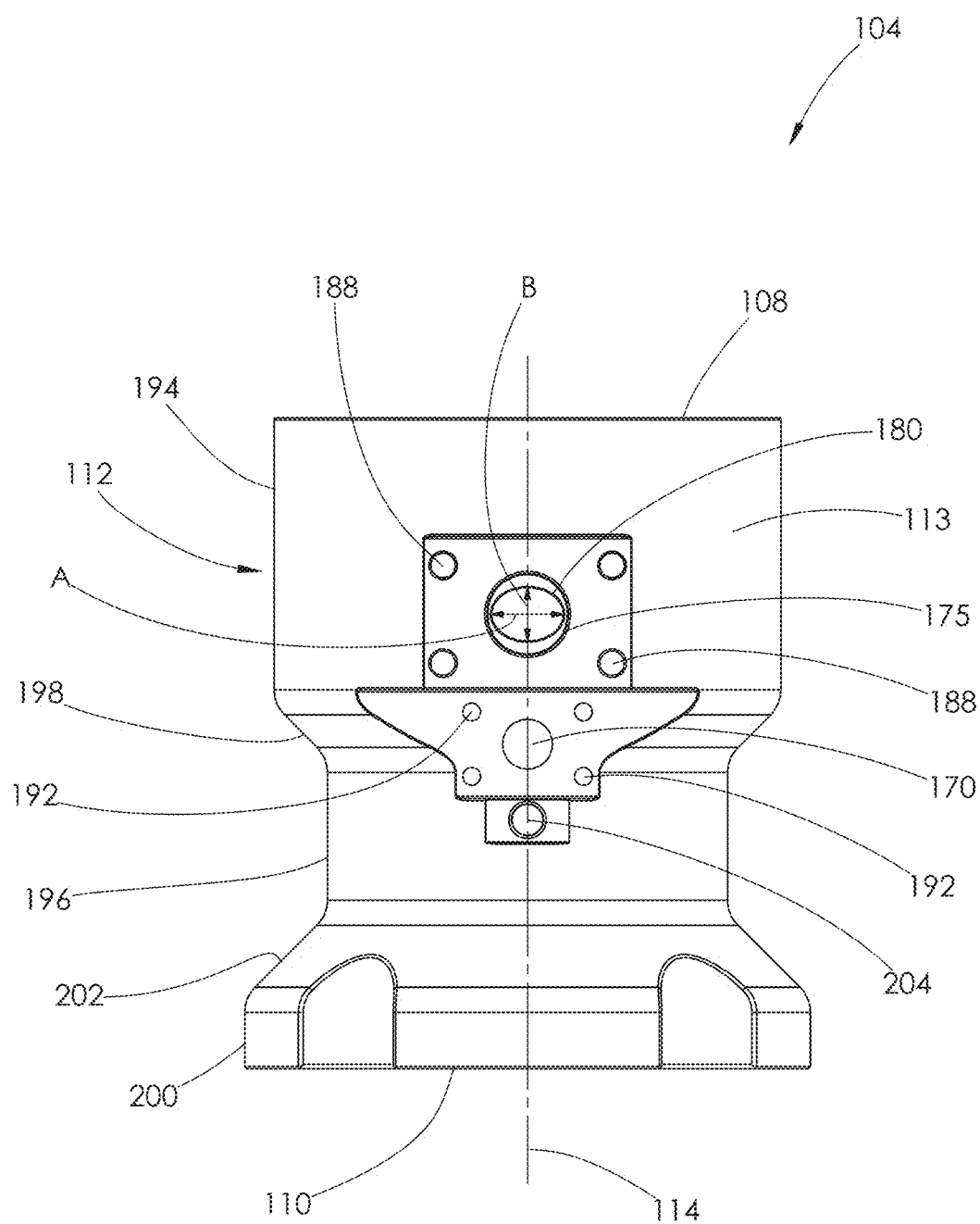
FIG. 18 is a top plan view of the housing shown in FIG. 14.

With reference to FIG. 18, the discharge bore 178 has an oval cross-sectional shape, as shown by a discharge bore opening 180. The opening 180 has a length A and a width B. The discharge bore 178 is formed within the housing 104 such that the width B extends along an axis that is parallel to the longitudinal axis 114 of the housing 104. During operation, high fluid pressure within the discharge bore 178 may cause the walls along the length A to compress, causing the discharge bore 178 to have a more circular cross-sectional shape. Providing room for the walls surrounding the discharge bore 178 to compress, helps reduce stress in the housing 104 and increase fluid flow. In alternative embodiments, the discharge bore may have a circular cross-sectional shape.

Figure 19:
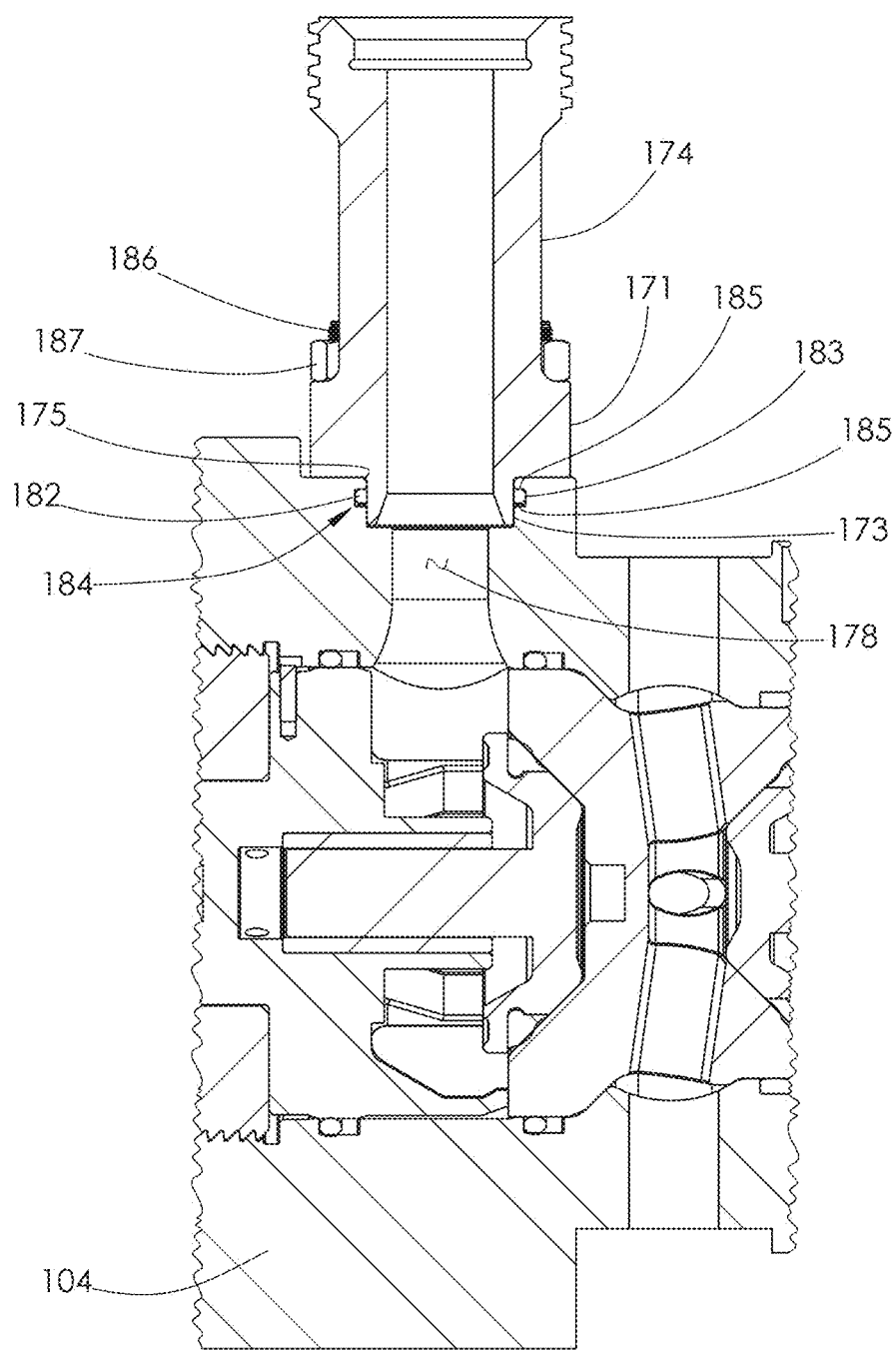
FIG. 19 is an enlarged view of area E shown in FIG. 9.

Continuing with FIG. 19, a counterbore 173 is formed within the housing 104 immediately above the opening 180 of the discharge bore 178. The discharge bore 178 opens into the counterbore 173. The counterbore 173 has a circular cross-sectional shape, as shown by the opening 175 in FIG. 18. A portion of the discharge conduit 174 is installed within the counterbore 173 through its opening 175. A seal 182 is interposed between the walls of the housing 104 surrounding the discharge bore 178 and an outer surface of the discharge conduit 174. The seal 182 is installed within a groove 184 formed in the walls of the housing 104. The seal 182 may be identical to the second seal 376, described with reference to FIGS. 65 and 70. In alternative embodiments, the seal may be identical to the first seal 374, described with reference to FIGS. 65 and 71.

The groove 184 is characterized by two sidewalls 185 joined to a base 183. The sidewalls 185 may join the base 183 via radius corners or at a 90 degree angle. No grooves are formed in the outer surface of the discharge conduit 174 for housing a seal. In operation, the seal 182 wears against the outer surface of the discharge conduit 174. If the outer surface of the discharge conduit 174 begins to erode, allowing fluid to leak around the seal 182, the discharge conduit 174 may be replaced with a new discharge conduit 174.

The discharge bore 178 shown in FIG. 9 interconnects a top surface 113 of the intermediate surface 112 of the housing 104 and the horizontal bore 106. Likewise, the discharge conduits 174 shown in FIGS. 6, 7, and 9 are attached to the top surface 113 of the intermediate surface 112 of each housing 104. In operation, any gas trapped within the housing 104 rises towards the top of the housing 104. Placing the discharge bore 178 and conduit 174 at the top of the housing 104 allows the gases to naturally escape. Additionally, any wear caused to the components by the rising gas will primarily be imposed on the discharge conduit 174, rather than the housing 104. The discharge conduit 174 and corresponding discharge piping 176 are easily replaced, if needed.

In alternative embodiments, the discharge bore may interconnect a bottom or side surface of the intermediate surface and the horizontal bore, and the discharge conduit may be attached to the corresponding surface of the housing. In further alternative embodiments, the discharge bore may interconnect the first outer surface of the housing and the horizontal bore, and the discharge conduit may be attached to the first outer surface of the housing.

With reference to FIGS. 6, 18 and 19, a rectangular flange 171 is formed around each discharge conduit 174. Each rectangular flange 171 is attached to the housing 104 using a plurality of threaded studs 186 and nuts 187, as shown in FIGS. 6 and 19. A plurality of threaded openings 188 are formed in the housing 104 for receiving the studs 186, as shown in FIG. 18. The openings 188 are positioned in a rectangular pattern around the discharge bore opening 180. Such pattern helps maximize the surface area of the intermediate surface 112 of the housing 104, helping to reduce the size and weight of the housing 104.

With reference to FIGS. 7 and 18, the intake manifolds 166 and 168 each comprise a plurality of rectangular flanges 189 joined to a plurality of conduits 191 in a one-to-one relationship, as shown in FIG. 7. Each rectangular flange 189 is attached to the housing 104 using a plurality of threaded studs 190 and nuts 193, as shown in FIG. 7. A plurality of threaded openings 192 are formed in the housing 104 for receiving the studs 190, as shown in FIG. 18. The openings 192 are positioned in a rectangular pattern around the intake bores 170 and 172 to maximize surface area of the housing 104. In alternative embodiments, the discharge conduits and intake manifolds may be attached to the housing using different types of fasteners, such as socket-headed screws.

Continuing with FIG. 18, the intermediate surface 112 of the housing 104 includes a first portion 194 joined to a second portion 196 by a first tapered portion 198. The second portion 196 is joined to a third portion 200 by a second tapered portion 202. The first portion 194 is joined to the first surface 108 and the third portion 200 is joined to the second surface 110.

The second portion 196 has a smaller diameter than both the first and third portions 194 and 200. Providing the second portion 196 with a smaller diameter helps remove unnecessary weight from the housing 104. The third portion 200 may have a slightly larger diameter than the first portion 194. The first, second, and third portions 194, 196, and 200 are generally cylindrical. Thus, the housing 104 may be characterized as being primarily cylindrical. In alternative embodiments, the housing may be uniform in diameter throughout its intermediate surface. In further alternative embodiments, the housing may have various diameters throughout its intermediate surface other than those shown in FIG. 18.

Continuing with FIG. 18, a threaded hole 204 is formed in the top surface 113 of the intermediate surface 112. The threaded hole 204 is positioned at the center of gravity of the housing 104 when the housing 104 is fully loaded with the components described herein. The threaded hole 204 is configured to receive a lifting eye (not shown) used to lift and support the housing 104 during assembly and maintenance, as shown in FIG. 9.

With reference to FIGS. 20-29, each fluid end section 102 further comprises a stuffing box 140 attached to the second outer surface 110 of the housing 104. The stuffing box 140 has a generally cylindrical shape and comprises a first outer surface 206 joined to an opposed second outer surface 208 by an intermediate outer surface 210. The intermediate surface 210 includes a cylindrical first portion 212 joined directly to a cylindrical second portion 214. The first portion 212 is positioned adjacent the first surface 206 and has a reduced diameter from that of the second portion 214. A threaded hole 215 is formed in a top surface of the second portion 214. The threaded hole 215 is configured to receive a lifting eye (not shown) used to lift and support the stuffing box 140 during assembly and maintenance.

Figure 25:
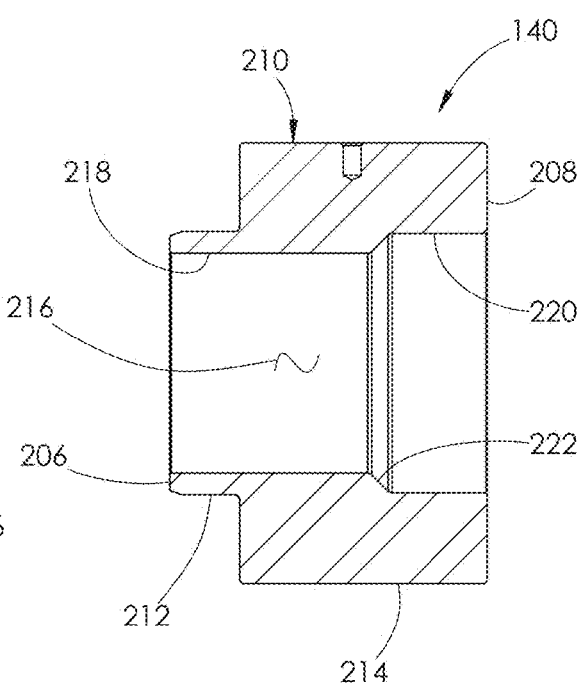
FIG. 25 is a cross-sectional view of the stuffing box shown in FIG. 24, taken along line F-F.
Figures 26, 27:
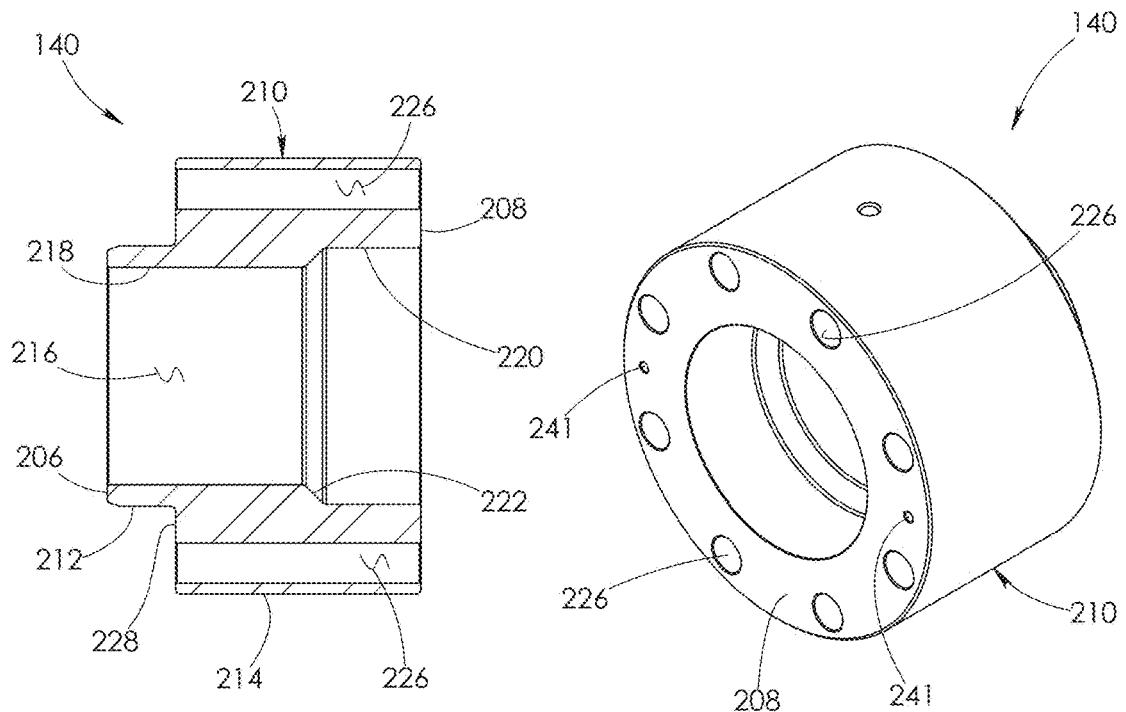
FIG. 26 is a cross-sectional view of the stuffing box shown in FIG. 24, taken along line G-G.
FIG. 27 is a perspective view of a second surface of the stuffing box shown in FIG. 22.
Figures 28, 29:
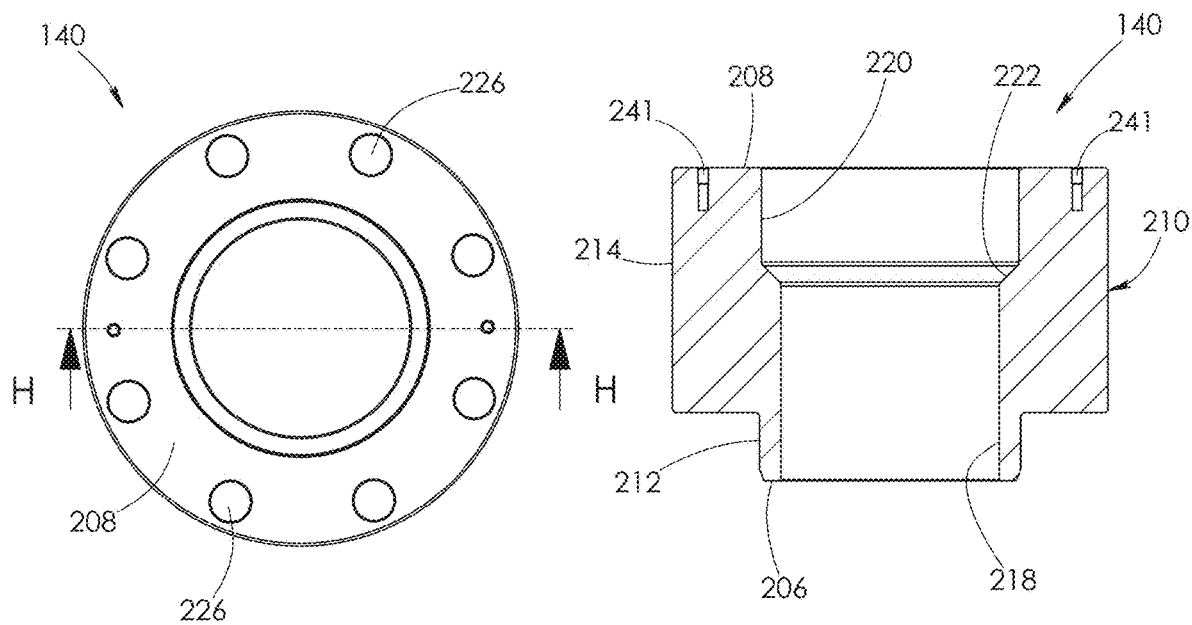
FIG. 28 is an elevational view of the second surface of the stuffing box shown in FIG. 22.
FIG. 29 is a cross-sectional view of the stuffing box shown in FIG. 28, taken along line H-H.
Figure 30:
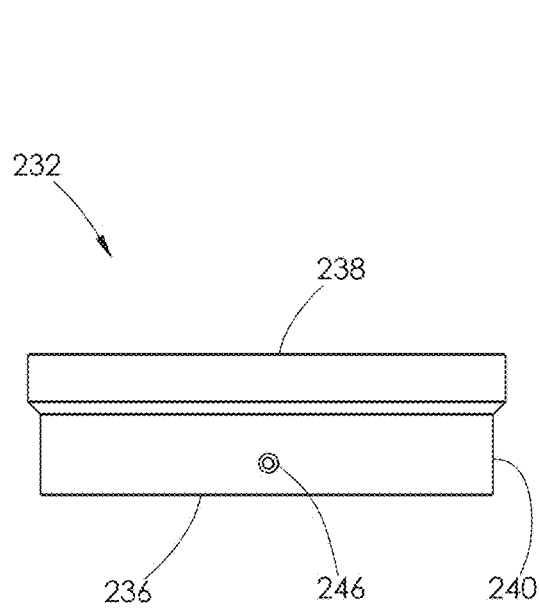
FIG. 30 is a top plan view of a retainer shown attached to the stuffing box in FIG. 20.

A central passage 216 interconnects the stuffing box's first and second outer surfaces 206 and 208. The walls surrounding the central passage 216 include a first section 218 joined to a second section 220 by a tapered shoulder 222, as shown in FIGS. 25, 26, and 29. The second section 220 has a larger diameter than that of the first section 218. As described in more detail herein, the second section 220 and the tapered shoulder 222 are configured for receiving a plunger packing 224, as shown in FIGS. 20 and 21.

Continuing with FIGS. 23-29, a plurality of passages 226 are formed around the periphery of the second portion 214 of the stuffing box 140. Each passage 226 interconnects the second surface 208 of the stuffing box 140 and a base 228 of the second portion 214. The passages 226 are formed parallel to the central passage 216.

Turning back to FIGS. 14 and 15, a plurality of second threaded openings 230 are formed in the second surface 110 of the housing 104. The openings 230 surround the opening of the horizontal bore 106. The second openings 230 are surrounded by the first openings 144 used with the connect plate 118.

Figure 20:
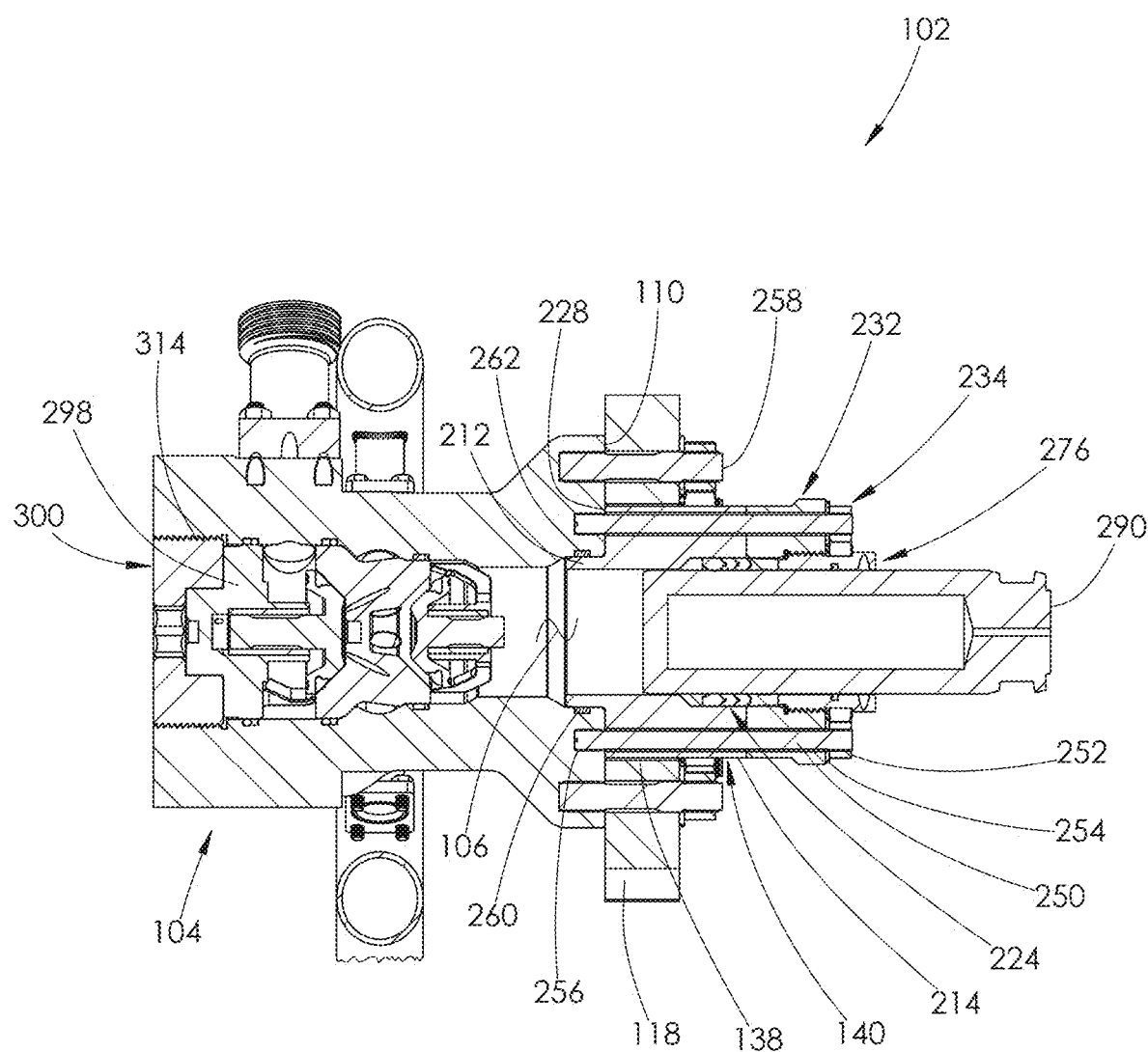
FIG. 20 is the cross-sectional view of the fluid end section shown in FIG. 17 with the upper and lower intake manifolds shown attached to the housing.
Figure 21:
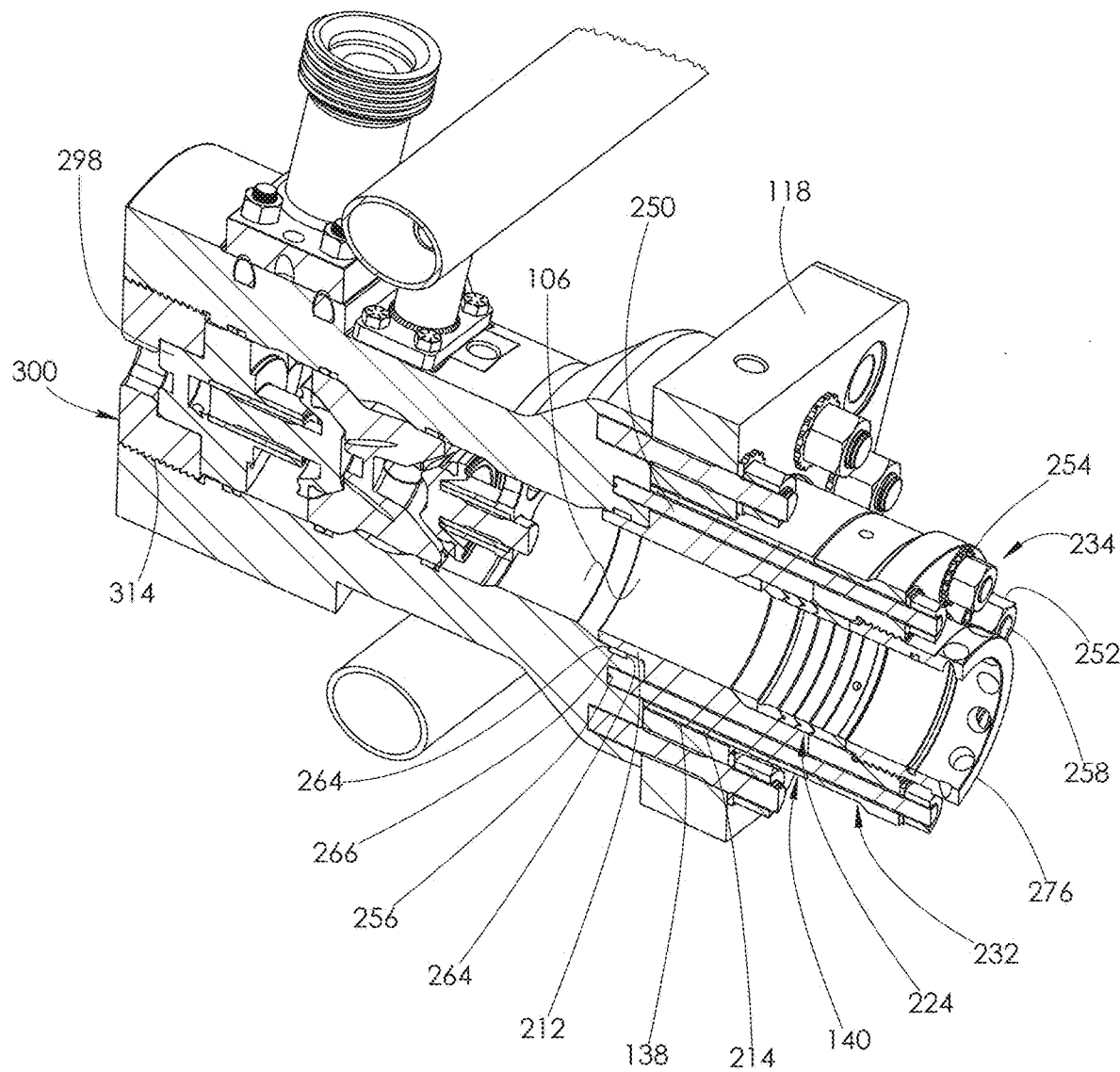
FIG. 21 is a rear perspective view of the fluid end section shown in FIG. 20, but the plunger has been removed.
Figure 22:
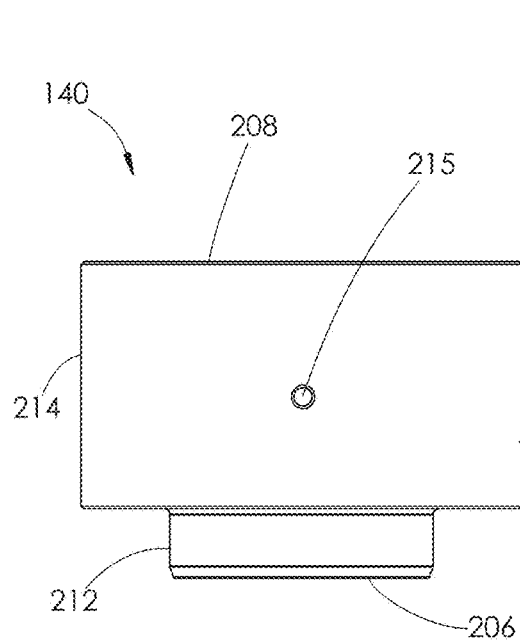
Figure 23:
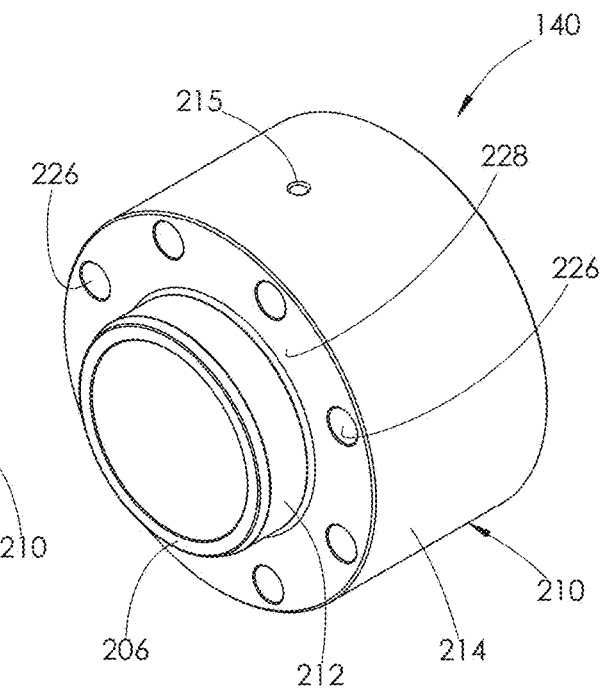
FIG. 23 is a perspective view of a first surface of the stuffing box shown in FIG. 22.
Figure 24:
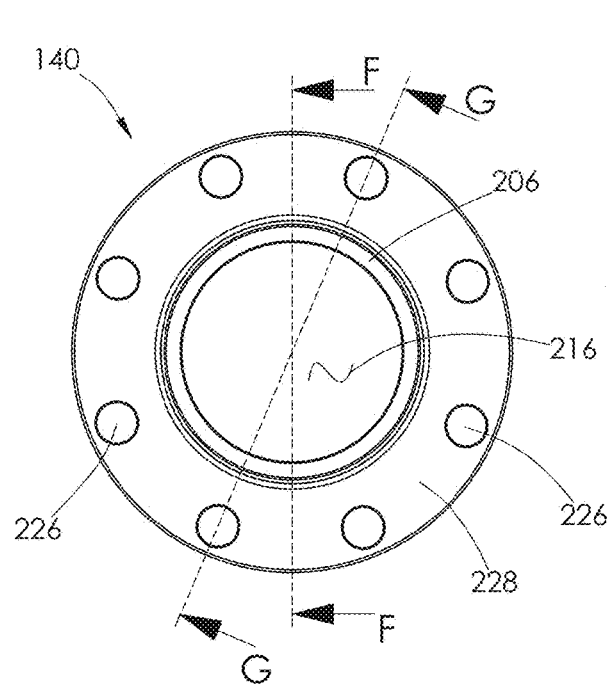
FIG. 24 is an elevational view of the first surface of the stuffing box shown in FIG. 22.

Continuing with FIGS. 20 and 21, the walls surrounding the horizontal bore 106 adjacent the second surface 110 of the housing 104 are sized to receive the first portion 212 of the stuffing box 140. The first portion 212 is installed within the horizontal bore 106 such that the base 228 of the second portion 214 abuts the second surface 110 of the housing 104. A portion of the second portion 214 is disposed within the central bore 138 formed in the connect plate 118. The stuffing box 140 is aligned on the housing 104 such that the passages 226 align with the second openings 230 in a one-to-one relationship.

With reference to FIGS. 20, 21, and 30-37, the stuffing box 140 is attached to the housing 104 using a retainer 232 and a fastening system 234. The retainer 232 has a generally cylindrical shape and comprises opposed first and second outer surfaces 236 and 238 joined by an intermediate surface 240. A central passage 242 interconnects the first and second outer surfaces 236 and 238. At least a portion of the central passage 242 has internal threads 244. A plurality of side passages 246 are formed in the retainer 232. Each passage 246 interconnects the central passage 242 and the intermediate surface 240. The passages 246 provide a pathway for lubricating oil to be introduced to the horizontal bore 106 during operation. The oil lubricates the moving parts within the housing 104 during operation.

Continuing with FIGS. 30-37, a plurality of passages 248 are formed in the retainer 232 and surround the central passage 242. Each passage 248 interconnects the first and second outer surfaces 236 and 238. The first surface 236 of the retainer 232 is positioned on the second surface 208 of the stuffing box 140 such that the passages 248 align with the passages 226 formed in the stuffing box 140, in a one-to-one relationship.

Figure 31:
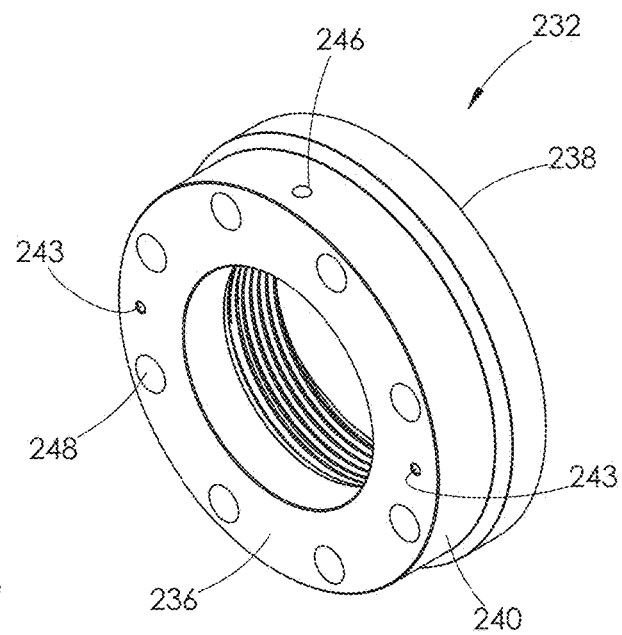
FIG. 31 is a perspective view of a first surface of the retainer shown in FIG. 30.
Figure 32:
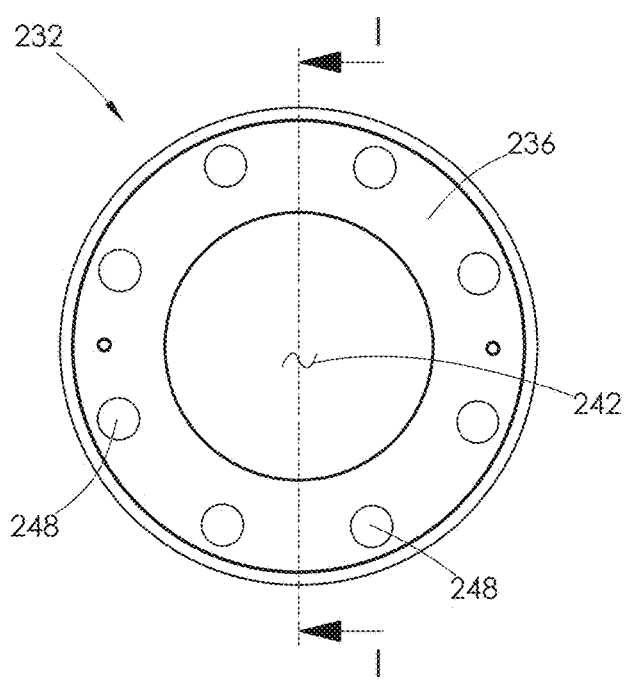
FIG. 32 is an elevational view of the first surface of the retainer shown in FIG. 30.
Figure 33:
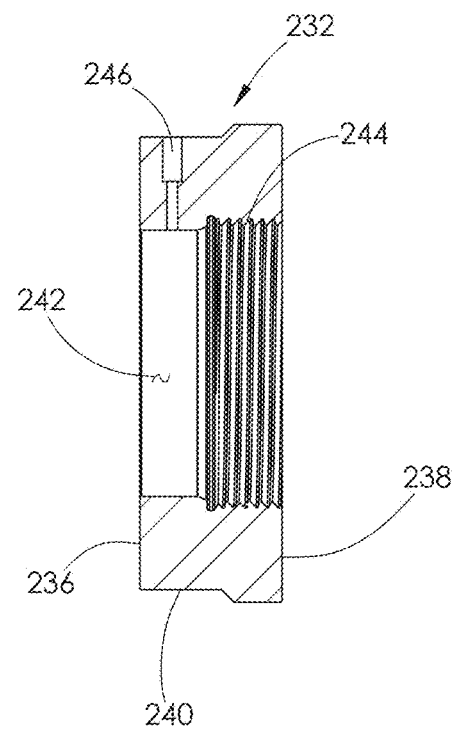
FIG. 33 is a cross-sectional view of the retainer shown in FIG. 32, taken along line I-I.
Figure 34:
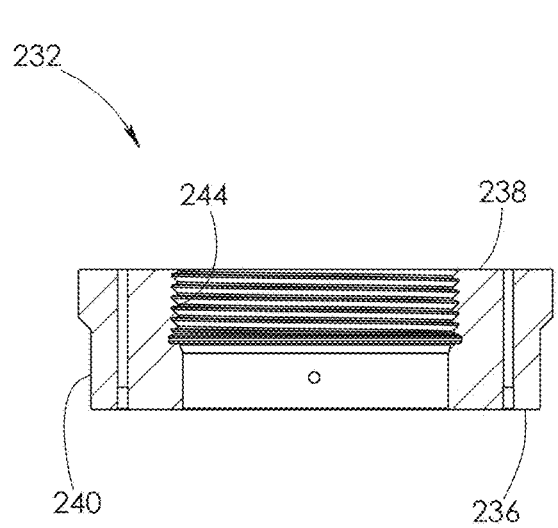
FIG. 34 is a cross-sectional view of the retainer shown in FIG. 36, taken along line J-J.
Figure 35:
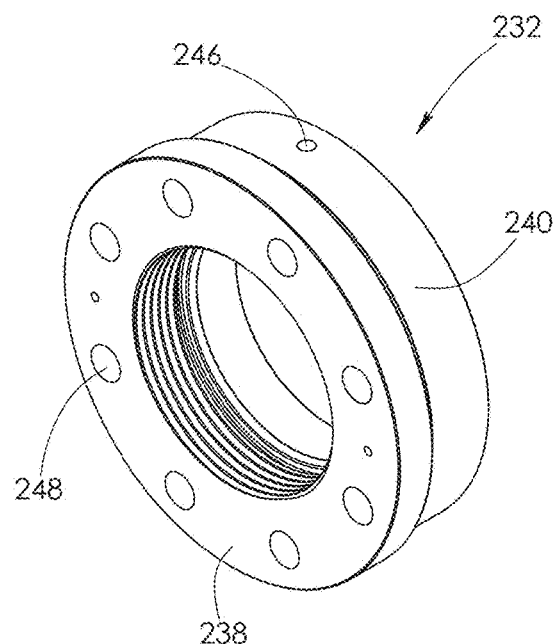
FIG. 35 is a perspective view of a second surface of the retainer shown in FIG. 30.
Figure 36:
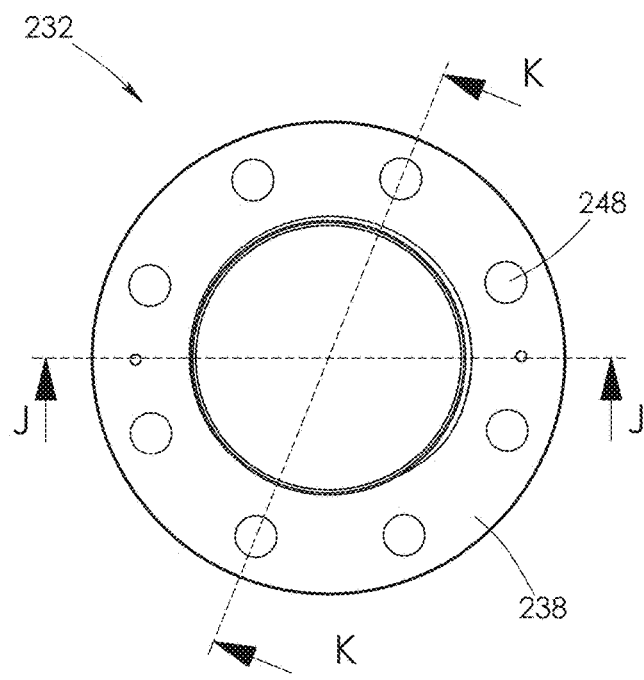
FIG. 36 is an elevational view of the second surface of the retainer shown in FIG. 30.
Figure 37:
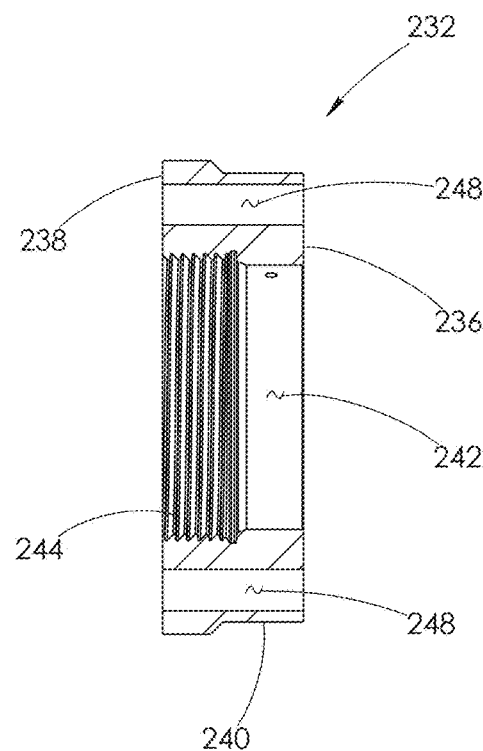
FIG. 37 is a cross-sectional view of the retainer shown in FIG. 36, taken along line K-K.
Figure 42:
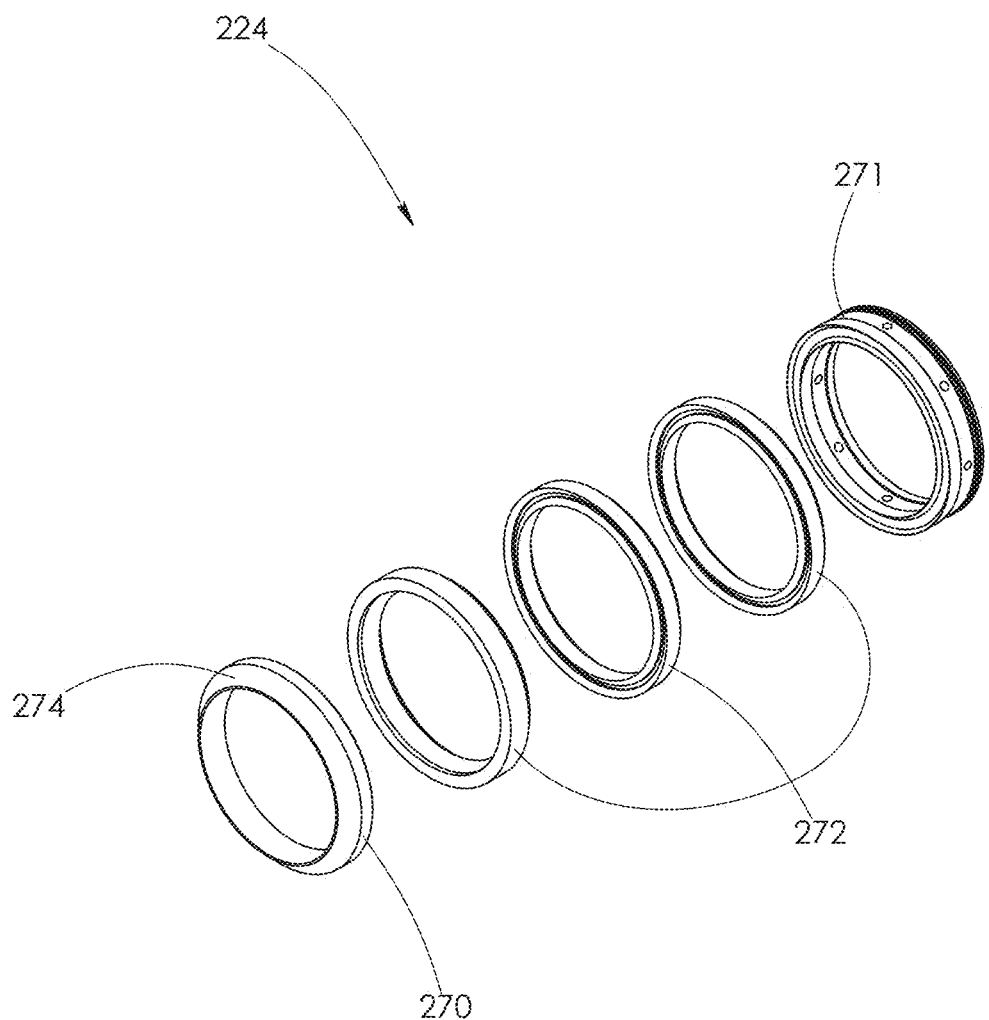
FIG. 42 is a perspective exploded view of the plunger packing shown in FIG. 38.
Figures 43, 44:
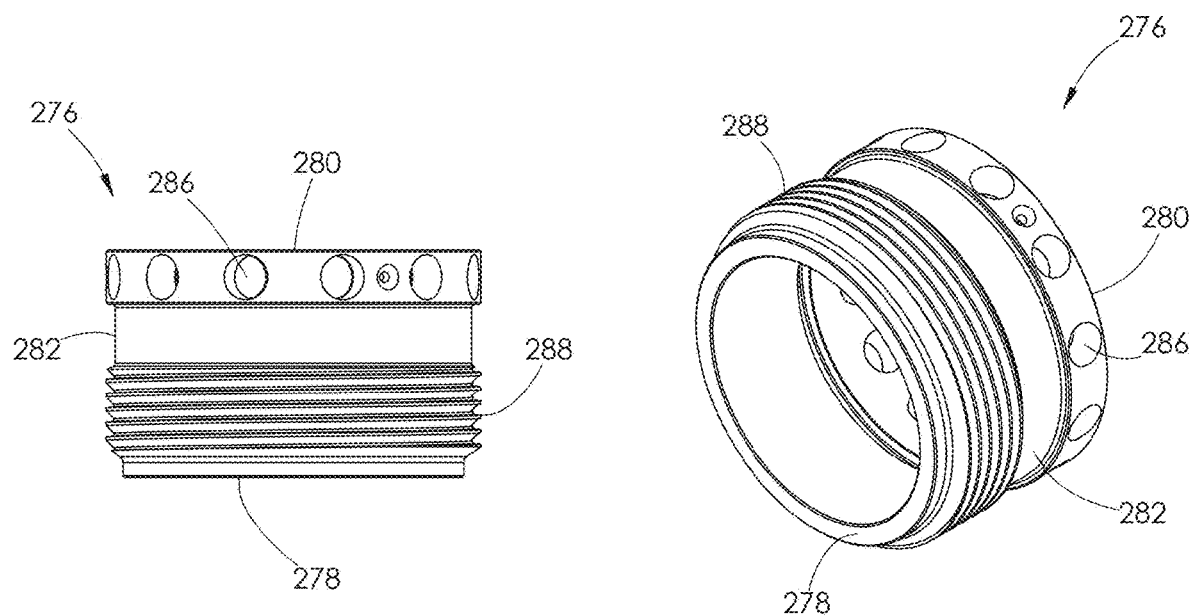
FIG. 43 is a top plan view of a packing nut shown installed within the retainer in FIG. 20.
FIG. 44 is a perspective view of a first surface of the packing nut shown in FIG. 43.
Figures 45, 46:
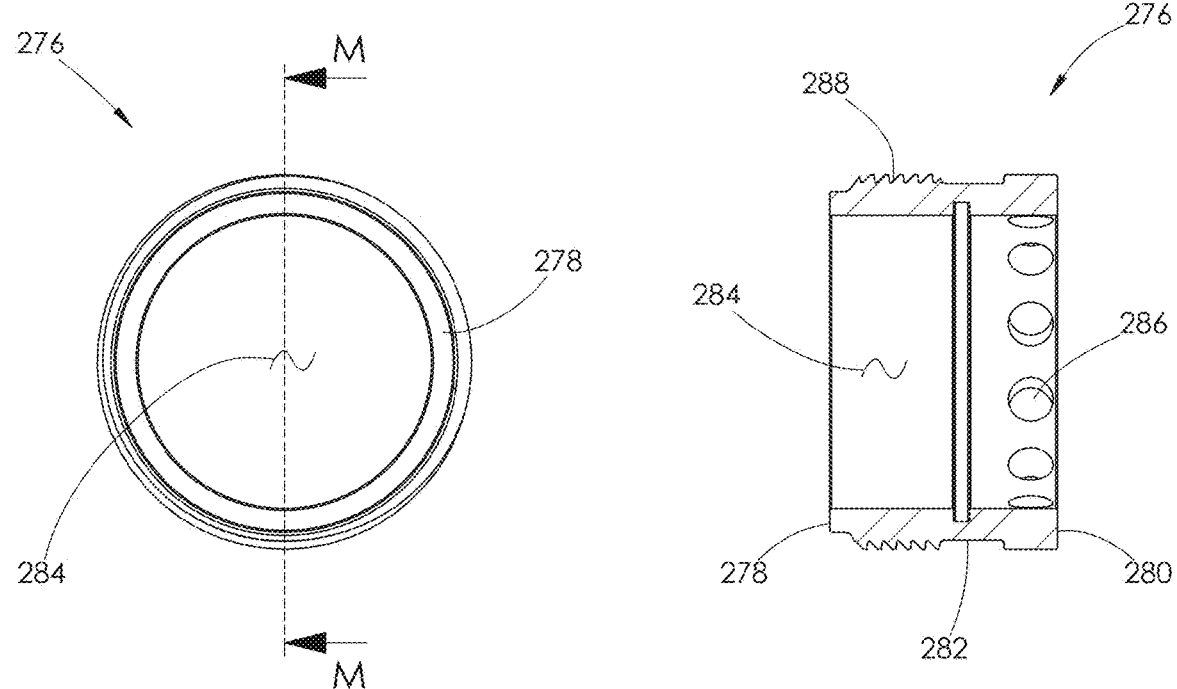
FIG. 45 is an elevational view of the first surface of the packing nut shown in FIG. 43.
FIG. 46 is a cross-sectional view of the packing nut shown in FIG. 45, taken along line M-M.
Figure 47:
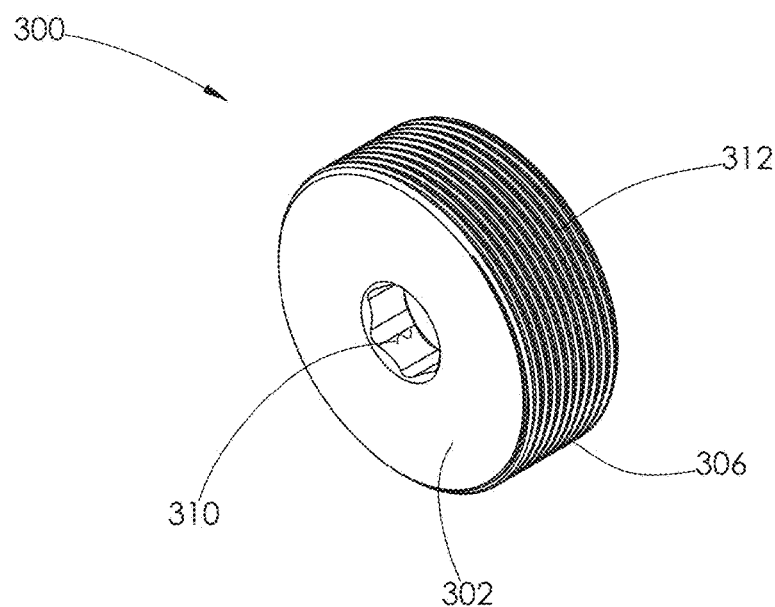
FIG. 47 is a perspective view of a first surface of a retainer shown installed within the housing in FIG. 20.
Figure 48:
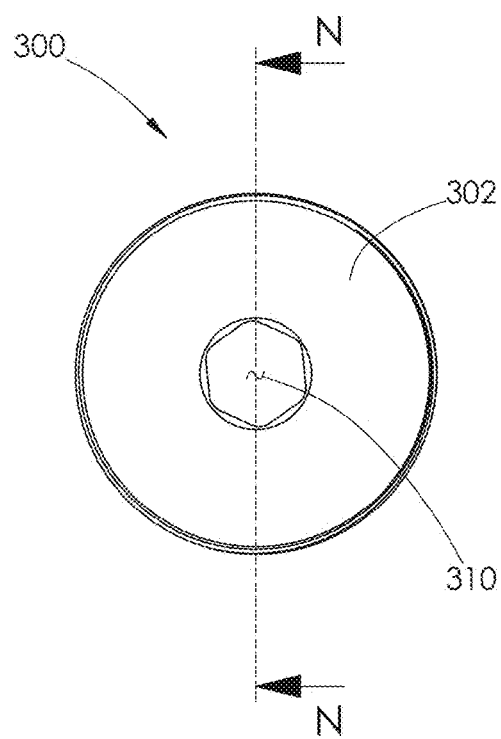
FIG. 48 is an elevational view of the first surface of the retainer shown in FIG. 47.
Figure 49:
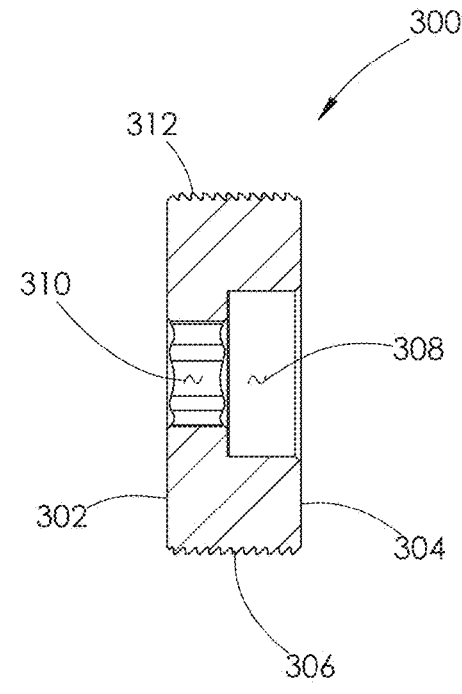
FIG. 49 is a cross-sectional view of the retainer shown in FIG. 48, taken along line N-N.

A pair of dowel pin holes 241 are formed in the second surface 208 of the stuffing box 140, as shown in FIGS. 27 and 28. A corresponding pair of dowel pin holes 243 are formed in the first surface 236 of the retainer 232, as shown in FIGS. 31 and 32. The holes 241 and 243 are configured for receiving a dowel pin. The dowel pin aligns the retainer 232 on the stuffing box 140 during assembly.

Turning back to FIGS. 20 and 21, the fastening system 234 secures both the retainer 232 and the stuffing box 140 to the housing 104. The fastening system 234 comprises a plurality of studs 250, nuts 252, and washers 254. A first end 256 of each stud 250 mates with one of the second openings 230 in the housing 104 in a one-to-one relationship. The passages 226 in the stuffing box 140 and the passages 248 in the retainer 232 subsequently receive the plural studs 250 projecting from the housing 104.

A second end 258 of each stud 250 projects from the second surface 238 of the retainer 232. The projecting second end 258 of each stud 250 receives a washer 254 and a nut 252. The nut 252 is turned until it tightly engages the washer 254 and the second surface 238 of the retainer 232, thereby securing the retainer 232 and the stuffing box 140 together. The retainer 232, in turn, holds the stuffing box 140 against the housing 104. The stuffing box 140 and the retainer 232 may be attached to and removed from the housing 104 without removing the connect plate 118.

When the first portion 212 of the stuffing box 140 is installed within the housing 104, a seal 260 is interposed between the walls of the housing 104 and outer surface of the first portion 212. The seal 260 is installed within a groove 262 formed in the walls of the housing 104. The seal 260 may be identical to the first seal 374, described with reference to FIGS. 65 and 71. In alternative embodiments, the seal may be identical to the second seal 376, described with reference to FIGS. 65 and 70.

The groove 262 is characterized by two sidewalls 264 joined by a base 266, as shown in FIG. 21. The sidewalls 264 may join the base 266 via radius corners or at a 90 degree angle. No grooves are formed in the first portion 212 of the stuffing box 140 for housing a seal. The seal 260 wears against the outer surface of the first portion 212 during operation. If the outer surface of the first portion 212 begins to erode, allowing fluid to leak around the seal 260, the stuffing box 140 may be replaced with a new stuffing box 140.

When the stuffing box 140 is attached to the housing 104 using the fastening system 234, a first end 256 of the studs 250 may be installed within the housing 104 such that they extend past the seal 260, as shown in FIG. 20. An edge of the studs 250 may not be purposely aligned with an edge of the seal 260 in order to prevent areas of high stress from being aligned with one another in the housing 104, potentially causing a stress riser.

Continuing with FIGS. 20, 21, and 38-42, a plunger packing 224 is installed within the central passage 216 of the stuffing box 140. The plunger packing 224 engages the tapered shoulder 222 and is positioned within the second section 220 of the central passage 216, as shown in FIGS. 20 and 21. A portion of the plunger packing 224 may extend into the central passage 242 of the retainer 232. The plunger packing 224 has a central passage 268 that aligns with the central passages 216 and 242 when the plunger packing 224 is installed within the stuffing box 140 and the retainer 232. In alternative embodiments, the plunger packing may be sized to not extend into the retainer.

The plunger packing 224 comprises a pair of outer ring seals 270 and 271 and at least one inner ring seal 272. The outer ring seals 270 and 271 may be made of metal while the inner ring seals 272 may be made of an elastomer material. The outer ring 270 has a tapered outer surface 274 that is sized to engage the tapered shoulder 222 formed in the central passage 216. The tapered engagement helps reduce stress in the stuffing box 140 during operation. In alternative embodiments, the walls surrounding the central passage of the stuffing box may include an annular shoulder rather than a tapered shoulder. In such embodiment, the plunger packing may have a flat outer ring configured to mate with the annular shoulder. A plurality of holes 275 are formed in the outer ring 271. The holes 275 are in fluid communication with the side passages 246 formed in the retainer 232 in order to deliver lubricating oil to the housing 104.

With reference to FIGS. 20, 21, and 43-46, a packing nut 276 is installed within the retainer 232 and engages the plunger packing 224. The packing nut 276 comprises a first surface 278 joined to an opposed second surface 280 by an intermediate surface 282. A central passage 284 extends through the packing nut 276 and interconnects the opposed first and second surfaces 278 and 280. A plurality of side holes 286 are formed in the packing nut 276 and interconnect the central passage 284 and the intermediate surface 282. The holes 286 are configured for engaging a tool used to grip the packing nut 276.

Continuing with FIGS. 43-46, external threads 288 are formed in a portion of the intermediate surface 282 of the packing nut 276. The external threads 288 are configured to mate with the internal threads 244 formed within the retainer 232, as shown in FIGS. 20 and 21. The mating threads 288 and 244 are buttress threads. The buttress threads are configured to handle a large amount of load using a low number of threads. Using a low number of threads allows the packing nut 276 to be quickly removed or installed within the retainer 232. In alternative embodiments, the packing nut and retainer may mate using traditional threads.

When the packing nut 276 is installed within the retainers 232, the first surface 278 of the packing nut 276 engages an outer ring seal 270 of the plunger packing 224. Such engagement compresses the plunger packing 224, creating a tight seal. After the packing nut 276 has been installed within a retainer 232, the central passage 284 within the packing nut 276 is aligned with the central passage 268 in the plunger packing 224.

Continuing with FIGS. 20 and 21, when the stuffing box 140 and the retainer 232 are attached to the housing 104, the central passages 216 and 242 align with the horizontal bore 106. Likewise, the central passages 268 and 284 in the installed plunger packing 224 and packing nut 276 align with the horizontal bore 106. Thus, the central passages 216, 242, 268, and 284 may be considered an extension of the horizontal bore 106. A plunger 290 is disposed with the installed plunger packing 224 and the packing nut 276, as shown in FIG. 20. In operation, the plunger 290 reciprocates within the horizontal bore 106 in order to pressurize fluid contained with the housing 104.

With reference to FIGS. 20, 21, and 47-49, the horizontal bore 106 is sealed at the first surface 108 of the housing 104 by a retainer 300. The retainer 300 has a first surface 302 joined to an opposed second surface 304 by an outer intermediate surface 306. A cutout 308 is formed in the second surface 304 for receiving a portion of a discharge valve guide 298. A central passage 310 is formed in the retainer 300 and interconnects the first surface 302 and the cutout 308. The walls surrounding the central passage 310 have a polygonal shape. The polygonal shape is configured to mate with a tool used to grip the retainer 300.

The intermediate surface 306 of the retainer 300 has external threads 312 that mate within internal threads 314 formed in the walls surrounding the horizontal bore 106 adjacent the first surface 108 of the housing 104, as shown in FIGS. 20 and 21. The mating threads 312 and 314 are buttress threads. The buttress threads are configured to handle a large amount of load using a low number of threads. Using a low number of threads allows the retainer 300 to be quickly removed from or installed within the housing 104. In alternative embodiments, the retainer may mate with the housing using traditional threads. In further alternative embodiments, the retainer may be secured to the housing using a fastening system, like the fastening system 234.

Figure 50:
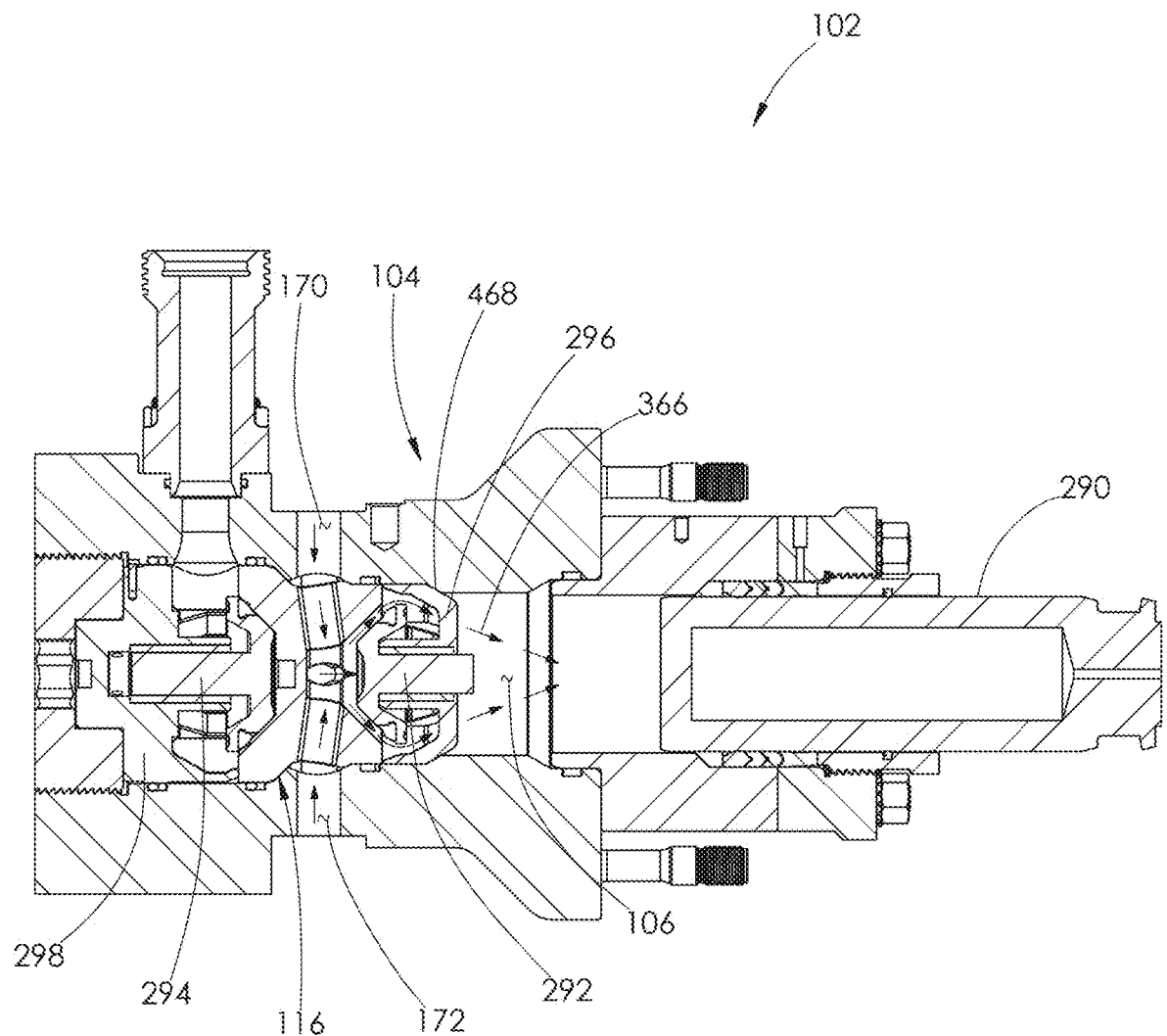
FIG. 50 is the cross-sectional view shown in FIG. 9, but the suction valve is spaced from the fluid routing plug.
Figure 51:
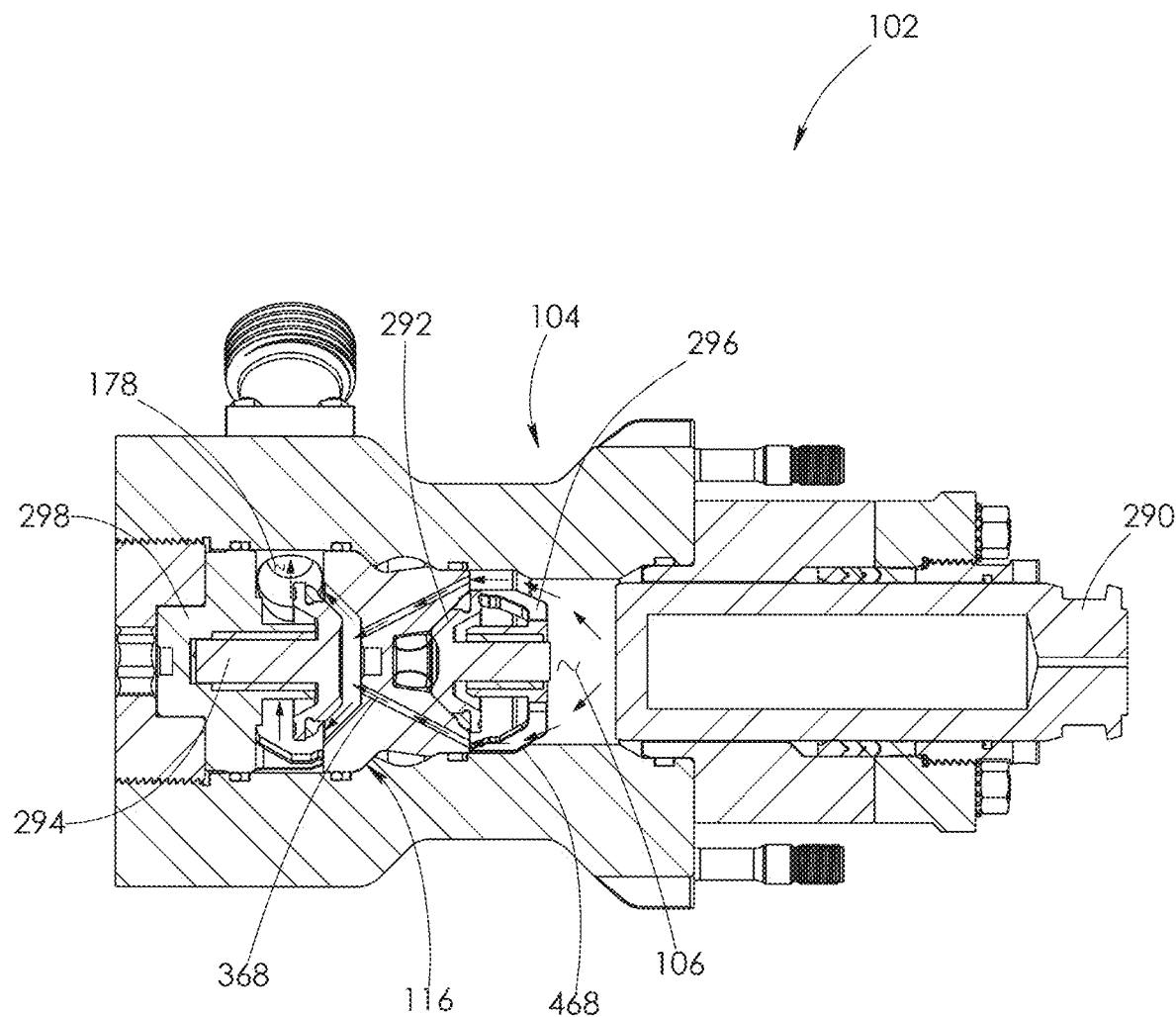
FIG. 51 is the cross-sectional view shown in FIG. 50, but the plunger has extended into the housing, the suction valve is sealed against the fluid routing plug, and the discharge valve is spaced from the fluid routing plug.

Turning now to FIGS. 50 and 51, the fluid routing plug 116 is installed within a medial section of the horizontal bore 106. The fluid routing plug 116 is configured to engage with a suction valve 292 on one side and a discharge valve 294 on the opposite side. In operation, the suction and discharge valves 292 and 294 move axially along an axis that is parallel to or aligned within the central longitudinal axis 114 of the housing 104, shown in FIG. 9, as the valves 292 and 294 move at alternating times between an open and closed position. In the closed position, the valves 292 and 294 are pressed against the fluid routing plug 116, preventing fluid from exiting the plug 116. In the open position, the valves 292 and 294 are spaced from the fluid routing plug 116, allowing fluid to flow from the plug 116.

As will be described in more detail herein, axial movement of the suction valve 292 is limited by a suction valve guide 296 installed within the housing 104. Likewise, axial movement of the discharge valve 294 is limited by the discharge valve guide 298 installed within the housing 104.

Turning now to FIGS. 52-64, the fluid routing plug 116 comprises a body 316 having opposed first and second outer surfaces 318 and 320 joined by an intermediate outer surface 322. The first outer surface 318 may also be referred to as the suction side of the fluid routing plug 116. The second outer surface 320 may also be referred to as the discharge side of the fluid routing plug 116. A central longitudinal axis 324 extends through the body 316 and both surfaces 318 and 320, as shown in FIG. 55.

Figure 58:
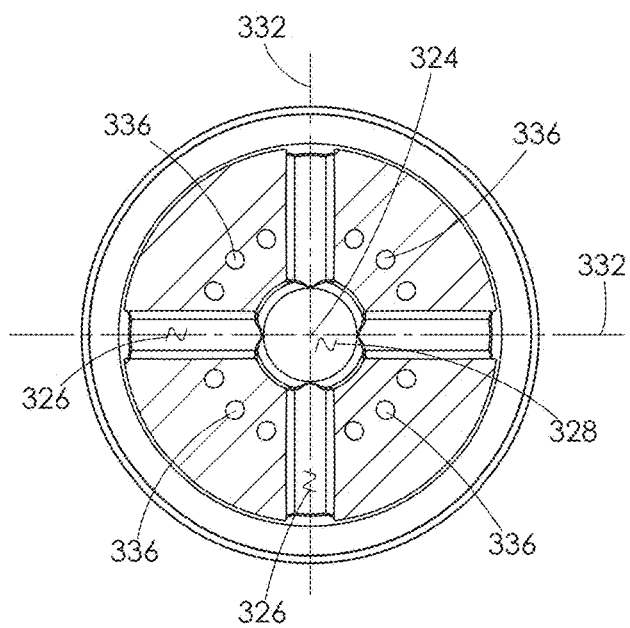
FIG. 58 is a cross-sectional view of the fluid routing plug shown in FIG. 57, taken along line P-P.

A plurality of first fluid passages 326 are formed within the body 316 and interconnect the intermediate surface 322 and the first surface 318. The first fluid passages 326 interconnect the intermediate surface 322 and the first surface 318 by way of an axial-blind bore 328, as shown in FIG. 55. The blind bore 328 extends along the central longitudinal axis 324 of the body 316. The first fluid passages 326 each open into the blind bore 328 via a plurality of openings 330. A longitudinal axis 332 of each first fluid passage 326 intersects the central longitudinal axis 324 of the body 316, as shown in FIG. 58.

The fluid routing plug 116 shown in FIGS. 52-64 has four first fluid passages 326 formed in its body 316. The first fluid passages 326 are equally spaced around the body 316. In alternative embodiments, more than four or less than four first fluid passages may be formed in the body and may be equally or unequally spaced apart from one another.

Figure 55:
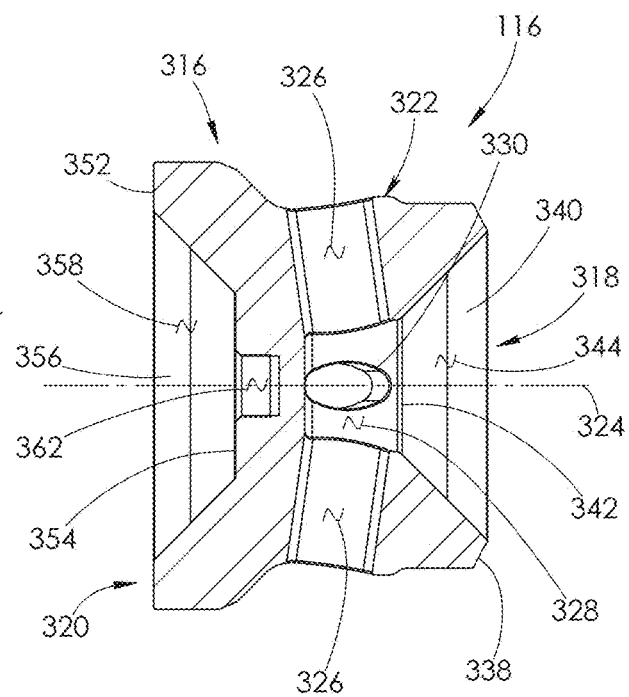
FIG. 55 is a cross-sectional view of the fluid routing plug shown in FIG. 54, taken along line O-O.

Continuing with FIG. 55, the first fluid passages 326 extend between the intermediate surface 322 and the blind bore 328 at a non-right angle relative to the central longitudinal axis 324—the acute angle facing the second surface 320 of the body 316. Forming the first fluid passages 326 at such an angle reduces the amount of stress in the fluid routing plug 116 as fluid flows through the first fluid passages 326. Forming the first fluid passages 326 at such angle also helps direct fluid flow towards the blind bore 328 and the first surface 318.

Figure 57:
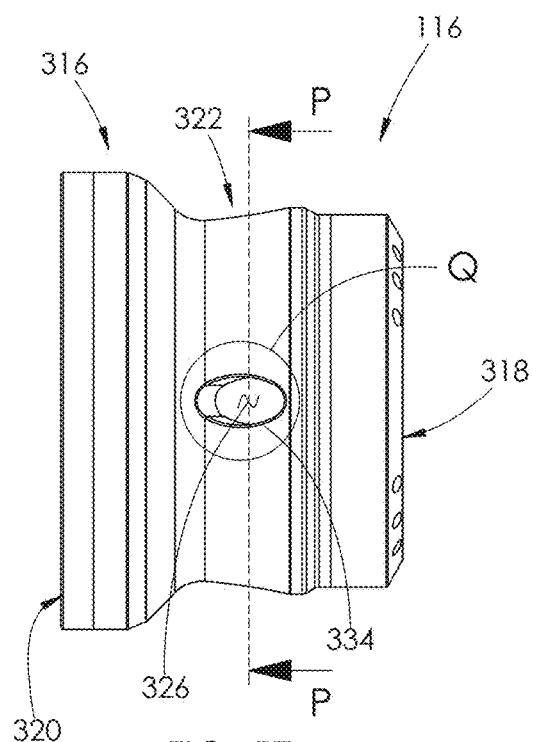
FIG. 57 is a top plan view of the fluid routing plug shown in FIG. 52.
Figure 59:
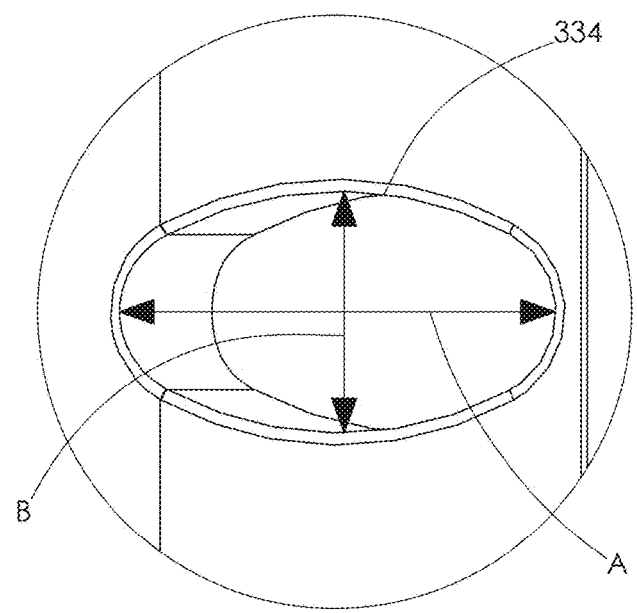
FIG. 59 is an enlarged view of area Q shown in FIG. 57.
Figures 60, 61:
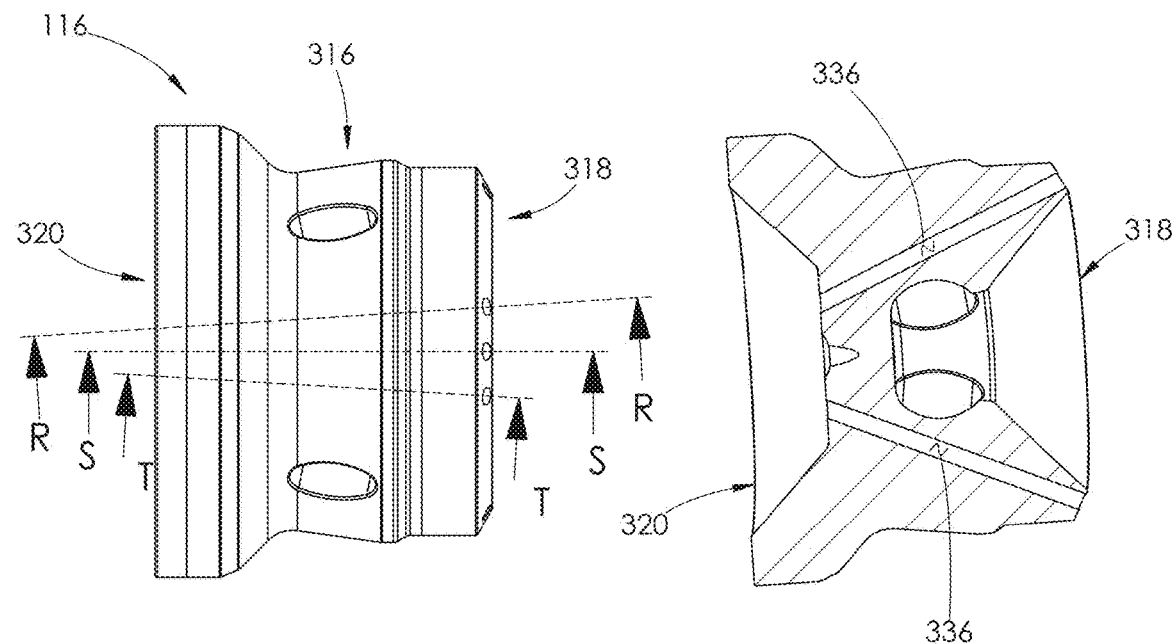
FIG. 60 is the top plan view of the fluid routing plug shown in FIG. 57, but the plug has been slightly rotated.
FIG. 61 is a cross-sectional view of the fluid routing plug shown in FIG. 60, taken along line R-R.
Figures 62, 63:
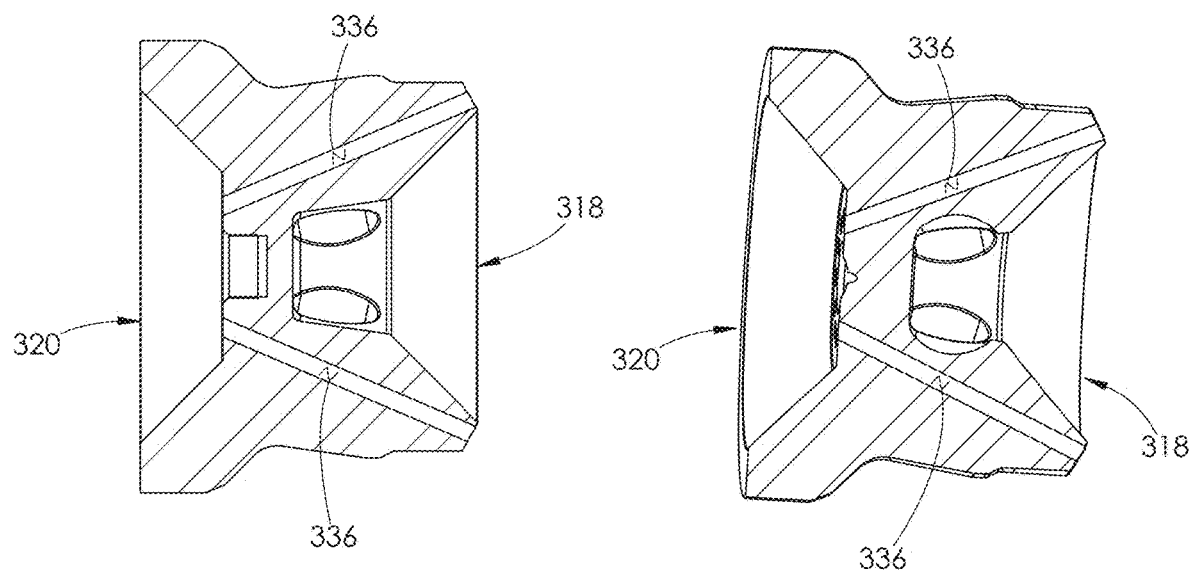
FIG. 62 is a cross-sectional view of the fluid routing plug shown in FIG. 60, taken along line S-S.
FIG. 63 is a cross-sectional view of the fluid routing plug shown in FIG. 60, taken along line T-T.

With reference to FIGS. 57 and 59, the first fluid passages 326 have an oval cross-sectional shape, as shown by an opening 334 of each first fluid passage 326 on the intermediate surface 322. Each opening 334 has a length A and a width B, as shown in FIG. 59. The first fluid passages 326 are formed in the body 316 such that the length A extends along an axis that is parallel to the central longitudinal axis 324 of the body 316. Orienting the first fluid passages 326 as such helps reduce the amount of stress in the body 316 as fluid flows through the first fluid passages 326 and helps maximize the rate of fluid flow through the passages 326. In alternative embodiments, the first fluid passages may have a different cross-sectional shape, such as a circular or oblong shape. In further alternative embodiments, the first fluid passages may be shaped like the first fluid passages 910, shown in FIGS. 121 and 124.

With reference to FIGS. 60-63, the fluid routing plug 116 further comprises a plurality of second fluid passages 336 formed in the body 316. The second fluid passages 336 each have a circular cross-sectional shape and interconnect the first and second surfaces 318 and 320 of the body 316. In alternative embodiments, the second fluid passages may have a different cross-sectional shape, such as an oval or oblong shape.

Unlike the first fluid passages 326, the second fluid passages 336 do not intersect an axially blind bore. Rather, each second fluid passage 336 extends between the first and second surface 318 and 320 along a straight-line path. The second fluid passages 336 and the first fluid passages 326 do not intersect and are positioned offset from one another, as shown in FIG. 58. Positioning the first and second passages 326 and 336 offset from one another helps minimize the stress in the fluid routing plug 116 during operation. The fluid routing plug 116 shown in FIGS. 52-64 has twelve second fluid passages 336 formed in its body 316. In alternative embodiments, more or less than twelve second fluid passages may be formed in the body.

Each second fluid passage 336 extends between the first and second surfaces 318 and 320 along a different axis, as shown in FIGS. 60-63. Each axis is positioned at a non-zero angle relative to the central longitudinal axis 324 of the body 316. Forming each second passage 336 along a different axis helps alleviate stress in the fluid routing plug 116 during operation and helps maximize the rate of fluid flow through the second passages 336.

Turning back to FIGS. 53, 55, and 56, the first surface 318 of the body 316 includes an outer rim 338 joined to a tapered wall 340. The outer rim 338 may taper slightly between the intermediate surface 322 and the tapered wall 340, as shown in FIG. 55. Such taper provides more surface area for the tapered wall 340 without increasing the length of the intermediate surface 322. The tapered wall 340 extends between an entrance 342 of the blind bore 328 and the outer rim 338 at an angle of at least 30 degrees relative to the central longitudinal axis 324 of the body 316. Preferably, the tapered wall 340 is formed at an angle of 45 degrees relative to the central longitudinal axis 324 of the body 316, as is shown in FIG. 55. As will be described in more detail later herein, the tapered wall 340 forms a cavity 344 within the first surface 318 of the body 316 that is sized to receive a sealing element 346 of the suction valve 292, as shown in FIGS. 72-76.

Figure 53:
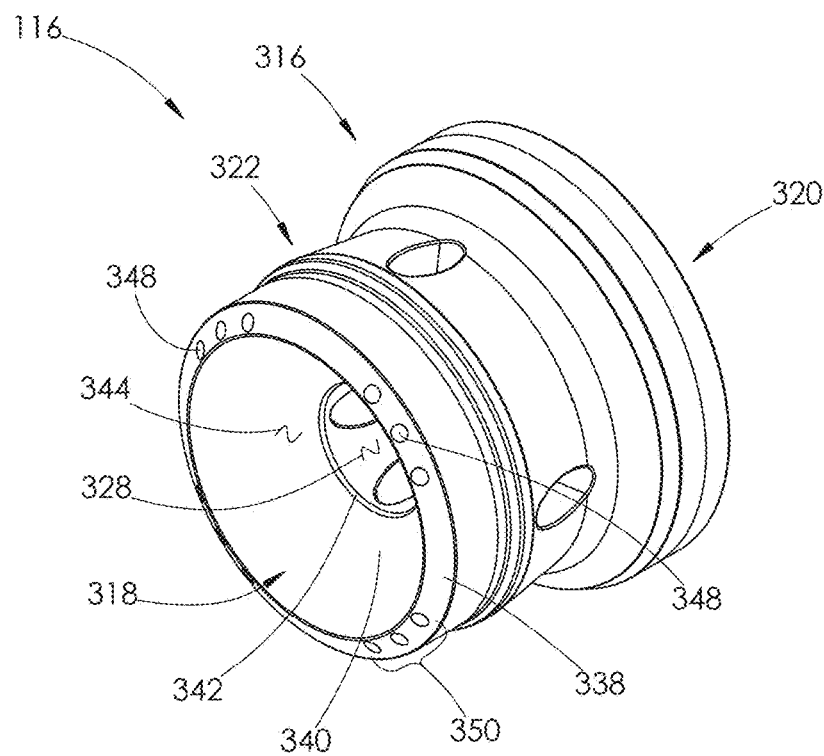
FIG. 53 is a perspective view of a first surface of the fluid routing plug shown in FIG. 52.
Figure 56:
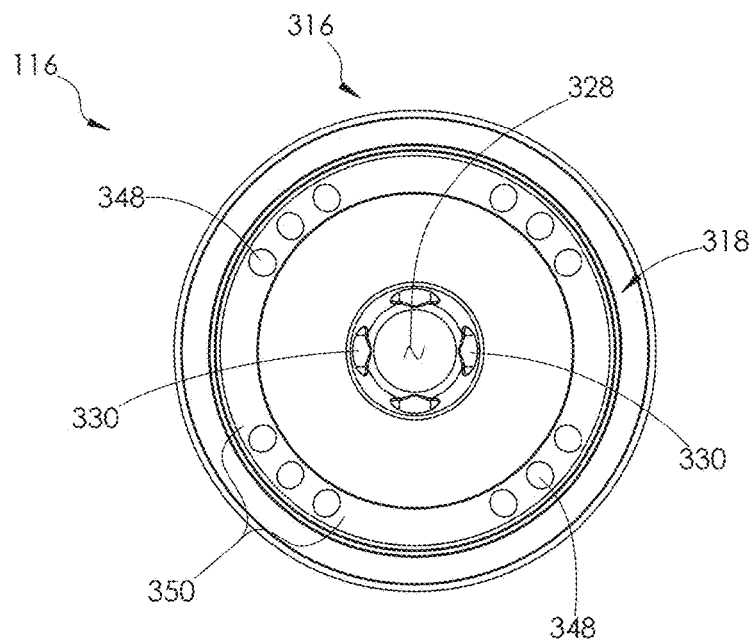
FIG. 56 is an elevational view of the first surface of the fluid routing plug shown in FIG. 52.

Continuing with FIGS. 53 and 56, the second fluid passages 336 open on the outer rim 338 of the first surface 318, as shown by the openings 348. The second fluid passages 336 are formed within the body 316 such that the openings 348 are positioned in groups 350 around the outer rim 338. The first surface 318 shown in FIG. 59 comprises four groups 350 of openings 348, each group 350 comprising three openings 348. Adjacent openings 348 within each group 350 are equally spaced. The spacing between the nearest openings 348 of adjacent groups 350 exceeds the spacing between adjacent openings 348 within a single group 350. Spacing the openings 348 in groups 350 helps achieve the ideal velocity of fluid flow through the fluid routing plug 116 and allows the second fluid passages 336 to be offset from the first fluid passages 326, as shown in FIG. 58. In alternative embodiments, the openings may be spaced in differently sized groups or different patterns than that shown in FIG. 56.

Figure 52:
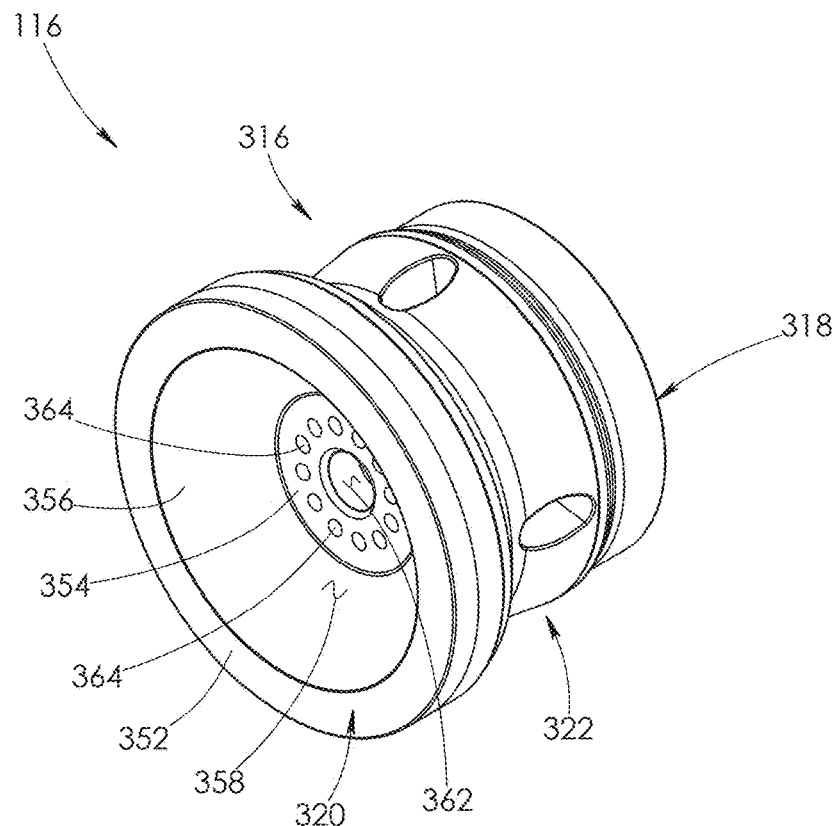
FIG. 52 is a perspective view of a second surface of a fluid routing plug shown installed within the fluid end section in FIG. 50.
Figure 54:
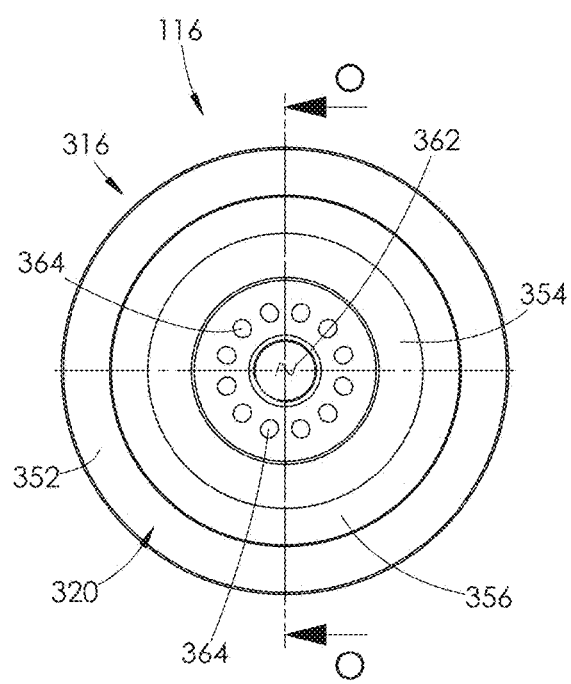
FIG. 54 is an elevational view of the second surface of the fluid routing plug shown in FIG. 52.

With reference to FIGS. 52, 54, and 55, the second surface 320 of the body 316 comprises an outer rim 352 joined to a central base 354 by a tapered wall 356. The tapered wall 356 extends between the central base 354 and the outer rim 352 at an angle of at least 30 degrees relative to the central longitudinal axis 324 of the body 316. Preferably, the tapered wall 356 is formed at an angle of 45 degrees relative to the central longitudinal axis 324 of the body 316, as is shown in FIG. 55. As will be described in more detail later herein, the tapered wall 356 forms a cavity 358 within the second surface 320 of the body 316 that is sized to receive a sealing element 360 of the discharge valve 294, as shown in FIGS. 85-89.

Continuing with FIGS. 52, 54, and 55, a blind bore 362 is formed in the center of the central base 354. The walls surrounding the blind bore 362 may be configured to mate with a tool used to grip the fluid routing plug 116. For example, the walls surrounding the blind bore 362 may be threaded. The second fluid passages 336 open on the central base 354 of the second surface 320, as shown by the openings 364 in FIGS. 52 and 54. The second fluid passages 336 are formed within the body 316 such that the openings 364 surround the opening of the blind bore 362. The openings 364 shown in FIG. 54 are all equally spaced from one another around the opening of the blind bore 362. In alternative embodiments, the openings of the second fluid passages on the central base may not all be equally spaced apart from one another.

Continuing with FIG. 55, in order to provide space for the openings 364 on the second surface 320, the tapered wall 356 has a greater diameter than the tapered wall 340 formed in the first surface 318. Thus, as will be described in more detail herein, the sealing element 360 of the discharge valve 294 is larger in size than the sealing element 346 of the suction valve 292, as shown in FIGS. 72-76 and 85-89.

Turning back to FIGS. 50 and 51, the fluid routing plug 116 is installed within the horizontal bore 106 such that the first fluid passages 326 are in fluid communication with the upper and lower intake bores 170 and 172. The upper and lower intake bores 170 and 172 direct fluid into the first fluid passages 326 of the fluid routing plug 116. The first fluid passages 326 direct the fluid into the blind bore 328 and towards the first surface 318 of the fluid routing plug 116.

When the plunger 290 is retracted from the housing 104, the fluid flowing through the first fluid passages 326 forces the suction valve 292 to move axially away from the first surface 318. Such position is considered an open position of the suction valve 292. When the suction valve 292 is spaced from the first surface 318, fluid flows out of the blind bore 328, through the gap between the first surface 318 and the suction valve 292. From there, the fluid flows around the suction valve 292 and the suction valve guide 296 and into the horizontal bore 106. A first fluid flow path for the fluid to be pressurized is shown by the arrows 366 in FIG. 50.

With reference to FIG. 51, as the plunger 290 extends into the horizontal bore 106, the plunger 290 forces fluid in the horizontal bore 106 back towards the fluid routing plug 116. Pressurized fluid forced back towards the fluid routing plug 116 by the plunger 290 forces the suction valve 292 to seal against the first surface 318, sealing the entrance 342 of the blind bore 328. Such position is considered a closed position of the suction valve 292. Once the entrance 342 of the blind bore 328 is sealed, the only place for fluid to flow is through the openings 348 of the second fluid passages 336 on the outer rim 338 of the first surface 318.

Fluid flows into the openings 348 on the first surface 318 and through the second passages 336 towards the second surface 320 of the fluid routing plug 116. The pressurized fluid at the second surface 320 forces the discharge valve 294 to move axially away from the second surface 320, unsealing the openings 364 of the second fluid passages 336. Such position is considered an open position of the discharge valve 294. Pressurized fluid is then allowed to flow around the discharge valve 294 and into the discharge bore 178. A second fluid flow path for the pressurized fluid is shown by the arrows 368 in FIG. 51.

When the plunger 290 retracts from the housing 104, the fluid pressure on the back side of the discharge valve 294 is greater than the fluid pressure within the fluid routing plug 116. Such pressure differential causes the discharge valve 294 to seal against the second surface 320, sealing the openings 364 of the second fluid passages 336. Such position is considered the closed position of the discharge valve 294.

Figure 64:
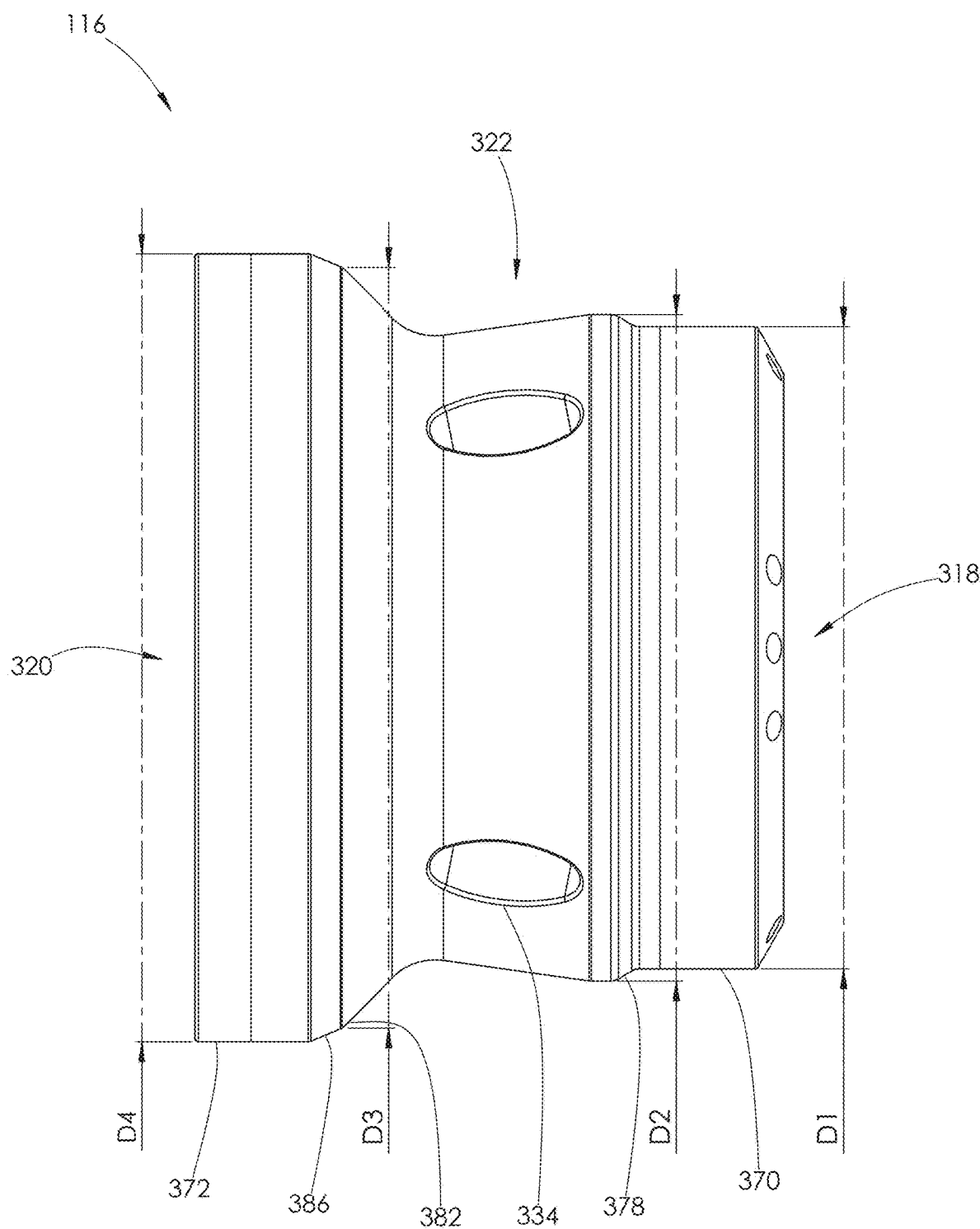
FIG. 64 is an enlarged view of the fluid routing plug shown in FIG. 60.

Turning to FIG. 64, the intermediate surface 322 of the fluid routing plug 116 varies in diameter throughout its length and generally decreases in size from its second surface 320 to its first surface 318. The intermediate surface 322 comprises a first sealing surface 370 positioned adjacent the first surface 318 and a second sealing surface 372 positioned adjacent the second surface 320. The first and second sealing surfaces 370 and 372 each extend around the entire intermediate surface 322 in an endless manner and surround the longitudinal axis 324 of the body 316. The first and second sealing surfaces 370 and 372 shown in FIG. 64 are annular. In alternative embodiments, the first and second sealing surfaces may have non-annular shape, such as an oval shape.

Figure 70:
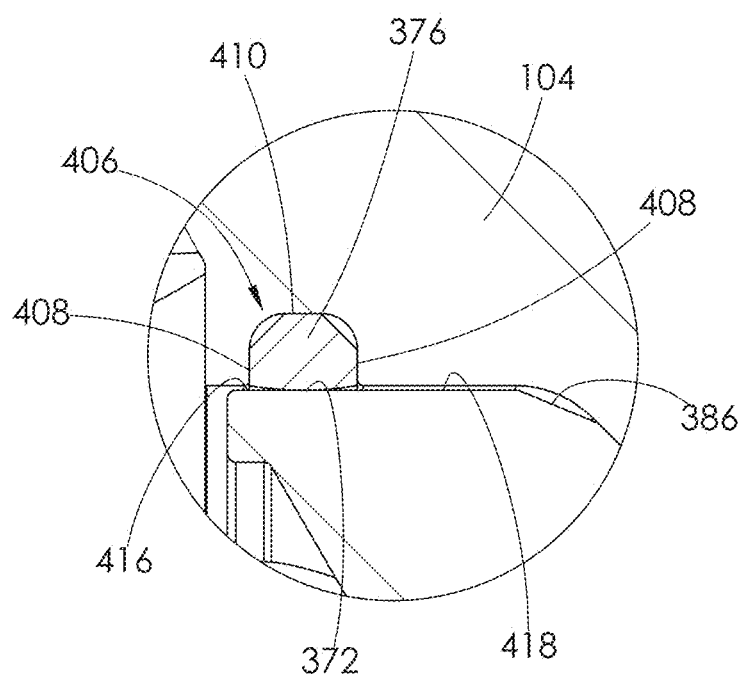
FIG. 70 is an enlarged view of area Y shown in FIG. 65.
Figure 71:
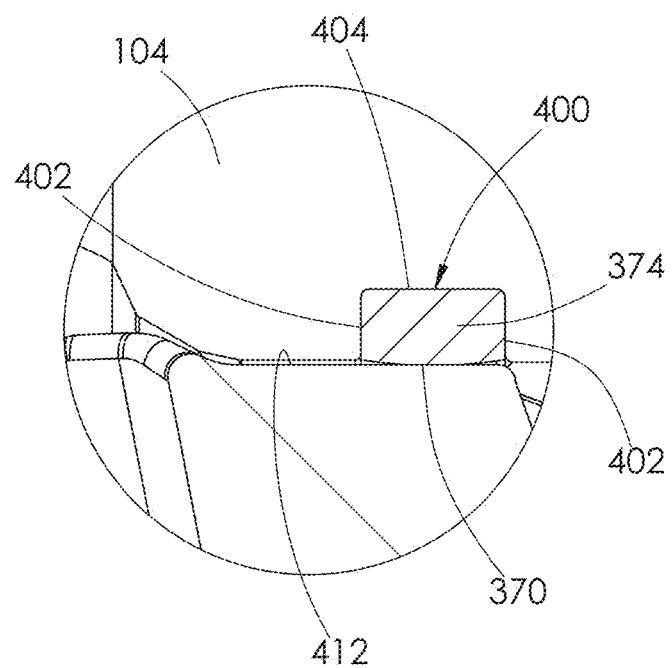
FIG. 71 is an enlarged view of area Z shown in FIG. 65.

The first sealing surface 370 has a smaller diameter than the second sealing surface 372. As will be described in more detail herein, the first and second sealing surfaces 370 and 372 are configured to engage a first and second seal 374 and 376 installed within the housing 104, as shown in FIGS. 70 and 71.

Continuing with FIG. 64, the intermediate surface 322 of the fluid routing plug 116 further comprises a first bevel 378 positioned between the opening 334 of the first fluid passages 326 and the first sealing surface 370. The first bevel 378 extends around the entire intermediate surface 322 in an endless manner and surrounds the longitudinal axis 324 of the body 316. The first bevel 378 shown in FIG. 64 is annular. In alternative embodiments, the first bevel may have a non-annular shape, such as an oval shape.

Figure 69:
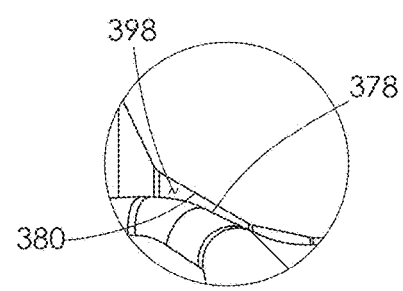
FIG. 69 is an enlarged view of area X shown in FIG. 65.

A maximum diameter of the first bevel 378 is greater than the diameter of the first sealing surface 370. The maximum diameter of the first bevel 378 is positioned adjacent the openings 334 of the first fluid passages 326 and a minimum diameter of the first bevel 378 is positioned adjacent the first sealing surface 370. As will be described in more detail later herein, the first bevel 378 corresponds with a first beveled surface 380 formed in the housing 104, as shown in FIGS. 65 and 69.

The intermediate surface 322 also comprises a second bevel 382 positioned between the second sealing surface 372 and the openings 334 of the first fluid passages 326. The second bevel 382 extends around the entire intermediate surface 322 in an endless manner and surrounds the longitudinal axis 324 of the body 316. The second bevel 382 shown in FIG. 64 is annular. In alternative embodiments, the first bevel may have non-annular shape, such as an oval shape.

A maximum diameter of the second bevel 382 is positioned adjacent the second sealing surface 372 and a minimum diameter of the second bevel 382 is positioned adjacent the openings 334 of the first fluid passages 326. The second sealing surface 372 and the maximum diameter of the second bevel 382 both have a greater diameter than the maximum diameter of the first bevel 378 and the diameter of the first sealing surface 370.

Figure 65:
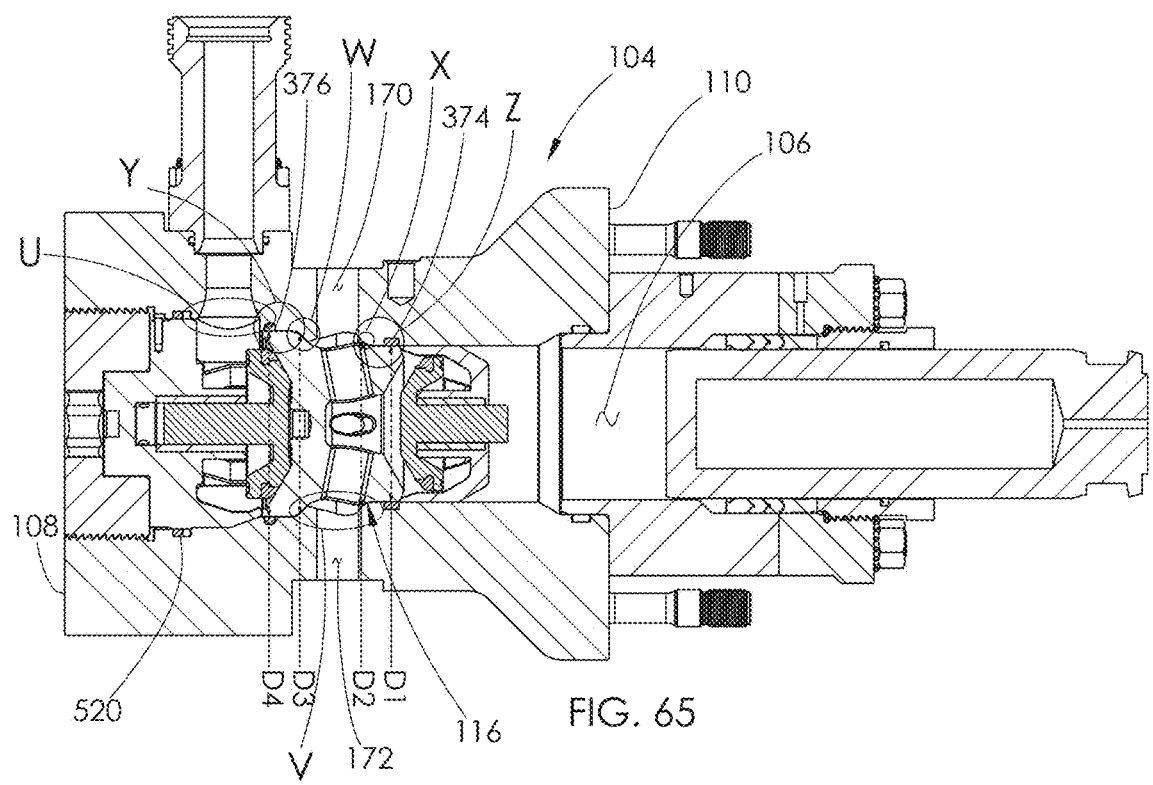
FIG. 65 is the cross-sectional view shown in FIG. 50.
Figure 68:
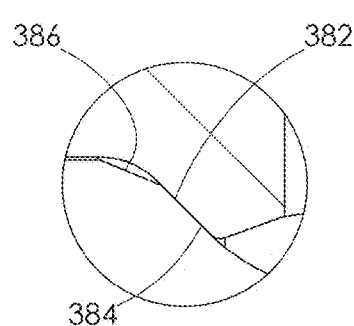
FIG. 68 is an enlarged view of area W shown in FIG. 65.

As will be described in more detail later herein, the second bevel 382 corresponds with a second beveled surface 384 formed in the housing 104, as shown in FIGS. 65 and 68. A small transition bevel 386 may extend between the second sealing surface 372 and the second bevel 382. However, the transition bevel 386 does not engage the second beveled surface 384, as shown in FIG. 68. The transition bevel 386 helps reduce friction between the fluid routing plug 116 and the housing 104 during installation.

As described above, the first and second bevels 378 and 382 are positioned between the first and second sealing surfaces 370 and 372. The first and second bevels 378 and 382 help alleviate stress in the fluid routing plug 116 during operation. In alternative embodiments, the intermediate surface may only include a single bevel positioned between the first and second sealing surfaces.

Continuing with FIG. 64, the various diameters of the intermediate surface 322 are shown in more detail. The first sealing surface 370 has a diameter D1. The maximum diameter of the first bevel 378 has a diameter D2. The maximum diameter of the second bevel 382 has a diameter D3, and the second sealing surface 372 has a diameter D4. As described above in detail, D4 is greater than D3, D3 is greater than D2, and D2 is greater than D1.

With reference to FIG. 65, in addition to being shaped to alleviate stress, the intermediate surface 322 is shaped to allow for easy installation of the fluid routing plug 116 within the horizontal bore 106. The fluid routing plug 116 is installed into the horizontal bore 106 at the first outer surface 108 of the housing 104. The fluid routing plug 116 is installed with the first surface 318 entering the horizontal bore 106 before the second surface 320. The fluid routing plug 116 is pushed into the horizontal bore 106 until the first sealing surface 370 engages the first seal 374 and the second sealing surface 372 engages the second seal 376.

The first sealing surface 370 and first bevel 378 have smaller diameters than the second seal 376 and the second beveled surface 384. Thus, clearance exists between these features as the fluid routing plug 116 is installed into the horizontal bore 106. Providing such clearance during installation avoids unnecessary wear to both the housing 104 and fluid routing plug 116 during installation.

Figure 67:
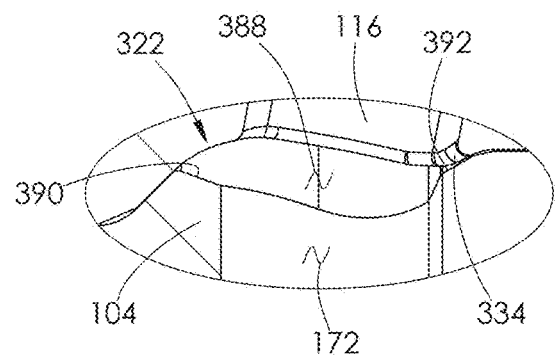
FIG. 67 is an enlarged view of area V shown in FIG. 65.

With reference to FIGS. 65 and 67, once the fluid routing plug 116 is installed within the housing 104, an annular chamber 388 is formed between the walls of the housing 104 and the intermediate surface 322. The intake bores 170 and 172 open into the chamber 388. Only a couple of the openings 334 of the first fluid passages 326 may align with the intake bores 170 and 172. Alternatively, the fluid routing plug 116 may be installed within the housing 104 such that none of the openings 334 directly align with the intake bores 170 and 172. The chamber 388 provides a pathway for fluid from the intake bores 170 and 172 to flow around the fluid routing plug 116 and into the openings 334 of the first fluid passages 326. The chamber 388 also provides space for proppant or other debris to collect during operation.

Figure 66:
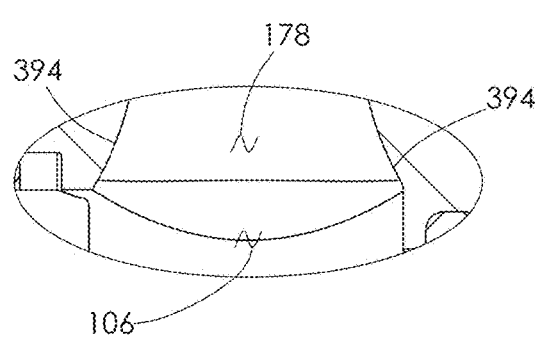
FIG. 66 is an enlarged view of area U shown in FIG. 65.

Continuing with FIG. 67, the walls of the housing 104 surrounding the horizontal bore 106 immediately adjacent the intake bores 170 and 172 are beveled, as shown by bevels 390 and 392. The bevels 390 and 392 help reduce stress in the housing 104 during operation and increase the size of the annular chamber 388. In alternative embodiments, the bevels 390 and 392 may be larger than those shown in FIG. 67 in order to increase the size of the chamber 388, as shown for example in FIG. 100F. Similarly, the walls of the housing 104 surrounding the horizontal bore 106 immediately adjacent the discharge bore 178 are also beveled, as shown by the bevel 394 in FIG. 66. The bevel 394 reduces stress in the housing 104 during operation and helps direct fluid into the discharge bore 178.

Continuing with FIGS. 65 and 68, the second bevel 382 and the second beveled surface 384 are shown in more detail. The second beveled surface 382 is positioned between the second seal 376 and the intake bores 170 and 172. The second beveled surface 384 has an annular shape and surrounds the horizontal bore 106 in an endless manner. In alternative embodiments, the second beveled surface may have a shape that conforms to the shape of the second bevel formed in the fluid routing plug.

When the fluid routing plug 116 is installed within the horizontal bore 106, the second bevel 382 seats against the second beveled surface 384, as shown in FIG. 68. The bevels 382 and 384 meet at a non-right angle. Such angle reduces stress in the fluid routing plug 116 and the housing 104 during operation. The bevels 382 and 384 remain engaged during the forward and backwards stroke of the plunger 290.

Turning to FIGS. 65 and 69, the first bevel 378 and the first beveled surface 380 are shown in more detail. The first beveled surface 380 is positioned between the intake bores 170 and 172 and the first seal 374. The first beveled surface 380 has an annular shape and surrounds the horizontal bore 106 in an endless manner. In alternative embodiments, the first beveled surface may have a shape that conforms to the shape of the first bevel formed in the fluid routing plug.

In contrast to the second bevel 382, the first bevel 378 is sized to be spaced from the first beveled surface 380 when the fluid routing plug 116 is initially installed within the housing 104, as shown by a gap 398. The gap 398 provides space for the fluid routing plug 116 to expand during operation.

As the plunger 290 retracts backwards away from the housing 104, a significant amount of load is applied to the second bevel 382. The applied load causes the fluid routing plug 116 to slightly compress, forcing the intermediate surface 322 at the first bevel 378 to expand outwards. As the first bevel 378 expands, it eventually engages with the first beveled surface 380. Upon engaging the first beveled surface 380, the load being applied to the second bevel 382 is shared with the first bevel 378, thereby decreasing the load applied to the second bevel 382. Without the gap 398, the fluid routing plug 116 would not have room to expand, potentially causing damage to the fluid routing plug 116 and the housing 104 over time.

As the plunger 290 extends forward into the housing 104, the first bevel 378 will return to its un-expanded state, re-creating the gap 398. The gap 398 will repeatedly be created and closed during operation as the plunger 290 reciprocates. In addition to providing space for the fluid routing plug 116 to expand, the gap 398 also provides a gas and fluid relief area during the forward stroke of the plunger 290.

Continuing with FIGS. 68 and 69, because the second bevel 382 carries the majority of the load experienced by the fluid routing plug 116 during operation, the second bevel 382 is longer than the first bevel 378. In alternative embodiments, the first bevel may be longer than that shown in FIG. 69 or be equal in length to the second bevel. In such embodiments, the first beveled surface formed in the housing may correspond with the chosen size of the first bevel.

In further alternative embodiments, the first bevel may be sized to mate with the first beveled surface when the fluid routing plug is first installed within the housing.

With reference to FIGS. 65, 70, and 71, in order to prevent fluid from leaking around the fluid routing plug 116 during operation, the first and second seals 374 and 376 are positioned between the sealing surfaces 370 and 372 and the walls of the housing 104 surrounding the horizontal bore 106.

The first seal 374 is positioned within a first annular groove 400 formed in housing 104 and surrounding the horizontal bore 106 in an endless manner. The first groove 400 is positioned between the intake bores 170 and 172 and the second outer surface 110 of the housing 104, as shown in FIG. 65. The first groove 400 is characterized by two sidewalls 402 joined by a base 404, as shown in FIG. 71. The sidewalls 402 may join the base 404 via radius corners or at a 90 degree angle. In alternative embodiments, the first groove may have a non-concentric shape that corresponds with the shape of the first sealing surface.

The second seal 376 is positioned within a second annular groove 406 formed in the housing 104 and surrounding the horizontal bore 106 in an endless manner. The second groove 406 is positioned between the discharge bore 178 and the intake bores 170 and 172, as shown in FIG. 65. The second groove 406 is characterized by two sidewalls 408 joined by a base 410. The sidewalls 408 may join the base 410 via radius corners or at a 90 degree angle. In alternative embodiments, the second groove may have a non-concentric shape that corresponds with the shape of the second sealing surface.

The second groove 406 has a larger diameter than that of the first groove 400 due to the diameter of the horizontal bore 106 at each groove, as shown in FIG. 65. Likewise, the second seal 376 has a larger diameter than that of the first seal 374. Because the first and second grooves 400 and 406 are formed in the housing 104, no grooves are formed in the intermediate surface 322 of the fluid routing plug 116 for receiving a seal.

When the fluid routing plug 116 is installed within the horizontal bore 106, the first and second seals 374 and 376 tightly engage the corresponding first and second sealing surfaces 370 and 372, as shown in FIGS. 70 and 71. During operation, the first and second seals 374 and 376 wear against the first and second sealing surfaces 370 and 372. If the first or second sealing surface 370 or 372 begins to erode, allowing fluid to leak around the fluid routing plug 116, the plug 116 may be removed and replaced with a new plug 116. The first or second seal 374 or 376 may also be replaced with a new seal, if needed.

The first groove 400 shown in FIG. 71 is wider than the second groove 406 shown in FIG. 70. As described below, each groove 400 and 406 is sized to correspond with the size of the seal installed within the groove. In alternative embodiments, the first and second grooves may be wider or narrower than those shown in the figures in order to accommodate the size of the seal installed within the groove.

As discussed above, the fluid routing plug 116 may repeatedly stretch and contract in response to the changing fluid pressure. For example, when the plunger 290 is retracted out of the housing 104, the fluid pressure at the first surface 318 is equal or approximately equal to the pressure of fluid delivered to the housing 104 from the intake manifolds 166 and 168. Such fluid pressure may be around 100-200 psi, for example. When the plunger 290 extends into the housing 104, the fluid at the first surface 318 may be pressurized to around 10,000 psi, for example.

The first seal 374, being positioned adjacent the first surface 318 of the fluid routing plug 116 experiences the constant change in fluid pressure. In contrast, the second seal 376, being positioned adjacent the second surface 320, experiences more static fluid pressure. The fluid pressure at the second surface 320 of the fluid routing plug 116 may remain at or close to 10,000 psi, for example.

Continuing with FIGS. 70 and 71, because the first seal 374 experiences more pressure fluctuations during operation than the second seal 376, the first seal 374 may be more robust than the second seal 376. For example, the first seal 374 is larger than the second seal 376 and has a generally square cross-sectional shape, while the second seal 376 has a circular cross-sectional shape. The first seal 374 may also have a higher durometer value than the second seal 376. As described below, both seals 374 and 376 are bi-directional seals. In alternative embodiments, the second seal may be of the same construction as the first seal.

Continuing with FIG. 71, the first seal 374 is shown engaged with both side walls 402 of the first groove 400. In operation, as the plunger 290 extends into the housing 104, pressurized fluid pushes against the right side of the first seal 374, helping to activate the first seal 374 and create a tight seal between the first seal 374 and the first sealing surface 370. As the plunger 290 retracts from the housing 104 and the fluid pressure drops, the fluid pressure is greater on the left side of the first seal 374. Thus, the fluid pressure may push against the left side of the first seal 374, helping to activate the first seal 374. Therefore, in operation, the first seal 374 may move slightly between its left and right side.

Continuing with FIG. 70, the second seal 376 is shown engaged with both side walls 408 of the second groove 406. In operation, pressurized fluid within the housing 104 helps to activate the second seal 376, thereby creating a tight seal between the second seal 376 and the second sealing surface 372. Because the second seal 376 experiences primarily static fluid pressure, the second seal 376 may not move within the second groove 406, as much as the first seal 374 moves within the first groove 400.

Continuing with FIGS. 70 and 71, the first seal 374 also takes up approximately 97% of the open volume within the first groove 400. Likewise, the second seal 376 takes up almost 97% of the open volume within the second groove 406. Normally, seals are configured to take up around 70% of the open volume within the groove the seal is installed within. The remaining open volume provides space for the seal to expand and move. However, in operation, fluid and proppants can fill the open volume and wear against the groove, eventually causing the walls of the groove to erode. If the walls of the groove are damaged, the housing 104 may need to be replaced.

By sizing the grooves 400 and 406 so that the seals 374 and 376 take up almost all of the open volume within the corresponding grooves 400 and 406, there is less room for fluid or proppants to fill any open space within the grooves. Specifically, fluid and proppants are prevented from entering any open volume on the back side of the seals 374 and 376, thereby protecting the first and second grooves 400 and 406 from erosion. In alternative embodiments, the first seal may take less volume of the first groove than is shown in FIG. 70. Likewise, in alternative embodiments, the second seal may take up less volume of the second groove than is shown in FIG. 71. The other grooves formed in the housing and described herein may also be configured so that the corresponding seals take up approximately 97% of the open volume within the groove.

Continuing with FIG. 71, the first sealing surface 370 may extend up to immediately adjacent the first surface 318 of the body 316. A first portion 412 of the intermediate surface 322 between the first bevel 378 and the first sealing surface 370 faces the housing 104 walls. A very small gap exists between the first portion 412 and the housing 104. The gap may be as small as 0.001 inches in width. Such gap provides clearance to reduce friction between the fluid routing plug 116 and the housing 104 during installation and operation. Such gap also provides space for excess proppant to collect during operation.

Continuing with FIG. 70, a second portion 416 of the intermediate surface 322 between the second sealing surface 372 and the second surface 320 may face the walls of the housing 104. A third portion 418 of the intermediate surface 322 between the second sealing surface 372 and the transition bevel 386 may also face the walls of the housing 104. Like the first portion 412, a very small gap exists between the second and third portions 416 and 418 and the housing 104. The gaps may be as small as 0.001 inches in width. Such gaps provide clearance to reduce friction between the fluid routing plug 116 and the housing 104 during installation and operation. Such gaps also provide space for excess proppant to collect during operation.

Turning back to FIG. 65, as discussed above, the walls of the housing 104 surrounding the horizontal bore 106 are sized to allow for easy installation of the fluid routing plug 116. The second groove 406 has a diameter D1. A maximum diameter of the second beveled surface 384 has a diameter D2. A maximum diameter of the first beveled surface 380 has a diameter D3, and the first groove 400 has a diameter D4. The diameter D4 is greater than the diameter D3. The diameter D3 is greater than the diameter D2, and the diameter D2 is greater than the diameter D1.

With reference to FIGS. 72-76 and 85-89, the suction and discharge valves 292 and 294 are generally identical, with the exception that the discharge valve 294 may be larger in size than the suction valve 292. As discussed above, the suction and discharge valves 292 and 294 each have a sealing element 346 and 360. The sealing elements 346 and 360 each include a sealing surface 420 and 422 that tapers at an angle that matches the angle of the tapered wall 340 and 356 of the fluid routing plug 116. Thus, the sealing surfaces 420 and 422 each taper at an angle of 30 or 45 degrees. Preferably, the tapered walls 340 and 356 and the sealing surfaces 420 and 422 both taper at an angle of 45 degrees.

Forming the mating tapered walls 340 and 356 and sealing surfaces 420 and 422 at 45 degrees provides more surface area for the valves 292 and 294 to seal against the fluid routing plug 116. Providing more sealing surface area or a larger "strike face" helps distribute the forces applied to the valves 292 and 294 and the fluid routing plug 116, thereby providing more evenly distributed sealing. Providing more evenly distributed sealing prevents certain areas from wearing faster than others, helping to increase the life of the parts.

Figure 72:
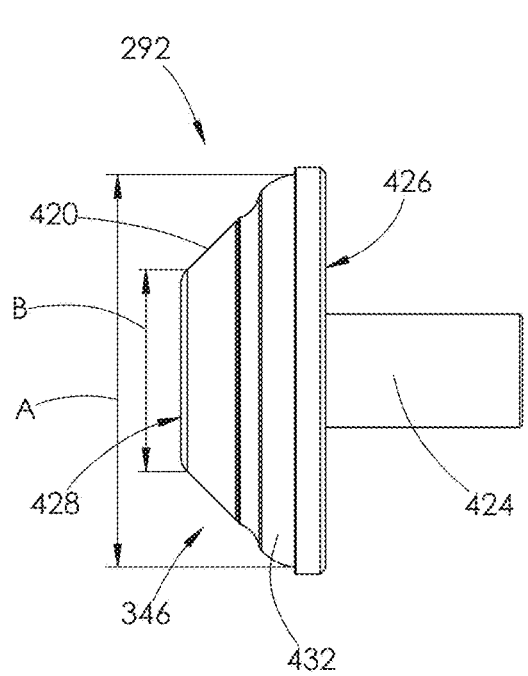
FIG. 72 is a top plan view of a suction valve shown installed within the housing in FIG. 50.
Figure 73:
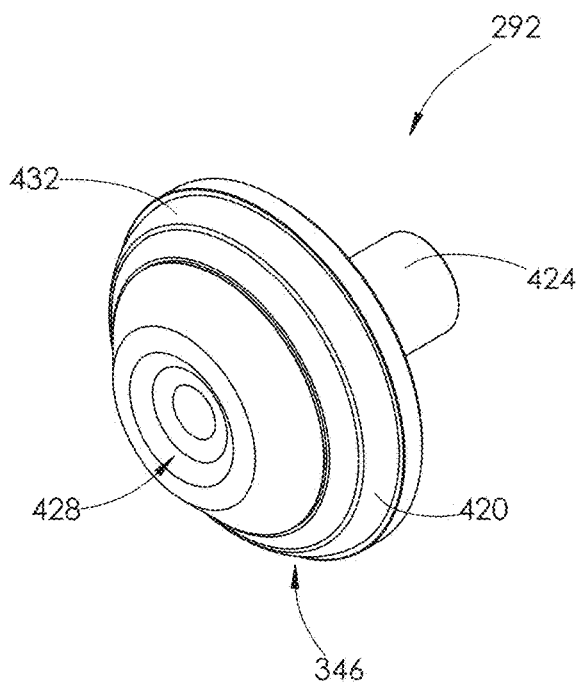
FIG. 73 is a perspective view of a second surface of the suction valve shown in FIG. 72.
Figure 74:
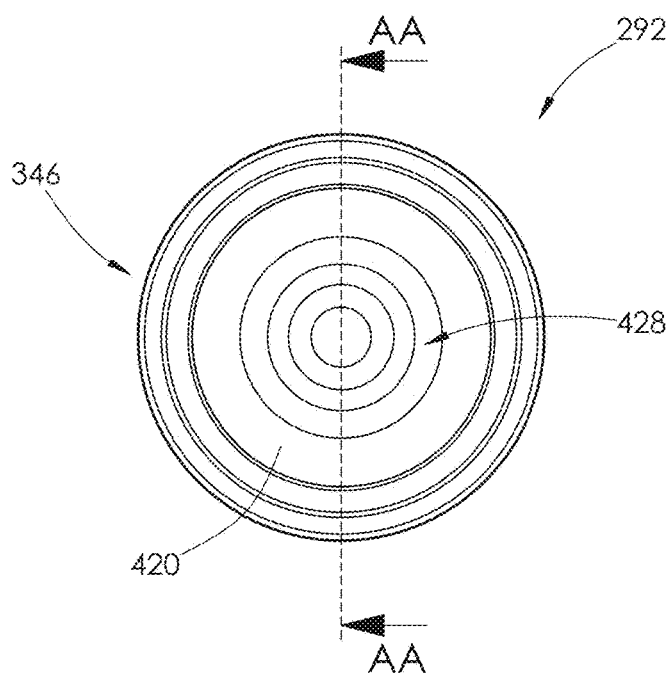
FIG. 74 is an elevational view of the second surface of the suction valve shown in FIG. 72.
Figures 85, 86:
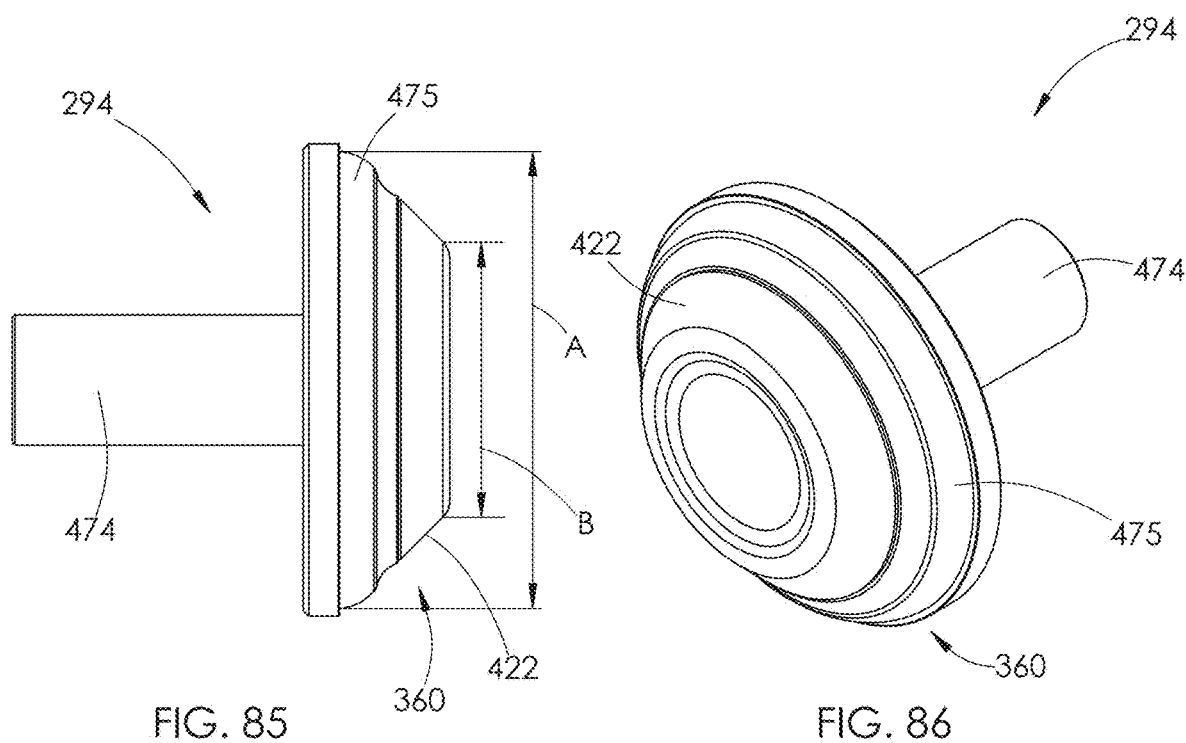
FIG. 85 is a top plan view of a discharge valve shown installed within the housing in FIG. 50.
FIG. 86 is a perspective view of a second surface of the discharge valve shown in FIG. 85.
Figure 87:
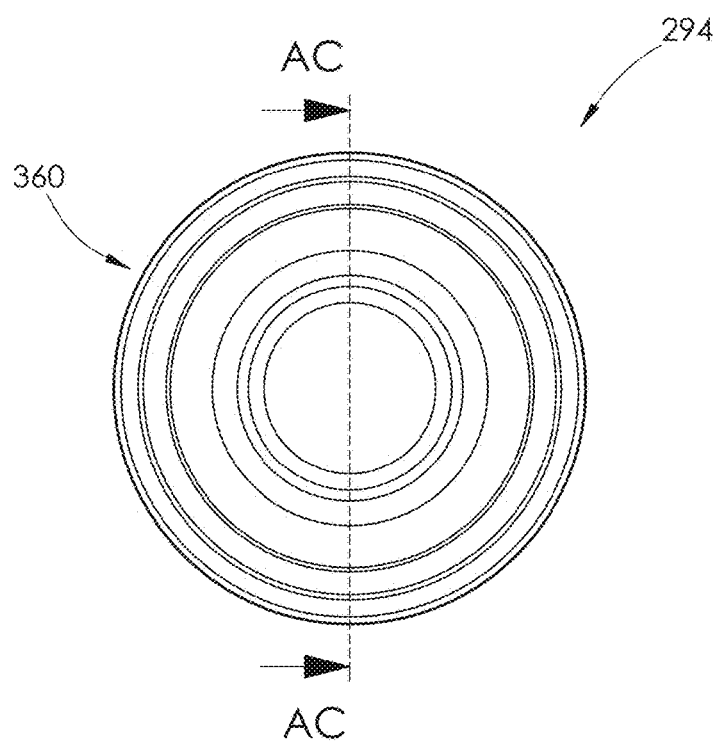
FIG. 87 is an elevational view of the second surface of the discharge valve shown in FIG. 85.
Figure 88:
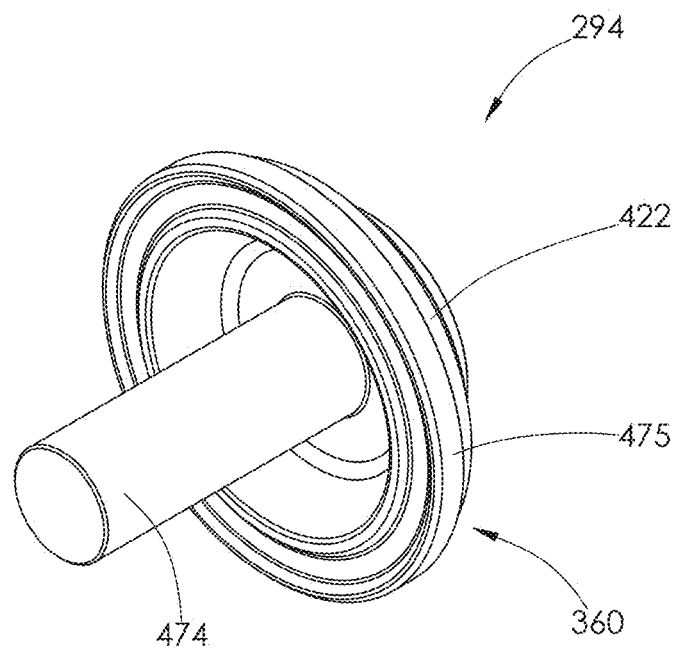
FIG. 88 is a perspective view of a first surface of the discharge valve shown in FIG. 85.

Each valve 292 and 294 also has an outer sealing diameter A and an inner sealing diameter B, as shown in FIGS. 72 and 85. The ratio of the outer sealing diameter A to the inner sealing diameter B is preferably 1.55 or greater. This ratio helps increase the life of the valves 292 and 294 and reduce any turbulent fluid flow during operation. The valves 292 and 294 and the fluid routing plug 116 are configured so that no portion of the valves 292 and 294 enters the first or second fluid passages 326 and 336 during operation. Additionally, no portion of the valve 292 enters the blind bore 328 during operation. Rather, the suction valve 292 is configured only to cover the entrance 342 of the blind bore 330 on the first surface 318, and the discharge valve 294 is configured only to cover the openings 364 of the second fluid passages 336 on the second surface 320.

Continuing with FIGS. 72-76, the suction valve 292 is shown in more detail. The suction valve 292 comprises the sealing element 346 joined to a stem 424. When the suction valve 292 is installed within the horizontal bore 106, the stem 424 extends along an axis that is parallel to or aligned with central the longitudinal axis 114 of the housing 104.

Figure 76:
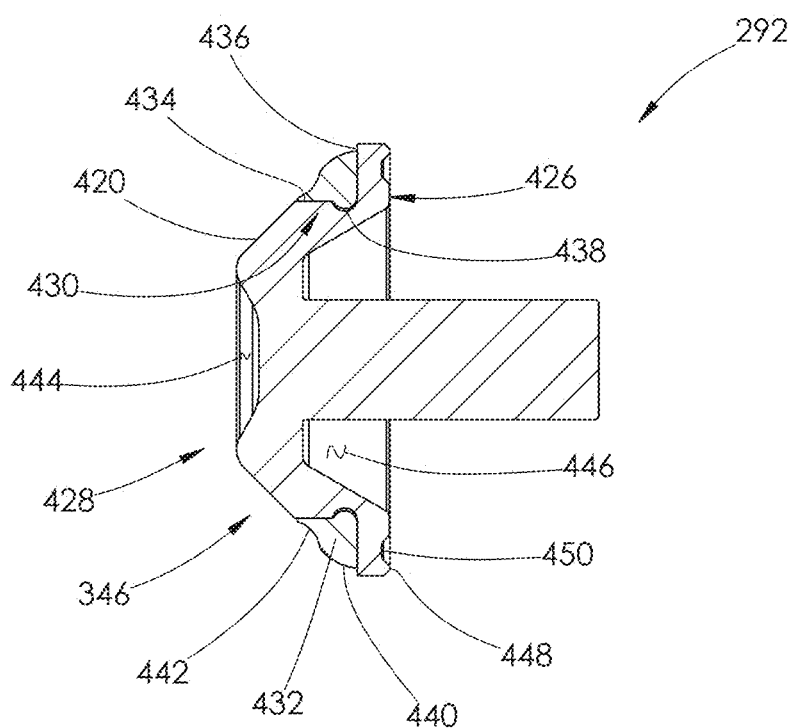
FIG. 76 is a cross-sectional view of the suction valve shown in FIG. 74, taken along line AA-AA.
Figure 77:
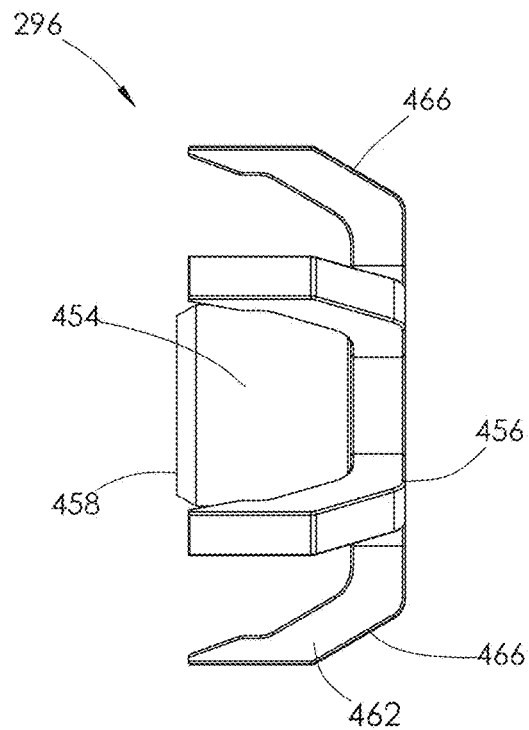
FIG. 77 is a top plan view of a suction valve guide shown installed within the housing shown in FIG. 50.
Figure 78:
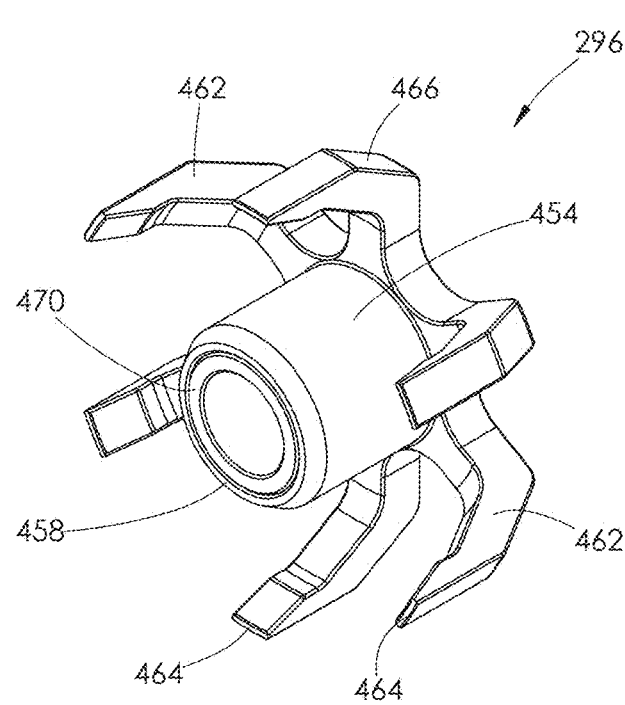
FIG. 78 is a perspective view of a first surface of the suction valve guide shown in FIG. 77.
Figure 79:
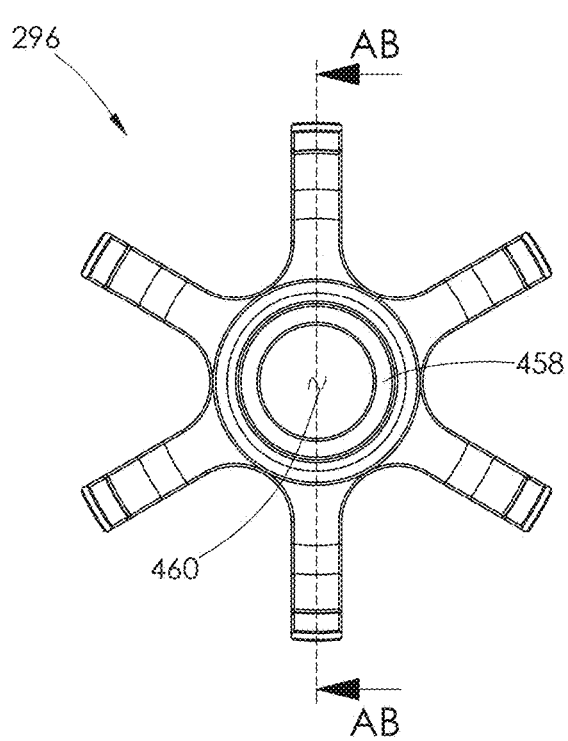
FIG. 79 is an elevation view of the first surface of the suction valve guide shown in FIG. 77.

The sealing element 346 comprises opposed first and second surfaces 426 and 428 joined by the sealing surface 420. A groove 430 is formed in the sealing surface 420 adjacent the first surface 426, as shown in FIG. 76. A seal 432 is installed within the groove 430. The groove 430 is characterized by a first sidewall 434 joined to a second sidewall 436. The sidewalls 434 and 436 may be joined by an inner groove 438. The groove 430 is sized to correspond with the inward facing surface of the seal 432. An outward facing surface of the seal 432 comprises a convex surface 440 joined to a concave surface 442. The seal 432 is preferably made of a polyurethane compound. In alternative embodiments, the seal may be made of a different elastomer material.

When the suction valve 292 seals against the first surface 318 of the fluid routing plug 116, the seal 432 and a portion of the sealing surface 420 mate with the tapered wall 340, as shown in FIG. 51. The seal 432 is shaped so that the convex surface 440 displaces into, or toward, the concave surface 442 as the seal 432 engages the tapered wall 340. This relative movement allows the shear forces to be dissipated, increasing the life of the seal 432 and the suction valve 292. If the seal 432 becomes worn and no longer seals properly, the seal 432 may be removed and replaced with a new seal 432. In alternative embodiments, the seal and groove may have various shapes and sizes, as desired. In further alternative embodiments, the sealing surface may not include a groove and corresponding seal.

Continuing with FIG. 76, the second surface 428 of the sealing element 346 is sized to cover the entrance 342 of the blind bore 328, as shown in FIG. 51. A cutout 444 is formed within the second surface 428. The cutout 444 creates a small cavity within the second surface 428. The cavity provides space for fluid to collect and apply pressure to the suction valve 292. Such pressure helps force the suction valve 292 to move axially to an open position.

Figure 75:
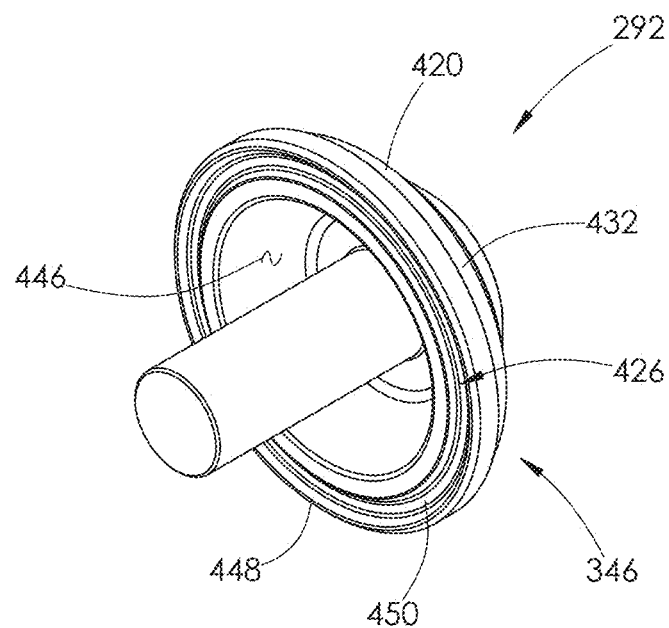
FIG. 75 is a perspective view of a first surface of the suction valve shown in FIG. 72.

Continuing with FIGS. 75 and 76, the stem 424 projects from the first surface 426 of the sealing element 346. An annular void 446 is formed in the first surface 426 and surrounds the stem 424. The first surface 426 further includes a ring-shaped outer rim 448 that surrounds the annular void 446 and the stem 424. The outer rim 448 joins the sealing surface 420. The annular void 446 reduces weight within the suction valve 292 and helps orient the valve's center of gravity during operation.

Figure 83:
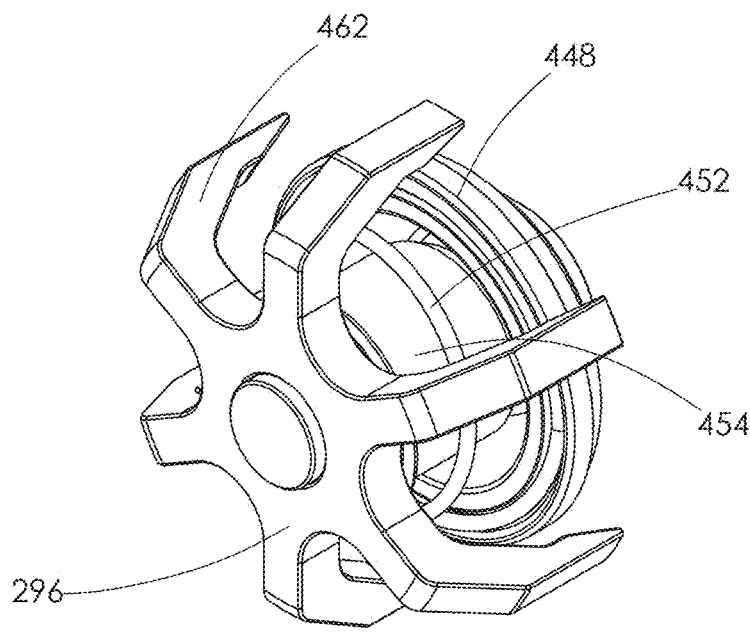
FIG. 83 is a perspective view of the suction valve guide shown in FIG. 77 engaged with the suction valve shown in FIG. 72. A spring is shown positioned between the suction valve guide and the suction valve.
Figure 84:
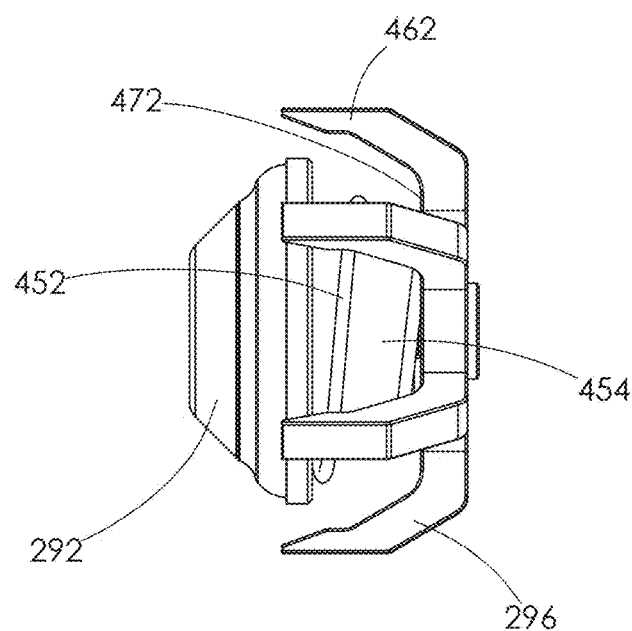
FIG. 84 is a top plan view of the suction valve guide, suction valve, and spring shown in FIG. 83.

An annular groove 450 is formed in the outer rim 448. The groove 450 is configured for receiving a bottom portion of a spring 452, as shown in FIG. 83. As described below, a top portion of the spring 452 engages with the suction valve guide 296, as shown in FIGS. 83 and 84. The spring 452 biases the suction valve 292 in the closed position. Positioning the spring 452 on the outer rim 448 helps to stabilize the suction valve 292 during operation.

With reference to FIGS. 77-82, the stem 424 is configured to move axially within the suction valve guide 296. The suction valve guide 296 may also be referred to as a cage for the suction valve 292. The suction valve guide 296 comprises a body 454 having opposed first and second surfaces 456 and 458. A central passage 460 is formed within the body 454 and interconnects the first and second surfaces 456 and 458. A plurality of legs 462 extend out from the body 454 adjacent its first surface 456 and project downward towards its second surface 458. The suction valve guide 296 shown in FIGS. 77-82 has six evenly spaced legs 462 formed around its body 454. In alternative embodiments, more or less than six legs may be formed on the body and may be non-uniformly spaced.

The legs 462 gradually decrease in thickness from the body 454 to a bottom surface 464 of each leg 462. The bottom surface 464 of each leg 462 is extremely thin so that the legs 462 do not block or interfere with the openings 348 of the second fluid passages 336 on the first surface 318, as shown in FIG. 50.

Continuing with FIGS. 77-82, an outer surface of each leg 462 includes a bevel 466. The bevels 466 are configured to engage a corresponding bevel 468 formed in the walls of the housing 104, as shown in FIGS. 50 and 51. The suction valve guide 296 is inserted into the horizontal bore 106 until the bevels 466 and 468 engage, allowing the guide 296 to bottom out on the walls of the housing 104. Once the bevels 466 and 468 are engaged, the suction valve guide 296 is held against the walls of the housing 104 by the spring 452 and fluid pressure.

When the suction valve guide 296 is in its installed position, the bottom surface 464 of each of the legs 462 hovers just above the first surface 318 of the fluid routing plug 116, leaving a gap between the legs 462 and the plug 116. The bottom surfaces 464 do not directly contact the fluid routing plug 116 in order to prevent the suction valve guide 296 from applying load to the plug 116 during operation.

Figure 80:
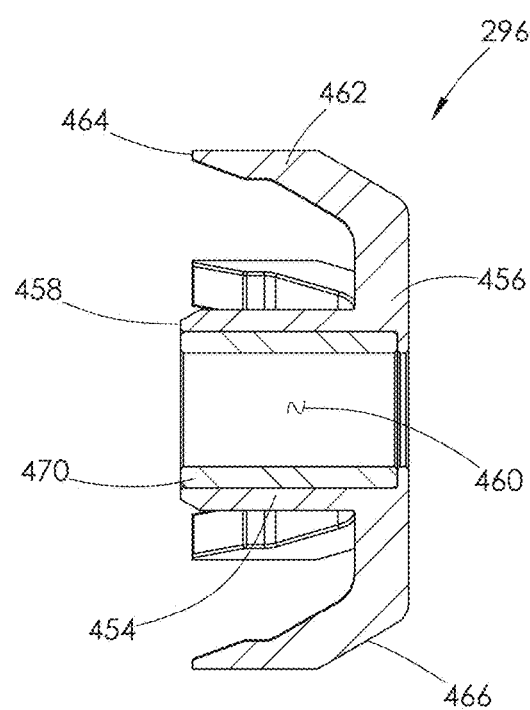
FIG. 80 is a cross-sectional view of the suction valve guide shown in FIG. 79, taken along line AB-AB.
Figure 81:
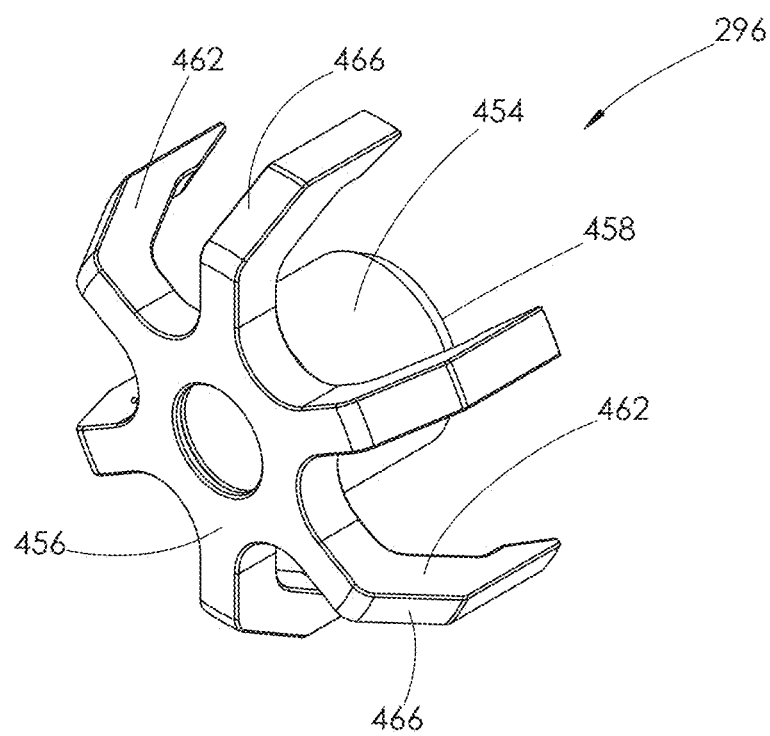
FIG. 81 is a perspective view of a second surface of the suction valve guide shown in FIG. 77.
Figure 82:
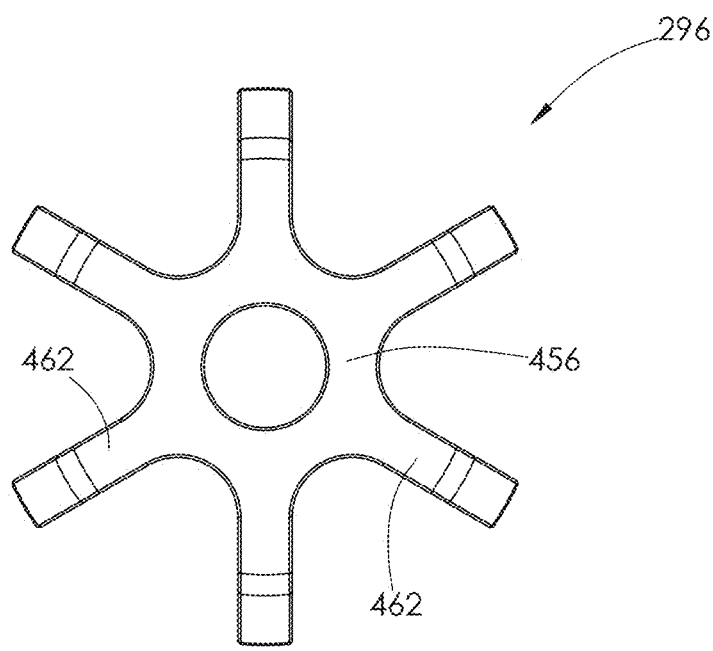
FIG. 82 is an elevational view of the second surface of the suction valve guide shown in FIG. 77.

Continuing with FIG. 80, a tubular insert 470 is installed within the central passage 460 of the body 454. The insert 470 may be press-fit within the passage 460. The insert 470 extends the length of the central passage 460 and is formed from a more wear resistant material than the suction valve guide 296. For example, the insert 470 may be made of tungsten carbide, while the suction valve guide 296 may be made of high strength alloy steel. The stem 424 is installed within the insert 470 and reciprocates within the insert 470 during operation, as shown in FIGS. 50 and 51. Any fluid contained within the insert 470 drains from the opening of the central passage 460 on the first surface 456 of the body 454.

During operation, the stem 424 may wear against the insert 470 as it reciprocates. The insert 470 helps decrease the rate of wear and helps the stem to wear evenly against the insert. Forming only the insert 470 out of a wear resistant material helps reduce the cost of the other parts, which do not experience as much wear during operation.

Turning to FIGS. 83 and 84, the spring 452 is interposed between the suction valve 292 and the suction valve guide 296. The spring 452 is held between the outer rim 448 of the suction valve 292 and an inner surface 472 of the legs 462. At least a portion of the spring 452 surrounds the body 454 of the suction valve guide 296. As the suction valve 292 moves to an open position, the spring 452 compresses between the suction valve 292 and the suction valve guide 296.

With reference to FIGS. 85-89, the discharge valve 294 is shown in more detail. As discussed above, the discharge valve 294 is constructed identically to the suction valve 292, with the exception that the discharge valve 294 may be larger in size. The discharge valve 294 shown in FIGS. 85-89, for example, has a larger sealing surface 422 and a longer stem 474 than the suction valve 292. When the discharge valve 294 is installed within the horizontal bore 106, the stem 424 extends along an axis that is parallel to or aligned with the central longitudinal axis 114 of the housing 104. A seal 475 is installed within a groove 477 formed in the sealing surface 422 and is configured to engage with the tapered wall 356 formed in the second surface 320 of the fluid routing plug 116. A bottom surface 476 of the discharge valve 294 is sized to cover the central base 354, as shown in FIG. 50.

With reference to FIGS. 90-95, the stem 474 formed on the discharge valve 294 is configured to move axially within the discharge valve guide 298. The discharge valve guide 298 may also be referred to as a cage for the discharge valve 294. The discharge valve guide 298 comprises a body 478 having opposed first and second surfaces 480 and 482 joined by an intermediate surface 484. The intermediate surface 484 includes a front portion 486, a medial portion 488, and a rear portion 490. The medial portion 488 has a larger diameter than both the front and rear portions 486 and 490. The front portion 486 has a slightly larger diameter than the rear portion 490.

Continuing with FIGS. 90-95, a blind bore 492 is formed in the first surface 480 and extends into the front portion 486 of the body 478. The blind bore 492 is configured to receive a tool used to grip the discharge valve guide 298. The front portion 486 is sized to be received within the cutout 308 formed in the retainer 300, as shown in FIGS. 50 and 51. When the discharge valve guide 298 and the retainer 300 are engaged, the blind bore 492 opens into the central passage 310 formed in the retainer 300.

Figure 93:
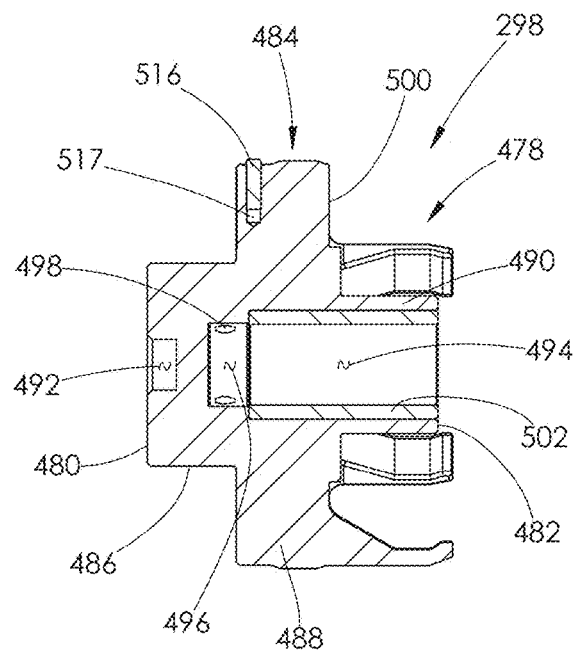
FIG. 93 is a cross-sectional view of the discharge valve guide shown in FIG. 92, taken along line AD-AD.
Figure 94:
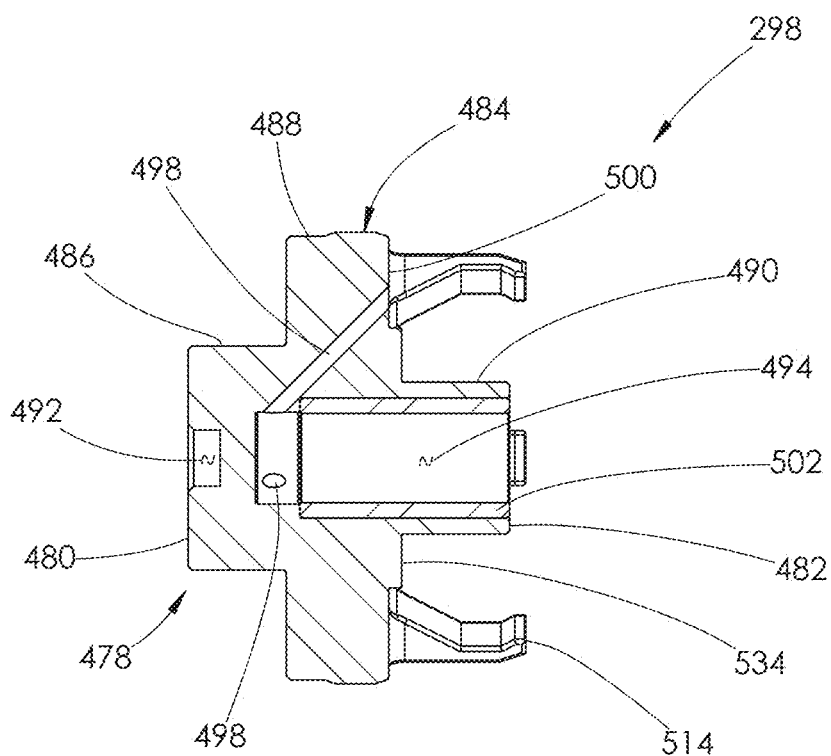
FIG. 94 is a cross-sectional view of the discharge valve guide shown in FIG. 92, taken along line AE-AE.

A central passage 494 is formed in the body 478 and opens on the second surface 482, as shown in FIGS. 93 and 94. The central passage 494 opens in the body 478 into an axially blind counterbore 496. A plurality of relief ports 498 are formed in the body 478. Each relief port 498 interconnects the counterbore 496 and a base 500 of the medial portion 488, as shown in FIG. 94.

Continuing with FIGS. 93 and 94, a tubular insert 502 is installed within the central passage 494. The insert 502 is identical to the insert 470, with the exception that the insert 502 may be larger than the insert 470. During operation, the stem 474 moves axially within the insert 502 installed within the central passage 494. Any fluid within the insert 502 drains from the body 478 through the counterbore 496 and the relief ports 498.

Figure 90:
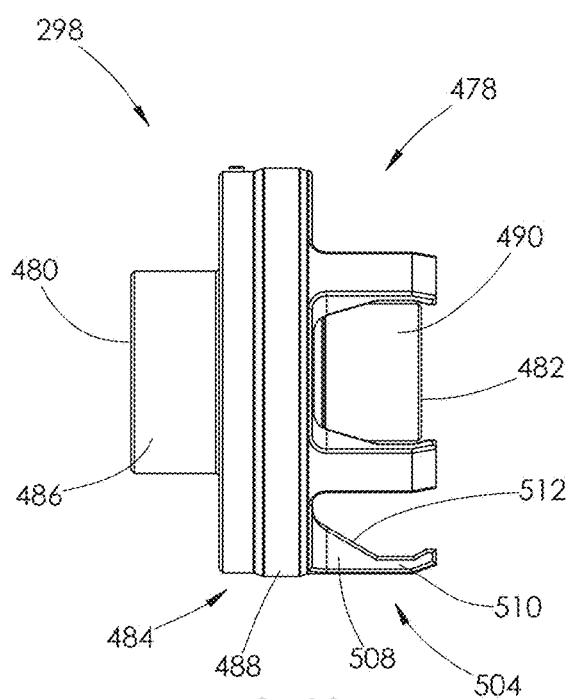
FIG. 90 is a top plan view of a discharge valve guide shown installed within the housing in FIG. 50.
Figure 91:
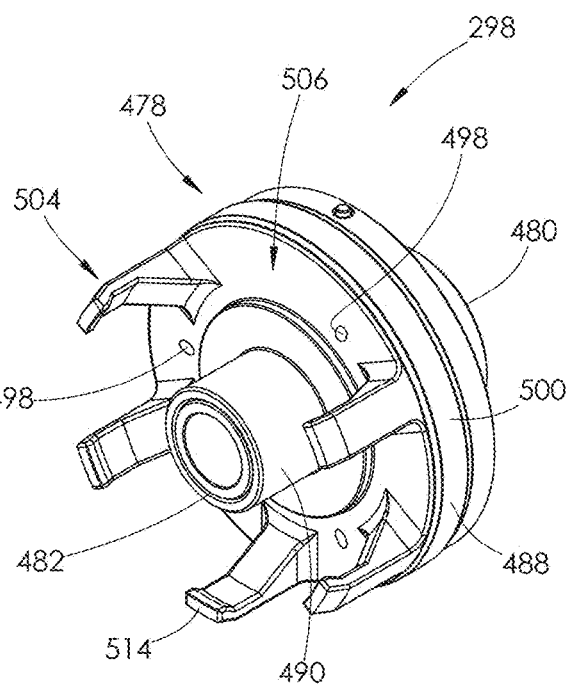
FIG. 91 is a perspective view of a first surface of the discharge valve guide shown in FIG. 90.
Figure 92:
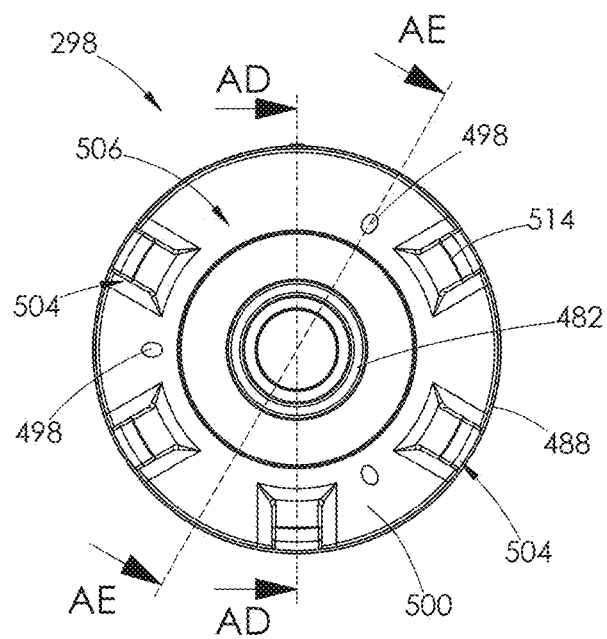
FIG. 92 is an elevation view of the first surface of the discharge valve guide shown in FIG. 90.

Continuing with FIGS. 90-92, a plurality of legs 504 project from the medial portion 488 and extend towards the second surface 482 of the body 478. The discharge valve guide 298 shown in FIGS. 90-95 comprises five legs 504. The legs 504 are positioned on the body 478 so as to leave a large space 506 between at least two adjacent legs 504. Other than the space 506, the legs 504 are equally spaced from one another. The space 506 is intended to align with the discharge bore 178, thereby preventing any legs 504 from blocking the discharge bore 178 during operation. Providing the space 506 therefore allows fluid to flow freely between the discharge valve 294 and the discharge bore 178 without significant obstructions. The space 506 also helps minimize wear applied to the legs 504 by the flowing fluid over time. In alternative embodiments, the body may have more or less than five legs and be spaced, as desired, as long as the legs are positioned on the body so as to leave a large space between at least two of the legs.

With reference to FIG. 90, each of the legs 504 has a thicker upper portion 508 and thinner lower portion 510. The thicker upper portion 508 provides strength to the legs 504 while the lower portion 510 is thinned in order to provide more room for fluid flow around the legs 504. The upper portion 508 also includes a tapered inner surface 512. Tapering the inner surface 512 of the legs 504 provides strength and alleviates stress in the legs 504 during operation.

Continuing with FIGS. 90-95, when the discharge valve guide 298 is installed within the horizontal bore 106, a bottom surface 514 of each leg 504 engages the outer rim 352 of the second surface 320 of the fluid routing plug 116, as shown in FIGS. 50 and 51. The discharge valve guide 298 is held against the fluid routing plug 116 by the retainer 300. Such engagement helps keep the second bevel 382 of the fluid routing plug 116 seated against the second beveled surface 384, as shown in FIGS. 65 and 68.

Figure 95:
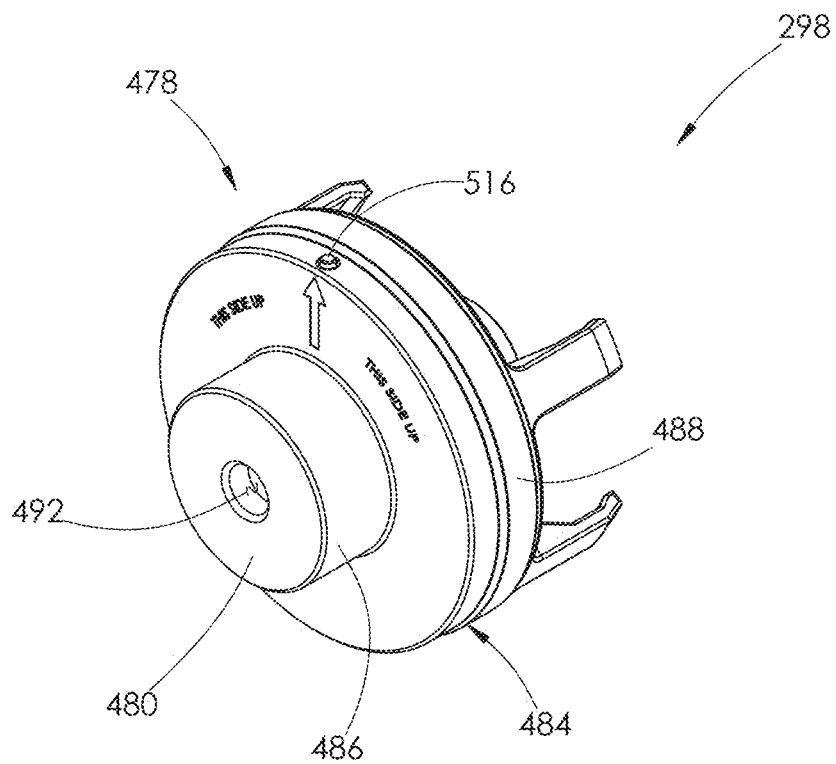
FIG. 95 is a perspective view of a second surface of the discharge valve guide shown in FIG. 90.
Figure 96:
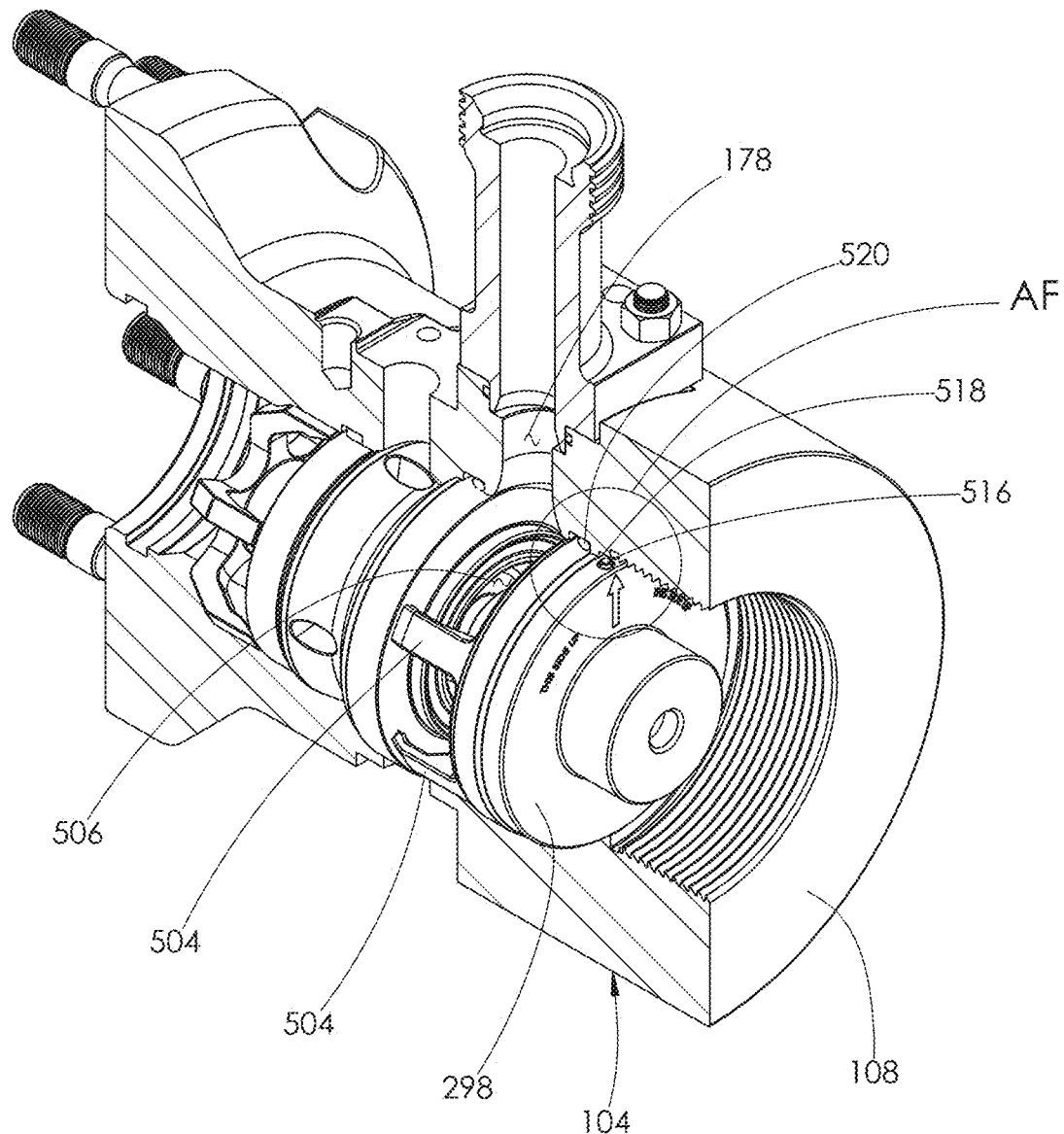
FIG. 96 is a perspective cut-away view of a first surface of the fluid end section shown in FIG. 8.
Figure 97:
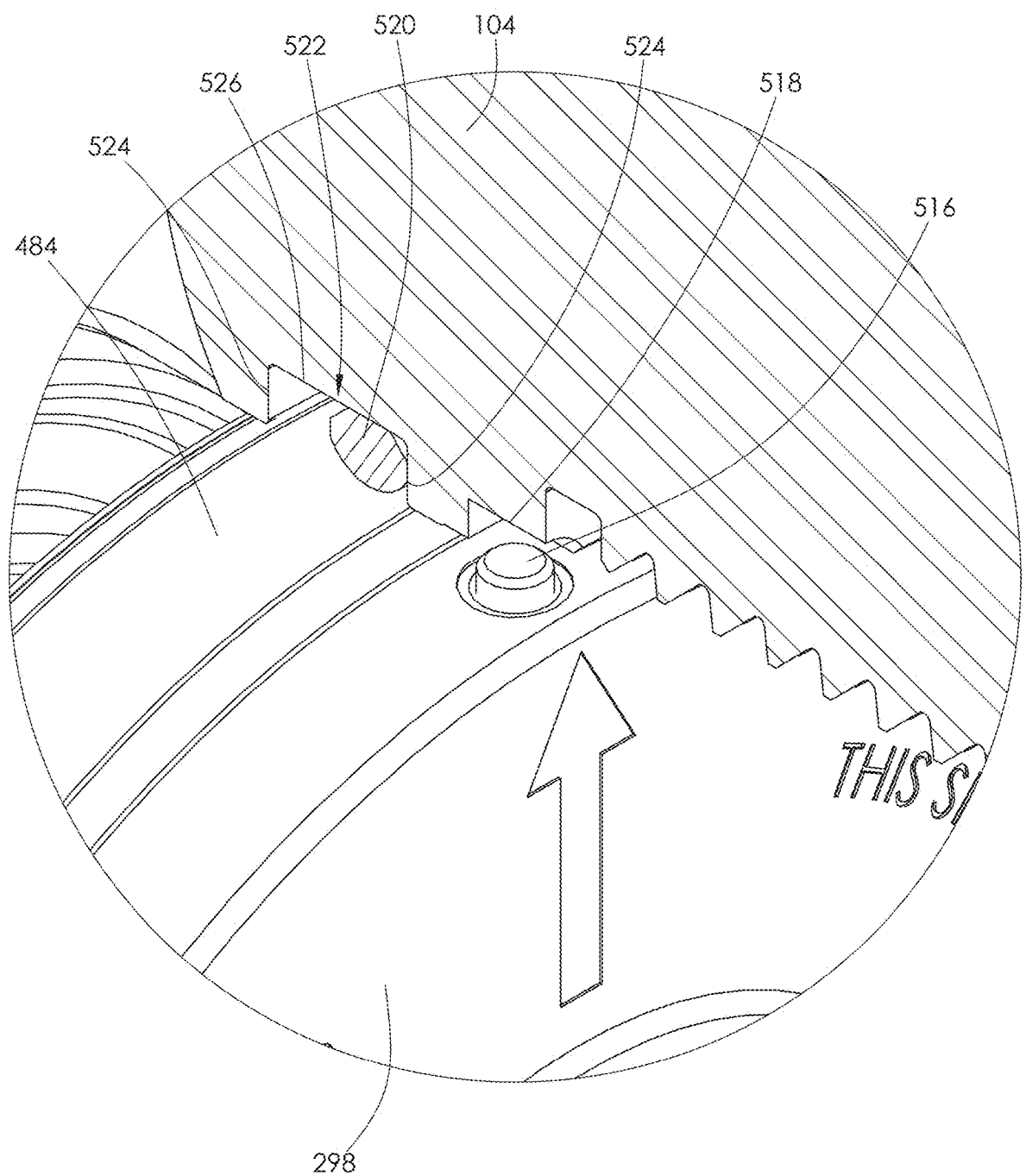
FIG. 97 is an enlarged view of area AF shown in FIG. 96.

Continuing with FIGS. 93 and 95, a dowel pin 516 is installed within a blind bore 517 formed in the medial portion 488 of the body 478. The dowel pin 516 is configured to be received within a dowel pin hole or groove 518 formed in the walls of the housing 104 surrounding the horizontal bore 106, as shown in FIGS. 96 and 97. The discharge valve guide 298 is installed within the horizontal bore 106 such that the dowel pin 516 is positioned within the dowel pin hole 518. Such positioning ensures that the space 506 between the pair of legs 504 aligns with the discharge bore 178, thus preventing any legs 504 from blocking the discharge bore 178 during operation.

Continuing with FIGS. 96 and 97, a seal 520 is interposed between the intermediate surface 484 of the body 478 and the walls of the housing 104. The seal 520 may be identical to the second seal 376 shown in FIGS. 65 and 70. In alternative embodiments, the seal may be identical to the first seal 374 shown in FIGS. 65 and 71. The seal 520 is installed within a groove 522 formed in the housing 104. The groove 522 is characterized by two sidewalls 524 joined to a base 526. The sidewalls 524 may join the base 526 via radius corner or at a 90 degree angle. During operation, the seal 520 wears against the outer intermediate surface 484 of the discharge valve guide 298. If the intermediate surface 484 begins to erode, allowing fluid to leak around the seal 520, the discharge valve guide 298 may be removed and replaced with a new discharge valve guide 298.

Figure 98:
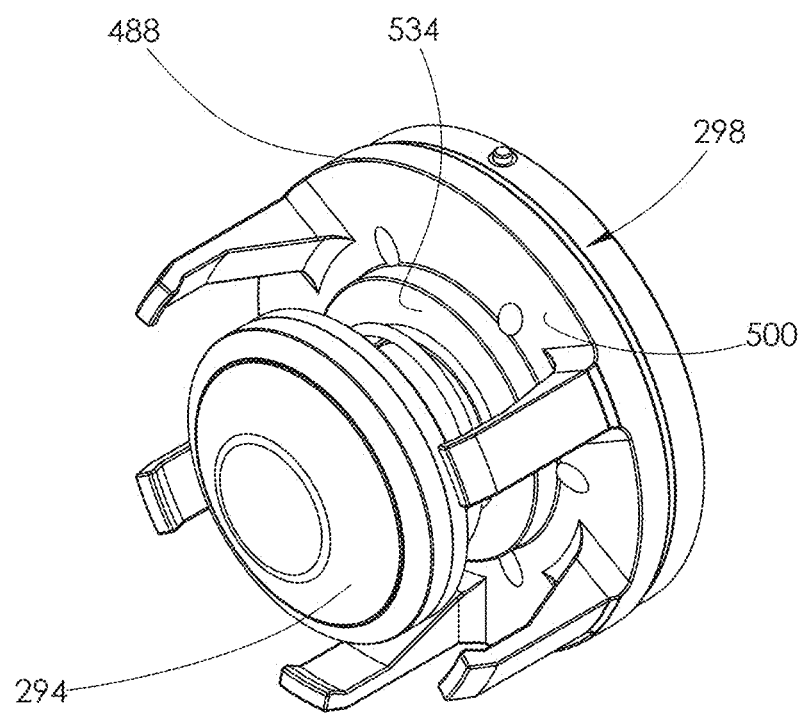
FIG. 98 is a perspective view of the discharge valve guide shown in FIG. 90 engaged with the discharge valve shown in FIG. 85. A spring is shown positioned between the discharge valve guide and the discharge valve.
Figure 99:
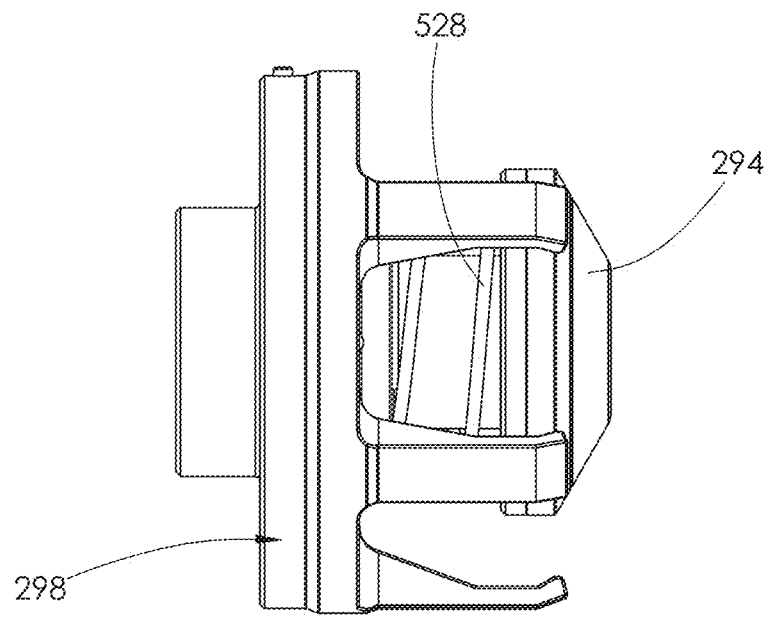
FIG. 99 is a top plan view of the discharge valve guide, discharge valve, and spring shown in FIG. 98.

With reference to FIGS. 98 and 99, a spring 528 is installed between the discharge valve 294 and the discharge valve guide 298. A bottom portion of the spring 528 sits in a groove 530, shown in FIG. 89, formed in an outer rim 532 of the discharge valve 294. A top portion of the spring 528 engages a ledge 534 formed in the base 500 of the medial portion 488 of the discharge valve guide 298. During operation, the spring 528 compresses against the ledge 534 of the medial portion 488.

Figure 100:
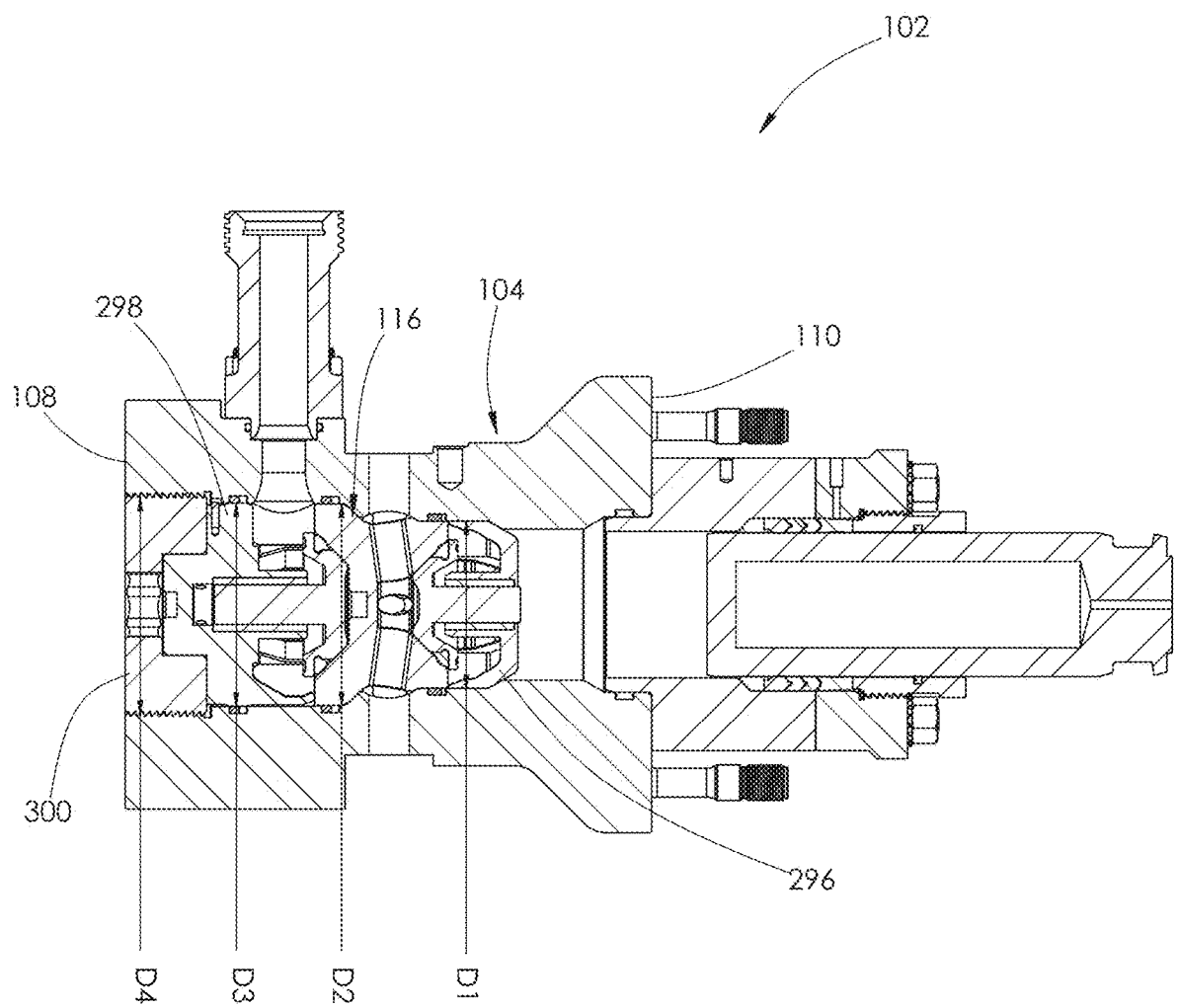
FIG. 100 is the cross-sectional view of the fluid end section shown in FIG. 9.
Figure 100A:
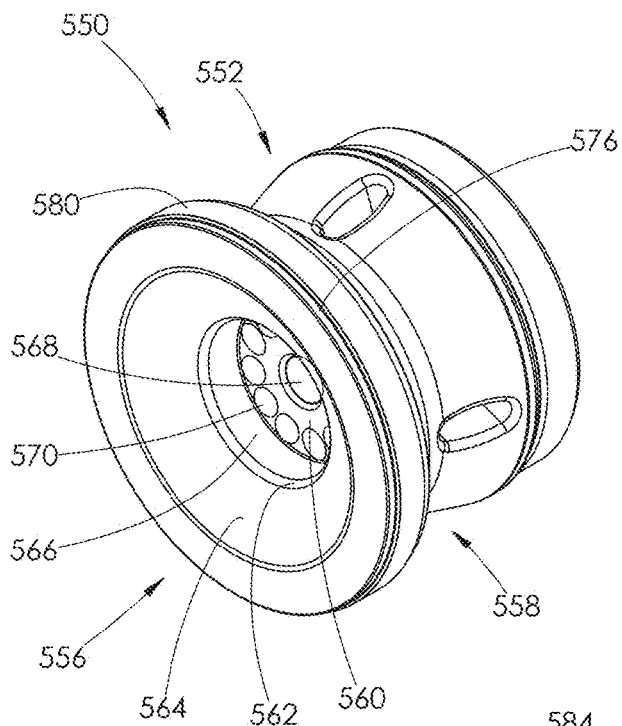
FIG. 100A is a perspective view of a second surface of another embodiment of a fluid routing plug.

Turning to FIG. 100, the components installed within the housing 104 are installed through the first surface 108, starting with the suction valve guide 296. The diameter of the installed components slightly increases from the second surface 320 to the first surface 318. For example, the suction valve guide 296 has smaller outer diameters than the fluid routing plug 116, and the fluid routing plug 116 has smaller outer diameters than the discharge valve guide 298. The discharge valve guide 298 has smaller outer diameters than the retainer 300.

Likewise, the diameters of the walls surrounding the horizontal bore 106 generally increase from the second surface 110 to the first surface 108. As shown in FIG. 100, a diameter D4 of the horizontal bore 106 is greater than a diameter D3 of the horizontal bore 106. The diameter D3 of the horizontal bore 106 is greater than a diameter D2 of the horizontal bore 106. The diameter D2 of the horizontal bore 106 is greater than a diameter D1 of the horizontal bore 106. Such construction allows the components to be installed without engaging the walls of the housing 104 until the component is at its intended installed position. The seals 374, 376, and 520 may be installed within the housing 104 prior to installing the other components described above.

Turning to FIGS. 100A-100E, another embodiment of a fluid routing plug 550 is shown. The fluid routing plug 550 may be installed within the housing 104 in place of the fluid routing plug 116. The fluid routing plug 550 is identical to the fluid routing plug 116, with a few exceptions. The fluid routing plug 550 comprises a body 552 having a first outer surface 554 joined to a second outer surface 556 by an intermediate outer surface 558. The second surface 556 of the fluid routing plug 550 is generally identical to the second surface 320 of the fluid routing plug 116, but a central base 560 formed in the second surface 556 is spaced from an edge 562 of a tapered wall 564 formed in the second surface 556. The central base 560 is spaced from the tapered wall 564 such that a throat 566 is formed between the central base 560 and the tapered wall 564.

Continuing with FIGS. 100A-100D, a blind hole 568 is formed in the central base 560 and a plurality of openings 570 corresponding to a plurality of second fluid passages 572 open on the central base 560 and surround the blind hole 568. In operation, fluid exiting the openings 570 flows into the throat 566 before pushing against the discharge valve 294 engaged with the second surface 556. Allowing fluid to gather in the throat 566 before contacting the discharge valve 294 helps the fluid to contact more surface area of the discharge valve 294, instead of having a plurality of single points of contact from each second fluid passage opening. Allowing the fluid to contact more surface area of the discharge valve 294 helps reduce wear to the valve over time.

Figure 100B:
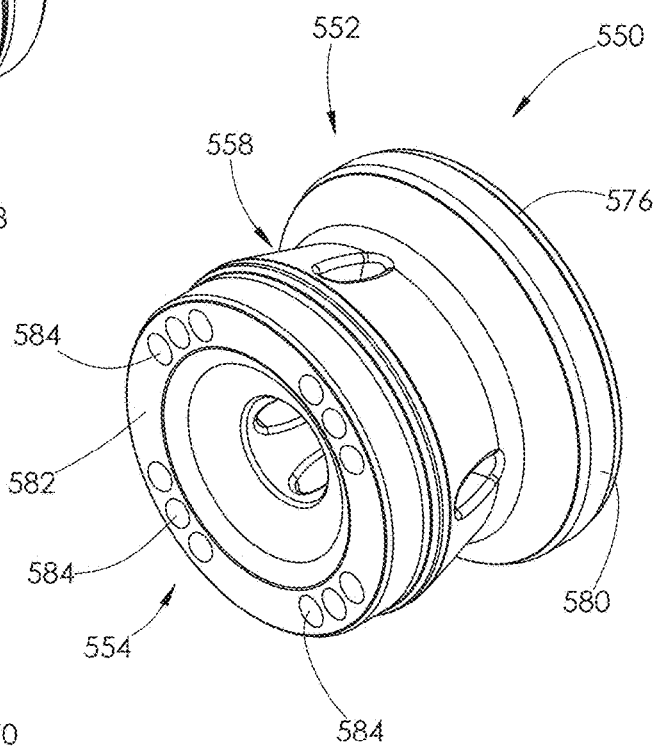
FIG. 100B is a perspective view of a first surface of the fluid routing plug shown in FIG. 100A.
Figure 100C:
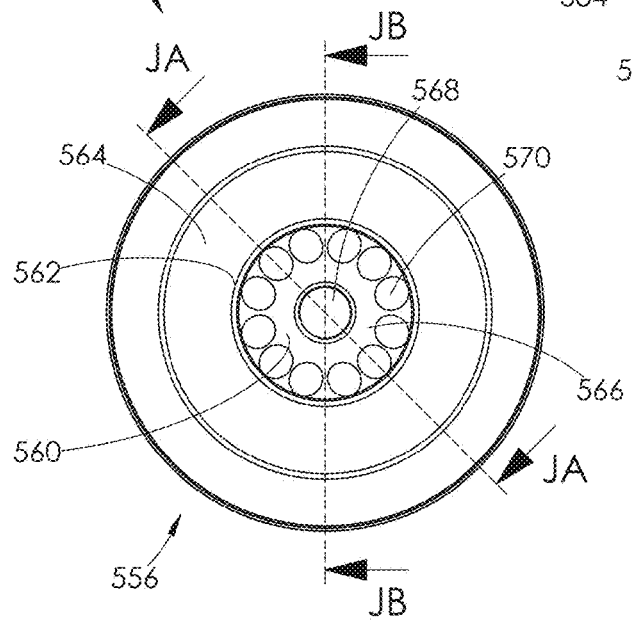
FIG. 100C is an elevational view of the second surface of the fluid routing plug shown in FIG. 100A.
Figure 100D:
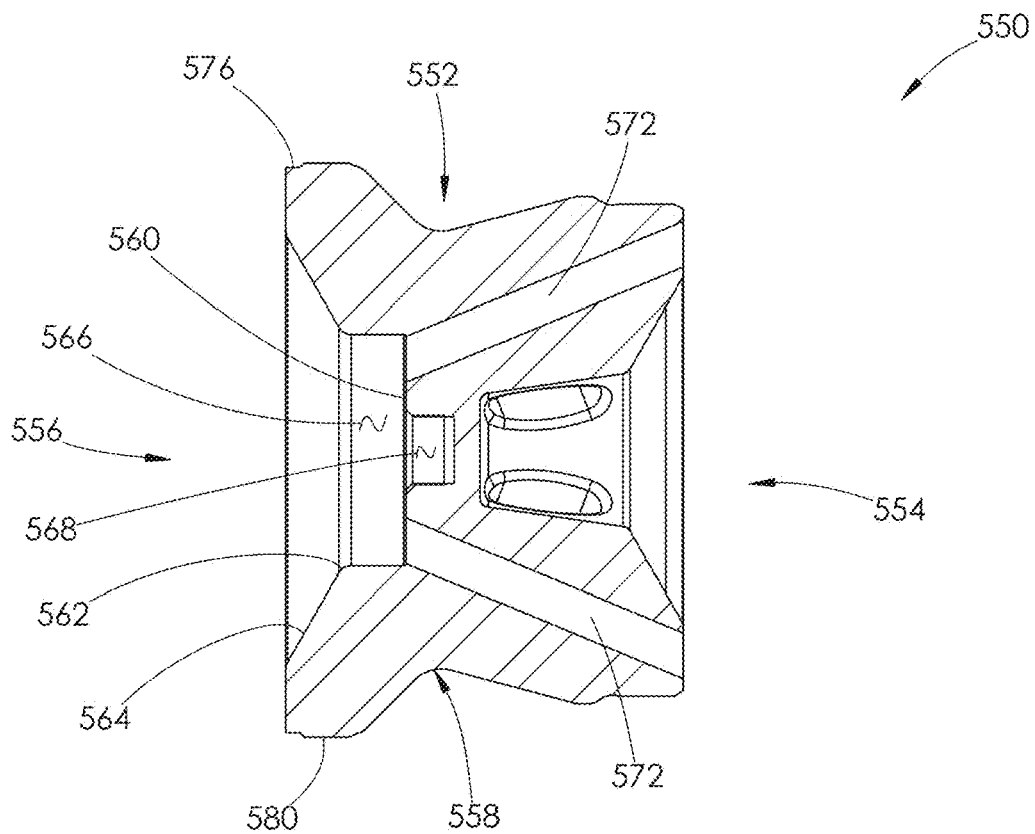
FIG. 100D is a cross-sectional view of the fluid routing plug shown in FIG. 100C, taken along line JA-JA.
Figure 100E:
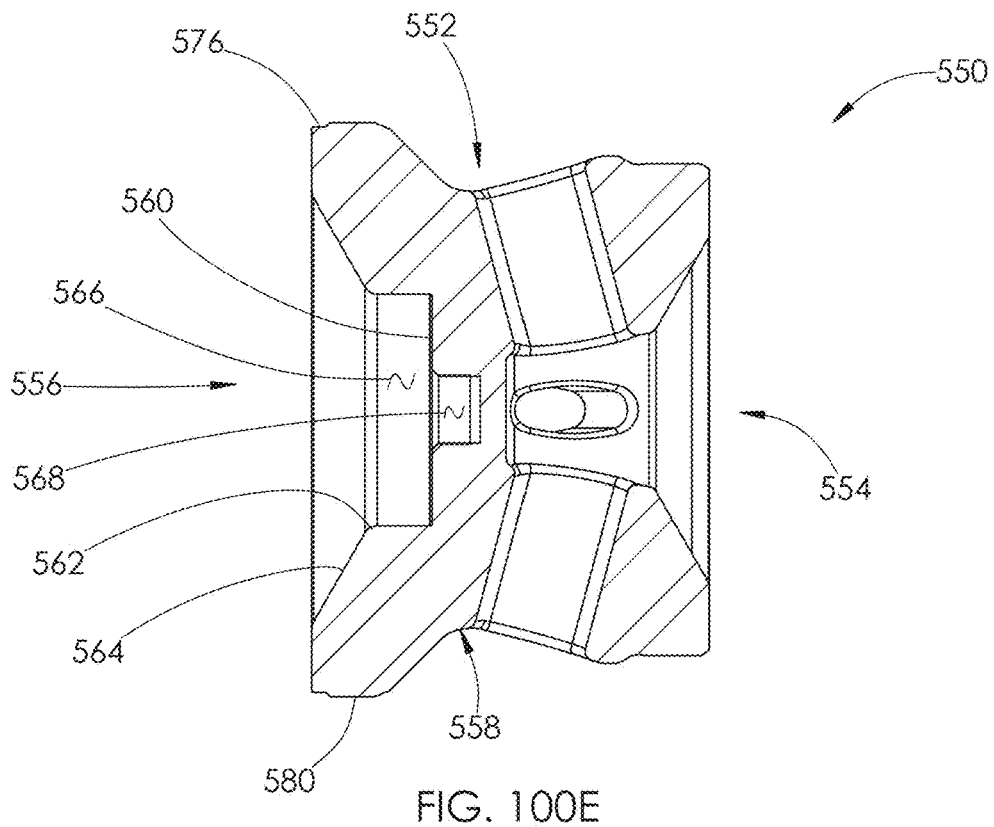
FIG. 100E is a cross-sectional view of the fluid routing plug shown in FIG. 100C, taken along line JB-JB.
Figure 100F:
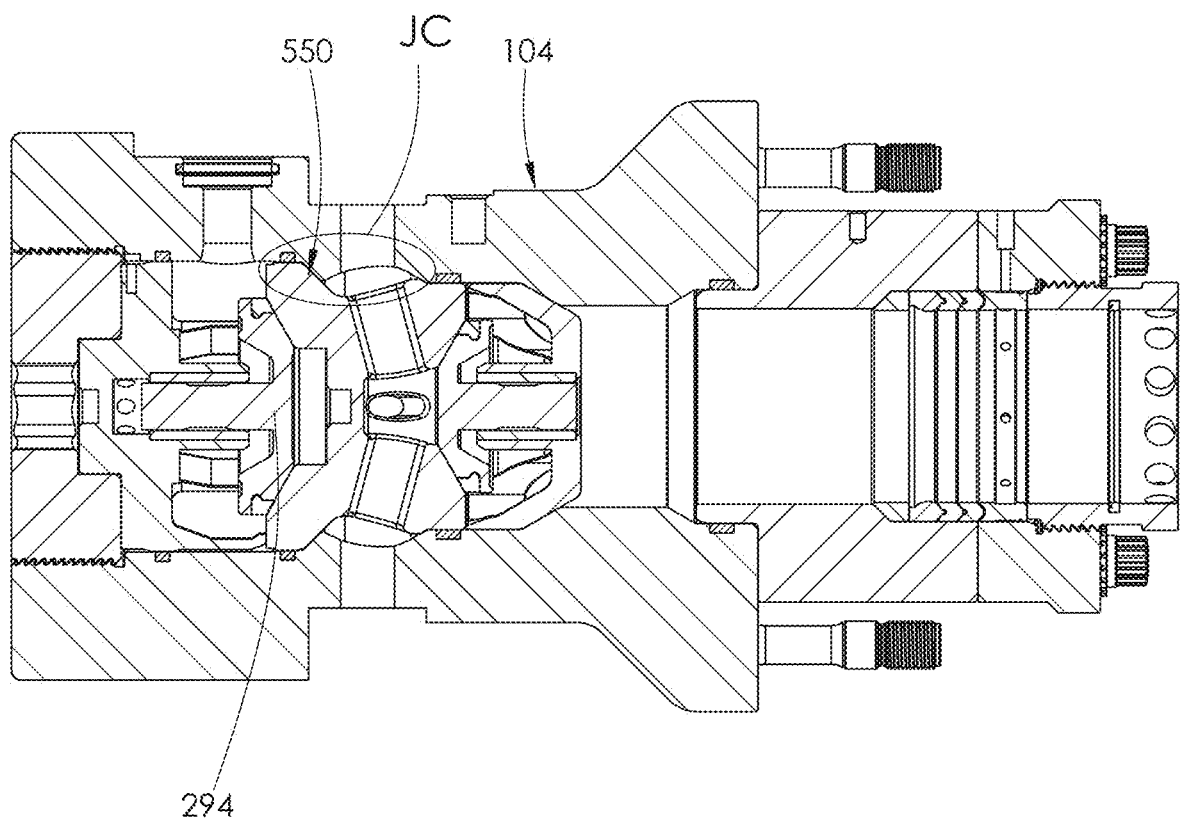
FIG. 100F is the cross-sectional view of the fluid end section shown in FIG. 9, but the fluid routing plug from FIG. 100A is shown installed within the housing.
Figure 100G:
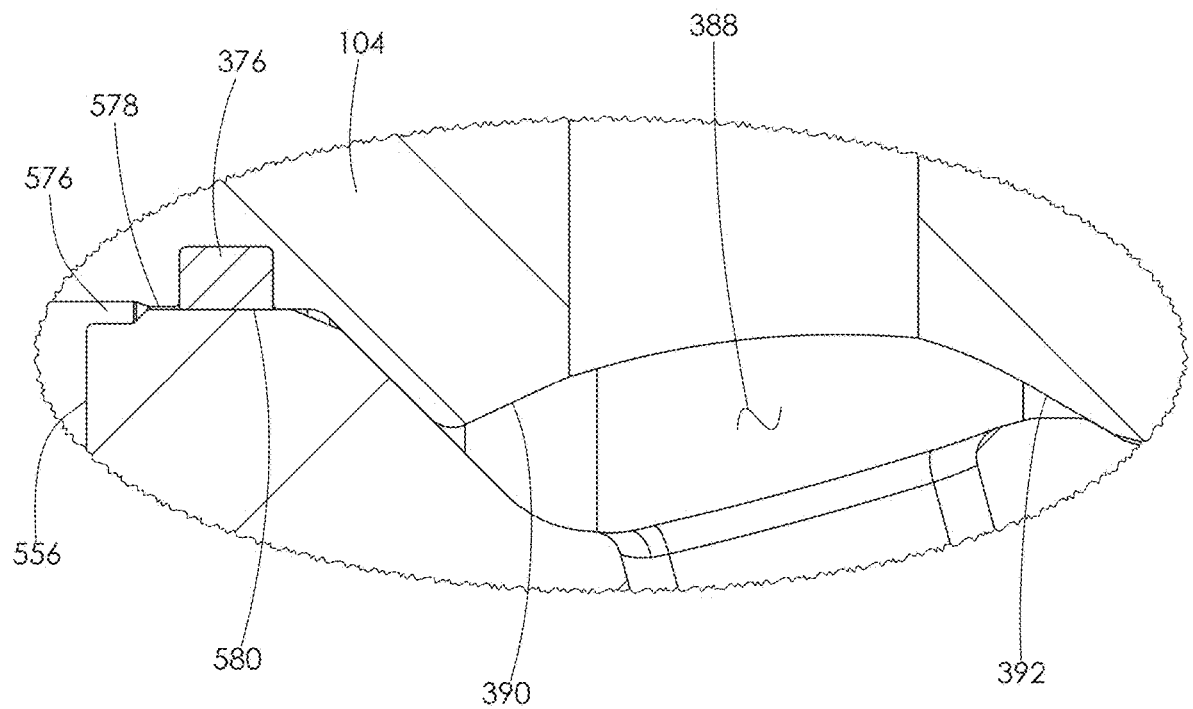
FIG. 100G is an enlarged view of area JC from FIG. 100F.
Figure 101:
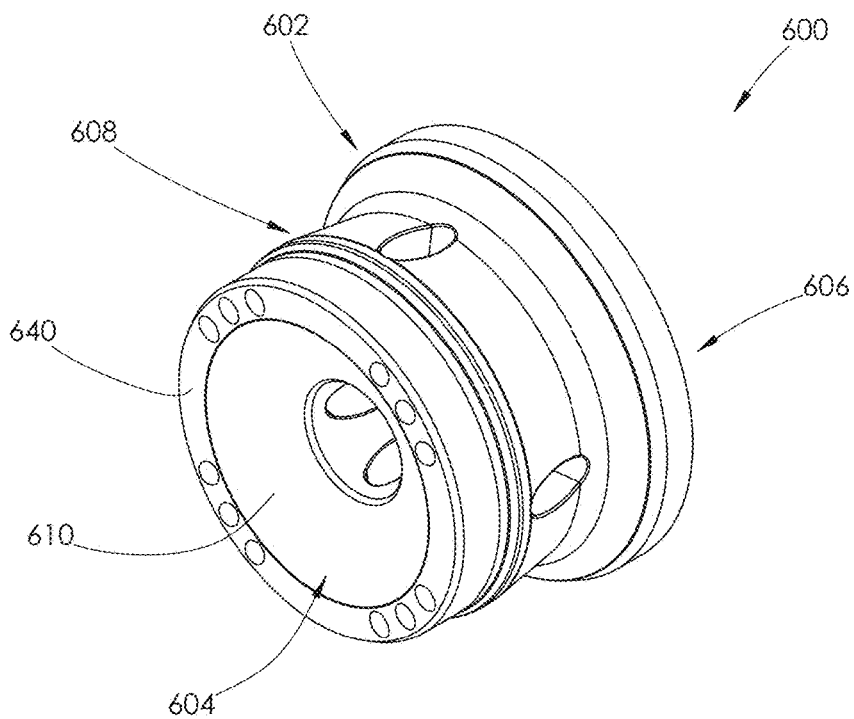
FIG. 101 is a perspective view of a first surface of another embodiment of a fluid routing plug.
Figure 102:
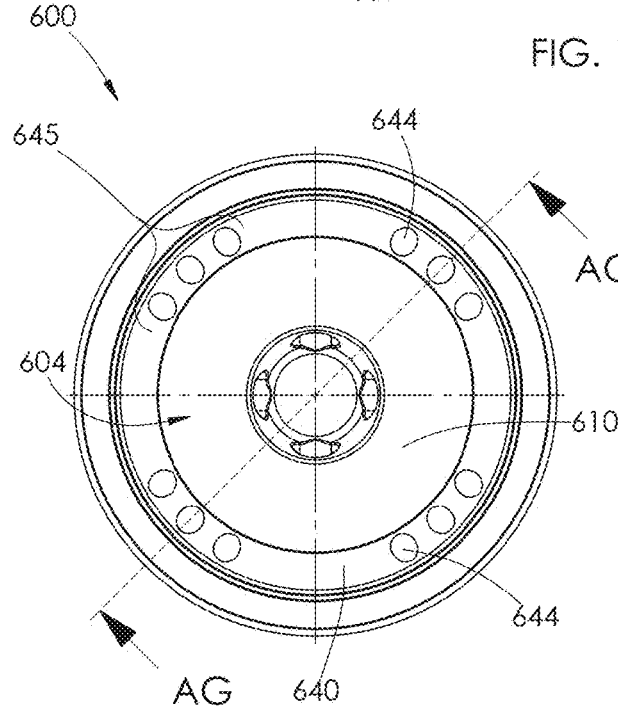
FIG. 102 is an elevational view of the first surface of the fluid routing plug shown in FIG. 101.

Continuing with FIGS. 100E and 100F, the intermediate surface 558 of the fluid routing plug 550 is identical to the intermediate surface 322 formed on the fluid routing plug 116. However, the intermediate surface 558 may include a cutout 576 adjacent the second surface 556. The cutout 576 provides space for fluid or proppant to collect during operation, as shown in FIG. 100F. The cutout 576 also helps reduce friction during installation of the fluid routing plug 550 within the housing 104. A small gap 578 may also exist between the walls of the housing 104 and the intermediate surface 558 between a second sealing surface 580 and the cutout 576, as shown in FIG. 100F. The gap 578 helps the seal 376 breath during operation.

Continuing with FIG. 100B, the first surface 554 of the fluid routing plug 550 is identical of the first surface 318 of the fluid routing plug 116, with the exception of its outer rim 582. The outer rim 582 is flat and wider than the outer rim 338, shown in FIG. 55. Because the outer rim 582 is wider, a plurality of openings 584 for the second fluid passages 572 may have a slightly larger diameter than the openings 348, shown in FIG. 56. Likewise, the openings 570 may also have a slightly larger diameter than the openings 364 shown in FIG. 54. Providing a slightly larger diameter for the second fluid passages 572 helps reduce fluid velocity through the fluid routing plug 550 during operation. Reducing fluid velocity within the fluid routing plug 550 helps reduce wear to the fluid routing plug 550 over time.

Figure 103:
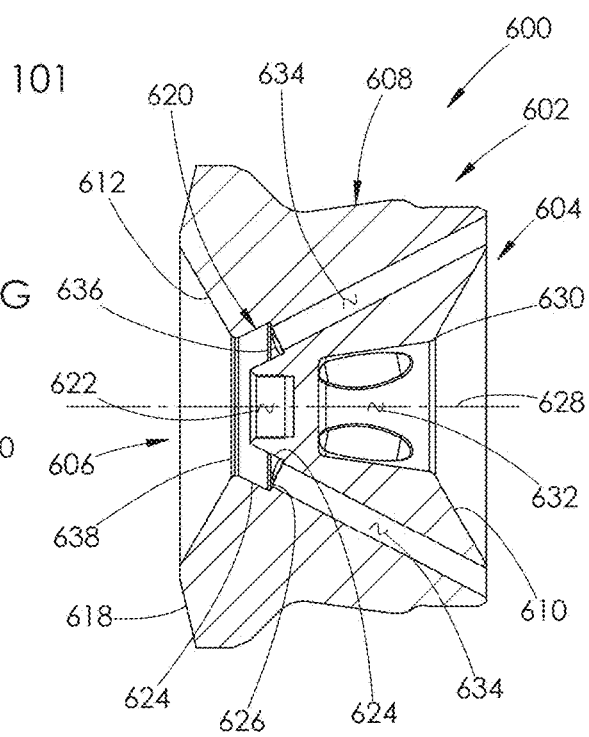
FIG. 103 is a cross-sectional view of the fluid routing plug shown in FIG. 102, taken along line AG-AG.
Figure 108:
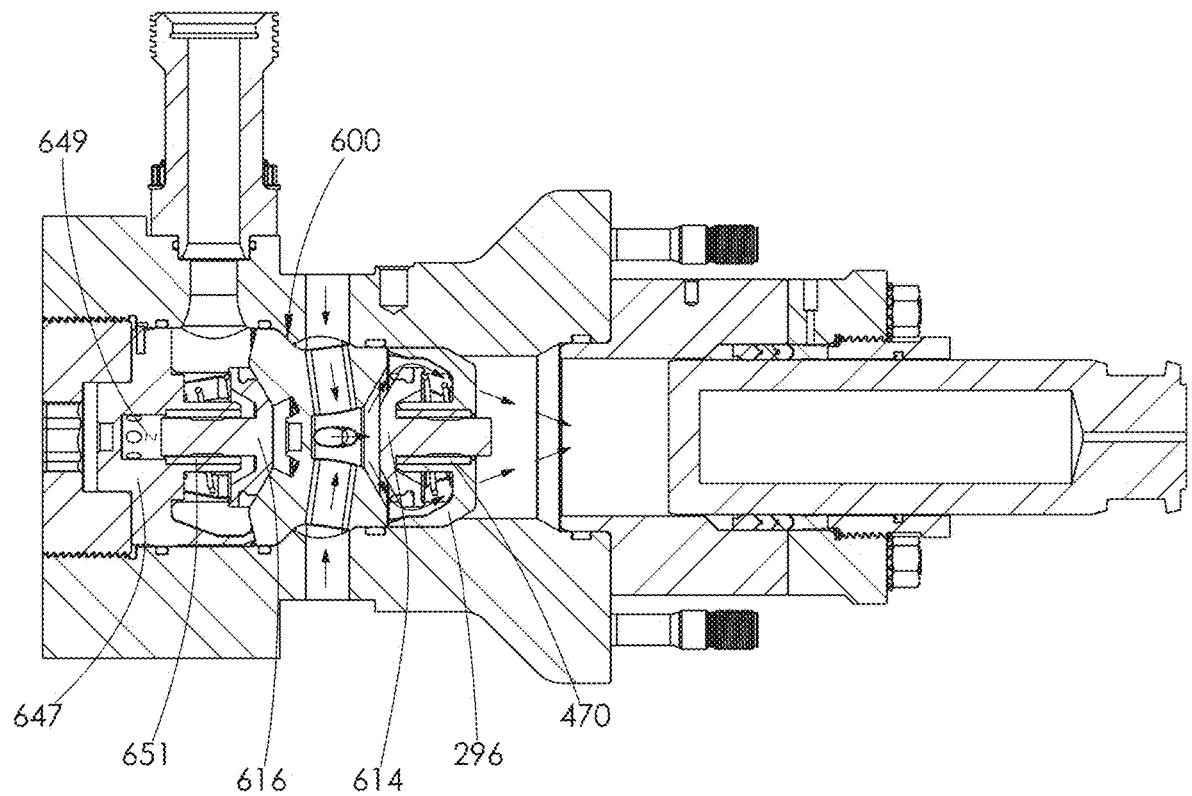
FIG. 108 is the cross-sectional view of the fluid end section shown in FIG. 50, but the fluid routing plug from FIG. 101 is shown installed within the housing.
Figure 109:
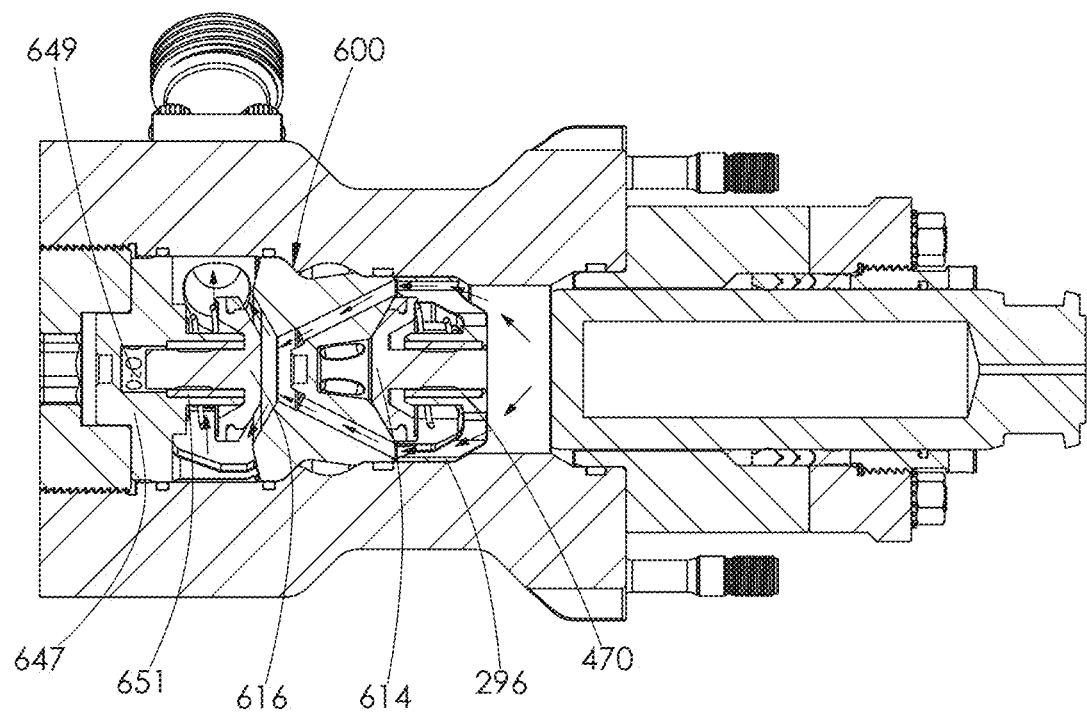
FIG. 109 is the cross-sectional view of the fluid end section shown in FIG. 51, but the fluid routing plug from FIG. 101 is shown installed within the housing.
Figure 110:
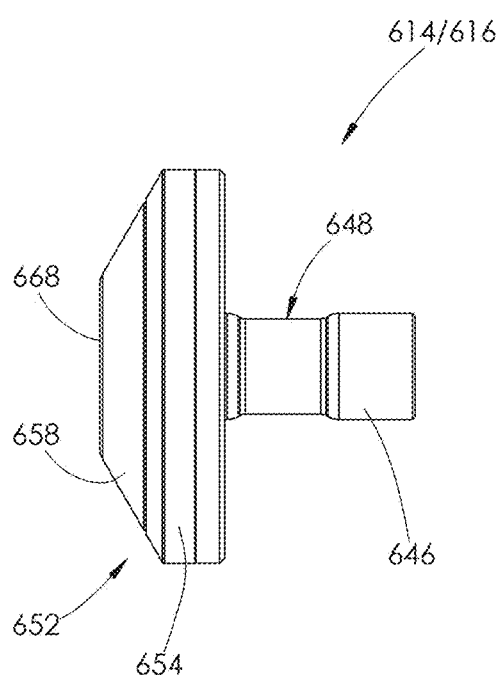
Figure 111:
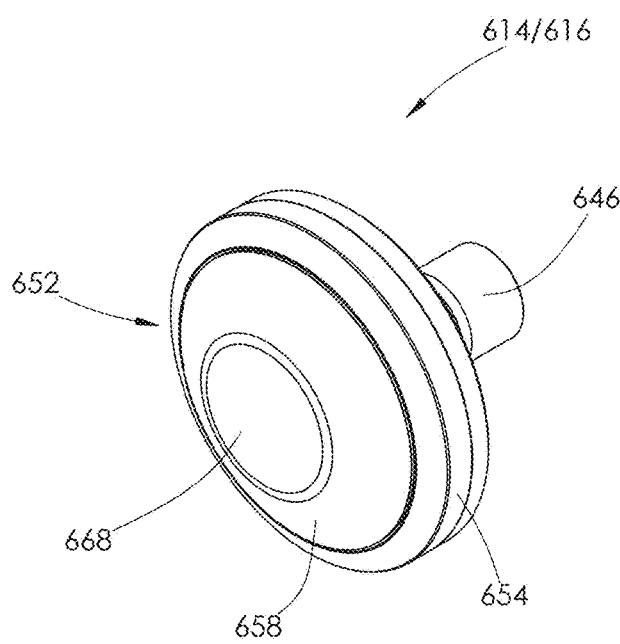
Figure 112:
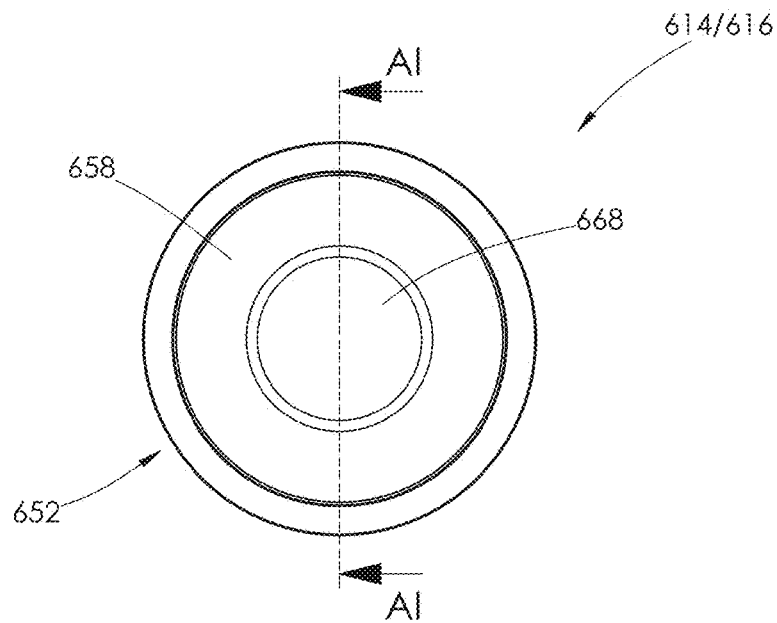
Figure 113:
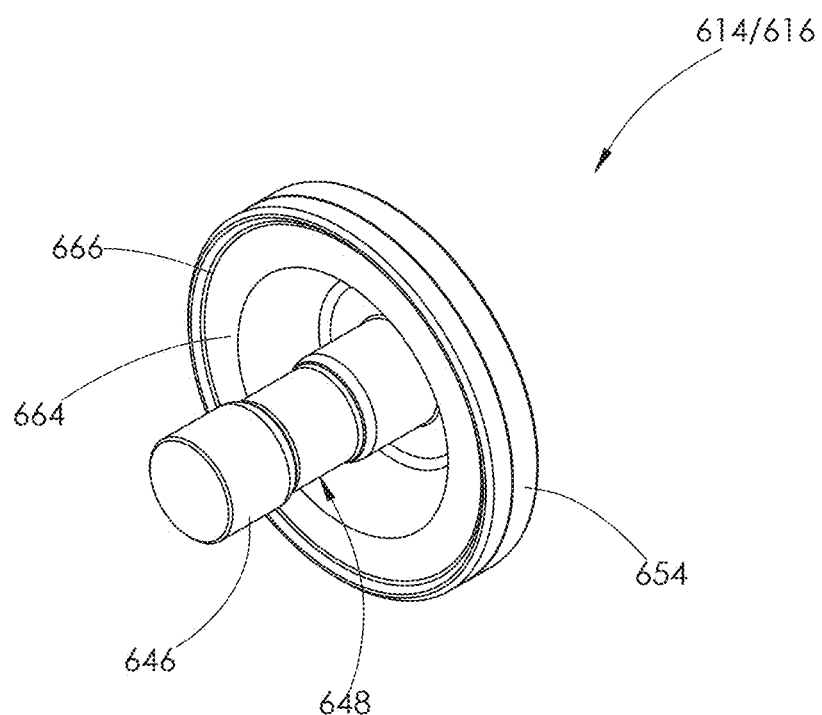
Figure 114:
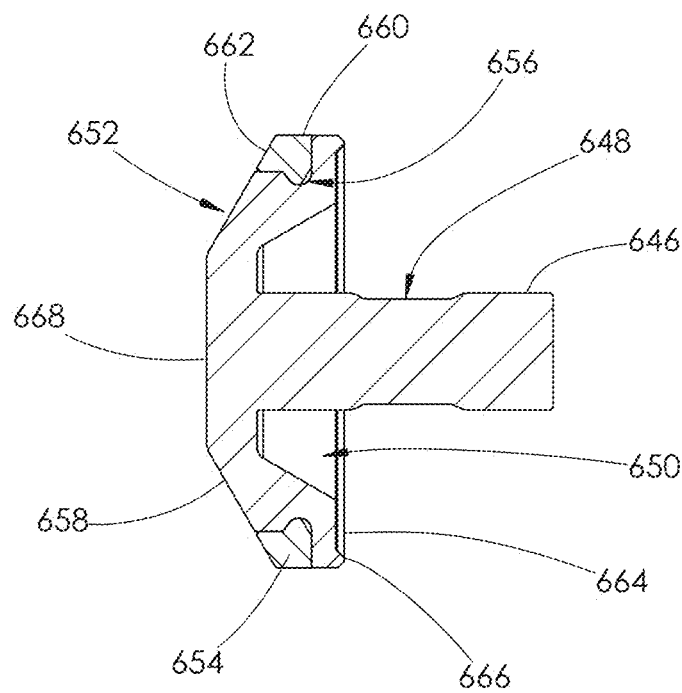

Turning to FIGS. 101-109, another embodiment of a fluid routing plug 600 is shown. The fluid routing plug 600 may be installed within the housing 104 in place of the fluid routing plug 116. The fluid routing plug 600 is identical to the fluid routing plug 116, with a few exceptions. The fluid routing plug 600 comprises a body 602 having a first outer surface 604 joined to a second outer surface 606 by an intermediate outer surface 608. In contrast to the fluid routing plug 116, the first and second surfaces 604 and 606 of the fluid routing plug 600 are configured so that each surface 604 and 606 has identically sized tapered walls 610 and 612, as shown in FIG. 103. Because the tapered walls 610 and 612 are the same size, a suction valve 614 and a discharge valve 616 used with the fluid routing plug 600 may be identical in size, as shown in FIGS. 108 and 109.

Using the same size suction and discharge valves 614 and 616 helps equalize the forces applied to the fluid routing plug 600 and the valves 614 and 616 during operation, helping to reduce any wear to the parts over time. Making the suction and discharge valves 614 and 616 identical also makes replacing the valves 614 and 616 during operation easier.

Figure 105:
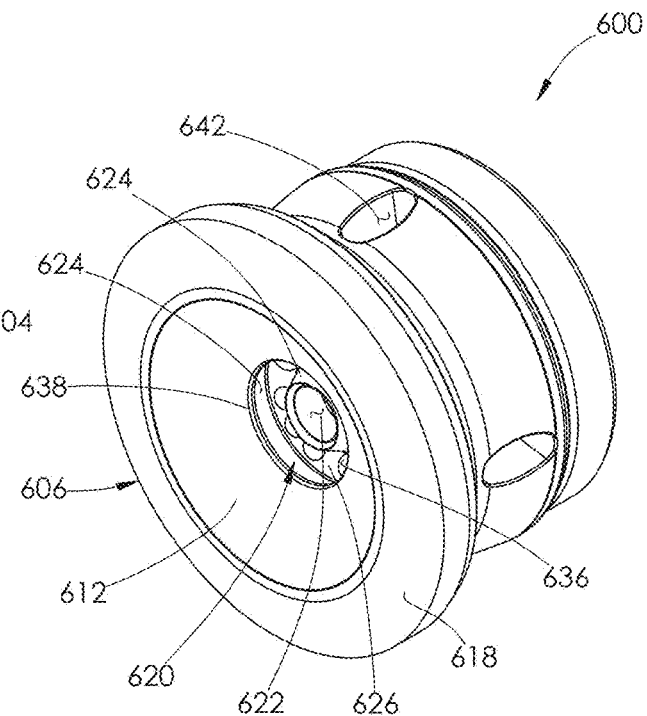
FIG. 105 is a perspective view of a second surface of the fluid routing plug shown in FIG. 101.
Figure 106:
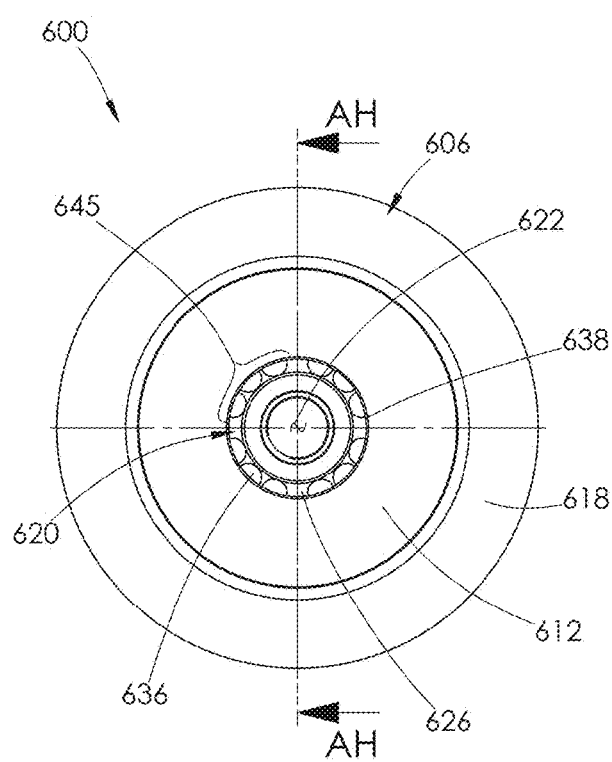
FIG. 106 is an elevational view of the second surface of the fluid routing plug shown in FIG. 101.
Figure 107:
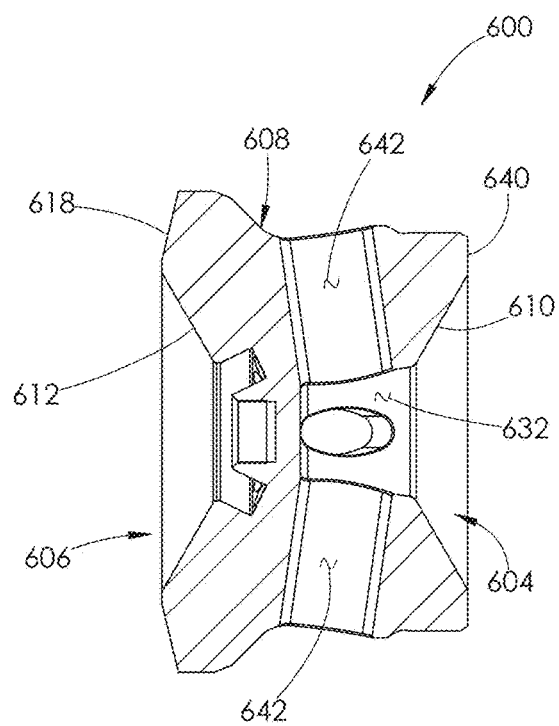
FIG. 107 is a cross-sectional view of the fluid routing plug shown in FIG. 106, taken along line AH-AH.

Continuing with FIGS. 103, 105, and 106, the tapered wall 612 formed in the second surface 606 extends between an outer rim 618 and an annular groove 620 formed in the center of the second surface 606. The annular groove 620 may be considered a central base formed in the second surface 606. The groove 620 surrounds a blind bore 622 formed in the center of the second surface 606. The blind bore 622 is identical to the blind bore 362 formed in the fluid routing plug 116, as shown in FIG. 55.

The groove 620 is characterized by two parallel sidewalls 624 joined by a base 626. The sidewalls 624 each extend at a non-zero angle relative to a central longitudinal axis 628 of the body 602. Because the sidewalls 624 of the groove 620 extend at an angle, the base 626 of the groove 620 extends at a non-zero angle relative to the central longitudinal axis 628 of the body 602. Preferably, the base 626 extends at approximately the same angle as the tapered wall 612 so that the base 626 and the tapered wall 612 are in a generally parallel relationship. The tapered wall 612 shown in FIG. 103 extends at a 45 degree angle relative to the central longitudinal axis 628.

An annular inner edge 638 of the tapered wall 612 is joined to the outer sidewall 624 of the groove 620 at a right angle. The diameter of the inner edge 638 of the tapered wall 612 is the same size as a diameter of an entrance 630 of an axially blind bore 632 formed in the first surface 604, as shown in FIG. 103. In alternative embodiments, the groove formed in the second surface and the inner edge of the tapered wall may not have an annular shape.

Continuing with FIGS. 103, 105, and 106, a plurality of second fluid passages 634 are formed in the body 602. The second fluid passages 634 are identical to the second fluid passages 336 formed in the fluid routing plug 116, shown in FIGS. 52-64, with the exception of the positioning of their openings 636 on the second surface 606. Each second fluid passage 634 opens on the base 626 of the groove 620 formed in the second surface 606. Thus, the openings 636 are axially spaced from the inner edge 638 of the tapered wall 612. Because the sidewalls 624 of the groove 620 are formed at an angle, the inner edge 638 of the tapered wall 612 slightly overlaps the openings 636, as shown in FIG. 106. By positioning the openings 636 in an axially spaced relationship with the inner edge 638 of the tapered wall 612, the size of the tapered wall 612 can be decreased without decreasing the size of the openings 636. The annular groove 620 also functions as a throat, similar to the throat 566 formed in the fluid routing plug 550.

Figure 104:
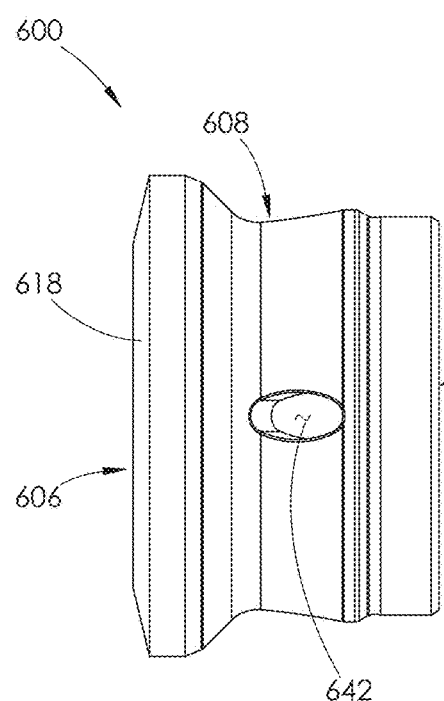
FIG. 104 is a top plan view of the fluid routing plug shown in FIG. 101.

Because the tapered wall 612 is decreased in size from the tapered wall 356 shown in FIG. 55, the outer rim 618 on the second surface 606 is wider than the outer rim 352. The outer rim 618 also tapers between the intermediate surface 608 and the tapered wall 612, as shown in FIGS. 103 and 104. Such taper increases the length of the tapered wall 612 without increasing the length of the intermediate surface 608.

Continuing with FIGS. 101-107, the first surface 604 is identical to the first surface 318 shown in FIGS. 53, 55, and 56, with the exception of its outer rim 640. Instead of tapering like the outer rim 338, shown in FIG. 55, the outer rim 640 is flat. The outer rim 640 is flat in order to slightly decrease the size of the tapered wall 610 to match the size of the tapered wall 612. The intermediate surface 608 of the fluid routing plug 600 is identical to that of the fluid routing plug 116, shown in FIG. 64. A plurality of first fluid passages 642 formed in the body 602 are identical to the first fluid passages 326, shown in FIGS. 55, 57, and 59. The second fluid passages 634 open on the outer rim 640 of the first surface 604, as shown by the openings 644. The openings 644 are positioned in groups 645, in the same manner as the second fluid passages 336 formed in the fluid routing plug 116, as shown in FIG. 56. The openings 636 on the second surface 606 may remain spaced in groups 645, as shown in FIG. 106.

With reference to FIGS. 108 and 109, the fluid routing plug 600 routes fluid throughout the housing 104 in the same manner as the fluid routing plug 116. The suction valve guide 296 is shown engaged with suction valve 614. Another embodiment of a discharge valve guide 647 is shown engaged with the discharge valve 616.

The discharge valve guide 647 is identical to the discharge valve guide 298, shown in FIGS. 90-95, with a few exceptions. A counterbore 649 formed in the guide 647 is larger than the counterbore 496. The counterbore 649 is larger in order to accommodate the shorter stem 646 of the discharge valve 616. An insert 651 installed within the discharge valve guide 647 is the same size as the insert 470 installed within the suction valve guide 296.

With reference to FIGS. 110-114, as discussed above, in contrast to the valves 292 and 294, the valves 614 and 616 are identical in size and shape. The valves 614 and 616 are generally identical to the valves 292 and 294, with a few exceptions. Each valve 614 and 616 comprises a sealing element 652 joined to a stem 646. The stem 646 projects from a first surface 650 of the sealing element 652.

An annular cutout 648 is formed within a medial portion of the stem 646. The cutout 648 provides space for fluid or proppants to collect during operation. Providing such space prevents the fluid and proppants from rubbing against the inserts 470 and 502. The suction and discharge valves 292 and 294 may be configured to include an annular cutout within their stems 424 and 474.

Continuing with FIGS. 110-114, the sealing element 652 further includes a second surface 668 joined to the first surface 650 by a sealing surface 658. A groove 656 is formed in the sealing surface 658 for housing a seal 654. The groove 656 is identical to the groove 430, shown in FIG. 76. An outward facing surface of the seal 654 comprises a sidewall 660 joined to a tapered base 662. In operation, the tapered base 662 engages the tapered walls 610 and 612 of the fluid routing plug 600. The sidewall 660 may compress creating a tight seal.

The first surface 650 of the sealing element 652 includes an outer rim 664. An outer ledge 666 surrounds the outer rim 664. A bottom portion of a spring engages the outer rim 664 and is held in place by the outer ledge 666. While not shown, a cutout may be formed in the second surface 668 of the sealing element 652, like the cutout 444, shown in FIG. 76.

One or more kits may be useful in assembling the fluid end section 102. A kit may comprise a plurality of housings 104 and a plurality of the corresponding fluid routing plugs 116 or 600. The kit may also comprise a plurality of suction valves 292 or 614, discharge valves 294 or 616, suction valve guides 296, discharge valve guides 298 or 657, springs 452 and 528, retainer 300, stuffing box 140, retainer 232, plunger packing 224, packing nut 276, fastening system 234, discharge conduit 174, and the various seals described herein. The kit may also comprise the intake manifolds 166 and 168, pipe system 176, connect plate 118, fastening system 146 and stay rods 120. The kit may also comprise other various features described herein for use with the fluid end 100. Unless specifically described herein, the various components of the fluid end 100 may be made of high strength alloy steel, such as carbon steel or stainless steel.

Figure 115:
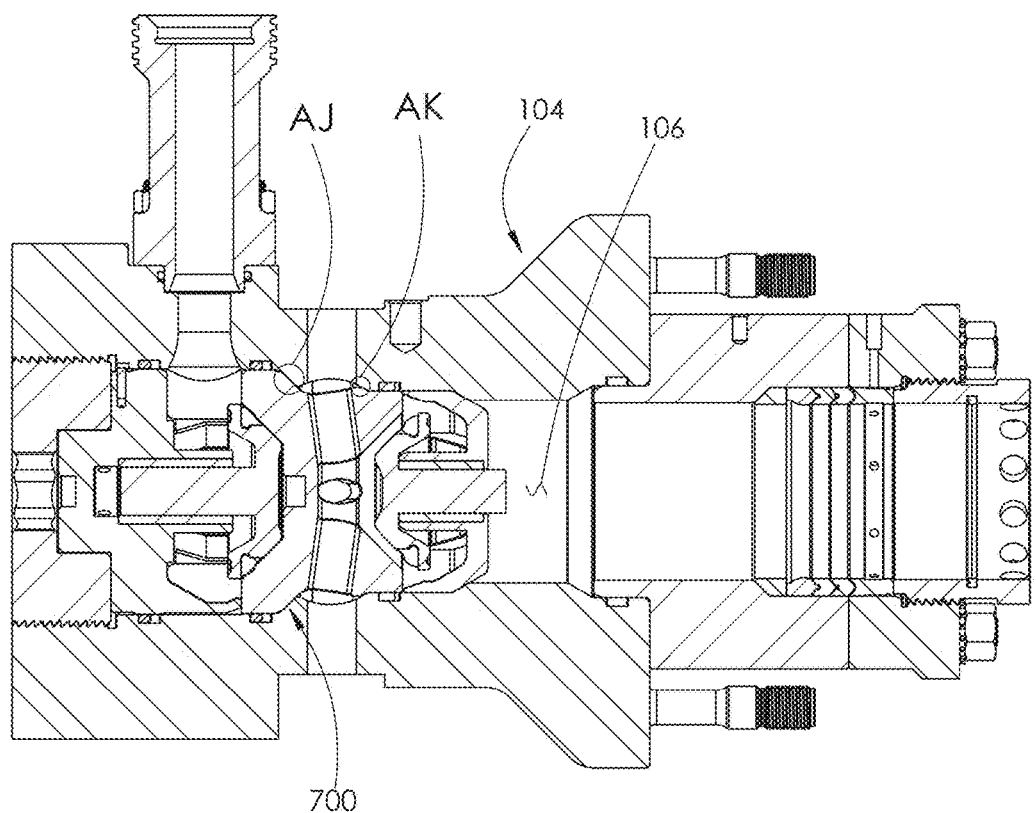
Figure 116:
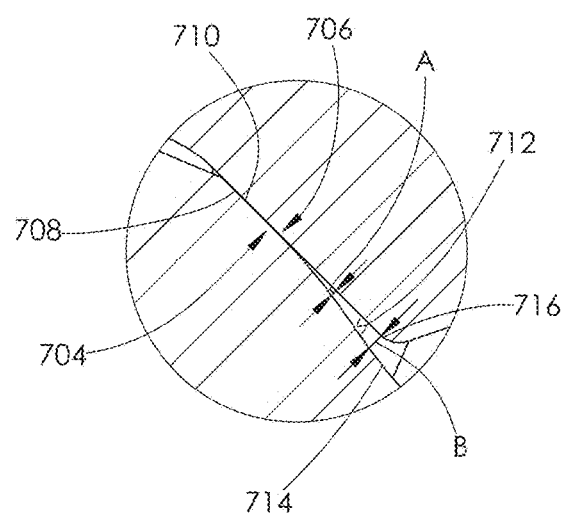
Figure 117:
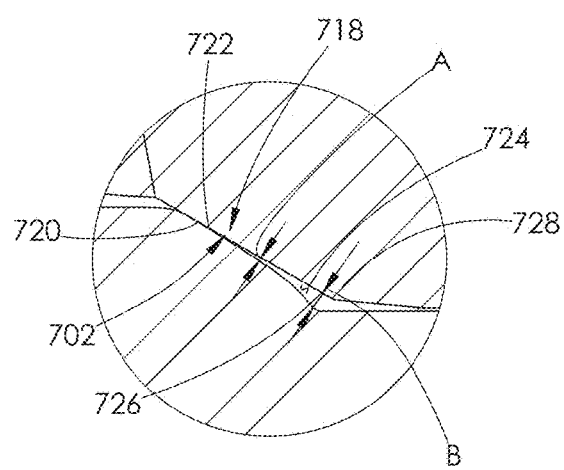

With reference to FIGS. 115-117, an alternative embodiment of a fluid routing plug 700 is shown. The fluid routing plug 700 may be installed within the housing 104 in place of the fluid routing plug 116. The fluid routing plug 700 is identical to the fluid routing plug 116, with the exception of the shape of its first and second bevels 702 and 704. When the fluid routing plug 700 is first installed within the horizontal bore 106, the second bevel 704 only partially engages a second beveled surface 706, as shown in FIG. 116. The bevels 704 and 706 mate at a second bevel mating surface 708 and a second beveled surface mating surface 710. Below the mating surfaces 708 and 710, the second bevel 704 and the second beveled surface 706 have mating angles that are not equal, causing a gap 712 to exist between the bevels 704 and 706. Specifically, the second bevel 704 may have a slightly convex shape so that portions of the second bevel 704 don't match the flat shape of the second beveled surface 706.

The width of the gap 712 gradually increases between the mating surfaces 708 and 710 and a bottom portion 714 of the second bevel 704 and a bottom portion 716 of the second beveled surface 706. Thus, the width B of the gap 712 is wider than the width A of the gap 712. Because the second bevel 704 has a slightly convex shape, the angle between the mating surfaces 708 and 710 is different from the angle between the bottom portions 714 and 716.

Turning to FIG. 117, the first bevel 702 and the first beveled surface 718 are shown in more detail. Like the second bevel 704, the first bevel 702 may only partially engage a first beveled surface 718. The bevels 702 and 718 mate at a first bevel mating surface 720 and a first beveled surface mating surface 722. Below the mating surfaces 720 and 722, the first bevel 702 and the first beveled surface 718 have mating angles that are not equal, causing a gap 724 to exist between the bevels 702 and 718. Specifically, the first bevel 702 may have a slightly convex shape so that portions of the first bevel 702 do not match the flat shape of the first beveled surface 718.

The width of the gap 724 gradually increases between the mating surfaces 720 and 722 and a bottom portion 726 of the first bevel 702 and a bottom portion 728 of the first beveled surface 718. Thus, the width B of the gap 724 is wider than the width A of the gap 724. Because the first bevel 702 has a slightly convex shape, the angle between the mating surfaces 720 and 722 is different from the angle between the bottom portions 726 and 728.

The width of the gaps 712 and 724 has been exaggerated in FIGS. 116 and 117 for illustration purposes. In reality, portions of the gaps 712 and 724 may be approximately 0.002 inches in width, for example. However, the gaps 712 and 724 may be wider or smaller depending on the materials and forces used.

As discussed above, in operation, the fluid pressure applied to the fluid routing plug 700 will cause the plug 700 to compress and expand as the plunger 290 retracts from the housing 104. As the fluid routing plug 700 starts to expand, the bottom portion 714 of the second bevel 704 will move to engage the bottom portion 714 of the second beveled surface 706, causing the bottom portions 714 and 716 to mate. Likewise, the bottom portion 726 of the first bevel 702 will move to engage the bottom portion 728 of the first beveled surface 718. Such movement of the fluid routing plug 700 distributes the load applied to the fluid routing plug 700 through the length of the first and second bevels 702 and 704.

Figure 118:
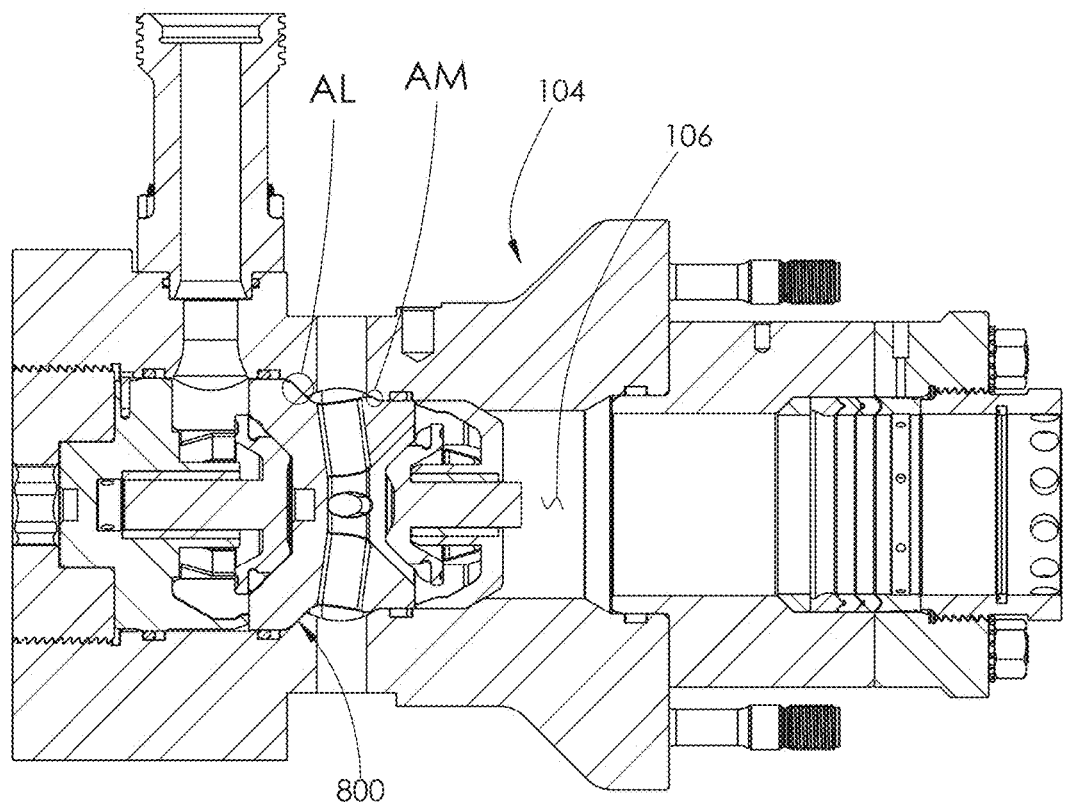
Figure 119:
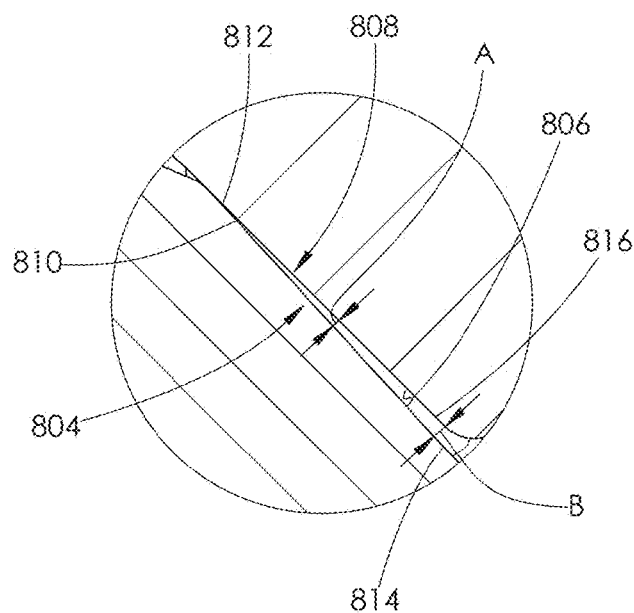
Figure 120:
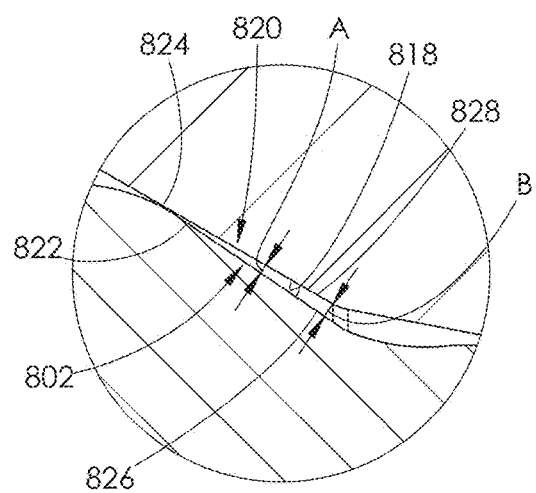

With reference to FIGS. 118-120, an alternative embodiment of a fluid routing plug 800 is shown. The fluid routing plug 800 may be installed within the housing 104 in place of the fluid routing plug 116. The fluid routing plug 800 is identical to the fluid routing plug 700, with the exception of the shape of its first and second bevels 802 and 804. Like the fluid routing plug 700, the second bevel 804 is sized to leave a gap 806 between the second bevel 804 and a second beveled surface 808 when the fluid routing plug 800 is first installed within the housing 104. In contrast to the gap 712, an angle formed between the mating surfaces 810 and 812 and bottom portions 814 and 816 of the second bevel 804 and second beveled surface 808 remains the same. Thus, an area A of the gap 806 has the same angle as an area B of the gap 806.

Likewise, the first bevel 802 is shaped so that an angle formed between the first bevel 802 and a first beveled surface 820 stays relatively the same between mating surfaces 822 and 824 and bottom portions 826 and 828. Thus, the width A of the gap 818 has approximately the same angle as the width B of the gap 818.

The width of the gaps 806 and 818 has been exaggerated in FIGS. 119 and 120 for illustration purposes. In reality, portions of the gaps 806 and 818, for example, may be approximately 0.002 inches in width. However, the gaps 806 and 818 may be wider or smaller depending on the materials and forces used.

As discussed above, the first and second bevels 802 and 804 expand during operation. Such movement of the fluid routing plug 800 distributes the load applied to the fluid routing plug 800 through the length of the first and second bevels 802 and 804.

In alternative embodiments, the first bevel may be configured to have a gap that increases in size, as shown in FIG. 117, while the second bevel may be configured to have a gap that increases by a different amount, as shown in FIG. 119, and vice versa. In further alternative embodiments, the width of the gap may be of various shapes and sizes depending on the materials used and forces involved. In even further alternative embodiments, the intermediate surface of the fluid routing plug may include any combination of the different bevel constructions described herein.

Turning to FIGS. 121-128, another embodiment of a fluid routing plug 900 is shown. The fluid routing plug 900 may be installed within the housing 104 in place of the fluid routing plug 116. The fluid routing plug 900 is identical to the fluid routing plug 116, with a few exceptions. The fluid routing plug 900 comprises a body 902 having a first outer surface 904 joined to a second outer surface 906 by an intermediate outer surface 908. A plurality of first fluid passages 910 are formed in the body 902 and interconnect the intermediate surface 908 and the first surface 904 by way of an axially blind bore 912, as shown in FIG. 124.

In contrast to the first fluid passages 326, shown in FIGS. 55 and 58, a longitudinal axis 914 of each first fluid passage 910 does not intersect a central longitudinal axis 916 of the body 902, as shown in FIG. 125. Rather, the first fluid passages 910 are formed such that the longitudinal axis 914 of each passage 910 is offset from the central longitudinal axis 916 of body 902. The offset configuration of the first fluid passages 910 encourages a vortex type flow of fluid about the central longitudinal axis 916, thereby reducing fluid turbulence during operation. In alternative embodiments, the longitudinal axis 914 of each first fluid passage 910 may intersect the longitudinal axis 916 of the body 902.

A plurality of openings 918 formed on the intermediate surface 908 for the first fluid passages 910 are similar to the openings 334, shown in FIGS. 57 and 59, but have a more oblong shape, as shown in FIG. 121. The oblong shape shown in FIG. 121 has opposed first and second ends 920 and 922. The second end 922, which is closer to the second surface 906, is slightly wider than the first end 920. The unequal size of the ends 920 and 922 helps direct fluid along the offset longitudinal axis 914 of the first fluid passages 910. The unequal size of the ends 920 and 922 also helps increase the wall thickness in certain areas of the body 902 between the first fluid passages 910 and a plurality of second fluid passages 924.

In alternative embodiments, the opposed ends of the openings may be identical in size or may be shaped identical to the openings 334, shown in FIGS. 57 and 59. The opening 918 of the first fluid passage 910 shown in FIG. 121 extends along an axis that is parallel to the longitudinal axis 916 of the body 902. In alternative embodiments, the openings of the first fluid passages may extend at a non-zero angle relative to the longitudinal axis 916 of the body 902, as shown for example by the openings 972 shown in FIG. 128D. The angle at which the first fluid passages 910 are formed in the body 902 may vary, as desired, in order to increase the wall thickness within the body 902 and reduce stress in the body 902 during operation.

Continuing with FIGS. 122 and 126, each of the second fluid passages 924 formed in the body 902 interconnects the first and second surfaces 904 and 906. The second fluid passages 924 are identical to the second fluid passages 336, shown in FIGS. 60-63, but the second fluid passages 924 are slightly pivoted from the position of the second fluid passages 336. Each second fluid passage 924 is pivoted so that it has a compound angle with respect to the central longitudinal axis 916, as shown in FIGS. 122, 123, 126, and 127. Meaning, each second fluid passage 924 extends such that it has two different angles relative to the central longitudinal axis 916—up-and-down, and side-to-side. Like the first fluid passages 910, forming the second fluid passages 924 at such angles encourages a vortex type flow of fluid about the central longitudinal axis 916, thereby reducing fluid turbulence during operation.

Continuing with FIGS. 124, 127, and 128, the first surface 904 of the fluid routing plug 900 may be identical to the first surface 318, shown in FIGS. 53, 55, and 56. However, an outer rim 926 of the first surface 904 may be flat rather than tapered. The second surface 906 of the fluid routing plug 900 is identical to the fluid routing plug 116, but a central base 928 formed in the second surface 906 may be slightly set back within the body 902, as compared to the central base 354, shown in FIGS. 54 and 55. An outer rim 930 on the second surface 906 may be slightly wider than the outer rim 352, shown in FIGS. 54 and 55. The intermediate surface 908 of the fluid routing plug 900 may be identical to the intermediate surface 322 of the fluid routing plug 116. Alternatively, the intermediate surface may be identical to those formed on the fluid routing plug 700 or 800.

In alternative embodiments, the first and second surfaces 904 and 906 of the fluid routing plug 900 may be configured so that its tapered walls 932 and 934 are the same size, like the fluid routing plug 600. In further alternative embodiments, the first and second surfaces of the fluid routing plug 900 may be identical to the first and second surfaces of the fluid routing plug 116.

Turning to FIGS. 128A-128G, another embodiment of a fluid routing plug 950 is shown. The fluid routing plug 950 may be installed within the housing 104 in place of the fluid routing plug 116. The fluid routing plug 950 is identical to the fluid routing plug 900, with a few exceptions. The fluid routing plug 950 comprises a body 962 having a first outer surface 964 joined to a second outer surface 952 by an intermediate outer surface 966. In contrast to the fluid routing plug 900, the second surface 952 of the fluid routing plug 950 is formed identically to the second surface 856 of the fluid routing plug 850, shown in FIGS. 100A-100E. A central base 954 formed in the second surface 952 is spaced from an edge 956 of a tapered wall 958 such that a throat 960 is formed within the second surface 952. The throat 960 serves the same purpose as the throat 566 formed in the fluid routing plug 550.

Continuing with FIG. 128A-128G, a plurality of first fluid passages 968, shown in FIG. 128G, and a plurality of second fluid passages 970, shown in FIG. 128A, are formed in the body 962. The first and second fluid passages 968 and 970 are identical to the first and second passages 910 and 924 formed in the fluid routing plug 900. However, as discussed above, an opening 972 of the first fluid passages 968 may extend along a non-zero angle relative to a central longitudinal axis 974 of the body 962, as shown in FIG. 128D. In alternative embodiments, the openings 972 may be identical to the openings 918, shown in FIG. 121. Like the fluid routing plug 900, the angle at which the first fluid passages 968 are formed in the body 962 may vary, as desired, in order to increase the wall thickness within the body 962 and reduce stress in the body 962 during operation.

In alternative embodiments, the first and second surfaces 964 and 952 of the fluid routing plug 950 may be configured like the fluid routing plug 600. In further alternative embodiments, the first and second surfaces of the fluid routing plug 950 may be identical to the first and second surfaces of the fluid routing plug 116.

Turning to FIGS. 129-131, another embodiment of a fluid routing plug 1000 is shown. The fluid routing plug 1000 may be installed within the housing 104 in place of the fluid routing plug 116. The fluid routing plug 1000 is identical to the fluid routing plug 116, but the fluid routing plug 1000 includes a first and second annular recess 1002 and 1004 formed in its intermediate surface 1001. The first annular recess 1002 is positioned between a first bevel 1006 and a first sealing surface 1008. The second annular recess 1004 is positioned between a second sealing surface 1010 and a second bevel 1012.

When the fluid routing plug 1000 is installed within the horizontal bore 106, a small annular space exists between the wall of the housing 104 and each recess 1002 and 1004.

The space provides relief areas for excess fluid or proppant to collect during operation. The first and second recesses 1002 and 1004 may also be formed in the intermediate surfaces of the fluid routing plugs 550, 600, 700, 800, 900, and 950.

In alternative embodiments, the first and second surfaces of each of the fluid routing plugs 550, 600, 700, 800, 900, and 950 may each be sized so as to engage with identically sized suction and discharge valves 292, 294, 614 or 616, as discussed with regard to fluid routing plug 600. In further alternative embodiments, the first and second surfaces of each of the fluid routing plugs 550, 600, 700, 800, 900, and 950 may be sized so as to engage with differently sized suction and discharge valves 292, 294, 614 or 616. In such embodiment, the valves 292, 294, 614 or 616 may be sized as desired, as long as the ratio of the outer sealing diameter A to the inner sealing diameter B of each valve is preferably 1.55 or greater, as discussed with regard to FIGS. 72 and 85. The desired size of the valve may vary depending on the desired fluid velocity within the corresponding fluid routing plug.

With reference to FIGS. 132-138, another embodiment of a fluid routing plug 1100 is shown. The fluid routing plug 1100 is identical to the fluid routing plug 116, with the exception of its outer intermediate surface 1102. The intermediate surface 1102 includes a first sealing surface 1104, a second sealing surface 1106, and a first bevel 1108. In contrast to the fluid routing plug 116, the intermediate surface 1102 does not include a second bevel. The first bevel 1108 is positioned between the first sealing surface 1104 and a first surface 1110 of the fluid routing plug 1100. In contrast, the first bevel 378 is positioned between the first fluid passage 326 and the first sealing surface 370 in the fluid routing plug 116, as shown in FIG. 64.

A plurality of first and second fluid passages 1112 and 1114 are formed in the fluid routing plug 1100. The first and second fluid passages 1112 and 1114 are formed identically to the first and second fluid passages 326 and 336 formed in the fluid routing plug 116. Likewise, the first surface 1110 and a second surface 1109 of the fluid routing plug 1100 are generally identical to the first and second surfaces 318 and 320 of the fluid routing plug 116. The intermediate surface 1102 also includes a taper 1116 between the second sealing surface 1104 and a plurality of openings 1118 of the first fluid passages 1112. Fluid is routed throughout the fluid routing plug 1100 and the housing 1120 in the same manner as the fluid routing plug 116 and housing 104 shown in FIGS. 50 and 51.

Continuing with FIGS. 136-138, another embodiment of a housing 1120 is shown. The housing 1120 is identical to the housing 104 with the exception of the shape of the walls surrounding its horizontal bore 1122. The walls surrounding the horizontal bore 1122 are shaped to mate with the fluid routing plug 1100. The walls include a first beveled surface 1124 that mates with the first bevel 1108, as shown in FIG. 138. Unlike the housing 104, the walls do not include a second beveled surface, as shown in FIG. 137. When the fluid routing plug 1100 is installed within the housing 1120, an annular chamber 1126 is formed between the walls of the housing 1120 and the taper 1116 on the intermediate surface 1102. The chamber 1126 provides a pathway for fluid to flow from a pair of intake bores 1128 and 1130 and the openings 1118. A first and second seal 1132 and 1134 installed within the housing 1120 are identical to the first and second seals 374 and 376, shown in FIGS. 70 and 71.

With reference to FIGS. 139-142, another embodiment of a fluid routing plug 1200 is shown. The fluid routing plug 1200 is identical to the fluid routing plug 1100, with the exception of its first and second surfaces 1202 and 1204. The first surface 1202 does not include an outer rim. Rather, the first surface 1202 has a tapered wall 1206 that tapers between an entrance 1208 of an axially blind bore 1210 and an outer edge 1212 of the first surface 1202. A plurality of openings 1214 for a plurality of second fluid passages 1216 are formed in the tapered wall 1206 adjacent the outer edge 1212. Removing the outer rim provides more surface area for the tapered wall 1206 and allows the tapered wall 1206 to taper at an angle of up to 60 degrees. Providing more surface area for the tapered wall 1206 provides more sealing area for a suction valve.

Similarly, the second surface 1204 does not include an outer rim. Rather, the second surface 1204 has a tapered wall 1218 that tapers between a central base 1220 and an outer edge 1222 of the second surface 1204. Removing the outer rim provides more surface area for the tapered wall 1218 and allows the tapered wall 1218 to taper at an angle of up to 60 degrees. Providing more surface area for the tapered wall 1218 provides more sealing area for a discharge valve. The fluid routing plug 1200 may be installed within the housing 1120, shown in FIG. 136. Fluid is routed throughout the fluid routing plug 1200 and the housing 1120 in the same manner as the fluid routing plug 116 and housing 104, shown in FIGS. 50 and 51.

With reference to FIGS. 143-150, another embodiment of a fluid routing plug 1300 is shown. The fluid routing plug 1300 comprises a body 1302 having opposed first and second outer surfaces 1304 and 1306 joined by an intermediate outer surface 1308. A central longitudinal axis 1310 extends through the body 1302 and both surfaces 1304 and 1306. A plurality of first fluid passages 1312 are formed within the body 1302 and interconnect the intermediate surface 1308 and the first surface 1304, as shown in FIG. 146. The first fluid passages 1312 interconnect the intermediate surface 1308 and the first surface 1304 by way of an axially blind bore 1314, as shown in FIG. 146. The first fluid passages 1312 have an oval cross-sectional shape similar to the first fluid passages 326, shown in FIG. 59. In contrast to the first fluid passages 326, the first fluid passages 1312 extend orthogonally to the central longitudinal axis 1310 of the body 1302.

Continuing with FIG. 147, a plurality of second fluid passages 1316 are formed in the body 1302 that interconnect the first surface 1304 and the second surface 1306. Like the second fluid passages 336, shown in FIGS. 60-63, the second fluid passages 1316 extend along a straight-line path between the first and second surfaces 1304 and 1306. The second fluid passages 1316 are offset from and do not intersect the first fluid passages 1312.

Continuing with FIGS. 147 and 149, a first recessed cavity 1318 is formed in the first surface 1304. The first cavity 1318 is characterized by a base 1320 surrounded by a side wall 1322. The base 1320 extends between the side wall 1322 and an entrance 1324 of the blind bore 1314. The side wall 1322 extends between the base 1320 and an outer rim 1326 of the first surface 1304. A plurality of openings 1328 for the second fluid passages 1316 are formed in the outer rim 1326. The openings 1328 are positioned in groups 1330, similar to the openings 348, shown in FIG. 56.

An annular first insert 1332 is installed within the first cavity 1318 such that it is fittingly received within the first cavity 1318. The first insert 1332 has a base 1334 joined to a sidewall 1336 and a central opening 1338. The base 1334 and sidewall 1336 are sized to correspond with the base 1320 and sidewall 1322 of the first recessed cavity 1318. The first insert 1332 has a tapered surface 1340 that extends between the sidewall 1336 and the base 1334. The tapered surface 1340 is sized to engage a suction valve 1342, as shown in FIG. 150.

The first insert 1332 is made of a harder and more wear-resistant material than the body 1302. For example, if the body 1302 is made of metal, the first insert 1332 may be made of tungsten carbide. Making the first insert 1332 out of a harder and more wear-resistant material than the body 1302 helps extend the life of the body 1302. Further, the first insert 1332 may be removed and replaced with a new insert, if needed.

Continuing with FIGS. 145, 147, and 148, a central base 1344 is formed in the second surface 1306 of the body 1302. A blind bore 1348 is formed in the central base 1344, similar to the blind bore 362 shown in FIG. 55. A plurality of openings 1350 for the second fluid passages 1316 are formed in the central base 1344 and surround the blind bore 1348. In contrast, to the openings 364, shown in FIG. 54, the openings 1350 are spaced around in the blind bore 1348 in groups 1352, similar to the openings 1328 on the first surface 1304.

A second recessed cavity 1354 is formed in the second surface 1306 of the body 1302 and surrounds the openings 1350. The second recessed cavity 1354 is characterized by a base 1356 surrounded by a sidewall 1358. The base 1356 of the second cavity 1354 serves as an extension of the central base 1344. The sidewall 1358 joins the base 1356 and an outer rim 1360. An annular second insert 1362 is installed within the second cavity 1354 such that the second insert is fittingly received within the second cavity 1354. The second insert 1362 is identical to the first insert 1332, but it has an outer diameter that is greater than an outer diameter of the first insert 1332. Likewise, a central passage 1331 formed in the second insert 1362 has a greater diameter than the central passage 1338. A tapered surface 1364 of the second insert 1362 is configured to engage a discharge valve 1366, as shown in FIG. 150.

Continuing with FIGS. 143, 144, and 146, the intermediate surface 1308 of the fluid routing plug 1300 has a generally cylindrical shape. The intermediate surface 1308 includes a first sealing surface 1368 and a second sealing surface 1370. The sealing surfaces 1368 and 1370 are configured to engage respective first and second seals 1372 and 1374 installed within another embodiment of a housing 1376, as shown in FIG. 150. The seals 1372 and 1374 may be identical to the first and seconds seals 374 and 376 installed within the housing 104. The first sealing surface 1368 has a smaller diameter than the second sealing surface 1370. The intermediate surface 1308 also includes a first bevel 1378 positioned between the first sealing surface 1368 and the first surface 1304, and a second bevel 1380 positioned between the second sealing surface 1374 and the first fluid passages 1312.

With reference to FIG. 150, the housing 1376 is similar to the housing 104, with the exception of the shape of its horizontal bore 1382. The walls surrounding the horizontal bore 1382 are shaped to engage the fluid routing plug 1300. The walls engage the outer rims 1326 and 1360 on the first and second surfaces 1304 and 1306 and the first and second bevels 1378 and 1380. Fluid is routed throughout the fluid routing plug 1300 and the housing 1376 in the same manner as the fluid routing plug 116 and housing 104, shown in FIGS. 50 and 51.

With reference to FIGS. 151-160, another embodiment of a fluid routing plug 1400 is shown. The fluid routing plug 1400 comprises a body 1402 having opposed first and second outer surfaces 1404 and 1406 joined by an intermediate outer surface 1408. A central longitudinal axis 1410 extends through the body 1402 and both surfaces 1404 and 1406, as shown in FIG. 155. A plurality of first fluid passages 1412 are formed within the body 1402 and interconnect the intermediate surface 1408 and the first surface 1404, as shown in FIG. 156. The first fluid passages 1412 interconnect the intermediate surface 1408 and the first surface 1404 by way of a first axially blind bore 1414, as shown in FIG. 156. The first blind bore 1414 opens on the first surface 1404 of the body 1402.

Rather than having a plurality of wide first fluid passages, like those shown in FIG. 55, the first fluid passages 1412 comprise a plurality of groups 1416 of smaller first fluid passages 1412. The first fluid passages 1412 within each group 1416 are positioned in a side-by-side relationship, as shown by openings 1417 for the first fluid passages 1412 on the intermediate surface 1408 in FIG. 164. Three first fluid passages 1412 are shown in each group 1416 in FIGS. 151-154. In alternative embodiments, more or less than three first fluid passages may be included in each group. The first fluid passages 1412 each have a circular cross-sectional shape and extend orthogonally to the central longitudinal axis 1410 of the body 1402, as shown in FIG. 156.

The fluid routing plug 1400 further comprises a plurality of second fluid passages 1418 formed within the body 1402, as shown in FIG. 155. The second fluid passages 1418 interconnect the first surface 1404 and the second surface 1406 of the body 1402. The second fluid passages 1418 interconnect the first surface 1404 and the second surface 1406 by way of a second axially blind bore 1420. The second blind bore 1420 opens on the second surface 1406 of the body 1402. Each second fluid passage 1418 extends between the first surface 1404 and the second blind bore 1420 along a straight line path.

Continuing with FIG. 158, a first recessed cavity 1422 is formed in the first surface 1404 of the body 1402. The first cavity 1422 is identical to the first cavity 1318 shown in FIG. 149. An annular first insert 1424 is installed within the first cavity 1422. The first insert 1424 is identical to the first insert 1332, shown in FIG. 149. The first insert 1424 is configured to engage a suction valve 1426, as shown in FIGS. 159 and 160.

The first cavity 1422 is surrounded by an outer rim 1428. A plurality of openings 1430 for the second fluid passages 1418 are formed on the outer rim 1428. The openings 1430 are equally spaced around the outer rim 1428.

Continuing with FIG. 157, a second recessed cavity 1438 is formed in the second surface 1406 and surrounds an entrance 1440 to the second blind bore 1420. The second cavity 1438 is identical to the second cavity 1354, shown in FIG. 148. An annular second insert 1442 is installed within the second cavity 1438. The second insert 1442 is identical to the second insert 1362, shown in FIG. 148. The second insert 1442 is configured to engage a discharge valve 1444, as shown in FIGS. 159 and 160.

Continuing with FIG. 155, a third blind bore 1434 is formed in a base 1436 of the second blind bore 1420. The third blind bore 1434 is configured to engage with a tool to help remove the fluid routing plug 1400 from the horizontal bore with which it is installed.

Turning back to FIGS. 151, 152, and 154, the intermediate surface 1408 of the body 1402 varies in diameter throughout its length and has a generally cylindrical shape. The intermediate surface 1408 includes a first sealing surface 1446 and a second sealing surface 1448. The first and second sealing surfaces 1446 and 1448 are configured to engage with a first and second seal 1450 and 1452 installed within another embodiment of a housing 1454, as shown in FIGS. 159 and 160. The first and second seal 1450 and 1452 may be identical to the first and second seals 374 and 376 installed within the housing 104, as shown in FIGS. 70 and 71. The first sealing surface 1446 is positioned between the first surface 1404 of the body 1402 and the first fluid passages 1412. The second sealing surface 1448 is positioned between the second surface 1406 of the body 1402 and the first fluid passages 1412.

The intermediate surface 1408 has a first reduced diameter portion 1456 around the first fluid passages 1412, as shown in FIG. 154. When the fluid routing plug 1400 is installed within the housing 1454, an annular chamber 1458 is formed between the first reduced diameter portion 1456 and the housing 1454, as shown in FIG. 159. An intake bore 1460 opens into the chamber 1458. The chamber 1458 provides a pathway for fluid to flow from the intake bore 1460 to the openings 1417 of the first fluid passages 1412.

The intermediate surface 1408 also has a second reduced diameter portion 1464, as shown in FIG. 154. The second reduced diameter portion 1464 surrounds the second cavity 1438, as shown in FIG. 156. The second reduced diameter portion 1464 provides space for a plurality of legs 1466 of a discharge valve guide 1468 to engage the fluid routing plug 1400, as shown in FIG. 159. The legs 1466 help hold the components installed within the housing 1454 in place during operation.

With reference to FIGS. 159 and 160, the housing 1454 is generally similar to the housing 104 with the exception of the shape of its horizontal bore 1470. While not shown, a stuffing box and related components may be attached to the housing 1454. The walls surrounding the horizontal bore 1470 are shaped to engage the fluid routing plug 1400. The first surface 1404 of the fluid routing plug 1400 seats against an annular shoulder 1472 formed in the housing 1454. Fluid is routed throughout the fluid routing plug 1400 and the housing 1454 in the same manner as the fluid routing plug 116 and housing 104 shown in FIGS. 50 and 51. A discharge bore 1474 is shown opening on a bottom surface 1476 of the housing 1454 in FIGS. 159 and 160. In alternative embodiments, the discharge bore may open on a top surface of the housing, like the discharge bore 178 shown in FIGS. 50 and 51. The housing 1454 shown in FIGS. 159 and 160 also includes a single intake bore 1460. In alternative embodiments, a second intake bore may also be formed in the housing, like the housing 104.

With reference to FIGS. 161-164, another embodiment of a fluid routing plug 1500 is shown. The fluid routing plug 1500 is identical to the fluid routing plug 1400, but it does not include a first and second sealing surface. Instead, first and second annular grooves 1502 and 1504 are formed in an intermediate surface 1506. The grooves 1502 and 1504 are formed at the same position as the first and second sealing surface 1446 and 1448 formed in the fluid routing plug 1400, as shown in FIG. 159. First and second seals 1508 and 1510 are installed within each respective first and second groove 1502 and 1504.

The fluid routing plug 1500 is installed within another embodiment of a housing 1512, as shown in FIG. 164. The housing 1512 is identical to the housing 1454, but it does not include any grooves for housing the first and second seals 1508 and 1510. Rather, the first and second seals 1508 and 1510 engage the walls of the housing 1512 when the fluid routing plug 1500 is installed. Thus, the seals 1508 and 1510 are installed within the fluid routing plug 1500, rather than the walls of the housing 1512.

Continuing with FIGS. 161-163, the fluid routing plug 1500 also does not include the second reduced diameter portion formed in the fluid routing plug 1400, as shown in FIG. 154. Instead, the fluid routing plug 1500 has a uniform diameter between the second seal 1510 and its second surface 1514. A discharge valve guide 1516 may engage the second surface 1514 of the fluid routing plug 1500, as shown in FIG. 164.

With reference to FIGS. 165-170, another embodiment of a fluid routing plug 1600 is shown. The fluid routing plug 1600 comprises a body 1602 having opposed first and second outer surfaces 1604 and 1606 joined by an intermediate outer surface 1608. A central longitudinal axis 1610 extends through the body 1602 and both surfaces 1604 and 1606, as shown in FIG. 168. A plurality of first fluid passages 1612 are formed within the body 1602 and interconnect the intermediate surface 1608 and the first surface 1604. The first fluid passages 1612 extend at a non-zero angle relative to the central longitudinal axis 1610 of the body 1602.

Continuing with FIGS. 168 and 169, a first recessed cavity 1614 is formed in the first surface 1604. The first cavity 1614 is identical to the first cavity 1318, shown in FIG. 149, but includes a plurality of openings 1616 for the first fluid passages 1612, as shown in FIG. 169. An annular first insert 1618 is installed within the first cavity 1614. The first insert 1618 is identical to the first insert 1332, but it includes a plurality of insert passages 1620. When the first insert 1618 is installed within the first cavity 1614, the plurality of insert passages 1620 align with the plurality of first fluid passages 1612 in a one-to-one relationship, as shown in FIG. 168. Thus, the insert passages 1620 become an extension of the first fluid passages 1612.

An opening 1622 of each first fluid passage 1612 on the intermediate surface 1608 has an oval shape, while an opening 1624 of each first fluid passage 1612 on the first surface 1604 has a circular shape, as shown in FIGS. 165 and 166. The openings 1624 are equally spaced around the periphery of the first insert 1618, as shown in FIG. 167. The fluid routing plug 1600 includes more first fluid passages 1612 than the fluid routing plug 116 shown in FIG. 52. However, the first fluid passages 1612 have a smaller diameter than a diameter of the first fluid passages 326 formed in the fluid routing plug 116.

Continuing with FIG. 168, the fluid routing plug 1600 further comprise a single second fluid passage 1626 formed in the body 1602. The second fluid passage 1626 interconnects the first surface 1604 and the second surface 1606 along a straight-line path. The second fluid passage 1626 has a circular cross-sectional shape and extends along the central longitudinal axis 1610 of the body 1602. Because the body 1602 only includes a single second fluid passage 1626, the second fluid passage 1626 has a much larger diameter than the other second fluid passages described herein.

The second surface 1606 of the body 1602 includes a second recessed cavity 1628 having an annular second insert 1630 installed therein. The second cavity 1628 and second insert 1630 are identical to the second cavity 1354 and second insert 1362, shown in FIG. 148. The first cavity 1614 and the first insert 1618 surround an opening 1632 of the second fluid passage 1626 on the first surface 1604 of the body 1603. Likewise, the second cavity 1628 and the second insert 1630 surround an opening 1634 on the second surface 1606 of the body 1602.

The intermediate surface 1608 of the fluid routing plug 1600 is identical to the intermediate surface 1506 of the fluid routing plug 1500, but it does not have seals installed within grooves formed in the intermediate surface 1608. Rather, the intermediate surface 1608 has a first and second sealing surface 1636 and 1638, like the fluid routing plug 1400. In alternative embodiments, a first and second seal may be installed within the intermediate surface 1608 of the fluid routing plug 1600.

With reference to FIG. 170, fluid is routed through the fluid routing plug 1600 differently from the previously described fluid routing plugs. The fluid routing plug 1600 is shown installed within the housing 1454. Fluid passes from the intake bore 1460, through the first fluid passages 1612 and into an opening in the horizontal bore 1470. A suction valve 1640 used with the fluid routing plug 1600 includes a central passage 1642. Thus, the suction valve 1642 can seal the first fluid passages 1612 while leaving the second fluid passage 1626 open to the horizontal bore 1470. As a plunger extends, the plunger forces fluid in the horizontal bore 1470 into the second fluid passage 1626. The pressurized fluid flows through the second fluid passage 1626 and exits the second surface 1606 of the body 1602. From there, the pressurized fluid flows around a discharge valve 1644 and towards the discharge bore 1474 formed in the housing 1454.

Various features of the fluid routing plugs 116, 600, 700, 800, 900, 1000, 1100, 1200, 1400, 1500, and 1600 described above may be modified, varied, or included in each of the plugs, as desired.

Turning to FIGS. 171-187, another embodiment of a fluid routing plug 1700 is shown. Instead of having a single body, like the fluid routing plugs described above, the fluid routing plug 1700 is separated into two different sections-a first section 1702 and a second section 1704. A suction valve 1706 seals against the first section 1702 and a discharge valve 1708 seals against the second section 1704, as shown in FIGS. 185 and 187. The first section 1702 may be characterized as a suction seat, and the second section 1704 may be characterized as a discharge seat. In operation, fluid is primarily routed throughout the first section 1702.

Continuing with FIGS. 171-180, the first section 1702 comprises a body 1710 having opposed first and second surfaces 1712 and 1714 joined by an intermediate surface 1716. A plurality of first fluid passages 1718 are formed in the body 1710 and interconnect the intermediate surface 1716 and the first surface 1712, as shown in FIG. 173. The first fluid passages 1718 interconnect the intermediate surface 1716 and the first surface 1712 by way of an axially blind bore 1720. The first fluid passages 1718 have the same shape and orientation as the first fluid passages 1312, shown in FIG. 146.

Continuing with FIG. 174, a plurality of second fluid passages 1722 are formed in the body 1710 and interconnect the first and second surfaces 1712 and 1714 along a straight-line path. The first fluid passages 1718 and the second fluid passages 1722 are formed offset from one another in the body 1710 and do not intersect. The second fluid passages 1722 each have a circular cross-sectional shape, like the second fluid passages 336, shown in FIGS. 60-63. The second fluid passages 1722 may each extend at a non-zero angle relative to a central longitudinal axis 1724 of the body 1710.

Continuing with FIGS. 179 and 180, a first recessed cavity 1726 is formed in the first surface 1712 of the first section 1702. The first cavity 1726 is characterized by a base 1728 surrounded by a sidewall 1730. The sidewall 1730 is joined to an outer rim 1732. A first annular insert 1734 is installed within the first cavity 1726, as shown in FIG. 179. The first insert 1734 is identical to the first insert 1332, shown in FIG. 149. The first insert 1734 is configured to engage the suction valve 1706, as shown in FIGS. 185 and 187.

Continuing with FIGS. 175 and 177, each second fluid passage 1722 opens on the outer rim 1732 of the first surface 1712, as shown by a plurality of openings 1736. The openings 1736 may be spaced in groups 1738 on the first surface 1712, similar to the openings 1328, shown in FIG. 144. Each group 1738 shown in FIG. 177 includes three openings 1736. A plurality of blind bores 1740 of varying shapes and sizes are formed in the outer rim 1732 between each of the openings 1736. The blind bores 1740 function to remove excess weight from the first section 1702.

Continuing with FIGS. 171 and 172, the second surface 1714 of the first section 1702 has an outer rim 1742 and a central blind bore 1744. The blind bore 1744 may be threaded and is configured to engage with a tool used to grip the first section 1702. A plurality of countersinks 1746 are formed in the second surface 1714 surrounding the blind bore 1744. The countersinks 1746 form a plurality of raised surfaces 1748 surrounding the blind bore 1744. Each raised surface 1748 may have a generally triangular shape. The countersinks 1746 help remove excess weight from the first section 1702. In alternative embodiments, the countersinks and raised areas may have various shapes and sizes as desired.

The second fluid passages 1722 open on the raised surfaces 1748, as shown by a plurality of openings 1750. A plurality of blind bores 1752 of various shapes and sizes may be formed in the raised surfaces 1748 around the openings 1750. The blind bores 1752 help remove excess weight from the first section 1702. The openings 1750 may remain spaced in groups 1738 on the second surface 1714. In alternative embodiments, the openings of the second fluid passages may have different spacing or grouping, as desired.

Continuing with FIGS. 176 and 178, the intermediate surface 1716 of the first section 1702 has a generally cylindrical shape. The intermediate surface 1716 includes a first sealing surface 1754 positioned between the first surface 1712 and the first fluid passages 1718, and a second sealing surface 1756 positioned between the second surface 1714 and the first fluid passages 1718. The first and second sealing surfaces 1754 and 1756 are configured to engage a first and second seal 1758 and 1760 installed within another embodiment of a housing 1762, as shown in FIGS. 185 and 187. The first and second seals 1758 and 1760 may be identical to the first and second seals 374 and 376 installed within the housing 104, as shown in FIGS. 70 and 71. The first sealing surface 1754 has a smaller diameter than the second sealing surface 1756 in order to reduce friction during installation of the first section 1702 within the housing 1762.

The intermediate surface 1716 further includes a first bevel 1764 positioned between the first sealing surface 1754 and the first surface 1712. The intermediate surface 1716 further includes a taper 1766 positioned between the second sealing surface 1756 and the first fluid passages 1718. The first bevel 1764 is configured to engage a first beveled surface 1768 formed in the housing 1762, as shown in FIG. 187. When the first section 1702 is installed within the housing 1762, an annular chamber 1770 is formed between the taper 1766 and the housing 1762, as shown in FIG. 187. The chamber 1770 provides a pathway for fluid from an upper and lower intake bore 1772 and 1774 and the first fluid passages 1718.

Continuing with FIGS. 185 and 187, fluid is routed throughout the first section 1702 in the same manner as the fluid routing plug 116. However, when fluid exits the second surface 1714 of the first section 1702, the fluid is directed into the second section 1704, instead of being directed towards a discharge bore.

Turning to FIGS. 181-184, the second section 1704 comprises a body 1776 having opposed first and second surfaces 1778 and 1780 joined by an intermediate surface 1782. A central passage 1784 interconnects the first and second surfaces 1778 and 1780 of the body 1776. The first surface 1778 has an outer rim 1786 joined to a tapered wall 1788. The tapered wall 1788 extends between the central passage 1784 and the outer rim 1786. A second recessed cavity 1790 is formed in the second surface 1780. The second cavity 1790 is characterized by a base 1792 surrounded by a sidewall 1794. The sidewall 1794 is joined to an outer rim 1796. The outer rim 1796 is thicker than the outer rim 1786. The base 1792 of the second cavity 1790 surrounds an opening 1798 of the central passage 1784.

A second annular insert 1800 is installed within the second cavity 1790 and surrounds the opening 1798 of the central passage 1784, as shown in FIGS. 185 and 187. The second insert 1800 is identical to the second insert 1362, shown in FIG. 148. The second insert 1800 is configured to engage the discharge valve 1708, as shown in FIGS. 185 and 187.

Continuing with FIGS. 181-184, the intermediate surface 1782 of the second section 1704 has a generally cylindrical shape. The intermediate surface 1782 includes a third sealing surface 1802 positioned between the first and second surfaces 1778 and 1780, as shown in FIG. 184. The third sealing surface 1802 is configured to engage with a third seal 1804 installed within the housing 1762, as shown in FIG. 187. The third seal 1804 may be identical to the first or second seal 1758 or 1760. The intermediate surface 1782 also includes a second bevel 1806 positioned between the third sealing surface 1802 and the second surface 1780. The second bevel 1806 is configured to engage with a second beveled surface 1808 formed in the housing 1762, as shown in FIG. 187.

Continuing with FIGS. 185-187, the second section 1704 is installed within the housing 1762 such that the outer rim 1786 of its first surface 1778 engages the outer rim 1742 of the second surface 1714 of the first section 1702. A seal 1810 may be positioned between the outer rims 1786 and 1742, as shown in FIG. 186. The seal 1810 may be installed within a groove 1812 formed in the outer rim 1786 of the second section 1704. The first section 1702 may have smaller outer diameters than the second section 1704 in order to reduce friction as the first and second sections 1702 and 1704 are installed within the housing 1762, as shown in FIG. 187.

In operation, fluid exiting the second surface 1714 of the first section 1702 is funneled into the central passage 1784 of the second section 1704 by way of the tapered wall 1788. Fluid exits the second surface 1780 of the second section 1704 and flows around the discharge valve 1708 and a discharge valve guide 1814 towards a discharge bore 1816.

With reference to FIGS. 188-195, another embodiment of a first section 1900 is shown. The first section 1900 is identical to the first section 1702 with a few exceptions. A plurality of first fluid passages 1902 formed in a body 1904 of the first section 1900 have an oblong cross-sectional shape, rather than an oval cross-sectional shape, as shown by the opening 1903 in FIG. 194. An end of the oblong shape may be wider than its opposed end, as shown in FIG. 194.

A first surface 1906 of the first section 1900 is identical to the first surface 1712 of the first section 1702 shown in FIG. 177, with the exception of its blind bores 1908. The blind bores 1908 have different spacing than the blind bores 1740 formed in the first surface 1712. A second surface 1910 of the first section 1900 includes a central base 1912 surrounded by an outer rim 1914. A blind bore 1916 is formed in the central base 1912, similar to the blind bore 1744.

Instead of including a plurality of countersinks and raised surfaces like the first section 1702, the second surface 1910 of the first section 1900 includes a cut-out area 1918 between the blind bore 1916 and the outer rim 1914. The cut-out area 1918 helps remove excess weight from the first section 1900. A plurality of second passages 1920 formed in the first section 1900 open on the outer rim 1914 of the second surface 1910, as shown by the openings 1922. A plurality of blind bores 1924 are positioned adjacent the openings 1922 to help remove excess weight. The spacing of the openings 1922 may be identical to the spacing of the openings 1750, shown in FIG. 172.

An intermediate surface 1926 of the first section 1900 is identical to the intermediate surface 1716 of the first section 1702 with a minor exception. The intermediate surface 1926 includes two tapers 1928 and 1930 positioned on opposite sides of the first fluid passages 1902. When the first section 1900 is installed in the housing 1762, an annular chamber 1932 is formed between the housing 1762 and the tapers 1928 and 1930, as shown in FIG. 195. The annular chamber 1932 provides a pathway for fluid from the intake bores 1772 and 1774 to the first fluid passages 1902.

Continuing with FIG. 195, the second section 1704 is shown engaging the first section 1900 within another embodiment of a housing 1934. The housing 1934 is generally identical to the housing 1762 shown in FIG. 187. A discharge conduit 1936 is shown attached to a bottom surface 1938 of the housing 1934. In alternative embodiments, the discharge conduit may attach to a top surface of the housing. Likewise, the discharge bore may interconnect the top surface of the housing and the horizontal bore. While not shown, a stuffing box and corresponding components may be attached to the housing 1934. Fluid is routed through the first and second sections 1900 and 1704 in the same manner as the fluid routing plug 1700.

With reference to FIGS. 196-203, another embodiment of a fluid routing plug 2000 is shown. The fluid routing plug 2000 comprises a first section 2002 and a second section 2004. The first section 2002 is generally identical to the first section 1900, with a few exceptions. In contrast to the first surface 1900, no blind bores are formed in an outer rim 2006 of a first surface 2008 of the first section 2002. An opening 2010 of each of the plurality of second fluid passages 2012 formed in the first section 2002 are equally spaced around the outer rim 2006, rather than being spaced in groups.

A second surface 2014 of the first section 2002 is flat with the exception of a plurality of openings 2016 of the second fluid passages 2012 and a central blind bore 2018. The openings 2016 are equally spaced around the blind bore 2018. The central blind bore 2018 may be threaded and configured to engage a tool used to grip the first section 2002. A plurality of first fluid passages 2020 formed in the first section 2002 are identical to the first fluid passages 1902, shown in FIG. 190. However, an oblong shaped opening 2021 of each first fluid passage 2020 may have the same sized ends, as shown in FIG. 199.

Turning to FIGS. 202 and 203, the second section 2004 is shown engaging the first section 2002 within another embodiment of a housing 2022. The second section 2004 is generally identical to the second section 1704, shown in FIGS. 181-184, but its first surface 2024 may have a thicker outer rim 2026 than the second section 1704. While not shown in FIGS. 202 and 203, a seal may be placed between the first and second sections 2002 and 2004, like that shown in FIG. 186. The housing 2022 is sized to receive the first and second sections 2002 and 2004. The housing 2022 shown in FIGS. 202 and 203 has a single intake bore 2028 and a discharge bore 2030 positioned on a bottom surface 2032 of the housing 2022. In alternative embodiments, the housing may include a second intake bore and the discharge bore may be formed on a top surface of the housing. While not shown, a stuffing box and corresponding components may be attached to the housing 2022. Fluid is routed throughout the first and second sections 2002 and 2004 in the same manner as the fluid routing plug 1700, shown in FIGS. 185 and 187.

With reference to FIGS. 204-211, another embodiment of a first section 2100 is shown. The first section 2100 is identical with the first section 2002, with a few minor exceptions. An intermediate surface 2102 of the first section 2100 has a uniform diameter throughout its length. The intermediate surface 2102 includes a first sealing surface 2104 positioned adjacent its first surface 2106 and a second sealing surface 2108 positioned adjacent its second surface 2110. The first and second sealing surfaces 2104 and 2108 are configured to engage a first and second seal 2112 and 2114 installed within another embodiment of a housing 2116, shown in FIGS. 210 and 211. The first and second seal 2112 and 2114 may be identical to the first and second seals 374 and 376, shown in FIGS. 70 and 71.

A plurality of first fluid passages 2118 formed in the first section 2100 may be generally identical to the first fluid passages 1902, shown in FIG. 190. The second surface 2110 of the first section 2100 shown in FIG. 205 does not include a central blind bore. In alternative embodiments, a central blind more may be formed in the second surface. A plurality of second fluid passages 2120 formed in the first section 2100 may extend parallel to a central longitudinal axis 2122 of the first section 2100, as shown in FIG. 208.

Turning to FIGS. 210 and 211, the second section 2004 is shown engaging the first section 2100 within the housing 2116. While not shown, a seal may be placed between the first and second sections 2100 and 2004, like that shown in FIG. 186. The housing 2116 is sized to receive the first and second sections 2100 and 2004. The housing 2116 shown in FIGS. 210 and 211 has a single intake bore 2124 and a discharge bore 2126 positioned on a bottom surface 2128 of the housing 2116. In alternative embodiments, the housing may include a second intake bore and the discharge bore may be formed on a top surface of the housing. While not shown, a stuffing box and corresponding components may be attached to the housing 2116. Fluid is routed throughout the first and second sections 2100 and 2004 in the same manner as the fluid routing plug 1700, shown in FIGS. 185 and 187.

With reference to FIGS. 212-222, another embodiment of a fluid routing plug 2500 is shown. The fluid routing plug 2500 is generally identical to the fluid routing plug 550, shown in FIG. 100A-100E, but the plug 2500 includes modified first and second surfaces 2502 and 2504. The first surface 2502 comprises a recessed area 2505 positioned between the opening of an axially blind bore 2506 and a tapered surface 2508. The recessed area 2505 is configured to receive a hardened insert 2510, shown in FIG. 220.

Similarly, the second surface 2504 comprises a recessed area 2512 positioned between a plurality of openings 2514 of a plurality of second fluid passages 2516 and a tapered surface 2518. The recessed area 2512 is configured to receive a hardened insert 2520. The inserts 2510 and 2520 are sized to form an extension of the tapered surfaces 2508 and 2518, as well as not block fluid flow through the plug 2500. The hardened inserts 2510 and 2520 help reduce wear to the plug 2500 over time due to repeated contact of the intake and discharge valves 292 and 294.

With reference to FIGS. 223-230, another embodiment of a fluid routing plug 2600 is shown. The fluid routing plug 2600 is generally identical to the fluid routing plug 550, shown in FIG. 100A-100E, but the plug 2600 has an alternative embodiment of an intermediate surface 2602. First and second grooves 2604 and 2606 are formed in the intermediate surface 2602 adjacent the corresponding first and second surfaces 2608 and 2610. The grooves 2604 and 2606 are configured to receive a first and second seal 2612 and 2614, as shown in FIGS. 228 and 229. The seals 2612 and 2614 may be generally identical to the seals 374 and 376, shown in FIGS. 70 and 71. However, the seals 2612 and 2614 may have a smaller diameter than the seals 374 and 376.

Continuing with FIG. 230, the fluid routing plug 2600 is used with an alternative embodiment of a housing 2616. The housing 2616 does not include any grooves for housing seals that engage with the fluid routing plug 2600. Instead, the seals 2612 and 2614 installed within the fluid routing plug 2600 directly engage the walls of the housing 2616. The area of the housing walls engaged with the seals 2612 and 2614 are characterized as sealing surfaces. In some embodiments, the sealing surfaces may be hardened to help reduce wear and erosion.

In alternative embodiments, a first groove for housing a seal may be formed in the fluid routing plug and a second groove for housing a seal may be formed in the walls of the housing, and vice versa. In such embodiment, a first sealing surface is formed on the fluid routing plug and a second sealing surface is formed on a wall of the housing, or vice versa.

With reference to FIG. 231, another embodiment of a fluid routing plug 2700 is shown. The fluid routing plug 2700 is a combination of the new features added to the fluid routing plugs 2500 and 2600. The fluid routing plug 2700 comprises recessed areas 2702 and 2704 for receiving hardened inserts 2706 and 2708. The fluid routing plug 2700 also comprises first and second grooves 2710 and 2712 for housing first and second seals 2714 and 2716.

With reference to FIGS. 232-236, another embodiment of a fluid routing plug 2800 is shown. The fluid routing plug 2800 is identical to the fluid routing plug 950 shown in FIGS. 128A-128G, with a few exceptions. A first annular groove 2802 is formed in a first surface 2804 of the plug 2800 for housing a first seal 2806. Likewise, a second annular groove 2808 is formed in a second surface 2810 of the plug 2800 for housing a second seal 2812.

Continuing with FIGS. 235 and 236, in operation, the first seal 2806 engages the suction valve 292 and the second seal 2812 engages the discharge valve 294. The seals 2806 and 2812 create a tight seal between the first and second surfaces 2804 and 2810 and the corresponding valves 292 and 294 during operation. Over time, the seals 2806 and 2812 may be removed and replaced with a new seal, as needed.

With reference to FIGS. 237-248, another embodiment of a fluid routing plug 2900 is shown. The fluid routing plug 2900 is identical to the fluid routing plug 550 shown in FIGS. 100A-100G, with a few exceptions. The fluid routing plug 2900 comprises a plurality of second fluid passages 2902, each second fluid passage 2902 interconnects opposed first and second surfaces 2904 and 2906 of a body 2908 of the plug 2900. Like the plug 550, a counterbore 2910 is formed in the second surface 2906 of the plug 2900. In contrast to the plug 550, each of the second fluid passages 2902 does not open directly into the counterbore 2910. Instead, a group of second fluid passages 2902 open directly into a discharge pocket 2912, and the pocket 2912 opens directly into the counterbore 2910.

Continuing with FIGS. 237-248, three second fluid passages 2902 are shown opening into a single pocket 2912, and four pockets 2912 are shown formed in the body 2908. The pockets 2912 surround a blind bore 2914 formed at a base 2916 of the counterbore 2910 and have the cross-sectional shape of an arced slot.

In alternative embodiments, more than three second passages 2902 or less than three second passages 2902 may open into a single pocket 2912. Likewise, more than four or less than four pockets 2912 may be formed within the body 2908. In further alternative embodiments, the pockets 2912 may have different cross-sectional shapes.

In operation, the pockets 2912 combine the flow of fluid from the second fluid passages 2902 into a single pocket 2912. The cross-sectional area of a single pocket 2912 is larger than the cross-sectional area of the three corresponding second fluid passages 2902 combined, as shown in FIGS. 255 and 256. The increase in cross-sectional area results in a reduced flow velocity when fluid enters the pocket 2912 from the second fluid passages 2902. Likewise, the cross-sectional area of the counterbore 2910 is greater than the cross-sectional area of the four pockets 2912 combined, as shown in FIGS. 243 and 244. This further increase in cross-sectional area results in a further reduced flow velocity when fluid enters the counterbore 2910 from the pockets 2912. The lower fluid velocity reduces erosion of various surfaces within the fluid end caused by fluid flow. The pockets 2912 also help strengthen the body 2908 during operation.

With reference to FIGS. 249-260, another embodiment of a fluid routing plug 3000 is shown. The fluid routing plug 3000 is identical to the fluid routing plug 950 shown in FIGS. 128A-128G, with a few exceptions. The fluid routing plug 3000 comprises a plurality of second fluid passages 3002, each second fluid passage 3002 interconnects opposed first and second surfaces 3004 and 3006 of a body 3008 of the plug 3000. Instead of opening directly into a counterbore 3010 formed in the second surface 3006 of the plug 3000, the second fluid passages 3002 open into a plurality of pockets 3012. The pockets 3012 are configured identical to and serve the same purpose as the pockets 2912, shown in FIGS. 237-248. In alternative embodiments, the pockets 3012 may be formed like those alternative embodiments contemplated for the pockets 2912, shown in FIGS. 237-248.

With reference to FIGS. 261-274, another embodiment of a fluid routing plug 3100 is shown. The fluid routing plug 3100 is identical to the fluid routing plug 3000 shown in FIGS. 249-260, with a few exceptions. The fluid routing plug 3100 comprises a plurality of second fluid passages 3102, each second fluid passage 3102 interconnects opposed first and second surfaces 3104 and 3106 of a body 3108 of the plug 3000. The second fluid passages 3102 open into a plurality of pockets 3110. The pockets 3110 open into a counterbore 3112. The counterbore 3112 comprises a plurality of sidewalls 3114 joined to a base 3116. The sidewalls 3114 join the base 3116 to a tapered surface 3118 formed in the second surface 3106 of the body 3108.

In contrast to the fluid routing plug 3000, the sidewalls 3114 do not have a uniform diameter. Instead, the sidewalls 3114 taper inwardly from the base 3116 to the tapered surface 3118 such that the walls surrounding the counterbore 3112 have a conical shape. Thus, a diameter of the counterbore 3112 is smaller adjacent the tapered surface 3118 than it is adjacent the base 3116.

Decreasing the diameter of the counterbore 3112 adjacent the tapered surface 3118 increases the surface area of the tapered surface 3118. Increasing the surface area of the tapered surface 3118 increases the area for the discharge valve 294 to strike and seal against the second surface 3106 of the body 3108. The increased surface area reduces the strike force applied per unit of area by the valve 294 to the second surface 3106 during operation, thereby increasing the service life of both the valve 294 and the fluid routing plug 3100.

Continuing with FIGS. 265 and 266, the fluid routing plug 3100 further comprises a plurality of pockets 3120 formed in the first surface 3104 of the body 3108. A plurality of the second fluid passages 3102 open into each pocket 3120. Three second fluid passages 3102 are shown corresponding with a single pocket 3120 in the figures. In alternative embodiments, more or less than three second fluid passages 3102 may correspond with a single pocket 3120. Four pockets 3120 are shown spaced around a rim 3122 of the first surface 3104 in the figures. In alternative embodiments, more or less than four pockets 3120 may be formed in the first surface 3104. The pockets 3120 have a cross-sectional shape of an arced slot. In alternative embodiments, the pockets 3120 may have different shapes or sizes.

Continuing with FIGS. 265 and 266, each pocket 3120 has a greater cross-sectional surface area than the corresponding second fluid passages 3102 combined. In traditional operation, fluid flows into the pockets 3120 and then into the second fluid passages 3102. However, in some instances, fluid may be caused to flow in a reverse direction. The greater cross-sectional surface area of the pockets 3120 reduces the velocity of fluid flow entering the pockets 3120 from the second fluid passages 3102.

In operation, a failure of the discharge valve 294 may result in the reverse flow of high-pressure fluid through the second fluid passages 3102 and towards the inlet chamber 106. The high-pressure fluid may subject any components around the inlet chamber 106, such as the inlet valve 292 and suction valve guide 296, to large erosive forces. By allowing the fluid to first enter the pockets 3120 prior to entering the inlet chamber 106, the velocity of the fluid is reduced, thereby decreasing erosive forces flowing towards the inlet chamber 106 and extending the life of the fluid end.

With reference to FIGS. 275-291, another embodiment of a fluid routing plug 3200 is shown. The fluid routing plug 3200 comprises a body 3202 having a first surface 3204 joined to a second surface 3206 by an intermediate surface 3208. The first surface 3204 is also referred to herein as a suction surface 3204. The second surface 3206 is also referred to herein as a discharge surface 3206.

Continuing with FIGS. 276, 278, and 284-287, a plurality of first fluid passages 3210 are formed in the body 3202 and interconnect the intermediate surface 3208 and the suction surface 3204. The interconnection may be made by an axially blind bore 3212 formed in the suction surface 3204. The first fluid passages 3210 are also referred to herein as suction fluid passages 3210. Three suction fluid passages 3210 are shown in the figures. In alternative embodiments, more or less than three suction fluid passages 3210 may be formed in the body 3202.

Continuing with FIGS. 286 and 287, the suction fluid passages 3210 have a generally oval or tear drop cross-sectional shape. An opening 3216 of each suction fluid passage 3210 comprises a first side wall 3218 joined to a second side wall 3220 by first and second ends 3222 and 3224. The first and second side walls 3218 and 3220 are straight lines of equal length S and the first and second ends 3222 and 3224 are circular arcs, as shown in FIG. 287.

Continuing with FIG. 287, the first end 3222 of the opening 3216 has a radius of R1 with a center at C1, and the second end 3224 has a radius of R2 with a center at C2. The first end 3222 is larger than the second end 3224 such that R1>R2. The first and second side walls 3218 and 3220 are tangent to the first and second ends 3222 and 3224 and have an included angle, σ. The opening 3216 is oriented such that the center C1 of the first end 3222 is a perpendicular distance D from the central longitudinal axis 3214.

Continuing with FIG. 287, the opening 3216 has a centerline 3209 that connects the centers C1 and C2 of the first and second ends 3222 and 3224. The centerline 3209 has a length E and forms an angle x with the central longitudinal axis 3214, further orienting the opening 3216. A cross-sectional shape of each suction fluid passage 3210 through the length of the body 3202 corresponds with the shape of each opening 3216. The various features of the suction fluid passages 3210 are sized to maximize fluid flow through the suction fluid passages 3210 and minimize turbulence and stress.

With reference to FIGS. 285 and 288 each suction fluid passage 3210 extends between the axially blind bore 3212 and the suction surface 3204 such that each suction fluid passage 3210 comprises a first longitudinal axis 3205 and a second longitudinal axis 3207. The first longitudinal axis 3205 extends through the center C1 of the first end 3222 of the opening 3216, shown in FIG. 287. Like the center C1, the first longitudinal axis 3205 is offset a perpendicular distance D from the central longitudinal axis 3214. The first longitudinal axis 3205 does not intersect, is not parallel to, and is not co-planar with the central longitudinal axis 3214.

The second longitudinal axis 3207 extends through point P, shown on FIG. 285. The second longitudinal axis 3207 may intersect and be coplanar with the central longitudinal axis 3214, as shown in FIG. 288. The configuration of the suction fluid passages 3210 encourages a vortex type fluid flow about the central longitudinal axis 3214 of the body 3202, thereby reducing fluid turbulence and erosion during operation.

Turning to FIGS. 277-285, and 288-291, a plurality of second fluid slots 3226 are formed in the body 3202 and interconnect the suction surface 3204 and the discharge surface 3206. The second fluid slots 3226 open into a counterbore 3203 formed in the discharge surface 3206, as shown in FIG. 276. The second fluid slots 3226 are also referred to herein as discharge fluid slots 3226. The suction fluid passages 3210 and discharge fluid slots 3226 do not intersect and are in a spaced-relationship with one another. Three discharge fluid slots 3226 are shown in the figures. In alternative embodiments, more or less than three discharge fluid slots 3226 may be formed in the body 3202.

Continuing with FIGS. 281-285, and 288-291, each discharge fluid slot 3226 is generally identical to the group of three second fluid passages 3002, shown in FIGS. 258-260, but the walls separating the individual fluid passages 3002 have been removed. Each discharge fluid slot 3226 thus has a larger cross-sectional surface area than the groups of second fluid passages 3002. Like the group of second fluid passages 3002, at least a portion of each discharge fluid slot 3226 intersects a corresponding plane 3240 containing the central longitudinal axis 3214, as shown in FIG. 288.

Each discharge fluid slot 3226 has an arced cross-sectional shape. The length of the arc may gradually increase between the suction and discharge surfaces 3204 and 3206, as shown in FIGS. 277 and 280. In alternative embodiments, the discharge fluid slots 3226 may have different shapes or sizes.

Continuing with FIGS. 277, 280, 284, each discharge fluid slot 3226 opens on the suction surface 3204 at a first opening 3234 and opens on the discharge surface 3206 at a second opening 3236. A position of the first and second openings 3234 and 3236 may be determined relative to a plane containing a line 3228 perpendicular to the central longitudinal axis 3214, as shown in FIG. 284. The first opening 3234, when projected onto the plane, is positioned at a first distance F1 from the central longitudinal axis 3214 and at a first angle φ1 relative to the line 3228. The second opening 3236, when projected on the plane, is positioned at a second distance F2 from the central longitudinal axis 3214 and at a second angle φ2 relative to the line 3228.

The first and second distances F1 and F2 shown in FIGS. 277, 280, and 284 are different. Likewise, the first and second angles φ1 and φ2 shown in FIG. 284 are different. In alternative embodiments, the first and second distances F1 and F2 may be the same, but the first and second angles φ1 and 2 may be different. In further alternative embodiments, the first and second angles φ1 and φ2 may be the same, but the first and second distances F1 and F2 may be different. In even further alternative embodiments, the first and second distances F1 and F2 may be the same, and the first and second angles φ1 and φ2 may be the same.

The configuration of the discharge fluid slots 3226 encourages a vortex type flow of fluid about the central longitudinal axis 3214 of the body 3202, thereby reducing fluid turbulence during operation. The shape of the discharge fluid slots 3226 thus maximizes fluid flow and minimizes stress to the fluid routing plug 3200 during operation.

Turning back to FIGS. 275-280, with the exception of the construction of the suction fluid passages 3210 and the discharge fluid slots 3226, the intermediate surface 3208 and the suction and discharge surfaces 3204 and 3206 of the fluid routing plug 3200 are identical to those used with the fluid routing plugs 950, shown in FIGS. 128A-128G.

With reference to FIG. 292, another embodiment of a fluid routing plug 3300 is shown. The fluid routing plug 3300 is identical to the fluid routing plug 3200 shown in FIGS. 275-291, but further comprises a hardened zone 3302 formed in its discharge surface 3304. The surface of the hardened zone 3302 is harder than its surrounding surfaces and may comprise a wear resistant material, such as tungsten carbide.

A hardened material may be applied to the hardened zone 3302 using a high velocity oxygen fuel (HVOF) thermal spray coating process. Alternatively, the hardened, wear resistant material may be applied to the discharge surface 3304 by other methods known in the art. Following application of the hardened material, the discharge surface 3304 may be ground so that it has a flush surface. Alternatively, the hardened zone 3302 may be finished to a different height, if desired.

Figure 89:
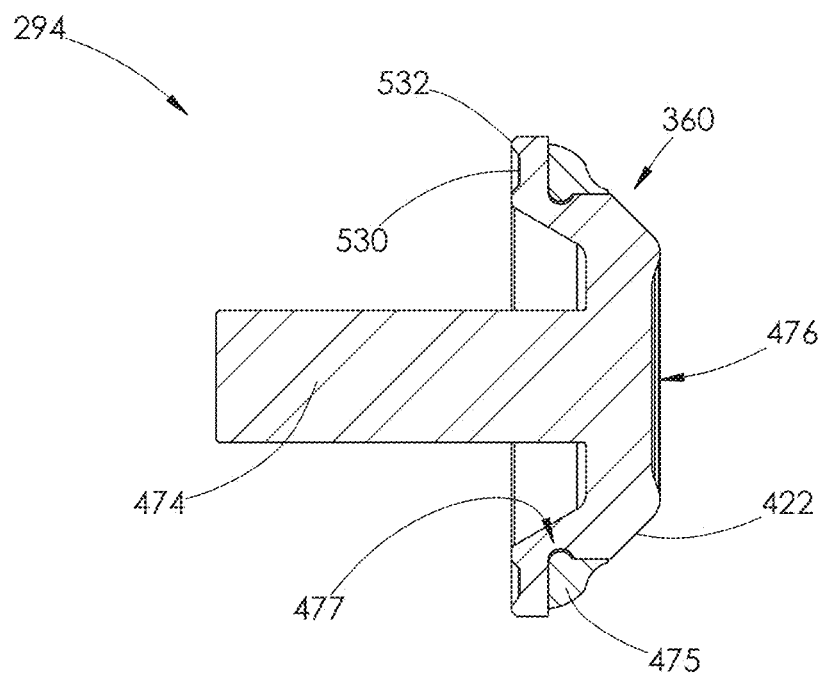
FIG. 89 is a cross-sectional view of the discharge valve shown in FIG. 87, taken along line AC-AC.

In operation, the hardened zone 3302 generally engages the seal 475 installed within the discharge valve 294 as shown in FIG. 89. The hardened zone 3302 increases the life span of the fluid routing plug 3300 reducing wear and erosion caused by repeated contact between discharge surface 3304 and the discharge valve 294 or seal 475. In alternative embodiments, the hardened zone 3302 may comprise more surface area of the discharge surface 3304 than is shown in FIG. 292. In further alternative embodiments, the fluid routing plug 3300 may comprise additional hardened zones, such as a hardened zone on a suction surface 3306 or an intermediate surface 3308 at desired areas.

The housings described herein have various embodiments of suction valves, discharge valves, suction valve guides, and discharge valve guides. One of skill in the art will appreciate that these components may have various shapes and sizes depending on the construction of the housing and various components.

While not shown herein, one of skill in the art will appreciate that the fluid end 100 described herein may be formed as a single housing having a plurality of horizontal bores formed therein and positioned in a side-by-side relationship. The housing may be attached to a single, large connect plate. In further alternative embodiments, the single housing described above may be broken up into one or more sections having two or more horizontal bores formed therein. Such housings may be attached to one or more connect plates.

One of skill in the art will further appreciate that various features of the fluid routing plugs, housings, and other components described herein may be modified or changed, as desired. While not specifically shown in a figure herein, various features from one or more of the fluid routing plugs described herein may be included in another one of the plugs. Likewise, various features from one or more of the different housings described herein may be included in another one of the housings.

One or more kits may be useful in assembling the fluid end sections 102. A kit may comprise a plurality of housings described herein, and a plurality of the corresponding fluid routing plugs described herein. The kit may also comprise a plurality of suction valves, discharge valves, suction valve guides, discharge valve guides, and various seals described herein.

The concept of a "kit" is described herein due to the fact that fluid ends are often shipped or provided unassembled by a manufacturer, with the expectation that a customer will use components of the kit to assemble a functional fluid end. Alternatively, some components are replaced during operation. Accordingly, certain embodiments within the present disclosure are described as "kits," which are unassembled collections of components. The present disclosure also describes and claims assembled apparatuses and systems by way of reference to specified kits, along with a description of how the various kit components are actually coupled to one another to form the apparatus or system.

The term "means for routing fluid" refers to the various fluid routing plugs described herein and structural equivalents thereof. The term "means for regulating fluid flow" refers to the various suction and discharge valves and suction and discharge valve guides described herein and structural equivalents thereof. A "means for pressurizing fluid" refers to the fluid end and the various embodiments of housings and components installed within or attached to the various housings described herein and structural equivalents thereof.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed. Changes may be made in the construction, operation and arrangement of the various parts, elements, steps and procedures described herein without departing from the spirit and scope of the invention as described in the following claims.

The invention claimed is:

1. An apparatus, comprising:
  a fluid routing plug, comprising:
    a body having an axially blind bore formed therein;
    a first surface comprising a tapered wall, at least a portion of the tapered wall configured to engage a valve body;
    an opposed second surface;
    an outer intermediate surface joining the first and second surfaces;
    a plurality of first passages joining a plurality of first openings formed in the outer intermediate surface and a plurality of second openings formed in a wall of the body surrounding the axially blind bore;
    a plurality of second passages joining a plurality of third openings formed in the tapered wall and a plurality of fourth openings formed in the second surface; and
    an entrance interconnecting the axially blind bore and the tapered wall.

2. The apparatus of claim 1, further comprising:
  an axis extending through the body and interconnecting the first and second surfaces;
  in which the tapered wall is tapered at an angle of 60 degrees relative to the axis.

3. The apparatus of claim 1, further comprising an outer edge formed on the first surface; in which the tapered wall is situated between the outer edge and the entrance.

4. A fluid end, comprising:
  a fluid end body having a bore formed therein; and
  the apparatus of claim 1 installed within the bore.

5. The apparatus of claim 1, in which the plurality of first passages are formed offset from and do not intersect with any of the plurality of second passages.

6. An apparatus, comprising:
  a fluid routing plug configured to be installed within a fluid end, the fluid routing plug comprising:
    a first end comprising a first tapered sealing surface and a plurality of first openings formed on the first tapered sealing surface;
    an opposed second end comprising a second tapered sealing surface;
    an intermediate surface joining the first and second ends;
    a plurality of first fluid passages formed therein; and
    a plurality of second fluid passages formed therein, the plurality of second fluid passages interconnecting the first and second ends;
    in which each of the plurality of second fluid passages is joined to one of the plurality of first openings in a one-to-one relationship.

7. The apparatus of claim 6, in which the fluid routing plug further comprises a plurality of second openings formed on the second end.

8. The apparatus of claim 6, in which the second end of the fluid routing plug further comprises a base, the base comprising a plurality of second openings, each of the second openings joined to one of the plurality of second fluid passages in a one-to-one relationship.

9. The apparatus of claim 8, in which the second end further comprises an outer edge; in which the second tapered sealing surface extends between the outer edge and the base.

10. The apparatus of claim 6, in which the fluid routing plug further comprises an axis extending through the first and second ends; in which the second tapered sealing surface is formed at a non-zero angle relative to the axis.

11. The apparatus of claim 10, in which the non-zero angle is between 1 and 60 degrees.

12. The apparatus of claim 6, in which the first end further comprises an axially blind bore formed therein, the axially blind bore having an entrance.

13. The apparatus of claim 12, in which the first end further comprises an outer edge; in which the first tapered sealing surface is situated between the outer edge and the entrance.

14. The apparatus of claim 6, in which the intermediate surface comprises:
a first sealing surface configured to engage a first seal; and
a second sealing surface configured to engage a second seal.

15. The apparatus of claim 14, in which the first and second seals are situated within a fluid end housing.

16. A fluid end, comprising:
a fluid end housing comprising a rectilinear bore formed therein;
the apparatus of claim 14 situated within the rectilinear bore;
a first seal that is the first seal of claim 14, the first seal installed within the rectilinear bore; and
a second seal that is the second seal of claim 14, the second seal installed within the rectilinear bore.

17. The apparatus of claim 14, in which the intermediate surface further comprises a beveled surface situated between the first sealing surface and the first end of the fluid routing plug.

18. An apparatus, comprising:
a fluid routing plug configured to be installed within a fluid end, the fluid routing plug comprising:
a first surface, comprising:
a first tapered sealing surface having a plurality of first openings formed therein; and
an opposed second surface, comprising:
a second tapered sealing surface; and
a base having a plurality of second openings formed therein;
in which the first tapered sealing surface is configured to engage a first valve; and
in which the second tapered sealing surface is configured to engage a second valve.

19. The apparatus of claim 18, in which the first valve is a suction valve; and in which the second valve is a discharge valve.

20. The apparatus of claim 18, in which the fluid routing plug further comprises a plurality of passages formed therein, the plurality of passages joining the plurality of first openings and the plurality of second openings.

* * * * *

UNITED STATES PATENT AND TRADEMARK OFFICE
CERTIFICATE OF CORRECTION

| | | |
|---|---|---|
| PATENT NO. | : 12,398,710 B2 | Page 1 of 1 |
| APPLICATION NO. | : 19/188205 | |
| DATED | : August 26, 2025 | |
| INVENTOR(S) | : Thomas et al. | |

It is certified that error appears in the above-identified patent and that said Letters Patent is hereby corrected as shown below:

In the Specification

Column 5, Line 18, after the word "in", please insert --FIG. 20.--.
Column 5, Line 19, please delete "FIG. 20.".
Column 20, Line 66, please delete "plural" and substitute therefor "plurality of".
Column 29, Line 11, after the word "in", please insert --the--.
Column 32, Line 11, please delete "central the" and substitute therefor "the central".
Column 36, Line 55, please delete the first occurrence of "of" and substitute therefor "to".
Column 39, Line 19, after "146", please insert --,--.
Column 40, Line 33, after the first occurrence of "and", please insert --the--.
Column 40, Line 34, after the word "and", please insert --the--.
Column 40, Line 39, after the word "between", please insert --the--.
Column 40, Line 40, after the second occurrence of "and", please insert --the--.
Column 43, Line 47, after the word "and", please insert --the--.
Column 44, Line 25, after the word "and", please insert --the--.
Column 45, Line 19, please delete the first occurrence of ",".
Column 45, Line 47, please delete "seconds" and substitute therefor "second".
Column 47, Line 3, please delete "seal" and substitute therefor "seals".
Column 49, Line 31, please delete "sections-a" and substitute therefor "sections — a".
Column 53, Line 17, please delete the first occurrence of "with" and substitute therefor "to".
Column 53, Line 21, after "2106", please insert --,--.
Column 53, Line 26, please delete "seal" and substitute therefor "seals".
Column 53, Line 57, please delete "FIG." and substitute therefor "FIGS.".
Column 54, Line 9, please delete "FIG." and substitute therefor "FIGS.".
Column 54, Line 54, after "292", please insert --,--.

Signed and Sealed this
Twenty-first Day of October, 2025

John A. Squires
*Director of the United States Patent and Trademark Office*